United States Patent
Kiuchi et al.

(10) Patent No.: US 8,985,634 B2
(45) Date of Patent: Mar. 24, 2015

(54) ANTI-COUNTERFEIT PRINTED MATTER, METHOD OF MANUFACTURING THE SAME, AND RECORDING MEDIUM STORING HALFTONE DOT DATA CREATION SOFTWARE

(75) Inventors: Masato Kiuchi, Kashiwa (JP); Susumu Kiuchi, Tokyo-To (JP); Kayoko Satoh, Tokyo-To (JP); Kazuya Ohshima, Kawasaki (JP)

(73) Assignee: National Printing Bureau, Incorporated Administrative Agency, Tokyo (JP)

( * ) Notice: Subject to any disclaimer, the term of this patent is extended or adjusted under 35 U.S.C. 154(b) by 486 days.

(21) Appl. No.: 13/119,094

(22) PCT Filed: Sep. 15, 2009

(86) PCT No.: PCT/JP2009/066072
§ 371 (c)(1),
(2), (4) Date: Mar. 15, 2011

(87) PCT Pub. No.: WO2010/032718
PCT Pub. Date: Mar. 25, 2010

(65) Prior Publication Data
US 2011/0193334 A1 Aug. 11, 2011

(30) Foreign Application Priority Data

Sep. 16, 2008 (JP) ................................ 2008-235825
Jun. 23, 2009 (JP) ................................ 2009-148174
Jun. 23, 2009 (JP) ................................ 2009-148175

(51) Int. Cl.
*B42D 15/00* (2006.01)
*H04N 1/40* (2006.01)
(Continued)

(52) U.S. Cl.
CPC ................ *B41M 3/14* (2013.01); *G06T 1/0021* (2013.01); *H04N 1/32251* (2013.01);
(Continued)

(58) Field of Classification Search
USPC .............................. 283/77, 93; 358/3.21, 3.28
See application file for complete search history.

(56) References Cited

U.S. PATENT DOCUMENTS 5,271,645 A * 12/1993 Wicker ........................... 283/92
5,784,200 A *  7/1998 Modegi ......................... 359/567
(Continued)

FOREIGN PATENT DOCUMENTS

JP        2001324949        * 11/2001
JP        2004-174997 A       6/2004
(Continued)

OTHER PUBLICATIONS

JP2001324949 Machine Translation.*
(Continued)

*Primary Examiner* — Kyle Grabowski
(74) *Attorney, Agent, or Firm* — Birch, Stewart, Kolasch & Birch, LLP

(57) ABSTRACT

This invention relates to an anti-counterfeit printed matter such as a banknote or a passport which requires anti-counterfeit or anti-copy, a method of manufacturing the same, and a recording medium storing halftone dot data creation software.

Units are arranged at a predetermined pitch in a matrix on a base material in a first direction and a second direction perpendicular to the first direction, each unit including a first object and a second object which are arranged along the first direction on both sides of a center so as to oppose each other and a third object arranged in a region without the first object and the second object, the first object and the second object of each of the units have an on/off relationship and the same area, the first objects form one of a positive image and a negative image of a first invisible image, and the second objects form the other of the negative image and the positive image of the first invisible image, and the third objects form a visible image having a continuous tone.

16 Claims, 87 Drawing Sheets

(51) Int. Cl.
*B41M 3/14* (2006.01)
*G06T 1/00* (2006.01)
*H04N 1/32* (2006.01)
*B42D 25/29* (2014.01)
*B42D 25/324* (2014.01)

(52) U.S. Cl.
CPC ........... H04N 1/32256 (2013.01); B42D 25/29 (2013.01); *B42D 2035/34* (2013.01); *G06T 2201/0051* (2013.01); *B42D 25/324* (2013.01)
USPC .............................. 283/93; 283/77; 358/3.28

(56) References Cited

U.S. PATENT DOCUMENTS

| | | | | |
|---|---|---|---|---|
| 6,865,001 | B2* | 3/2005 | Long et al. | 283/93 |
| 7,305,105 | B2* | 12/2007 | Chosson et al. | 380/258 |
| 7,366,301 | B2* | 4/2008 | Huang et al. | 283/93 |
| 2002/0106102 | A1* | 8/2002 | Au et al. | 382/100 |
| 2004/0165219 | A1* | 8/2004 | Chen | 358/3.28 |
| 2007/0121170 | A1* | 5/2007 | McCarthy et al. | 358/3.28 |

FOREIGN PATENT DOCUMENTS

| | | | |
|---|---|---|---|
| JP | 3544536 | B2 | 7/2004 |
| JP | 2004-261979 | A | 9/2004 |
| JP | 2005-53197 | A | 3/2005 |
| JP | 2005-262492 | A | 9/2005 |
| JP | 2007-43171 | A | 2/2007 |
| JP | 4013450 | B2 | 11/2007 |
| JP | 4132122 | B2 | 8/2008 |

OTHER PUBLICATIONS

"Hidden and scrambled images," Conference on Optical Security and Counterfeit Deterrence Techniques IV, Jan. 28, 2002, SPIE vol. 4677, pp. 333-348.

* cited by examiner (a)

(b)

(a)

(b)

(a)

(b)

ANTI-COUNTERFEIT PRINTED MATTER, METHOD OF MANUFACTURING THE SAME, AND RECORDING MEDIUM STORING HALFTONE DOT DATA CREATION SOFTWARE

TECHNICAL FIELD

The present invention relates to an anti-counterfeit printed matter, including securities such as banknotes, passports, stock certificates, and bonds, various kinds of certificates, and important documents, which requires anti-counterfeit or anti-copy and especially has a continuous tone as in a face image, a method of manufacturing the same, and a recording medium storing halftone dot data creation software.

RELATED ART

Generally, various techniques are applied to produce an anti-counterfeit effect for valuable printed matters of certificate documents. However, along with the recent advent of high-quality color copying machines and computerized color plate making techniques, certificate document counterfeit techniques tend to be rich in variety. Measures against certificate document counterfeit cope with this by growing in sophistication. However, this leads to an increase in manufacturing cost necessary for anti-counterfeit, and for example, introducing dedicated facilities including special machines and tools for obtaining an environment to confirm the anti-counterfeit effect sometimes drives up the cost of authenticity determination.

One of useful methods of enabling authenticity determination at low cost is a technique of overlaying a discrimination tool on a printed matter. More specifically, a discrimination tool is overlaid on a printed matter containing an invisible image, thereby making the invisible image visible. The major form of the discrimination tool is a lenticular lens or a transparent sheet (to be referred to as a "parallel line filter" hereinafter) with a parallel line screen printed on it. The techniques of visualizing an invisible image are roughly classified into two types: dot phase modulation and line phase modulation.

As a printed matter whose latent image is visualized upon overlaying a discrimination tool formed from such a parallel line filter and an authenticity determination method therefor, there exists a printed matter having a background image portion printed by parallel line (or halftone dot) objects and a latent image portion printed by parallel line (or halftone dot) objects in a phase different from that of the background image portion. The background image portion and latent image portion of the printed matter appear to be hard to visually recognize discriminately. However, a method is known which allows to visually recognize the background image portion and latent image portion discriminately by overlaying a parallel line filter on the printed matter at a predetermined position.

An example of dot phase modulation includes an image forming method and a printed matter with patterns phase-modulated in the first and second directions, in which a first multi-tone image is formed by overlaying a parallel line filter so as to make the first direction of the printed matter coincide with the parallel line pattern of the parallel line filter, and a second multi-tone image is formed by changing the overlay angle of the parallel line filter so as to make the second direction of the printed matter coincide with the parallel line pattern (see, for example, patent reference 1).

Another example of dot phase modulation is a printed matter in which dots of a dot pattern whose image becomes visible upon overlaying a lens array (for example, flyeye lens, honeycomb lens, or lenticular lens) on the base material include halftone dots in at least two types of screen line numbers and at least two types of screen angles. If the printed matter is authentic, the percent dot area of the dots of the dot pattern does not change. Hence, an invisible image is visualized by overlaying a lens array. If the printed matter is a duplication, the dots reproduced by the size of the screen line number or the halftone dot angle degrade, and the dot density changes. Hence, an image different from the invisible image becomes visible on the printed matter (see, for example, patent reference 2).

An example of dot phase modulation on abroad is Isogram available from Astron Design, Netherlands (see, for example, non-patent reference p. 1340). More specifically, a flat pattern having an apparently uniform density includes an invisible image formed by the phase of fine halftone dots upon enlargement. When a dedicated sheet is overlaid on the printed matter, the invisible image is made visible as a negative or positive image. However, it is impossible to clearly visualize the image because of the flat pattern having a uniform density.

The present applicants have applied for a patent concerning a printed matter using dot phase modulation. This is a latent image printed matter having two latent image patterns formed by periodically arraying a plurality of isochromatic pixels on a base material. The printed matter has a first latent image pattern (invisible image) in a first region where the plurality of pixels are arrayed with a phase shift in the first direction and a second latent image pattern (invisible image) in a second region printed by a functional ink (see, for example, patent reference 3).

An example of line phase modulation is a printed matter having line portions and non-line portions on a base material, in which a plurality of kinds of latent image parallel line patterns each printed in a different color and having a latent image portion formed by shifting the parallel line phase by a 1/2 pitch with respect to a parallel line pattern having a single pitch and width are superimposed at different angles and printed, and the latent image portion is made visible by overlaying a film having the same pitch as that of the parallel line pattern of the printed matter on the plurality of kinds of invisible images (see, for example, patent reference 4).

An example of line phase modulation on abroad is HIT (Hidden Image Technology) available from Jura, Hungary (see non-patent reference p. 1341). A flat pattern having an apparently uniform density includes an invisible image formed by the phase of fine parallel lines upon enlargement. When a dedicated sheet is overlaid on the printed matter, the invisible image is made visible as a negative or positive image. Note that since it may be possible to identify the invisible image of the printed matter by normal observation, a visible image is formed as a camouflage pattern by changing the object width of some parallel lines. Hollow objects may be used to form the visible image. However, when the invisible image is made visible by overlaying the dedicated sheet, the camouflage pattern is simultaneously visualized as a visible image to impede visibility of the visualized invisible image.

In general, a pattern formed by dot phase modulation or line phase modulation is flat.

In the above-described printed matters, the latent image pattern is made of printed objects having a flat density. For this reason, it is impossible to form an invisible image that can clearly be visualized. In addition, even when providing some kind of visible image, it includes simple hollow objects, as in patent reference 2, and therefore impedes visibility of a visualized invisible image. When normally observed, the printed matter shows only a monotonous pattern. Since no more elaborate design expression is possible, the printed matter has limited applications as a product.

The present applicants have applied for a patent concerning an anti-counterfeit printed matter which forms invisible images that are never identifiable upon normal observation even without hollow objects or the like but clearly visible using a single discrimination tool, and arrays the invisible images in a predetermined direction so as to prevent any visible image from impeding the visibility of the visualized invisible images.

The present applicants have already applied for a patent concerning a printed matter and a method of visualizing an invisible image embedded in a photo image using some kind of discrimination element. This technique creates a halftone dot printed matter characterized by providing a first halftone region of m×m pixels (m≥2, m is an integer) and a second halftone region of n×n pixels (1≤n<m, n is an integer) where halftone dots are printed to express a continuous tone image, in which an embedded image using at least one color ink containing no infrared absorption pigment is arranged in the first halftone region as halftone dots, and an invisible image made of characters or a face image using ink containing infrared absorption pigments is arranged in the second halftone region as halftone dots (see, for example, patent reference 5).

However, the method using the features of infrared absorption is very effective as an anti-counterfeit measure but needs an optical device to visualize infrared rays as a discrimination tool. It is therefore necessary to prepare the expensive device in advance for authenticity determination.

There also exists a series of techniques generally called digital watermark as a method of adding read information without changing the design properties of photo images and any other various kinds of patterns. Digital watermark is also called a concealed image and is mainly used to embed copyright information in a document file or its printed matter in an advanced copy or DTP technique. A known representative technique for printed matters is called a frequency use type.

The digital watermark is said to rarely deteriorate its frequency characteristic even in a duplication and often used recently in digital images distributed on the Internet for the purpose of copyright protection. There is also a growth in the use of digital watermark in posters and the like because it works even in printed matters.

The digital watermark is most effective in a continuous tone (photo tone) pattern. The continuous tone (photo tone) pattern is multilevel image data and therefore has sufficient redundancy. For this reason, not only the frequency use type but also many other methods such as a pixel replacement type, pixel space use type, and quantization error diffusion type have been proposed, and there have been a lot of references and patent applications. The digital watermark is one of the techniques that have received a great deal of attention today.

However, to see information embedded as a digital watermark, the user needs an optical device such as a scanner capable of optically reading the printed matter including the embedded digital watermark and a computer and an application to analyze the read image. The user cannot see the information embedded in the printed matter without deploying the peripheral devices.

PRIOR ART REFERENCES

Non-Patent Document

Non-patent reference 1: Optical Security and Counterfeit Deterrence Techniques IV Vol. 4677 (by SPIE—The International Society for Optical Engineering)

Patent Document

Patent document 1: Japanese Patent No. 4132122
Patent document 2: Japanese Patent No. 4013450
Patent document 3: Japanese Patent Application No. 2007-43171
Patent document 4: Japanese Patent Laid-Open No. 2004-174997
Patent document 5: Japanese Patent No. 3544536

Problem to be Solved by the Invention

In the above-described printed matters of patent references 1, 2, and 4, since a latent image pattern is made of printed objects having a uniform density, it is impossible to form an invisible image that can clearly be visualized. In addition, when only the printed matter is observed without overlaying the parallel line filter, no significant visible image having a continuous tone is formed. Even when attempting to form such an image, it is difficult to form a significant visible image having a continuous tone by the conventional simple object arrangement. "Continuous tone" indicates a pattern having highlight, halftone, and shadow densities.

Patent reference 1 discloses a printed matter including a first multi-tone image formed by overlaying a parallel line filter and a second multi-tone image formed by changing the overlay angle of the parallel line filter so as to make its parallel line pattern coincide with the second direction of the printed matter. When observing only the printed matter without overlaying the parallel line filter, the printed matter is visually recognized as if some kind of multi-tone image were embedded in the printed matter because of simple dot phase modulation, resulting in a sense of incongruity. In addition, since the multi-tone images are formed by simple dot modulation, the printed matter itself has a printed pattern with a flat density. Hence, it is difficult to form a significant visible image having a continuous tone.

Even if some kind of visible image is provided, as in patent reference 2, it is eventually necessary to form an invisible image in the flat density region of the visible image. It is therefore difficult to form an invisible image in the region where the significant visible image having a continuous tone is formed. Additionally, in patent reference 2, since the visible image is formed by simple hollow objects or dot patterns of two complementary colors, the visibility of the visualized invisible image is impeded. Furthermore, the printed matter described in patent reference 2 requires a plurality of discrimination tools.

Patent reference 4 discloses a printed matter having a latent image formed by line phase modulation. To solve the problem that the latent image portion is visually recognized in advance when observing only the printed matter without overlaying the parallel line filter, it is necessary to form the latent image parallel line pattern using broken lines or form camouflage objects using hollow objects. In addition, since the latent image portion is formed by simple line phase modulation, the printed matter itself has a printed pattern with a flat density. Hence, it is difficult to form a significant visible image having a continuous tone.

Even when some kind of invisible image or information is embedded in a photo image, an optical device that visualizes the image or information and a computer and an application to analyze the image are necessary, as in the printed matter described in patent reference 5. It is necessary to deploy the peripheral devices for authenticity determination.

In the present invention, there is demanded, in consideration of the above-described situations, a method that allows to reliably embed an invisible image in the same region as that of a significant visible image having a continuous tone even when the significant visible image with a continuous tone is formed on a printed matter without a parallel line filter overlaid on it, forms an invisible image that can clearly be visualized by a single discrimination tool, prevents a visible image from impeding the visibility of a visualized invisible image, and can also easily determine authenticity without deploying peripheral devices such as a computer and an application. Simultaneously demanded is a system capable of easily manufacturing the above-described printed matter including a significant visible image with a continuous tone and an embedded invisible image without forcing the operator to arrange objects by trial and error.

The present invention has been made to solve such conventional problems, and has as its object to propose an anti-counterfeit printed matter including a significant visible image having a continuous tone and an embedded invisible image, which can embed the invisible image in the same region as the region where the significant visible image with a continuous tone is provided and make, using a predetermined object array, the invisible image hard to visually recognize upon observing only the printed matter without overlaying a discrimination tool and forming any camouflage pattern, and an anti-counterfeit printed matter manufacturing method that allows an operator to easily manufacture without arranging objects by trial and error. It is another object of the present invention to propose a recording medium storing software including an item setting means, an image input means, a calculation means, and an image output means and capable of automatically creating the halftone dot data of an anti-counterfeit printed matter by causing the item setting means to do necessary settings.

SUMMARY OF THE INVENTION

An anti-counterfeit printed matter having a continuous tone according to the present invention is characterized in that units are arranged at a predetermined pitch in a matrix on a base material in a first direction and a second direction perpendicular to the first direction, each unit including a first object and a second object which are arranged along the first direction on both sides of a center so as to oppose each other, and a third object arranged in a region without the first object and the second object, the first object and the second object of each of the units have an on/off relationship and the same area, the first objects form one of a positive image and a negative image of a first invisible image, and the second objects form the other of the negative image and the positive image of the first invisible image, and the third objects form a visible image having a continuous tone.

An anti-counterfeit printed matter having a continuous tone according to the present invention is characterized in that the third objects form the visible image having the continuous tone by one method selected from increasing/decreasing an object size, changing an object density, and changing an object sparseness.

An anti-counterfeit printed matter having a continuous tone according to the present invention is characterized in that a long side of the unit has a length of not more than 1 mm.

An anti-counterfeit printed matter having a continuous tone according to the present invention is characterized in that a fourth object having an object area ratio 1/2 or substantially 1/2 that of the first object or the second object and also having the same color is arranged at a position where the first object, the second object, and the third object are not formed in the unit in which, out of the first objects and the second objects which are arranged in the on/off relationship to form the first invisible image, the first object and the second object in an off state are arranged in close vicinity in the adjacently arranged units.

An anti-counterfeit printed matter having a continuous tone according to the present invention is characterized in that the fourth object is formed in a shape surrounding the third object or in a shape surrounded by the third object in a region where the first object, the second object, and the third object are not formed in the unit.

An anti-counterfeit printed matter having a continuous tone according to the present invention is characterized in that the fourth object is formed in a region where the first object, the second object, and the third object are not formed in the unit, and is arranged at a position adjacent to the first object and/or the second object.

An anti-counterfeit printed matter having a continuous tone according to the present invention is characterized in that the first objects, the second objects, the third objects, and the fourth objects are printed by ink containing a photoluminescent material, and a desired pattern is printed by solid filling using a colorless transparent material on at least some of the first objects, the second objects, the third objects, and the fourth objects.

An anti-counterfeit printed matter having a continuous tone according to the present invention is characterized in that units are arranged at a predetermined pitch in a matrix on a base material, each unit including a first object and a second object which are arranged along a first direction on both sides of a center so as to oppose each other, a fifth object and a sixth object which are arranged along a second direction perpendicular to the first direction on both sides of the center so as to oppose each other, and a third object arranged in a region without the first object, the second object, the fifth object, and the sixth object, the first object and the second object of each of the units have an on/off relationship and the same area, the first objects form one of a positive image and a negative image of a first invisible image, and the second objects form the other of the negative image and the positive image of the first invisible image, the fifth object and the sixth object of each of the units have the on/off relationship and the same area, the fifth objects form one of a positive image and a negative image of a second invisible image, and the sixth objects form the other of the negative image and the positive image of the second invisible image, and the third objects form a visible image having a continuous tone.

An anti-counterfeit printed matter having a continuous tone according to the present invention is characterized in that the unit has a square shape and sides each having a length of not more than 1 mm.

An anti-counterfeit printed matter having a continuous tone according to the present invention is characterized in that a fourth object having an object area ratio 1/2 or substantially 1/2 that of the first object or the second object and also having the same color is arranged at a position where out of the first objects and the second objects which are arranged in the on/off relationship to form the first invisible image, the first object and the second object in an off state are arranged in close vicinity in the adjacently arranged units, and a seventh object having an object area ratio 1/2 or substantially 1/2 that of the fifth object or the sixth object and also having the same color is arranged at a position where out of the fifth objects and the sixth objects which are arranged in the on/off relationship to form the second invisible image, the fifth object and the sixth object in the off state are arranged in close vicinity in the adjacently arranged units.

An anti-counterfeit printed matter having a continuous tone according to the present invention is characterized in that the fourth object and the seventh object are formed in a region where the first object, the second object, the third object, the fifth object, and the sixth object are not formed in the unit.

An anti-counterfeit printed matter having a continuous tone according to the present invention is characterized in that the fourth object and the seventh object are formed in a shape surrounding the third object or in a shape surrounded by the third object in a region where the first object, the second object, the third object, the fifth object, and the sixth object are not formed in the unit.

An anti-counterfeit printed matter having a continuous tone according to the present invention is characterized in that the fourth object and the seventh object are formed in a region where the first object, the second object, the third object, the fifth object, and the sixth object are not formed in the unit, and arranged at four corners in the unit having the square shape.

An anti-counterfeit printed matter having a continuous tone according to the present invention is characterized in that the first objects, the second objects, the third objects, the fourth objects, the fifth objects, the sixth objects, and the seventh objects are printed by ink containing a photoluminescent material, and a desired pattern is printed by solid filling using a colorless transparent material on at least some of the first objects, the second objects, the third objects, the fourth objects, the fifth objects, the sixth objects, and the seventh objects.

An anti-counterfeit printed matter having a continuous tone according to the present invention is characterized in that the first objects, the second objects, and the fourth objects have a hue different from that of the fifth objects, the sixth objects, and the seventh objects.

An anti-counterfeit printed matter having a continuous tone according to the present invention is characterized in that the visible image having the continuous tone includes a face image.

A method of manufacturing an anti-counterfeit printed matter having a continuous tone of the present invention using a manufacturing apparatus including image input means, item setting means, calculation means, and printing means is characterized by comprising the steps of:

causing the image input means to input, for the anti-counterfeit printed matter, first image data serving as a base of the first invisible image to be visually recognized as a latent image upon overlaying one of a lenticular lens and a parallel line filter on the anti-counterfeit printed matter and second image data serving as a base of the visible image having the continuous tone;

causing the item setting means to do resolution setting, coloring setting, and halftone dot data shape setting of the first objects, the second objects, and the third objects in the anti-counterfeit printed matter for each setting item;

causing the calculation means to form, from the first image data input by the image input means, image data having the first invisible image made of the first objects and the second objects based on contents set by the item means, form image data serving as the visible image having the continuous tone and made of the third objects, and composite the image data having the first invisible image and the image data serving as the visible image having the continuous tone; and causing the printing means to print the composited image data on the base material.

A method of manufacturing an anti-counterfeit printed matter having a continuous tone of the present invention using a manufacturing apparatus including image input means, item setting means, calculation means, and printing means is characterized by comprising the steps of:

causing the image input means to input, for the anti-counterfeit printed matter, first image data and second image data serving as a base of the first invisible image and the second invisible image to be visually recognized as latent images upon overlaying one of a lenticular lens and a parallel line filter on the anti-counterfeit printed matter and third image data serving as a base of the visible image having the continuous tone;

causing the item setting means to do resolution setting, coloring setting, and halftone dot data shape setting of the first objects, the second objects, the third objects, the fifth objects, and the sixth objects in the anti-counterfeit printed matter for each setting item;

causing the calculation means to form, from the first image data input by the image input means, image data having the first invisible image made of the first objects and the second objects based on contents set by the item setting means, form image data having the second invisible image made of the fifth objects and the sixth objects based on the contents set by the item setting means, form image data serving as the visible image having the continuous tone and made of the third objects, and composite the image data having the first invisible image, the image data having the second invisible image, and the image data serving as the visible image having the continuous tone; and causing the printing means to print the composited image data on the base material.

An anti-counterfeit printed matter manufacturing system according to the present invention is characterized by comprising visible information input means for inputting image information data to express a visible image having a continuous tone, invisible information input means for inputting first invisible information data to express a first invisible image, visible image construction means for setting third objects using the image information data to obtain a continuous tone image, invisible image construction means for setting first objects and second objects using the first invisible information data, image composite means for compositing the first objects, the second objects, and the third objects to acquire image data, and printing means for printing the composited image data on a base material.

An anti-counterfeit printed matter manufacturing system according to the present invention is characterized by comprising visible information input means for inputting image information data to express a visible image having a continuous tone, invisible information input means for inputting first invisible information data and second image information data to express a first invisible image and a second invisible image, visible image construction means for setting third objects using the image information data to obtain a continuous tone image, invisible image construction means for setting first objects and second objects using the first invisible information data and setting fifth objects and sixth objects using the second invisible information data, image composite means for compositing the first objects, the second objects, the third objects, the fifth objects, and the sixth objects to acquire image data, and printing means for printing the composited image data on a base material.

An anti-counterfeit printed matter manufacturing system according to the present invention is characterized in that the image composite means further comprises means for adding image data to express fourth objects having an object area ratio 1/2 or substantially 1/2 that of the first objects or the second objects and seventh objects having an object area ratio 1/2 or substantially 1/2 that of the fifth objects or the sixth objects.

An anti-counterfeit printed matter manufacturing system according to the present invention is characterized in that a face image having a continuous tone is formed as image information.

According to the present invention, there is provided a halftone dot data creation apparatus for an anti-counterfeit printed matter in which a plurality of units are periodically arranged in a predetermined region on a base material, first objects or second objects are formed along a predetermined direction on both sides of a center of the unit so as to oppose each other in the unit, the first objects and the second objects have the same area in each of the plurality of arranged units, one kind of the first objects and the second objects is colored in the same color (on), and the other is not colored (off), an invisible image is formed by combining the on state and the off state, and fourth objects having an object area ratio 1/2 or substantially 1/2 that of the first objects and the second objects and also having the same or substantially the same color are arranged, to relax density imbalance in the predetermined region, based on or substantially based on boundaries between the first objects and the second objects at positions where the first objects and the second objects arranged to form the invisible image should originally be arranged adjacently in the predetermined direction and at positions where off portions are arranged adjacently in the plurality of units arranged adjacently, characterized by comprising image input means for inputting first image data serving as a base of the invisible image to be visually recognized as a latent image upon overlaying one of a lenticular lens and a parallel line filter on the anti-counterfeit printed matter, item setting means for doing resolution setting, coloring setting, and halftone dot data shape setting of the first objects, the second objects, and the fourth objects in the halftone dot data for each setting item, and calculation means for forming, from the first image data input by the image input means, image data having the invisible image made of the first objects and the second objects based on contents set by the item setting means, and compositing the image data having the invisible image and the fourth objects to relax the density imbalance.

A halftone dot data creation apparatus according to the present invention is characterized in that the item setting means comprises a generation data resolution setting unit configured to set the resolution of the halftone dot data by inputting an arbitrary resolution or selecting one of a plurality of resolutions stored in advance, a coloring setting unit configured to set colors of the anti-counterfeit printed matter, and a halftone dot shape setting unit configured to set a height and a width of the unit and halftone dot shapes of the first objects, the second objects, and the fourth objects to be formed in the unit.

A halftone dot data creation apparatus according to the present invention is characterized in that the calculation means comprises an outline extraction unit configured to extract an outline of the first image data to generate outline image data of the first image data, an invisible image arranging unit configured to divide the units into intra-outline units inside the outline and extra-outline units outside the outline using the outline image data, arrange one of the first object and the second object in the on state inside each intra-outline unit, and arrange the other of the first object and the second object in the off state inside each extra-outline unit, an object deletion unit configured to, in the first objects and the second objects arranged in the intra-outline units and the extra-outline units, when both the first object and the second object arranged adjacent to each other are on, delete one of the first object and the second object by setting the object in the off state, and a density imbalance relaxing object arranging unit configured to, to relax the density imbalance in the predetermined region, arrange the fourth objects having the object area ratio 1/2 or substantially 1/2 that of the first objects and the second objects and also having the same or substantially the same color based on or substantially based on the boundaries between the first objects and the second objects at spatial positions where one of the first object and the second object has been deleted or at positions where off portions are arranged adjacently in the plurality of units arranged adjacently.

According to the present invention, there is provided a halftone dot data creation apparatus for an anti-counterfeit printed matter in which a plurality of units are periodically arranged in a predetermined region on a base material, first objects or second objects are formed along a predetermined direction on both sides of a center of the unit so as to oppose each other in the unit, the first objects and the second objects have the same area in each of the plurality of arranged units, one kind of the first objects and the second objects is colored in the same color (on), and the other is not colored (off), an invisible image is formed by combining the on state and the off state, a visible image is formed by arranging third objects in a unit where the first objects or the second objects are formed and/or based on or substantially based on a boundary between the units, and fourth objects having an object area ratio 1/2 or substantially 1/2 that of the first objects and the second objects and also having the same or substantially the same color are arranged, to relax density imbalance in the predetermined region, in a predetermined region without the first objects, the second objects, and the third objects at positions where the first objects and the second objects arranged to form the invisible image should originally be arranged adjacently in the predetermined direction and at positions where off portions are arranged adjacently in the plurality of units arranged adjacently, characterized by comprising image input means for inputting first image data serving as a base of the invisible image to be visually recognized as a latent image upon overlaying one of a lenticular lens and a parallel line filter on the anti-counterfeit printed matter and second image data serving as a base of the visible image to be visually recognized, item setting means for doing resolution setting, coloring setting, and halftone dot data shape setting of the first objects, the second objects, the third objects, and the fourth objects in the halftone dot data for each setting item, and calculation means for forming, from the first image data input by the image input means, image data having the invisible image made of the first objects and the second objects based on contents set by the item setting means, forming image data serving as the visible image made of the third objects, and compositing the image data having the invisible image, the image data serving as the visible image, and the fourth objects to relax the density imbalance.

A halftone dot data creation apparatus according to the present invention is characterized in that the item setting means comprises a generation data resolution setting unit configured to set the resolution of the halftone dot data by inputting an arbitrary resolution or selecting one of a plurality of resolutions stored in advance, a coloring setting unit configured to set colors of the anti-counterfeit printed matter, and a halftone dot shape setting unit configured to set a height and a width of the unit and halftone dot shapes of the first objects, the second objects, the third objects, and the fourth objects to be formed in the unit.

A halftone dot data creation apparatus according to the present invention is characterized in that the calculation means comprises an outline extraction unit configured to extract an outline of the first image data to generate outline image data of the first image data, an invisible image arranging unit configured to divide the units into intra-outline units inside the outline and extra-outline units outside the outline using the outline image data, arrange one of the first object and the second object in the on state inside each intra-outline unit, and arrange the other of the first object and the second object in the off state inside each extra-outline unit, a visible image arranging unit configured to arrange the third objects to form the visible image in the units where the first objects or the second objects are formed and/or based on or substantially based on the boundaries between the units, an object deletion unit configured to, in the first objects and the second objects arranged in the intra-outline units and the extra-outline units, when both the first object and the second object arranged adjacent to each other are on, delete one of the first object and the second object by setting the object in the off state, and a density imbalance relaxing object arranging unit configured to, to relax the density imbalance in the predetermined region, arrange the fourth objects having the object area ratio 1/2 or substantially 1/2 that of the first objects and the second objects and also having the same or substantially the same color in the predetermined region without the first objects, the second objects, and the third objects at spatial positions where one of the first object and the second object has been deleted or at positions where off portions are arranged adjacently in the plurality of units arranged adjacently.

A halftone dot data creation apparatus according to the present invention is characterized in that the third objects are arranged by the visible image arranging unit in the units where the first objects or the second objects are formed and/or based on or substantially based on the boundaries between the units, and form the visible image having the continuous tone by one method selected from increasing/decreasing an object size, changing an object density, and changing an object sparseness.

A halftone dot data creation apparatus according to the present invention is characterized by further comprising image output means for outputting a calculation result obtained by the calculation means to obtain one of the anti-counterfeit printed matter and a printing plate.

According to the present invention, there is provided a recording medium storing halftone dot data creation software which causes a computer including image input means for inputting first image data serving as an invisible image, item setting means for doing settings for each setting item, and calculation means for creating halftone dot data based on the first image data and the set setting items to execute a method of creating halftone dot data of an anti-counterfeit printed matter in which an invisible image to be visually recognized as a latent image upon overlaying one of a lenticular lens and a parallel line filter is embedded, characterized by causing the computer to execute the halftone dot data generation method comprising the image input step of causing the image input means to input first image data serving as a base of the invisible image to be visually recognized as the latent image upon overlaying one of the lenticular lens and the parallel line filter, the item setting step of causing the item setting means to do resolution setting, coloring setting, and halftone dot data shape setting of first objects, second objects, and fourth objects in the halftone dot data for each setting item to generate image data having the invisible image from the first image data, and the calculation step of causing the calculation means to generate, from the input first image data, the image data having the invisible image made of the first objects and the second objects based on contents set by the item setting means and composite the image data having the invisible image and the fourth objects to relax the density imbalance.

A recording medium storing halftone dot data creation software according to the present invention is characterized in that the item setting step comprises the generation data resolution setting step of causing a generation data resolution setting unit to set the resolution of the halftone dot data by inputting an arbitrary resolution or selecting one of a plurality of resolutions stored in advance, the coloring setting step of causing a coloring setting unit to set colors of the anti-counterfeit printed matter, and the halftone dot shape setting step of causing a halftone dot shape setting unit to set a height and a width of the unit and halftone dot shapes of the first objects, the second objects, and the fourth objects to be formed in the unit.

A recording medium storing halftone dot data creation software according to the present invention is characterized in that the calculation step comprises the outline extraction step of causing an outline extraction unit to extract an outline of the first image data to generate outline image data of the first image data, the invisible image arranging step of causing an invisible image arranging unit to divide the units into intra-outline units inside the outline and extra-outline units outside the outline using the outline image data, arrange one of the first object and the second object in the on state inside each intra-outline unit, and arrange the other of the first object and the second object in the off state inside each extra-outline unit, the object deletion step of causing an object deletion unit to, in the first objects and the second objects arranged in the intra-outline units and the extra-outline units, when both the first object and the second object arranged adjacent to each other are on, delete one of the first object and the second object by setting the object in the off state, and the density imbalance relaxing object arranging step of causing a density imbalance relaxing object arranging unit to, to relax the density imbalance in the predetermined region, arrange the fourth objects having the object area ratio 1/2 or substantially 1/2 that of the first objects and the second objects and also having the same or substantially the same color based on or substantially based on the boundaries between the first objects and the second objects at spatial positions where one of the first object and the second object has been deleted or at positions where off portions are arranged adjacently in the plurality of units arranged adjacently.

According to the present invention, there is provided a recording medium storing halftone dot data creation software which causes a computer including image input means for inputting first image data serving as an invisible image and second image data serving as a visible image, item setting means for doing settings for each setting item, and calculation means for creating halftone dot data based on the first image data, the second image data, and the set setting items to execute a method of creating halftone dot data of an anti-counterfeit printed matter in which a visible image and an invisible image to be visually recognized as a latent image upon overlaying one of a lenticular lens and a parallel line filter are embedded, characterized by causing the computer to execute the halftone dot data generation method comprising the image input step of causing the image input means to input first image data serving as a base of the invisible image to be visually recognized as the latent image upon overlaying one of the lenticular lens and the parallel line filter and the second image data serving as a base of the visible image to be visually recognized, the item setting step of causing the item setting means to do resolution setting, coloring setting, and halftone dot data shape setting of first objects, second objects, third objects, and fourth objects in the halftone dot data for each setting item to generate image data having the invisible image from the first image data and image data serving as the visible image from the second image data, and the calculation step of causing the calculation means to form, from the input first image data, the image data having the invisible image made of the first objects and the second objects based on contents set by the item setting means, form image data serving as the visible image made of the third objects, and composite the image data having the invisible image, the image data serving as the visible image, and the fourth objects to relax the density imbalance.

A recording medium storing halftone dot data creation software according to the present invention is characterized in that the item setting step comprises the generation data resolution setting step of causing a generation data resolution setting unit to set the resolution of the halftone dot data by inputting an arbitrary resolution or selecting one of a plurality of resolutions stored in advance, the coloring setting step of causing a coloring setting unit to set colors of the anti-counterfeit printed matter, and the halftone dot shape setting step of causing a halftone dot shape setting unit to set a height and a width of the unit and halftone dot shapes of the first objects, the second objects, the third objects, and the fourth objects to be formed in the unit.

A recording medium storing halftone dot data creation software according to the present invention is characterized in that the calculation step comprises the outline extraction step of causing an outline extraction unit to extract an outline of the first image data to generate outline image data of the first image data, the invisible image arranging step of causing an invisible image arranging unit to divide the units into intra-outline units inside the outline and extra-outline units outside the outline using the outline image data, arrange one of the first object and the second object in the on state inside each intra-outline unit, and arrange the other of the first object and the second object in the off state inside each extra-outline unit, the visible image arranging step of causing a visible image arranging unit to arrange the third objects in the units where the first objects or the second objects are formed and/or based on or substantially based on the boundaries between the units, the object deletion step of causing an object deletion unit to, in the first objects and the second objects arranged in the intra-outline units and the extra-outline units, when both the first object and the second object arranged adjacent to each other are on, delete one of the first object and the second object by setting the object in the off state, and the density imbalance relaxing object arranging step of causing a density imbalance relaxing object arranging unit to, to relax the density imbalance in the predetermined region, arrange the fourth objects having the object area ratio 1/2 or substantially 1/2 that of the first objects and the second objects and also having the same or substantially the same color in the predetermined region without the first objects, the second objects, and the third objects at spatial positions where one of the first object and the second object has been deleted or at positions where off portions are arranged adjacently in the plurality of units arranged adjacently.

A recording medium storing halftone dot data creation software according to the present invention is characterized in that in the visible image arranging step, the third objects are arranged in the units where the first objects or the second objects are formed and/or based on or substantially based on the boundaries between the units, and form the visible image having the continuous tone by one method selected from increasing/decreasing an object size, changing an object density, and changing an object sparseness.

A recording medium storing halftone dot data creation software according to the present invention is characterized by further comprising image output software for outputting a calculation result obtained in the calculation step to obtain one of the anti-counterfeit printed matter and a printing plate.

According to the present invention, there is provided a halftone dot data creation apparatus for an anti-counterfeit printed matter in which a plurality of units are periodically arranged in a predetermined region on a base material, first objects or second objects are formed along a first direction on both sides of a center of the unit so as to oppose each other in the unit, fifth objects or sixth objects are formed along a second direction perpendicular to the first direction on both sides of the center so as to oppose each other, the first objects, the second objects, the fifth objects, and the sixth objects have the same area in each of the plurality of arranged units, one kind of the first objects and the second objects is colored in the same color (on), and the other is not colored (off), a first invisible image is formed by combining the on state and the off state, fourth objects having an object area ratio 1/2 or substantially 1/2 that of the first objects and the second objects are arranged, to relax density imbalance in the predetermined region, based on or substantially based on boundaries between the first objects and the second objects at positions where the first objects and the second objects arranged to form the first invisible image should originally be arranged adjacently in the first direction and at positions where off portions are arranged adjacently in the plurality of units arranged adjacently, one kind of the fifth objects and the sixth objects is colored in the same color (on), and the other is not colored (off), a second invisible image is formed by combining the on state and the off state, and seventh objects having an object area ratio 1/2 or substantially 1/2 that of the fifth objects and the sixth objects are arranged, to relax density imbalance in the predetermined region, based on or substantially based on boundaries between the units at positions where the fifth objects and the sixth objects arranged to form the second invisible image should originally be arranged adjacently in the second direction and at positions where off portions are arranged adjacently in the plurality of units arranged adjacently, characterized by comprising image input means for inputting first image data and second image data serving as a base of the first invisible image and the second invisible image to be visually recognized as latent images upon overlaying one of a lenticular lens and a parallel line filter on the anti-counterfeit printed matter, item setting means for doing resolution setting, coloring setting, and halftone dot data shape setting of the first objects, the second objects, the fourth objects, the fifth objects, the sixth objects, and the seventh objects in the halftone dot data for each setting item, and calculation means for forming, from the first image data input by the image input means, image data having the first invisible image made of the first objects and the second objects based on contents set by the item setting means, forming, from the second image data, image data having the second invisible image made of the fifth objects and the sixth objects based on contents set by the item setting means, and compositing the image data having the first invisible image, the image data having the second invisible image, and the fourth objects and the seventh objects to relax the density imbalance.

A halftone dot data creation apparatus according to the present invention is characterized in that the item setting means comprises a generation data resolution setting unit configured to set the resolution of the halftone dot data by inputting an arbitrary resolution or selecting one of a plurality of resolutions stored in advance, a coloring setting unit configured to set colors of the anti-counterfeit printed matter, and a halftone dot shape setting unit configured to set a height and a width of the unit and halftone dot shapes of the first objects, the second objects, the fourth objects, the fifth objects, the sixth objects, and the seventh objects to be formed in the unit.

A halftone dot data creation apparatus according to the present invention is characterized in that the calculation means comprises an outline extraction unit configured to extract outlines of the first image data and the second image data to generate outline image data of the first image data and outline image data of the second image data, an invisible image arranging unit configured to divide the units into intra-outline units inside the outline and extra-outline units outside the outline using the outline image data of the first image data, arrange one of the first object and the second object in the on state inside each intra-outline unit, arrange the other of the first object and the second object in the off state inside each extra-outline unit, divide the units into intra-outline units inside the outline and extra-outline units outside the outline using the outline image data of the second image data, arrange one of the fifth object and the sixth object in the on state inside each intra-outline unit, and arrange the other of the fifth object and the sixth object in the off state inside each extra-outline unit, an object deletion unit configured to, in the first objects, the second objects, the fifth objects, and the sixth objects arranged in the intra-outline units and the extra-outline units, when both the first object and the second object arranged adjacent to each other are on, delete one of the first object and the second object by setting the object in the off state, and when both the fifth object and the sixth object arranged adjacent to each other are on, delete one of the fifth object and the sixth object by setting the object in the off state, and a density imbalance relaxing object arranging unit configured to, to relax the density imbalance in the predetermined region, arrange the fourth objects having the object area ratio 1/2 or substantially 1/2 that of the first objects and the second objects and also having the same or substantially the same color based on or substantially based on the boundaries between the first objects and the second objects at spatial positions where one of the first object and the second object has been deleted or at positions where off portions are arranged adjacently in the plurality of units arranged adjacently, and to relax the density imbalance in the predetermined region, arrange the seventh objects having the object area ratio 1/2 or substantially 1/2 that of the fifth objects and the sixth objects and also having the same or substantially the same color based on or substantially based on the boundaries between the fifth objects and the sixth objects at spatial positions where one of the fifth object and the sixth object has been deleted or at positions where off portions are arranged adjacently in the plurality of units arranged adjacently.

According to the present invention, there is provided a halftone dot data creation apparatus for an anti-counterfeit printed matter in which a plurality of units are periodically arranged in a predetermined region on a base material, first objects or second objects are formed along a first direction on both sides of a center of the unit so as to oppose each other in the unit, fifth objects or sixth objects are formed along a second direction perpendicular to the first direction on both sides of the center so as to oppose each other, the first objects, the second objects, the fifth objects, and the sixth objects have the same area in each of the plurality of arranged units, one kind of the first objects and the second objects is colored in the same color (on), and the other is not colored (off), a first invisible image is formed by combining the on state and the off state, fourth objects having an object area ratio 1/2 or substantially 1/2 that of the first objects and the second objects are arranged, to relax density imbalance in the predetermined region, based on or substantially based on boundaries between the first objects and the second objects at positions where the first objects and the second objects arranged to form the first invisible image should originally be arranged adjacently in the first direction and at positions where off portions are arranged adjacently in the plurality of units arranged adjacently, one kind of the fifth objects and the sixth objects is colored in the same color (on), and the other is not colored (off), a second invisible image is formed by combining the on state and the off state, and seventh objects having an object area ratio 1/2 or substantially 1/2 that of the fifth objects and the sixth objects are arranged, to relax density imbalance in the predetermined region, based on or substantially based on boundaries between the units at positions where the fifth objects and the sixth objects arranged to form the second invisible image should originally be arranged adjacently in the second direction and at positions where off portions are arranged adjacently in the plurality of units arranged adjacently, characterized by comprising image input means for inputting first image data and second image data serving as a base of the first invisible image and the second invisible image to be visually recognized as latent images upon overlaying one of a lenticular lens and a parallel line filter on the anti-counterfeit printed matter, and third image data serving as a base of a visible image to be visually recognized, item setting means for doing resolution setting, coloring setting, and halftone dot data shape setting of the first objects, the second objects, the third objects, the fourth objects, the fifth objects, the sixth objects, and the seventh objects in the halftone dot data for each setting item, and calculation means for forming, from the first image data input by the image input means, image data having the first invisible image made of the first objects and the second objects based on contents set by the item setting means, forming, from the second image data, image data having the second invisible image made of the fifth objects and the sixth objects based on contents set by the item setting means, forming the visible image made of the third objects, and compositing the image data having the first invisible image, the image data having the second invisible image, the image data having the visible image, and the fourth objects and the seventh objects to relax the density imbalance.

A halftone dot data creation apparatus according to the present invention is characterized in that the item setting means comprises a generation data resolution setting unit configured to set the resolution of the halftone dot data by inputting an arbitrary resolution or selecting one of a plurality of resolutions stored in advance, a coloring setting unit configured to set colors of the anti-counterfeit printed matter, and a halftone dot shape setting unit configured to set a height and a width of the unit and halftone dot shapes of the first objects, the second objects, the third objects, the fourth objects, the fifth objects, the sixth objects, and the seventh objects to be formed in the unit.

A halftone dot data creation apparatus according to the present invention is characterized in that the calculation means comprises an outline extraction unit configured to extract outlines of the first image data and the second image data to generate outline image data of the first image data and outline image data of the second image data, an invisible image arranging unit configured to divide the units into intra-outline units inside the outline and extra-outline units outside the outline using the outline image data of the first image data, arrange one of the first object and the second object in the on state inside each intra-outline unit, arrange the other of the first object and the second object in the off state inside each extra-outline unit, divide the units into intra-outline units inside the outline and extra-outline units outside the outline using the outline image data of the second image data, arrange one of the fifth object and the sixth object in the on state inside each intra-outline unit, and arrange the other of the fifth object and the sixth object in the off state inside each extra-outline unit, an object deletion unit configured to, in the first objects, the second objects, the fifth objects, and the sixth objects arranged in the intra-outline units and the extra-outline units, when both the first object and the second object arranged adjacent to each other are on, delete one of the first object and the second object by setting the object in the off state, and when both the fifth object and the sixth object arranged adjacent to each other are on, delete one of the fifth object and the sixth object by setting the object in the off state, a density imbalance relaxing object arranging unit configured to, to relax the density imbalance in the predetermined region, arrange the fourth objects having the object area ratio 1/2 or substantially 1/2 that of the first objects and the second objects and also having the same or substantially the same color based on or substantially based on the boundaries between the first objects and the second objects at spatial positions where one of the first object and the second object has been deleted or at positions where off portions are arranged adjacently in the plurality of units arranged adjacently, and to relax the density imbalance in the predetermined region, arrange the seventh objects having the object area ratio 1/2 or substantially 1/2 that of the fifth objects and the sixth objects and also having the same or substantially the same color based on or substantially based on the boundaries between the fifth objects and the sixth objects at spatial positions where one of the fifth object and the sixth object has been deleted or at positions where off portions are arranged adjacently in the plurality of units arranged adjacently, and a visible image arranging unit configured to arrange the third objects to form the visible image in a region without the first objects, the second objects, the fourth objects, the fifth objects, the sixth objects, and the seventh objects.

A halftone dot data creation apparatus according to the present invention is characterized in that the third objects are arranged by the visible image arranging unit at least at the center of the unit, almost at the center, or at four corners, and form the visible image having the continuous tone by one method selected from increasing/decreasing an object size, changing an object density, and changing an object sparseness.

A halftone dot data creation apparatus according to the present invention is characterized by further comprising image output means for outputting a calculation result obtained by the calculation means to obtain one of the anti-counterfeit printed matter and a printing plate.

According to the present invention, there is provided a recording medium storing halftone dot data creation software which causes a computer including image input means for inputting first image data and second image data serving as invisible images, item setting means for doing settings for each setting item, and calculation means for creating halftone dot data based on the first image data, the second image data, and the set setting items to execute a method of creating halftone dot data of an anti-counterfeit printed matter in which a first invisible image and a second invisible image to be visually recognized as latent images upon overlaying one of a lenticular lens and a parallel line filter are embedded, characterized by causing the computer to execute the halftone dot data generation method comprising the image input step of causing the image input means to input first image data and second image data serving as a base of the first invisible image and the second invisible image to be visually recognized as the latent images upon overlaying one of the lenticular lens and the parallel line filter, the item setting step of causing the item setting means to do resolution setting, coloring setting, and halftone dot data shape setting of first objects, second objects, fifth objects, and sixth objects in the halftone dot data for each setting item to generate image data having the first invisible image from the first image data and image data having the second invisible image from the second image data, and the calculation step of causing the calculation means to form, from the input first image data, the image data having the first invisible image made of the first objects and the second objects based on contents set by the item setting means, form, from the second image data, the image data having the second invisible image made of the fifth objects and the sixth objects based on contents set by the item setting means, and composite the image data having the first invisible image, the image data having the second invisible image, and the fourth objects and the seventh objects to relax the density imbalance.

A recording medium storing halftone dot data creation software according to the present invention is characterized in that the item setting step comprises the generation data resolution setting step of causing a generation data resolution setting unit to set the resolution of the halftone dot data by inputting an arbitrary resolution or selecting one of a plurality of resolutions stored in advance, the coloring setting step of causing a coloring setting unit to set colors of the anti-counterfeit printed matter, and the halftone dot shape setting step of causing a halftone dot shape setting unit to set a height and a width of the unit and halftone dot shapes of the first objects, the second objects, the fourth objects, the fifth objects, the sixth objects, and the seventh objects to be formed in the unit.

A recording medium storing halftone dot data creation software according to the present invention is characterized in that the calculation step comprises the outline extraction step of causing an outline extraction unit to extract outlines of the first image data and the second image data to generate outline image data of the first image data and outline image data of the second image data, the invisible image arranging step of causing an invisible image arranging unit to divide the units into intra-outline units inside the outline and extra-outline units outside the outline using the outline image data of the first image data, arrange one of the first object and the second object in the on state inside each intra-outline unit, arrange the other of the first object and the second object in the off state inside each extra-outline unit, divide the units into intra-outline units inside the outline and extra-outline units outside the outline using the outline image data of the second image data, arrange one of the fifth object and the sixth object in the on state inside each intra-outline unit, and arrange the other of the fifth object and the sixth object in the off state inside each extra-outline unit, the object deletion step of causing an object deletion unit to, in the first objects, the second objects, the fifth objects, and the sixth objects arranged in the intra-outline units and the extra-outline units, when both the first object and the second object arranged adjacent to each other are on, delete one of the first object and the second object by setting the object in the off state, and when both the fifth object and the sixth object arranged adjacent to each other are on, delete one of the fifth object and the sixth object by setting the object in the off state, and the density imbalance relaxing object arranging unit step of causing a density imbalance relaxing object arranging unit to, to relax the density imbalance in the predetermined region, arrange the fourth objects having the object area ratio 1/2 or substantially 1/2 that of the first objects and the second objects and also having the same or substantially the same color based on or substantially based on the boundaries between the first objects and the second objects at spatial positions where one of the first object and the second object has been deleted or at positions where off portions are arranged adjacently in the plurality of units arranged adjacently, and to relax the density imbalance in the predetermined region, arrange the seventh objects having the object area ratio 1/2 or substantially 1/2 that of the fifth objects and the sixth objects and also having the same or substantially the same color based on or substantially based on the boundaries between the fifth objects and the sixth objects at spatial positions where one of the fifth object and the sixth object has been deleted or at positions where off portions are arranged adjacently in the plurality of units arranged adjacently.

According to the present invention, there is provided a recording medium storing halftone dot data creation software which causes a computer including image input means for inputting first image data and second image data serving as invisible images and third image data serving as a visible image, item setting means for doing settings for each setting item, and calculation means for creating halftone dot data based on the first image data, the second image data, the third image data, and the set setting items to execute a method of creating halftone dot data of an anti-counterfeit printed matter in which a visible image, a first invisible image and a second invisible image to be visually recognized as latent images upon overlaying one of a lenticular lens and a parallel line filter are embedded, characterized by causing the computer to execute the halftone dot data generation method comprising the image input step of causing the image input means to input first image data and second image data serving as a base of the first invisible image and the second invisible image to be visually recognized as the latent images upon overlaying one of the lenticular lens and the parallel line filter and the third image data serving as a base of the visible image to be visually recognized, the item setting step of causing the item setting means to do resolution setting, coloring setting, and halftone dot data shape setting of first objects, second objects, third objects, fourth objects, fifth objects, sixth objects, and seventh objects in the halftone dot data for each setting item to generate image data having the first invisible image from the first image data, image data having the second invisible image from the second image data, and image data having the visible image from the third image data, and the calculation step of causing the calculation means to form, from the input first image data, the image data having the first invisible image made of the first objects and the second objects based on contents set by the item setting means, form, from the second image data, the image data having the second invisible image made of the fifth objects and the sixth objects based on contents set by the item setting means, form the image data having the visible image made of the third objects, and composite the image data having the first invisible image, the image data having the second invisible image, the image data having the visible image, and the fourth objects and the seventh objects to relax the density imbalance.

A recording medium storing halftone dot data creation software according to the present invention is characterized in that the item setting step comprises the generation data resolution setting step of causing a generation data resolution setting unit to set the resolution of the halftone dot data by inputting an arbitrary resolution or selecting one of a plurality of resolutions stored in advance, the coloring setting step of causing a coloring setting unit to set colors of the anti-counterfeit printed matter, and the halftone dot shape setting step of causing a halftone dot shape setting unit to set a height and a width of the unit and halftone dot shapes of the first objects, the second objects, the third objects, the fourth objects, the fifth objects, the sixth objects, and the seventh objects to be formed in the unit.

A recording medium storing halftone dot data creation software according to the present invention is characterized in that the calculation step comprises the outline extraction step of causing an outline extraction unit to extract outlines of the first image data and the second image data to generate outline image data of the first image data and outline image data of the second image data, the invisible image arranging step of causing an invisible image arranging unit to divide the units into intra-outline units inside the outline and extra-outline units outside the outline using the outline image data of the first image data, arrange one of the first object and the second object in the on state inside each intra-outline unit, arrange the other of the first object and the second object in the off state inside each extra-outline unit, divide the units into intra-outline units inside the outline and extra-outline units outside the outline using the outline image data of the second image data, arrange one of the fifth object and the sixth object in the on state inside each intra-outline unit, and arrange the other of the fifth object and the sixth object in the off state inside each extra-outline unit, the object deletion step of causing an object deletion unit to, in the first objects, the second objects, the fifth objects, and the sixth objects arranged in the intra-outline units and the extra-outline units, when both the first object and the second object arranged adjacent to each other are on, delete one of the first object and the second object by setting the object in the off state, and when both the fifth object and the sixth object arranged adjacent to each other are on, delete one of the fifth object and the sixth object by setting the object in the off state, the density imbalance relaxing object arranging unit step of causing a density imbalance relaxing object arranging unit to, to relax the density imbalance in the predetermined region, arrange the fourth objects having the object area ratio 1/2 or substantially 1/2 that of the first objects and the second objects and also having the same or substantially the same color based on or substantially based on the boundaries between the first objects and the second objects at spatial positions where one of the first object and the second object has been deleted or at positions where off portions are arranged adjacently in the plurality of units arranged adjacently, and to relax the density imbalance in the predetermined region, arrange the seventh objects having the object area ratio 1/2 or substantially 1/2 that of the fifth objects and the sixth objects and also having the same or substantially the same color based on or substantially based on the boundaries between the fifth objects and the sixth objects at spatial positions where one of the fifth object and the sixth object has been deleted or at positions where off portions are arranged adjacently in the plurality of units arranged adjacently, and the visible image arranging step of causing a visible image arranging unit to arrange the third objects to form the visible image in a region without the first objects, the second objects, the fourth objects, the fifth objects, the sixth objects, and the seventh objects.

A recording medium storing halftone dot data creation software according to the present invention is characterized in that in the visible image arranging step, the third objects are arranged at least at the center of the unit, almost at the center, or at four corners, and form the visible image having the continuous tone by one method selected from increasing/ decreasing an object size, changing an object density, and changing an object sparseness.

A recording medium storing halftone dot data creation software according to the present invention is characterized by further comprising image output software for outputting a calculation result obtained in the calculation step to obtain one of the anti-counterfeit printed matter and a printing plate.

According to the present invention, there is provided an anti-counterfeit printed matter having a continuous tone, which can reliably embed an invisible image in the same region as that of a significant visible image having a continuous tone by a predetermined object arrangement even when the significant visible image having the continuous tone is formed on a printed matter without any parallel line filter overlaid on it, form an invisible image that can clearly be visualized by a single discrimination tool, and prevent visibility of the visualized invisible image from being impeded by the visible image so as to solve the problems on print reproduction.

Additionally, in the anti-counterfeit printed matter having a continuous tone according to the present invention, density imbalance relaxing objects are provided. For this reason, when only the printed matter is observed without overlaying the discrimination tool, the invisible image is hardly visually recognized even without a camouflage pattern.

The anti-counterfeit printed matter manufacturing system according to the present invention can save an operator from arranging objects by trial and error and easily manufacture an anti-counterfeit printed matter including an embedded invisible image and a significant visible image having a continuous tone.

Any person who has no special knowledge of halftone dot data created by the recording medium storing creation software for executing the halftone dot data creation apparatus according to the present invention and the anti-counterfeit printed matter manufactured from the created halftone dot data can easily create the halftone dot data. In addition, the margin of operation errors decreases, and the time required for data creation dramatically shortens.

DETAILED DESCRIPTION OF THE EMBODIMENTS

Figure 1:
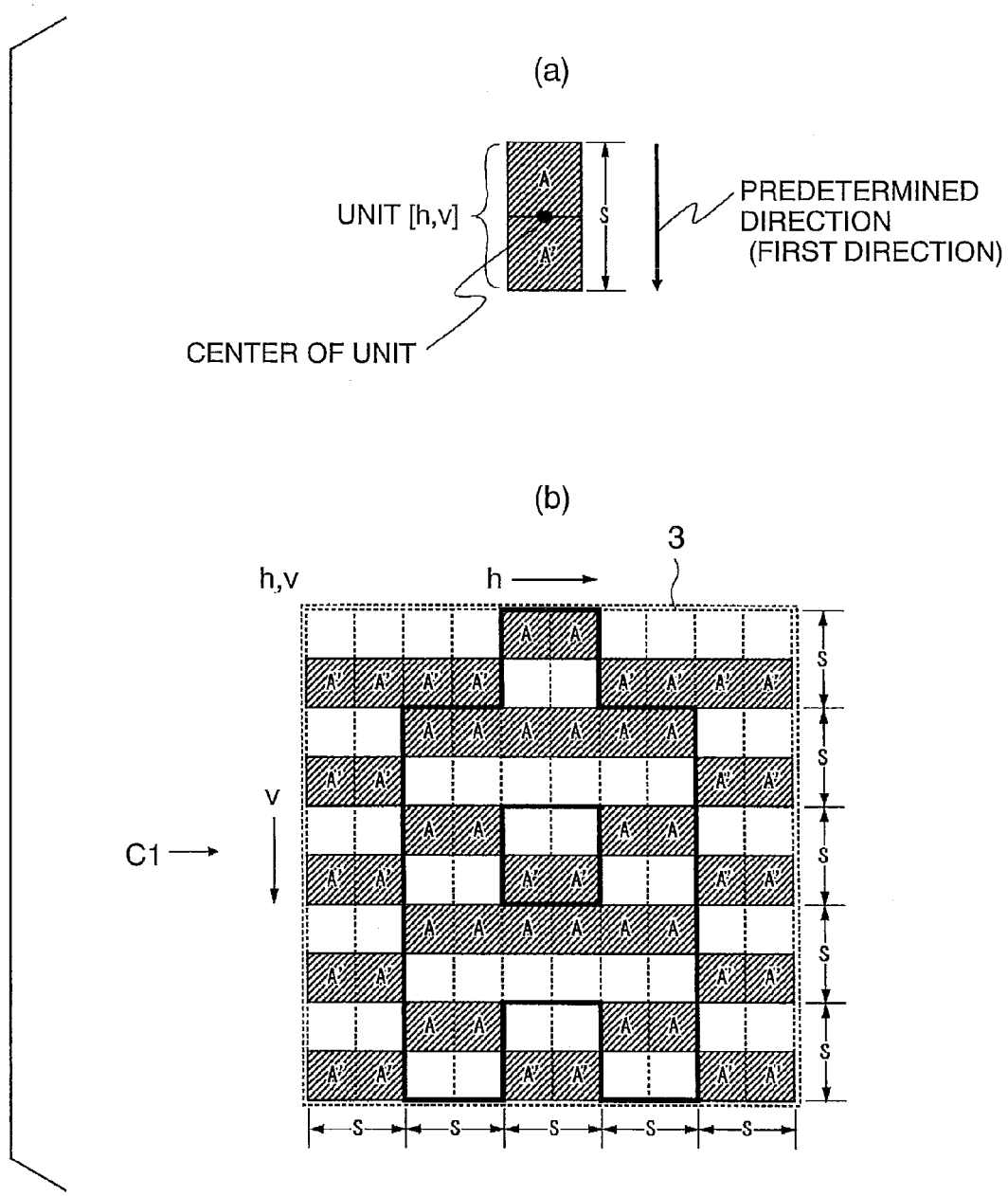
FIG. 1 shows explanatory views of the arrangement of objects of an anti-counterfeit printed matter and a state in which the objects of the printed matter are arranged in a matrix.

An anti-counterfeit printed matter, a method of manufacturing the same, halftone dot data creation apparatus, and a recording medium storing creation software will now be described with reference to the accompanying drawings. However, the present invention is not limited to the embodiments to be described below and also incorporates various other embodiments within the technical scope defined in the appended claims.

An example of an anti-counterfeit printed matter to be manufactured by a halftone dot data creation apparatus and a recording medium storing creation software will be described. Anti-counterfeit printed matters C1 to C7 are examples each having one invisible image embedded. Anti-counterfeit printed matters C8 to C15 are examples each having two invisible images embedded. An anti-counterfeit printed matter C16 is an application example of the anti-counterfeit printed matters C1 to C15. In addition, an example of an anti-counterfeit printed matter to be manufactured by a halftone dot data creation apparatus and a recording medium storing creation software will be described. Note that the boundaries of the units of the anti-counterfeit printed matters C1 to C16 explained in the drawings are indicated by solid lines and dotted lines for the descriptive convenience. However, the boundaries of the units of an actual printed matter are not printed as solid lines or dotted lines.

(Anti-Counterfeit Printed Matter C1)

An anti-counterfeit printed matter will be described in detail. FIG. 1 shows a partially enlarged view of the arrangement of objects of the printed pattern of an anti-counterfeit printed matter and a view schematically illustrating the objects arranged in a matrix to form a printed pattern 3 on the printed matter so as to clarify the composition. A vertical size S is 1 mm or less, and for example, 340 μm. The objects shown in FIG. 1(a) form a minimum unit called a unit and include an object A (first object) and an object A' (second object). The objects in FIG. 1(a) are periodically arranged in a matrix on the surface of the printed matter. As shown in FIG. 1(a), the objects A and A' in the unit are formed along a predetermined direction on opposite sides of the center of the unit. The objects A and A' pair off and have an on/off relationship. The on/off relationship indicates that for example, when one is black (on), the other is white (off), and when one is colored, the other is colorless. That is, the two objects are never black or white simultaneously on principle. The objects A and A' have the same area. Since the objects A and A' exist, an invisible image (negative or positive) that is not visually recognized under a normal visual condition is formed by only the objects A, and another invisible image (positive or negative) is formed by only the objects A'.

The objects having such an arrangement are continuously periodically arranged in a matrix on the printed matter tightly in the vertical and horizontal directions to obtain an arrangement shown in FIG. 1(b). FIG. 1(b) is a view schematically illustrating the plurality of objects arranged in the number v of vertical steps and the number h of horizontal steps in a matrix to form the printed pattern 3 on the printed matter so as to clarify the composition of the invisible image indicated by bold solid lines. Note that in this embodiment, the number of steps indicates the number of units repeated on the printed pattern 3. The number of steps is not particularly limited. The number of steps is proportional to the resolution of the invisible image. The bold solid lines indicating the invisible image only explain the position and are not visually recognized in fact. In the printed pattern 3, the total area of the objects A equals that of the objects A'. When the objects A and A' are arranged in the horizontal direction, parallel lines made of the groups of objects A and parallel lines made of the groups of objects A' are formed. That is, FIG. 1(b) shows a state in which an invisible image is formed by line phase modulation. In this state, however, when observed by the naked eye, both the objects A and A' are on (color) near the units in which a plurality of objects A and a plurality of objects A' are arranged in a matrix. For this reason, the density appears to be high (dark). In addition, both the objects A and A' are off (colorless) near the units in which a plurality of objects A and a plurality of objects A' are arranged in a matrix. For this reason, the density appears to be low (light). That is, density imbalance may occur upon naked eye observation. FIG. 1(b) shows line phase modulation. However, the present invention is not limited to this, and dot phase modulation may be used.

To relax the apparent density imbalance, object deletion and addition are executed for each unit [h,v] that is the minimum unit. Note that [v] is the number of steps corresponding to the number of units counted vertically from the upper side, and [h] is the number of steps corresponding to the number of units counted horizontally from the left side. First, concerning the unit [h,v] of each column of the matrix, the objects A[h,v] and A'[h,v] are sequentially detected. Note that as for the method of detecting the objects A[h,v] and A'[h,v], for example, if the printed pattern 3 is a binary image having the bitmap format, the object A[h,v] or A'[h,v] may be identified and deleted in a process target unit by processing called labeling in general.

Next, if a condition that the unit [h,v] includes the object A'[h,v], and the unit [h,v+1] includes the object A[h,v+1] is satisfied, the object A'[h,v] which should be arranged originally in the unit [v] is deleted. More specifically, when the unit [h,v], unit [h,v+1], and unit [h,v+2] are arranged, and the object A'[h,v] of the unit [h,v] is adjacent to the object A[h,v+1] of the unit [h,v+1], as shown in FIG. 2(a), the object A'[h,v] of the unit [h,v] is deleted, as shown in FIG. 2(b), thereby obtaining the printed pattern 3 shown in FIG. 2(c).

If a condition that the unit [h,v] includes the object A[h,v], and the unit [h,v+1] includes the object A'[h,v+1] is satisfied, an object a is added between the unit [h,v] and the unit [h,v+1]. More specifically, as shown in FIG. 3(b), the object a (fourth object) having an object area 1/2 or almost 1/2 that of the object A or A' is added near the midpoint between the unit [h,v] and the unit [h,v+1]. This relaxes the density imbalance upon naked eye observation between the unit [h,v] and the unit [h,v+1].

If a condition that the unit [h,v] includes the object A'[h,v], the unit [h,v+1] includes no object, and the unit [h,v+2] includes the object A[h,v+2] is satisfied, an object E is added at or almost at the center of the unit [h,v+1]. More specifically, as shown in FIG. 3(c), the object E (fourth object) having an object area 1/2 or almost 1/2 that of the object A or A' is added at or almost at the center of the unit [h,v+1]. This relaxes the density imbalance upon naked eye observation between the unit [h,v] and the unit [h,v+2].

If a condition that the unit [h,v] includes the object A'[h,v], the unit [h,v+1] includes no object, and the unit [h,v+2] includes the object A'[h,v+2] is satisfied, the object E is added in the unit [h,v+1], and the object a is added between the unit [h,v+1] and the unit [h,v+2]. More specifically, as shown in FIG. 3(d), the object E (fourth object) having an object area 1/2 or almost 1/2 that of the object A or A' is added at or almost at the center of the unit [h,v+1], and the object a having an object area 1/2 or almost 1/2 that of the object A or A' is added between the unit [h,v+1] and the unit [h,v+2]. This relaxes the density imbalance upon naked eye observation between the unit [h,v] and the unit [h,v+2]. Hence, when these processes are applied to the printed pattern 3 shown in FIG. 1(b), the density imbalance upon naked eye observation is relaxed throughout the printed pattern 3 shown in FIG. 3(e).

Figure 4:
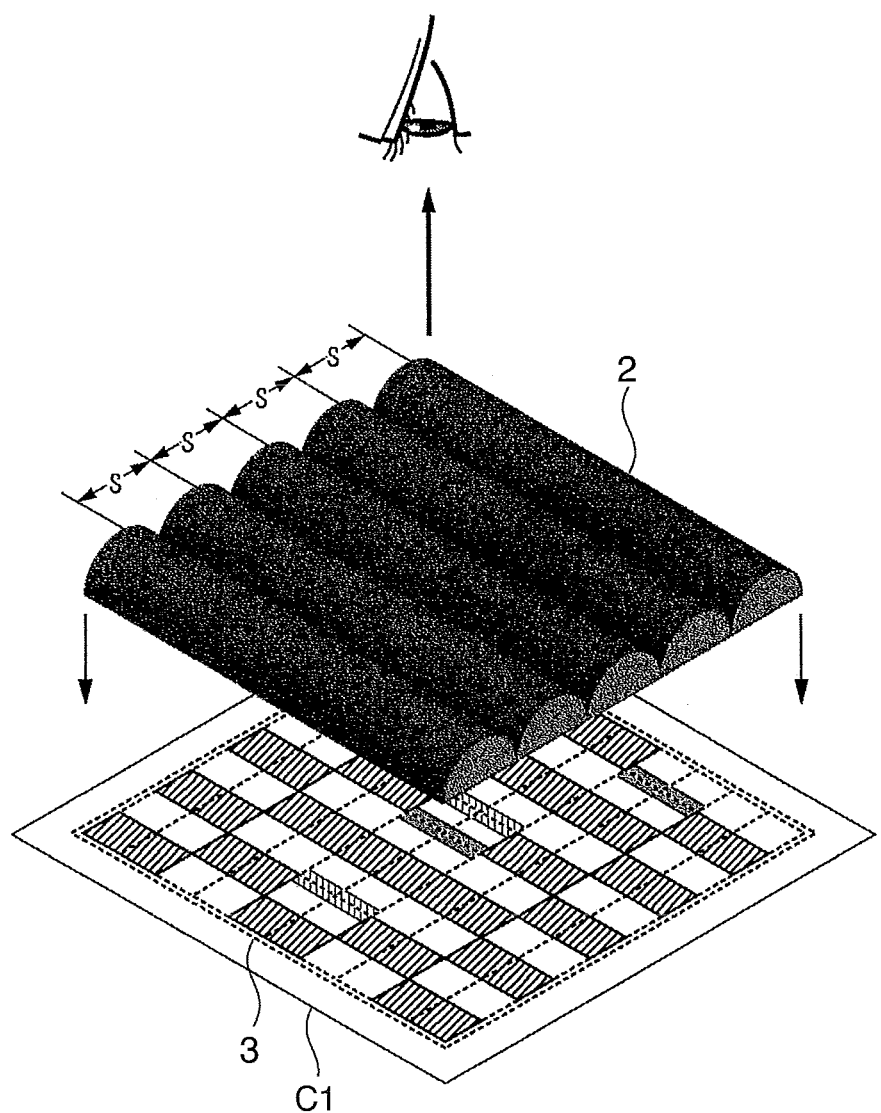
FIG. 4 is an explanatory view showing a state in which visual observation is done while overlaying a discrimination tool 2 on an anti-counterfeit printed matter C1.
Figure 5:
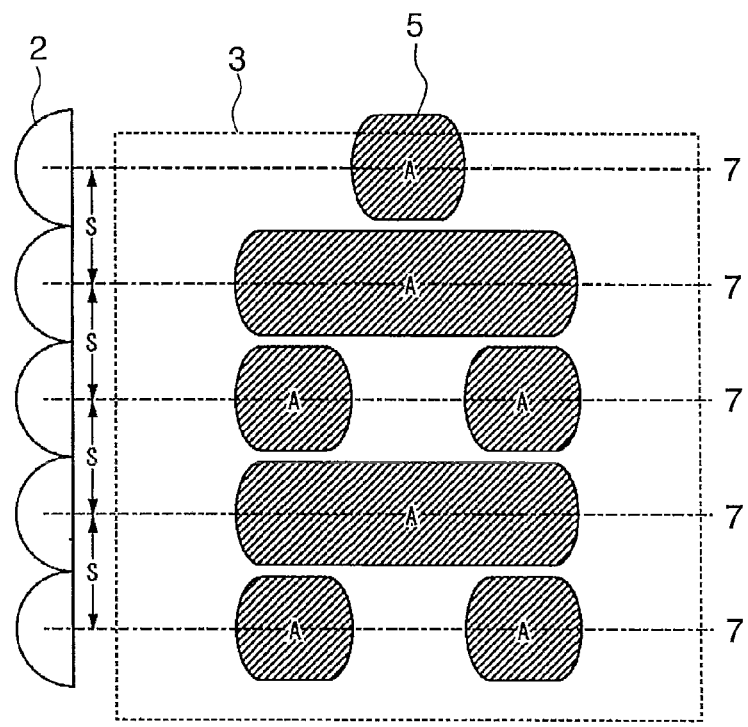
FIG. 5 is an explanatory view showing a state in which the lenticular lens is placed on the anti-counterfeit printed matter C1 so as to locate the center lines on the objects A, and a magnified state of the objects visually recognized at this time.

As shown in FIG. 4, a discrimination tool 2 formed from a lenticular lens or a parallel line filter is overlaid on the printed pattern 3 of a printed matter 1 in this state, and the printed pattern is visually observed from the front. This allows to visualize an invisible image 5 formed on the printed pattern 3 as a visible image, as shown in FIG. 5. Note that the length S is 340 μm, and the printed pattern 3 is printed on a coated paper sheet by offset printing. However, the length S, the base material of the printed matter, the printing method, the printing material, the printing apparatus, and the like are not particularly limited. The invisible image 5 is visually recognized as a negative image or a positive image depending on the overlay position of the discrimination tool 2 on the printed pattern 3. Note that the invisible image 5 embedded in the anti-counterfeit printed matter C1 cannot be confirmed without overlaying the discrimination tool 2 (lenticular lens or parallel line filter).

The lenticular lens serving as a discrimination tool is placed at a predetermined position on the printed matter so as to make the center line of each lens element coincide with the center of the object A, that is, a line L1 in FIG. 3(a). In this case, the objects A are magnified so that the image (pattern) constructed by the objects A can be confirmed. When the discrimination tool is moved in the vertical axis direction to magnify the objects A', the invisible image visually recognized based on the objects A is visually recognized in a reversed negative/positive state.

(Anti-Counterfeit Printed Matter C2)

Figure 6:
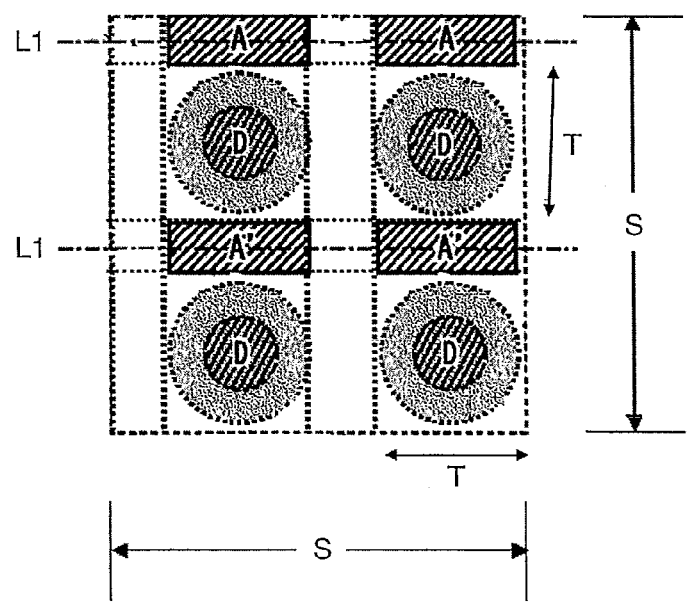
FIG. 6 is an explanatory view showing the basic structure of a printed pattern of an anti-counterfeit printed matter.

The anti-counterfeit printed matter C2 will be described in detail. FIG. 6 is a partially enlarged view of the basic arrangement of objects of the printed pattern of the anti-counterfeit printed matter C2. The vertical/horizontal size S is 1 mm or less, and for example, 423 μm. The objects form a minimum unit called a unit and are periodically arranged in a matrix on the surface of the printed matter. Each object includes at least three object elements. The object A (first object) and the object A' (second object) pair off and have an on/off relationship. The on/off relationship indicates that for example, when one is black (on), the other is white (off), and when one is colored, the other is colorless. That is, the two objects are never black or white simultaneously. The objects A and A' have the same area. Since the objects A and A' exist, an invisible image (negative or positive) that is not visually recognized under a normal visual condition is formed by only the objects A, and another invisible image (positive or negative) is formed by only the objects A'.

An object D (third object) is an element of a visible image, and forms a pattern having an arbitrary continuous tone visually recognized by naked eye observation in a normal visual recognition state. Note that the object D is arranged between the objects A and A'. A region T shown in FIG. 6 indicates the maximum region of the object D. Within this region, the object D can be formed by not only a normal halftone dot for printing but also increasing/decreasing the object size, changing the object density, changing the object sparseness, or a set of random dots of an FM screen or the like, and its shape is not particularly limited. The above-described "sparseness" means a change in the amount of objects having the same object area and arranged in a predetermined region. A region with a high arrangement density reproduces shadow, and a region with a low arrangement density reproduces highlight. Hence, the continuous tone is reproduced by arbitrarily setting the object sparseness.

The objects D need not always have a single color and may include a plurality of objects of subtractive color mixture of, for example, cyan, magenta, yellow, and black. This allows to express a pattern having an arbitrary continuous tone as a color image. The colors are not particularly limited. In addition, the objects D can also be printed using a photoluminescent ink such as silver ink.

Figure 7:
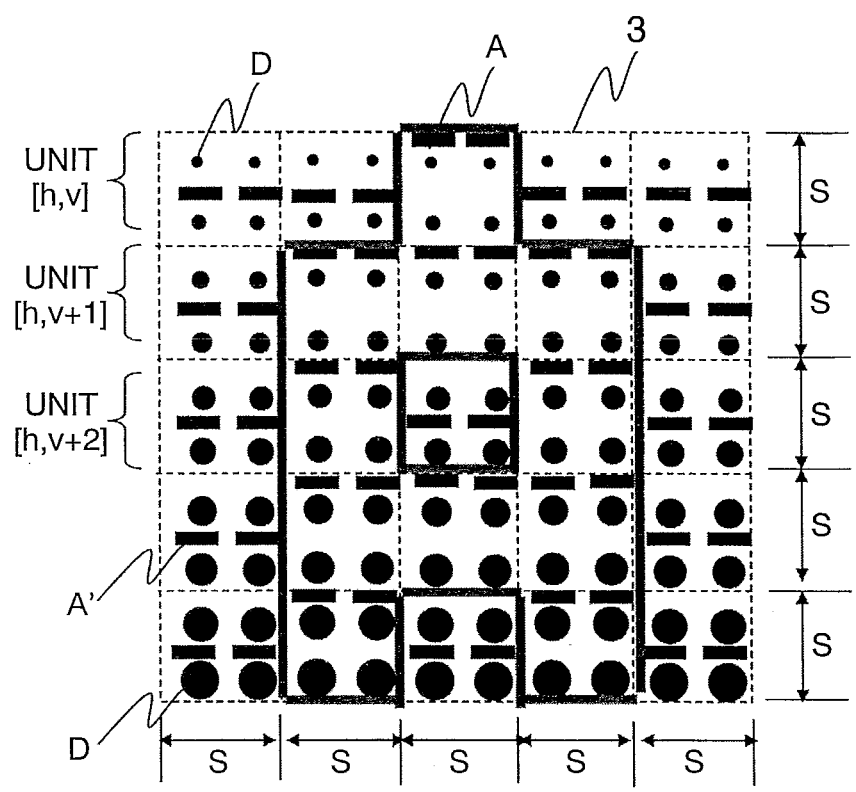
FIG. 7 is a view schematically illustrating the objects arranged in a matrix to form a printed pattern 3 on the printed matter so as to clarify the composition.

FIG. 7 is a view schematically illustrating the objects arranged in a matrix to form the printed pattern 3 on the anti-counterfeit printed matter C2 so as to clarify the composition. Note that FIG. 7 is a view schematically illustrating the same printed matter so as to clarify the position and composition of the invisible image indicated by bold solid lines. FIG. 7 shows the position of the invisible image "A".

Even in the state of the printed pattern 3 shown in FIG. 7, the invisible image that is not visually recognized by naked eye observation is formed. The density of the objects partially appears to be high (dark) or low (light) near the units arranged in a matrix. That is, density imbalance may occur upon naked eye observation. Such density imbalance acts as a noise component in the pattern having the continuous tone expressed by the objects D and degrades the visibility of the visible image.

To relax the apparent density imbalance, object deletion and addition are executed for each unit [h,v] that is the minimum unit. Note that [v] is the number of steps corresponding to the number of units counted vertically from the upper side, and [h] is the number of steps corresponding to the number of units counted horizontally from the left side. First, concerning the unit [h,v] of each column of the matrix, the objects A[h,v] and A'[h,v] are sequentially detected. Note that as for the method of detecting the objects A[h,v] and A'[h,v], for example, if the printed pattern 3 is a binary image having the bitmap format, the object A[h,v] or A'[h,v] may be identified and deleted in a process target unit by processing called labeling in general.

Figure 8:
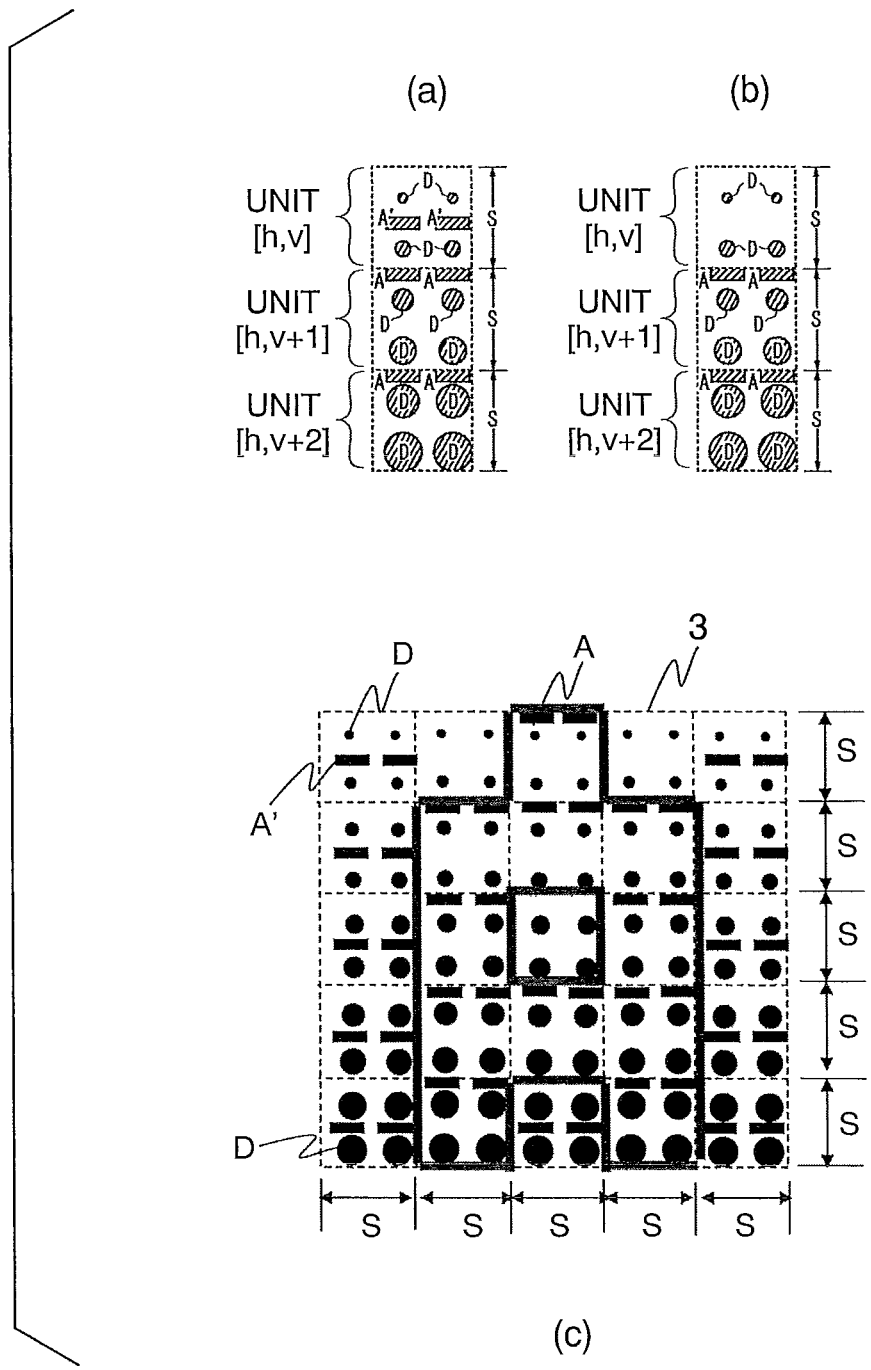
FIG. 8 shows views of a state in which the objects A'[h,v] of the unit [h,v] are deleted.

Next, if a condition that the unit [h,v] includes the objects A'[h,v], and the unit [h,v+1] includes the objects A[h,v+1] is satisfied, the objects A'[h,v] which should be arranged originally in the unit [h,v] are deleted. More specifically, when the unit [h,v], unit [h,v+1], and unit [h,v+2] are arranged, and the objects A'[h,v] of the unit [h,v] are adjacent to the objects A[h,v+1] of the unit [h,v+1], as shown in FIG. 8(a), the objects A'[h,v] of the unit [h,v] are deleted, as shown in FIG. 8(b).

Figure 9:
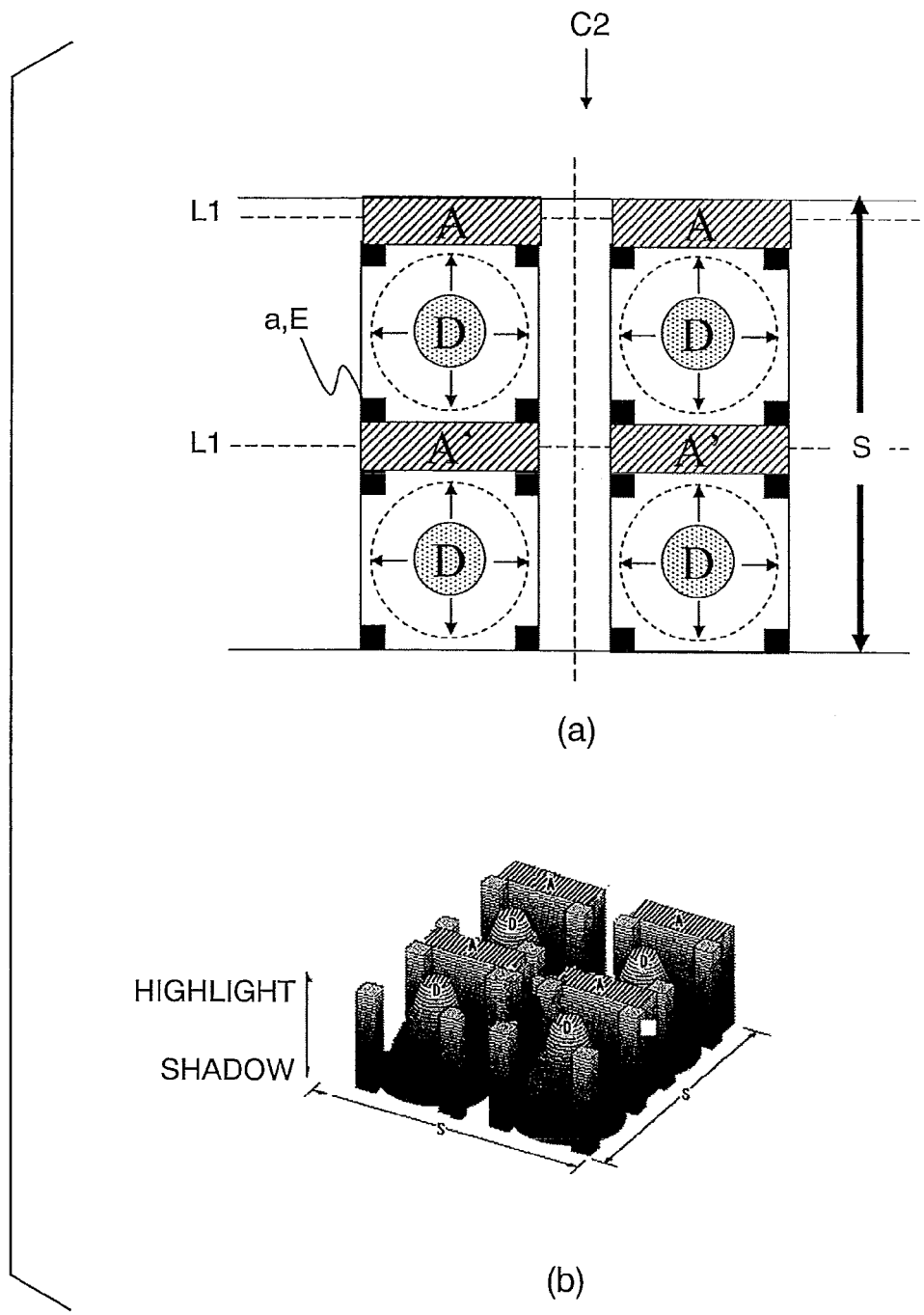
FIG. 9 shows a plan view and a conceptual view of the object arrangement of the unit [h,v] of an anti-counterfeit printed matter C2.
Figure 10:
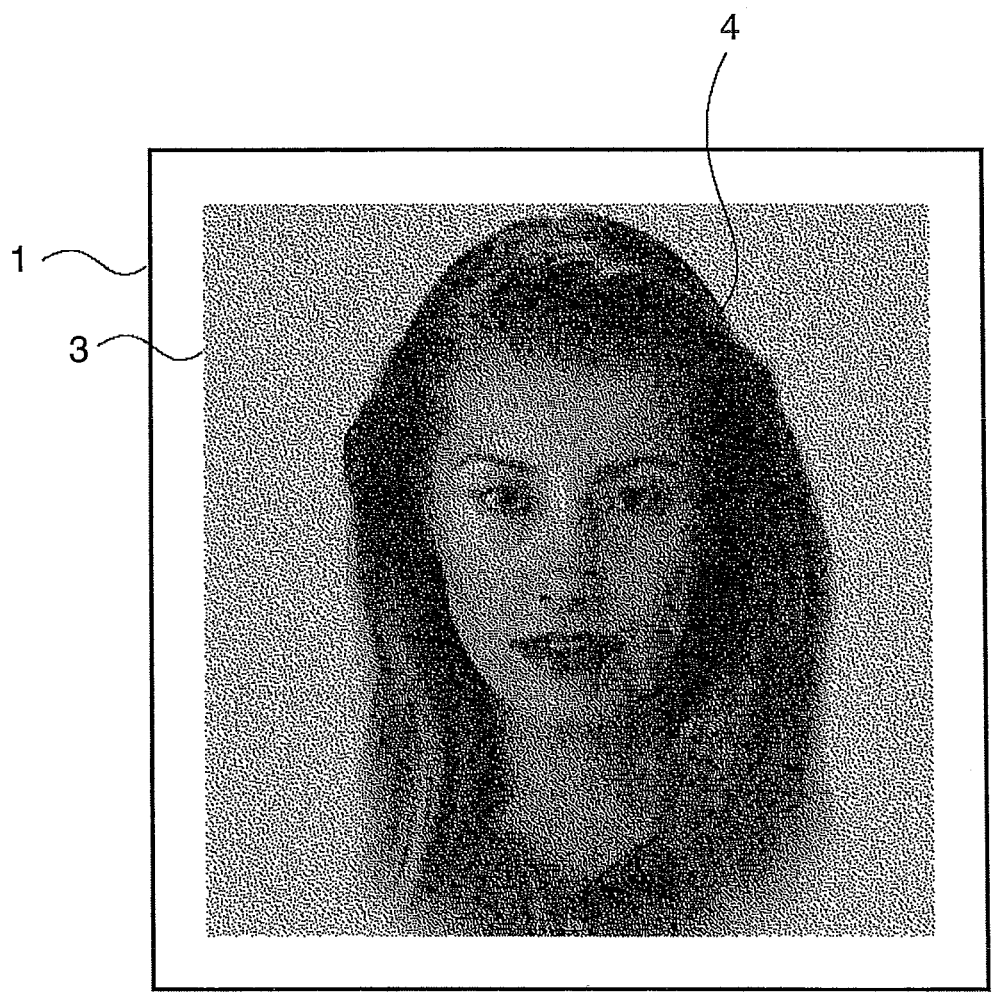
FIG. 10 is a view showing a pattern 4 having an arbitrary continuous tone.

FIG. 9 shows a plan view of the object arrangement of the unit [h,v] of the anti-counterfeit printed matter C2. The basic object arrangement is the same as that shown in FIG. 6. In addition to the objects D that produce the continuous tone, the objects a and E are provided to relax density imbalance. The objects a and E are located in the regions occupied by the objects D in FIG. 6 and arranged around the objects D so as to be adjacent to the objects A and A'. The objects a and E need only be arranged in predetermined regions where the objects A, A', and D do not exist. The total object area of the objects a or E in the unit [h,v] to relax the density imbalance is 1/2 or almost 1/2 the object area of the objects A or A' in the unit [h,v]. The almost 1/2 object area indicates an object area ratio of 40% to 60% when the object area ratio of the objects A or A' is defined as 100%. At an object area ratio of 40% or less, the density appears to be low, and the density imbalance cannot be relaxed. At an object area ratio higher than 60%, the density appears to be high, and the density imbalance cannot be relaxed. Note that this also applies to the following embodiments. Note that the objects D construct a pattern 4 having an arbitrary continuous tone shown in FIG. 10. The size of the object D changes in accordance with the continuous tone from highlight to shadow, thereby determining the density of the pattern 4 shown in FIG. 10. Note that the objects D are arranged in a unit where the first objects or the second objects are formed and/or based on or almost based on the boundary between the units.

Figure 11:
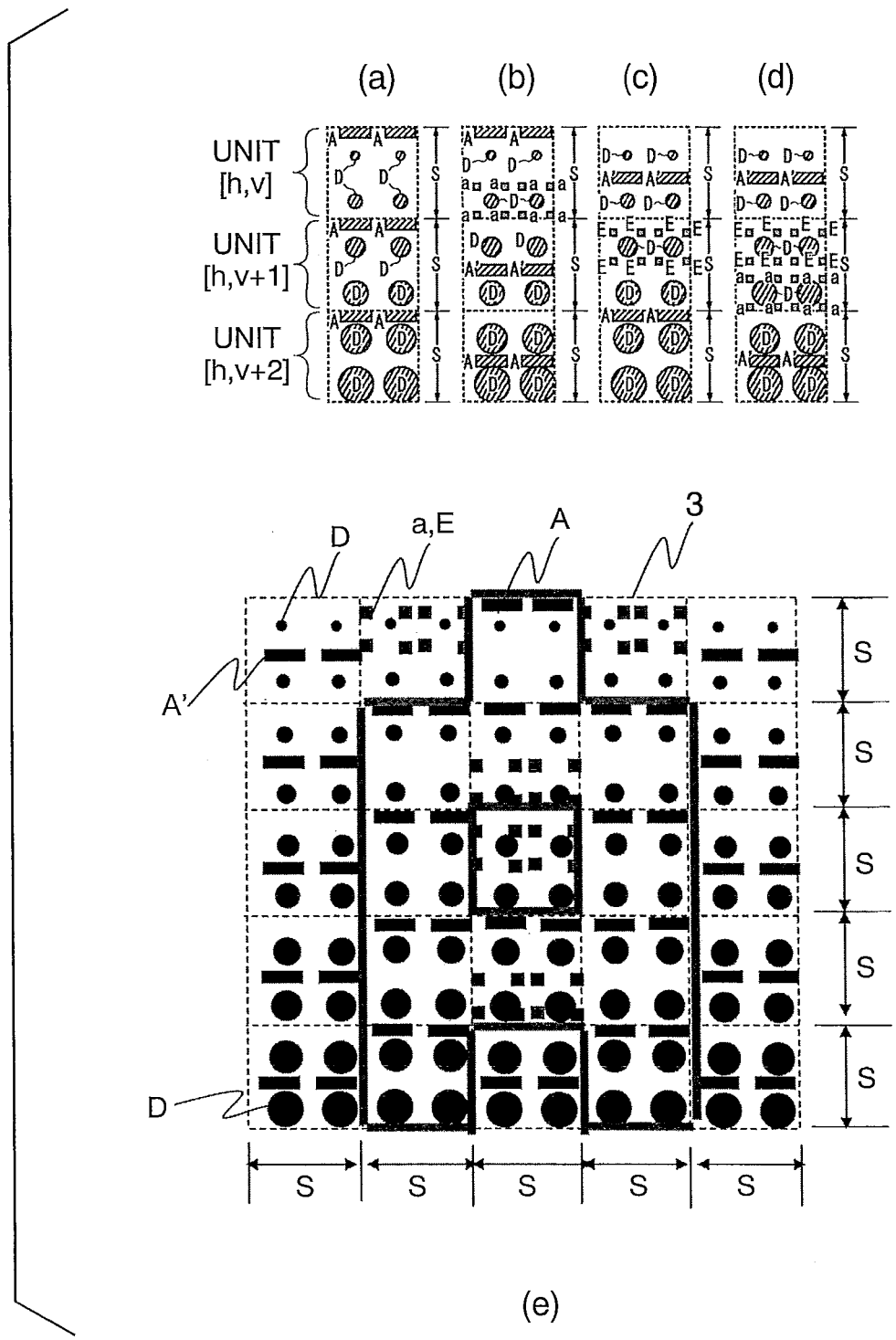
FIG. 11 shows views of a state in which the objects a and E having an object area 1/2 or almost 1/2 that of the objects A or A' are added.

If a condition that the unit [h,v] includes the objects A[h,v], and the unit [h,v+1] includes the objects A'[h,v+1] is satisfied, the objects a are added between the unit [h,v] and the unit [h,v+1]. More specifically, as shown in FIG. 11(b), the objects a having an object area (total area in each unit: fourth objects) 1/2 or almost 1/2 that of the objects A or A' are added near the midpoint between the objects A of the unit [h,v] and the objects A' of the unit [h,v+1]. This relaxes the density imbalance upon naked eye observation between the unit [h,v] and the unit [h,v+1].

If a condition that the unit [h,v] includes the objects A'[h,v], the unit [h,v+1] includes no object, and the unit [h,v+2]

includes the objects A[h,v+2] is satisfied, the objects E are added between the unit [h,v] and the unit [h,v+2] in a process f7. More specifically, as shown in FIG. 11(c), the objects E (fourth objects) having an object area 1/2 or almost 1/2 that of the objects A or A' are added near the midpoint between the objects A' of the unit [h,v] and the objects A of the unit [h,v+2]. This relaxes the density imbalance upon naked eye observation between the unit [h,v] and the unit [h,v+2].

If a condition that the unit [h,v] includes the objects A'[h,v], the unit [h,v+1] includes no object, and the unit [h,v+2] includes the objects A'[h,v+2] is satisfied, the objects E and a are added between the unit [h,v] and the unit [h,v+2]. More specifically, as shown in FIG. 11(d), the objects E and a (fourth objects) having an object area 1/2 or almost 1/2 that of the objects A or A' are added at or almost at the midpoint between the objects A' of the unit [h,v] and the objects A' of the unit [h,v+2]. This relaxes the density imbalance upon naked eye observation between the unit [h,v] and the unit [h,v+2]. Hence, when these processes are applied to the printed pattern 3, the density imbalance upon naked eye observation is relaxed throughout the printed pattern 3. Note that the arrangement positions of the objects a and E are not particularly limited. These objects are arranged in regions where the objects A, A', and D do not exist.

(Anti-Counterfeit Printed Matter C3)

Figure 12:
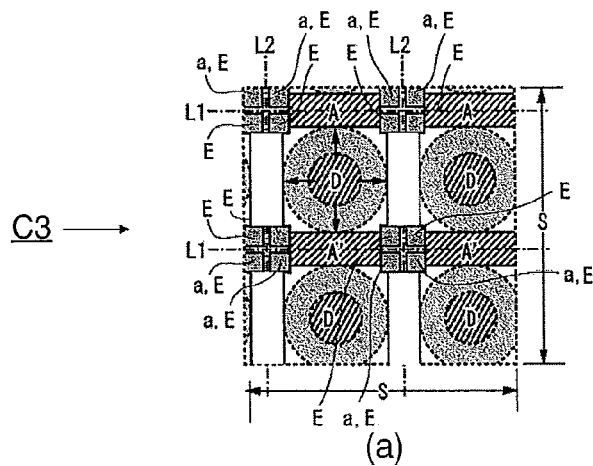
FIG. 12 shows a plan view and a conceptual view of the object arrangement of the unit [h,v] of an anti-counterfeit printed matter C3.
Figure 12:
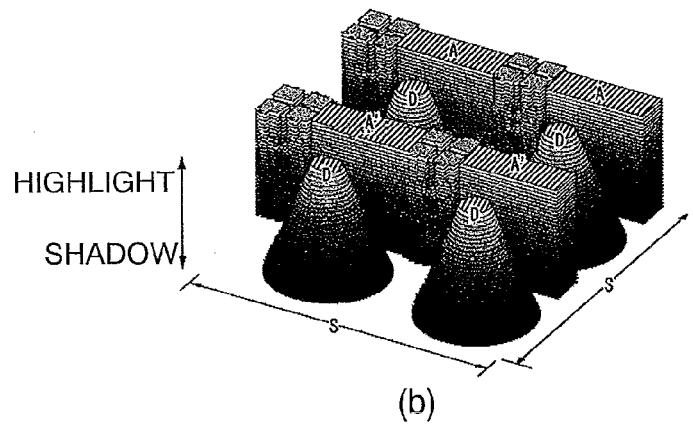
Figure 13:
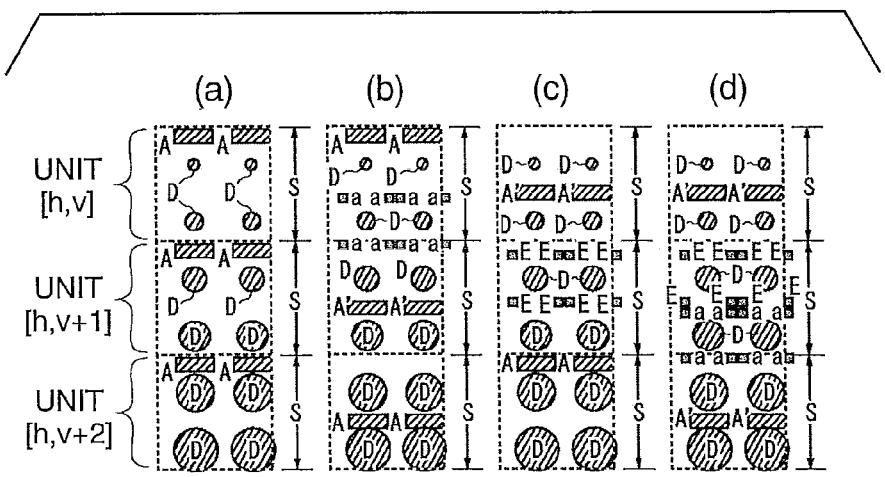
FIG. 13 shows views of a state in which the objects a and E having an object area 1/2 or almost 1/2 that of the objects A or A' are added.

To relax density imbalance in the anti-counterfeit printed matter C2, in the object arrangement of the unit [h,v], the objects a and E are provided in the regions occupied by the objects D in FIG. 6 to relax density imbalance in addition to the objects D that produce the continuous tone. The objects a and E may be provided outside the regions occupied by the objects D if the effects of the present invention are not impeded. FIG. 12(a) shows the object arrangement of the unit [h,v] of the anti-counterfeit printed matter C3. The basic object arrangement is the same as that shown in FIG. 6. The role of the objects a and E to relax density imbalance is the same as in the anti-counterfeit printed matter C2. The objects a and E are located outside the regions occupied by the objects D shown in FIG. 6 so as to be adjacent to the objects A and A'. The object area of the objects a or E in the unit [h,v] is 1/2 or almost 1/2 the object area of the objects A or A' in the unit [h,v]. Note that the objects D construct the pattern 4 having an arbitrary continuous tone shown in FIG. 10. As shown in the conceptual view of FIG. 12(b), the size of the object D changes in accordance with the continuous tone from highlight to shadow, thereby determining the density of the pattern 4 shown in FIG. 10.

In addition, the density partially appears to be high (dark) or low (light) near the units arranged in a matrix. That is, density imbalance occurs upon naked eye observation. To relax this, the objects A' are deleted, as in the anti-counterfeit printed matter C2. As a result, the same arrangement as that shown in FIG. 8(b) is obtained.

Figure 14:
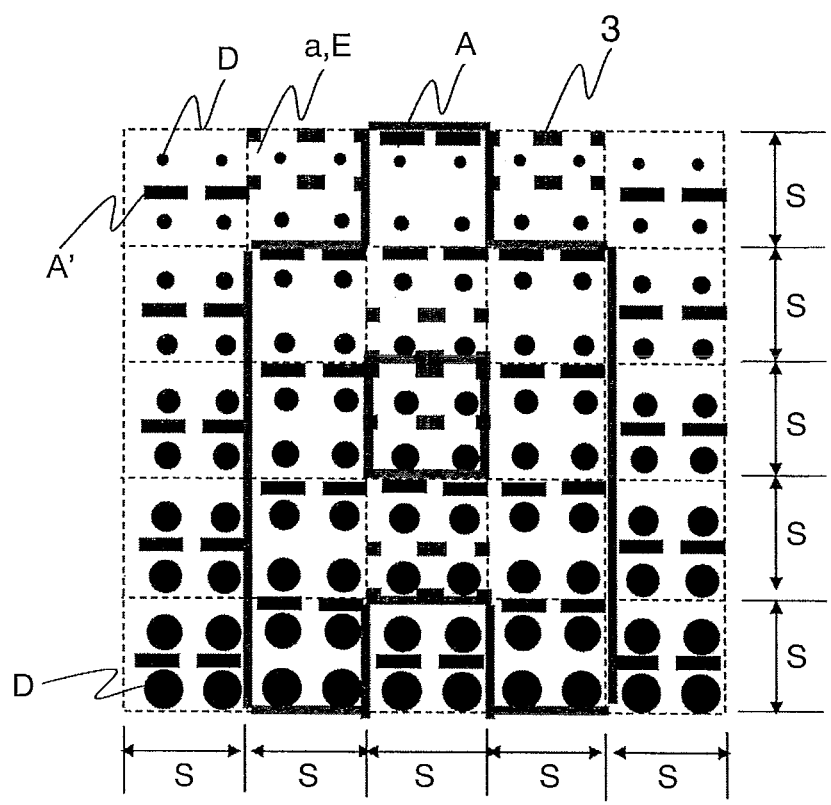
FIG. 14 is an explanatory view showing a state in which the density imbalance upon naked eye observation is relaxed throughout the printed pattern 3.

Next, as in the anti-counterfeit printed matter C2, the objects a and E to relax density imbalance upon naked eye observation are applied to the printed pattern 3 in FIG. 7 to obtain the object arrangements shown in FIGS. 13(a) to 13(d). Additionally, the density imbalance upon naked eye observation is relaxed throughout the printed pattern 3 shown in FIG. 14.

(Anti-Counterfeit Printed Matter C4)

Figure 15:
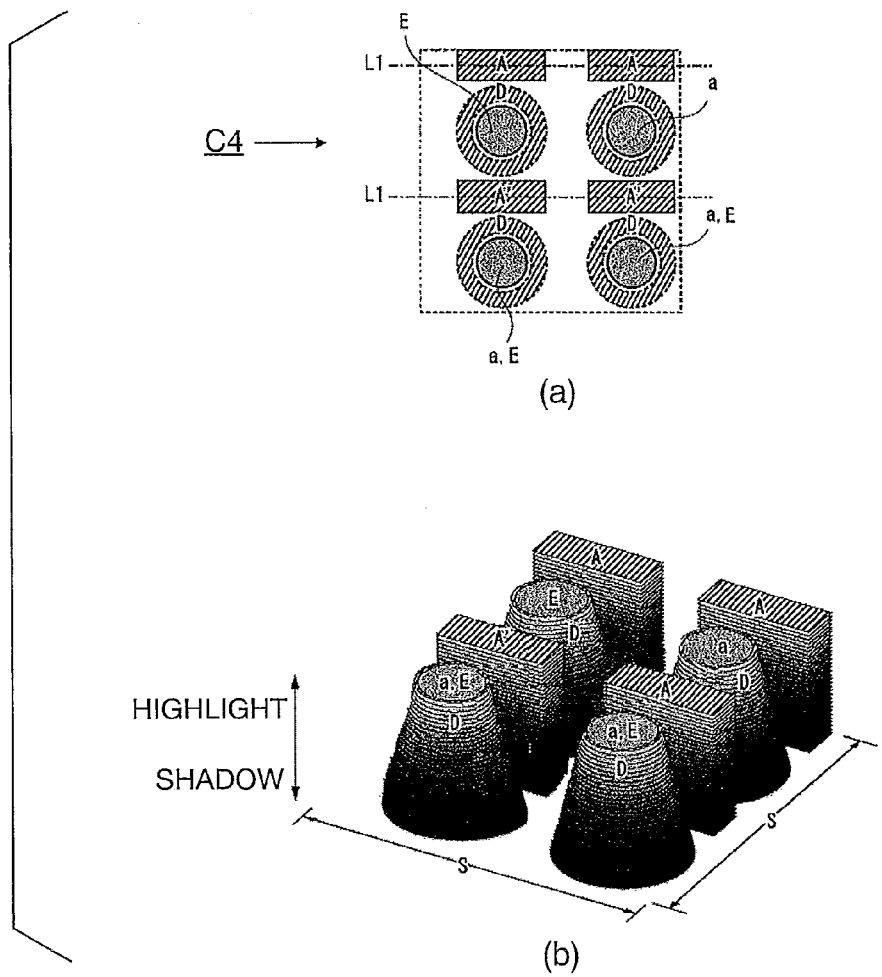
FIG. 15 shows a plan view and a conceptual view of the object arrangement of the unit [h,v] of an anti-counterfeit printed matter C4.
Figure 16:
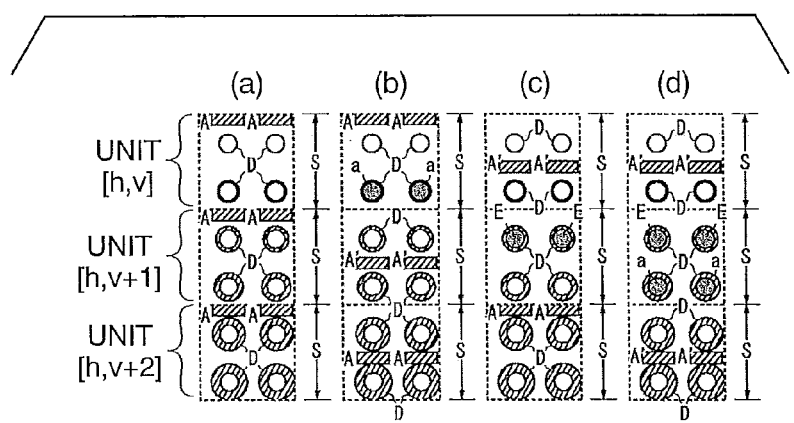
FIG. 16 shows views of a state in which the objects a and E having an object area 1/2 or almost 1/2 that of the objects A or A' are added.

To relax density imbalance in the anti-counterfeit printed matters C2 and C3, in the object arrangement of the unit [h,v], the objects a and E are provided around the objects D that produces the continuous tone to relax the density imbalance. The objects a and E may be provided at the centers of the regions occupied by the objects D shown in FIG. 6 if the effects of the present invention are not impeded. FIG. 15(a) shows the object arrangement of the unit [h,v] of the anti-counterfeit printed matter C4. The basic object arrangement is the same as that shown in FIG. 6. The role of the objects a and E to relax density imbalance is the same as in the anti-counterfeit printed matters C2 and C3. The objects a and E are located at the centers of the regions occupied by the objects D shown in FIG. 6 not to come into contact with the objects A and A'. The object area of the objects a or E in the unit [h,v] is 1/2 or almost 1/2 the object area of the objects A or A' in the unit [h,v]. Note that the objects D are doughnut-shaped objects surrounding the objects a and E to relax density imbalance and construct the pattern 4 having an arbitrary continuous tone shown in FIG. 10. As shown in the conceptual view of FIG. 15(b), the width of the doughnut-shaped object D changes in accordance with the continuous tone from highlight to shadow, thereby determining the density of the pattern 4 shown in FIG. 10.

In addition, the density partially appears to be high (dark) or low (light) near the units arranged in a matrix. That is, density imbalance occurs upon naked eye observation. To relax this, the objects A' are deleted, as in the anti-counterfeit printed matter C2. As a result, the same arrangement as that shown in FIG. 8(b) is obtained.

Figure 17:
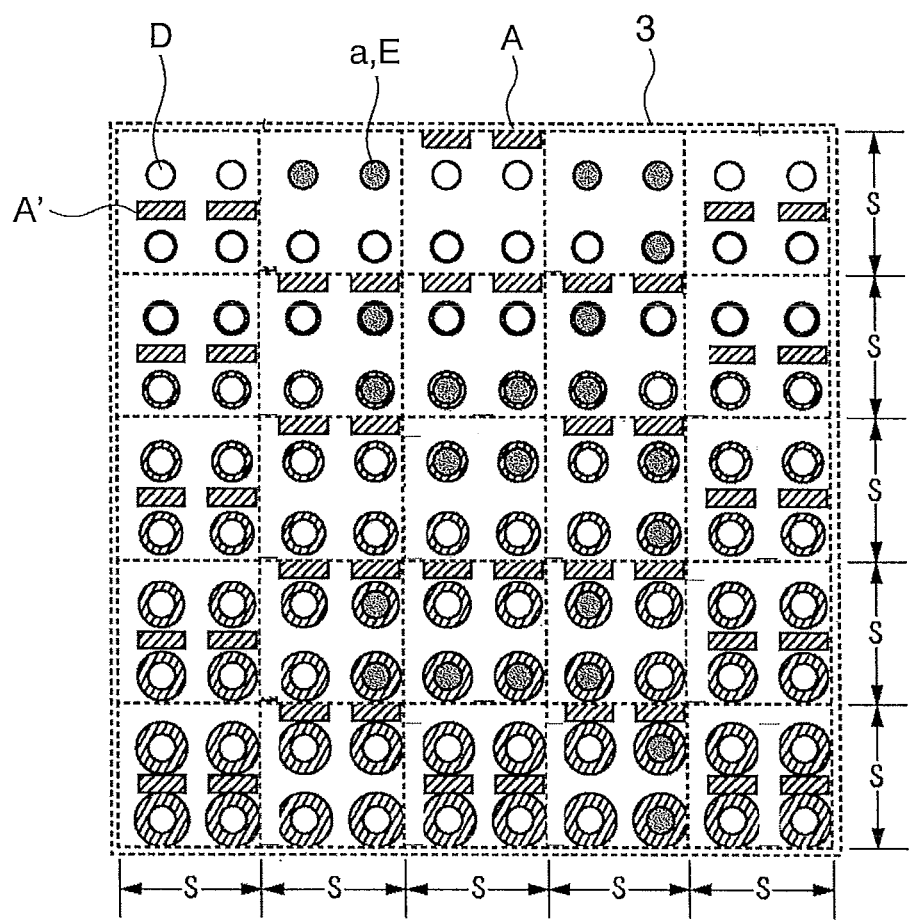
FIG. 17 is an explanatory view showing a state in which the density imbalance upon naked eye observation is relaxed throughout the printed pattern 3.

Next, as in the anti-counterfeit printed matters C2 and C3, the objects a and E to relax density imbalance upon naked eye observation are applied to the printed pattern 3 in FIG. 7 to obtain the object arrangements shown in FIGS. 16(a) to 16(d). Additionally, the density imbalance upon naked eye observation is relaxed throughout the printed pattern 3 shown in FIG. 17.

(Anti-Counterfeit Printed Matter C5)

Figure 18:
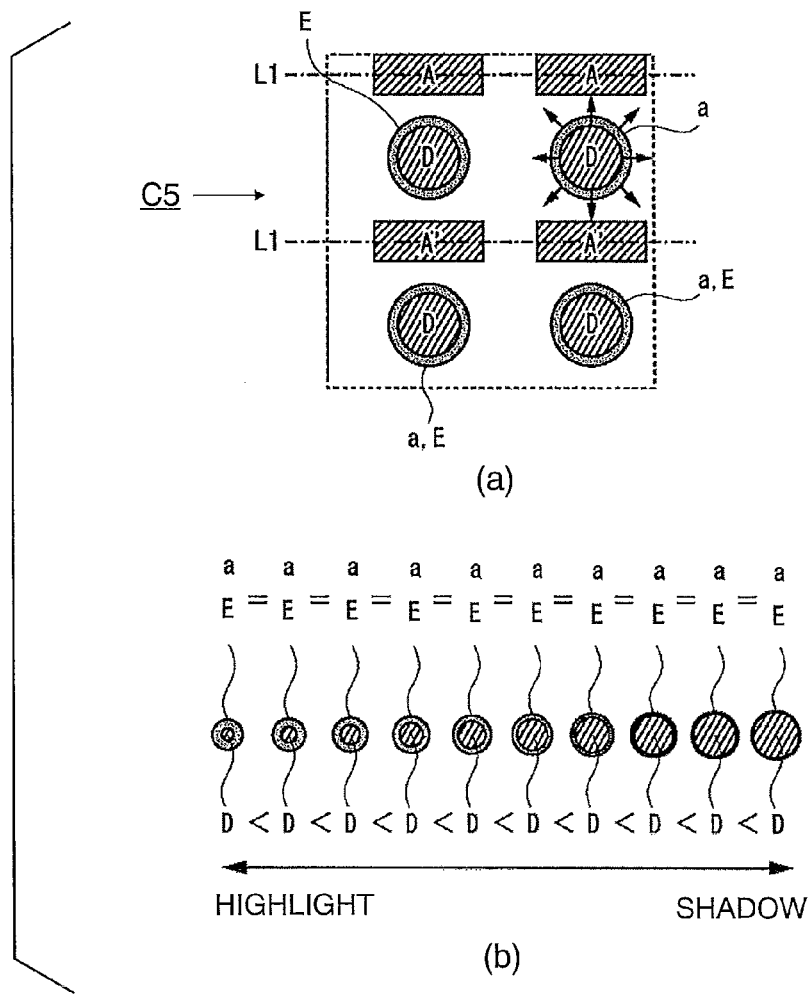
FIG. 18 shows a plan view and a conceptual view of the object arrangement of the unit [h,v] of an anti-counterfeit printed matter C5.
Figure 19:
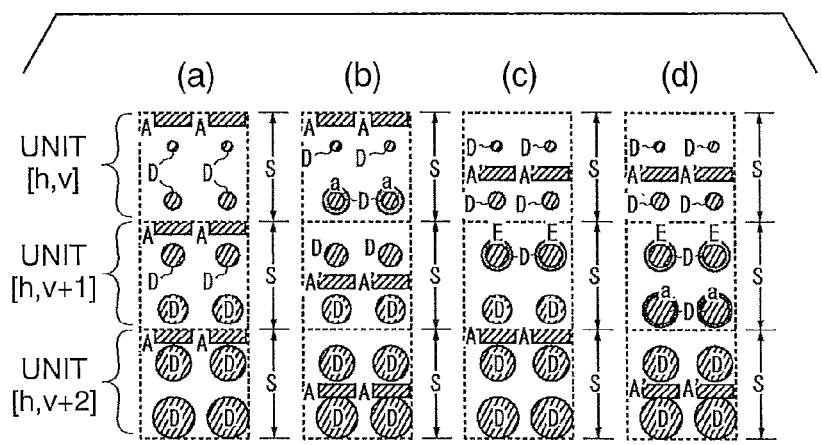
FIG. 19 shows views of a state in which the objects a and E having an object area 1/2 or almost 1/2 that of the objects A or A' are added.

To relax density imbalance in the anti-counterfeit printed matters C2 to C4, in the object arrangement of the unit [h,v], the objects a and E are provided around the objects D that produces the continuous tone to relax the density imbalance. The objects a and E may be arranged to surround the objects D shown in FIG. 6 if the effects of the present invention are not impeded. FIG. 18(a) shows the object arrangement of the unit [h,v] of the anti-counterfeit printed matter C5. The basic object arrangement is the same as that shown in FIG. 6. The role of the objects a and E to relax density imbalance is the same as in the anti-counterfeit printed matters C2 to C4. The objects a and E are arranged to surround the objects D shown in FIG. 6 not to come into contact with the objects A and A'. The object area of the objects a or E in the unit [h,v] is 1/2 or almost 1/2 the object area of the objects A or A' in the unit [h,v]. Note that the objects D are circular objects, and the objects a and E to relax density imbalance are arranged to surround the objects D and construct the pattern 4 having an arbitrary continuous tone shown in FIG. 10. As shown in the conceptual view of FIG. 18(b), the amount of the object D changes in accordance with the continuous tone from highlight to shadow, whereas the object a or E surrounding the object D does not change the object area from highlight to shadow while conforming to the shape of the object D, thereby determining the density of the pattern 4 shown in FIG. 10.

In addition, the density partially appears to be high (dark) or low (light) near the units arranged in a matrix. That is, density imbalance occurs upon naked eye observation. To relax this, the objects A' are deleted, as in the anti-counterfeit printed matter C2. As a result, the same arrangement as that shown in FIG. 8(b) is obtained.

Figure 20:
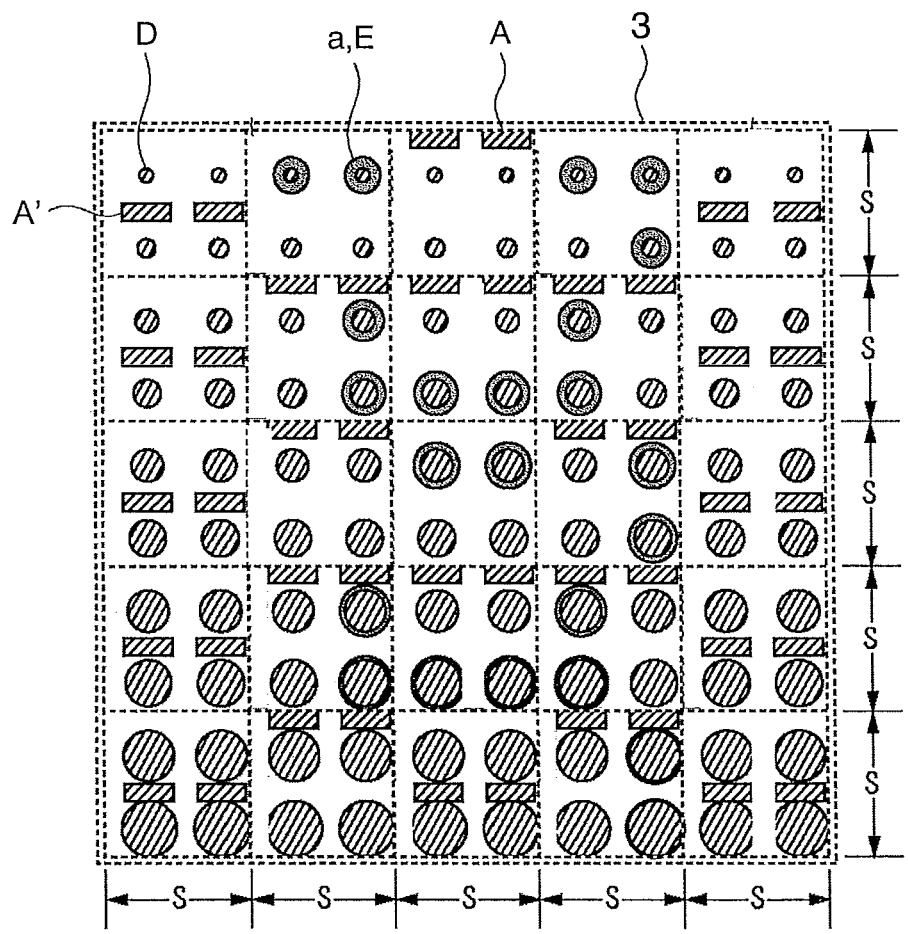
FIG. 20 is an explanatory view showing a state in which the density imbalance upon naked eye observation is relaxed throughout the printed pattern 3.

Next, as in the anti-counterfeit printed matter C2, the objects a and E to relax density imbalance upon naked eye observation are applied to the printed pattern 3 in FIG. 7 to obtain the object arrangements shown in FIGS. 19(a) to 19(d). Additionally, the density imbalance upon naked eye observation is relaxed throughout the printed pattern 3 shown in FIG. 20.

In addition, a unit [h,v] which completely lacks the objects A or A' may be generated in the objects of the printed pattern 3. In this case, objects having almost the same object area as the objects A or A' are preferably added at least in the regions where the objects D shown in FIG. 6 are arranged. This further relaxes the density imbalance upon naked eye observation.

(Anti-Counterfeit Printed Matter C6)

Figure 21:
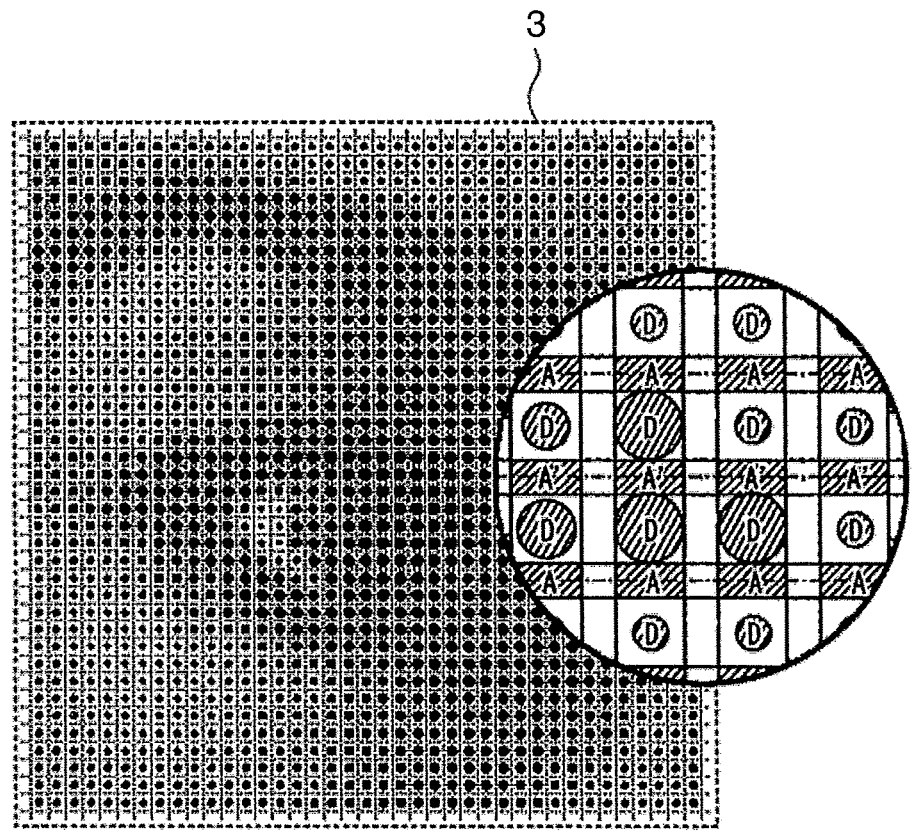
FIG. 21 is an explanatory view showing a state in which a pattern having a continuous tone in the printed pattern 3 expresses a photo image by continuously changing the size of an object D.
Figure 22:
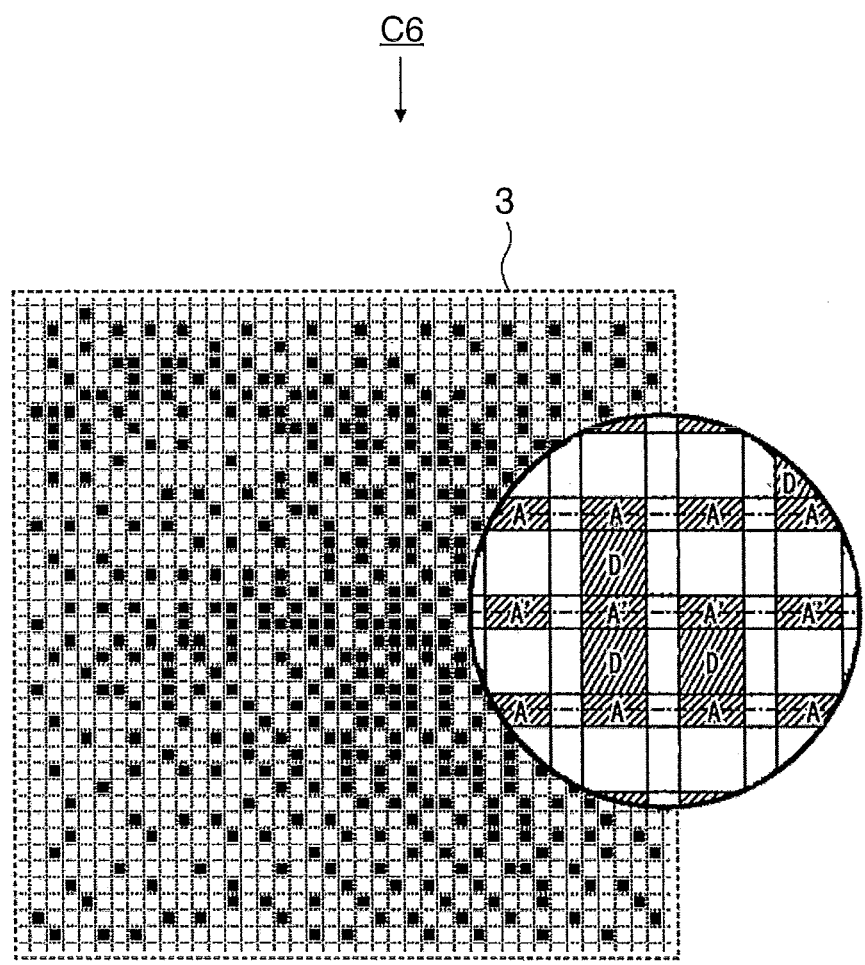
FIG. 22 is an explanatory view showing a state in which the objects in the regions occupied by the objects D having the same object area are colored at random in each of the units arranged in a matrix so as to express a relative photo tone.

In the above-described anti-counterfeit printed matters C2 to C5, the pattern 4 having the continuous tone in the printed pattern 3 expresses a photo image by continuously changing the size of the object D, as shown in the partially enlarged view (the circle in FIG. 21) of the printed pattern 3 shown in FIG. 21. However, since the unit size is 423 µm in the anti-counterfeit printed matters C2 to C5, the highlight portion in the continuous tone is expressed by fine objects. Hence, a printing method and means having a resolution allowing to express the fine objects are necessary. The anti-counterfeit printed matter C6 may include the objects D having the same size so that it can be implemented by a printing method and means capable of solving at least the objects A and A'. More specifically, the objects in the regions occupied by the objects D having the same object area shown in FIG. 6 may be colored at random in each of the units arranged in a matrix so as to express a relative photo tone, as shown in the partially enlarged view (the circle in FIG. 22) of the printed pattern 3 shown in FIG. 22. To color the objects D, dithering that is a known tone expression method may be used. This enables, for example, a printer having a low resolution to provide a visible image having a continuous tone image. Note that FIGS. 21 and 22 illustrate the objects A and A' that are all colored to help understanding the basic positional relationship of the objects in the units.

(Anti-Counterfeit Printed Matter C7)

Figure 23:
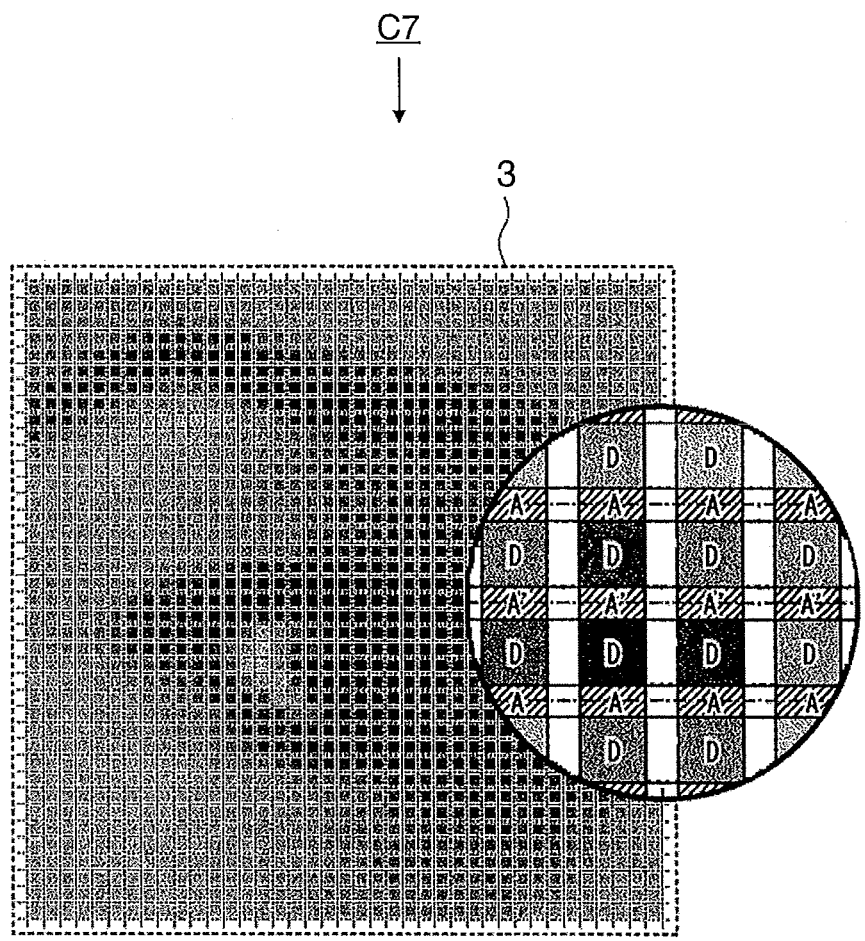
FIG. 23 is an explanatory view showing a state in which the objects in the regions occupied by the objects D having different densities are arranged in a matrix so as to express a photo tone.

In the above-described anti-counterfeit printed matters C2 to C6, the pattern 4 having the continuous tone in the printed pattern 3 expresses a photo image by continuously changing the size of the object D, as shown in the partially enlarged view (the circle in FIG. 21) of the printed pattern 3 shown in FIG. 21. However, the anti-counterfeit printed matters C2 to C6 particularly increase the applicability in commercial printing generally called prepress such as offset printing, letterpress printing, and screen printing, and the technique of the present invention is not limited to this. The anti-counterfeit printed matter C7 includes the objects D that are filled to appropriate densities in terms of grayscale. More specifically, the objects in the regions occupied by the objects D shown in FIG. 6 are colored to appropriate densities in terms of grayscale in each of the units arranged in a matrix so as to express a relative photo tone, as shown in the partially enlarged view (the circle in FIG. 23) of the printed pattern 3 shown in FIG. 23. Even when an inkjet printer capable of printing an image of photo quality is used as the method of coloring the regions occupied by the objects D, a visible image having a continuous tone image can be provided. In addition, photographic paper having a coating of a silver-halide photosensitive material may be used for the printed matter 1. Note that FIGS. 21 to 23 illustrate the objects A and A' that are all colored to help understanding the basic positional relationship of the objects in the units.

The above-described objects A, A', D, a, and E can have any shape as far as the effects of the present invention can be obtained.

(Halftone Dot Data Creation Apparatus A1)

Figure 24:
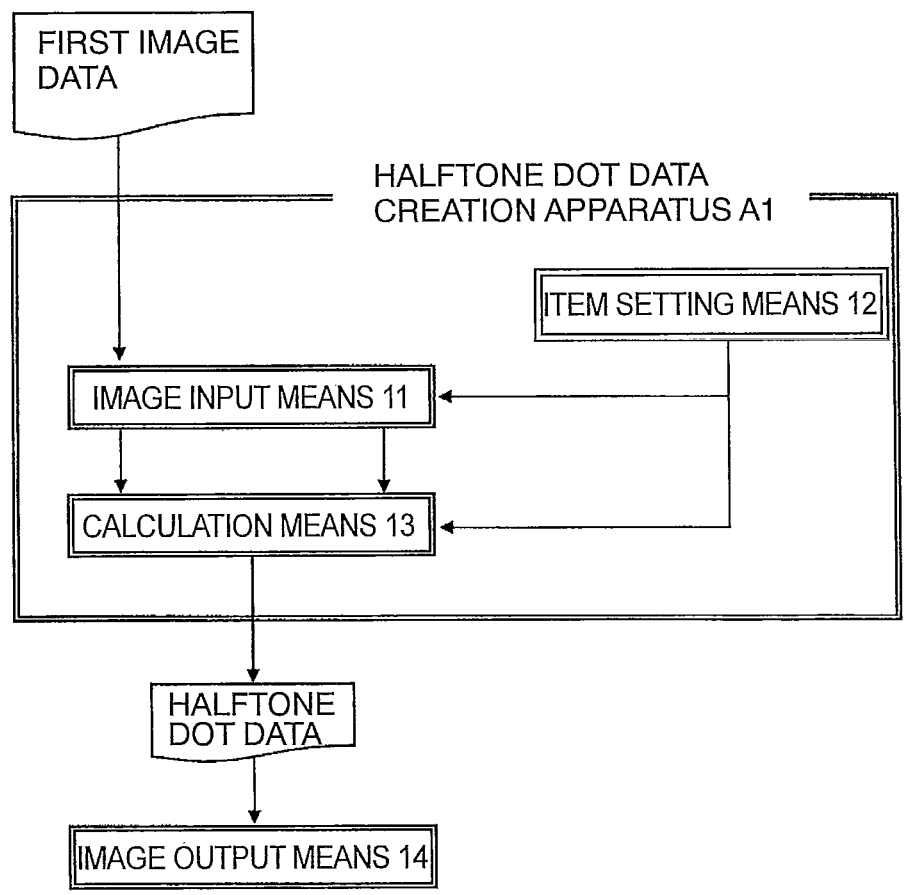
FIG. 24 is a block diagram of a halftone dot data creation apparatus A1 according to the present invention.

An apparatus for creating the above-described halftone dot data will be explained with reference to the block diagram of the apparatus shown in FIG. 24. The halftone dot data creation apparatus A1 includes an image input means 11, an item setting means 12, a calculation means 13, and an image output means 14.

(Image Input Means)

The image input means 11 inputs first image data 23 as shown in FIG. 25(a) serving as the base of an invisible image to be visually recognized as a latent image upon overlaying a lenticular lens or a parallel line filter. Density correction of the first image data 23 can be performed as needed. The first image data 23 may be acquired by extracting predetermined information from a text file (TXT or CSV format) of personal information and the like and converting it into an image file.

(Item Setting Means)

Figure 26:
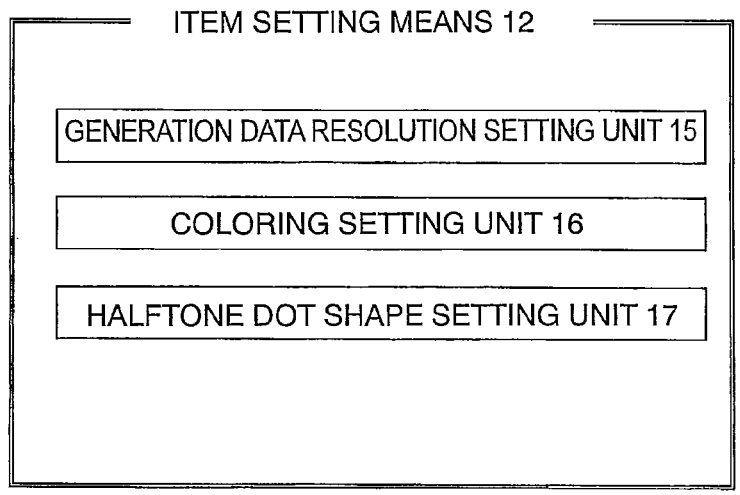
FIG. 26 is a block diagram of an item setting means 12 of the halftone dot data creation apparatus A1 according to the present invention.

As shown in FIG. 26, the item setting means 12 includes a generation data resolution setting unit 15 which sets the resolution of halftone dot data, a coloring setting unit 16 which sets coloring, and a halftone dot shape setting unit 17 which sets the shapes of the halftone dots of the first, second, and fourth objects. The settings are done for each setting item.

(Generation Data Resolution Setting Unit)

The generation data resolution setting unit 15 sets the resolution of halftone dot data according to the present invention. The resolution may be set by inputting an arbitrary resolution or selecting one of a plurality of resolutions stored in advance.

(Coloring Setting Unit)

The coloring setting unit 16 arbitrarily sets "C", "M", "Y", and/or "K" of the first, second, and fourth objects and "C", "M", "Y", and/or "K" of the background portion. "C" represents the ratio of the cyan component to the anti-counterfeit printed matter to be manufactured from halftone dot data. "M" represents the ratio of the magenta component to the anti-counterfeit printed matter. "Y" represents the ratio of the yellow component to the anti-counterfeit printed matter. "K" represents the ratio of the black component to the anti-counterfeit printed matter. Note that the colors to be set by the coloring setting unit of the present invention are not limited to "C", "M", "Y", and "K". Any other colors outputtable by a printer using spot colors, fluorescent inks, gold ink, silver ink, and the like can be set.

(Halftone Dot Shape Setting Unit)

The halftone dot shape setting unit 17 sets the height and width of a unit, and the halftone dot shapes of the first, second, and fourth objects to be formed in the unit.

(Calculation Means)

The calculation means 13 forms, from the first image data 23 input by the image input means 11, image data having the invisible image made of the first and second objects based on the contents set by the item setting means 12. Then, the calculation means 13 composites the image data having the invisible image and the fourth objects to relax density imbalance, thereby generating composite image data 26 (halftone dot data) as shown in FIG. 25(g).

Figure 27:
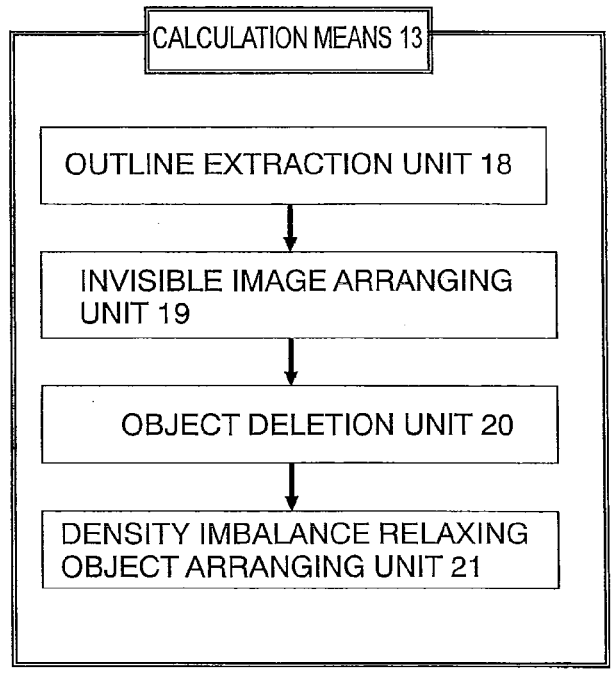
FIG. 27 is a block diagram of a calculation means 13 of the halftone dot data creation apparatus A1 according to the present invention.

As shown in FIG. 27, the calculation means 13 includes an outline extraction unit 18, an invisible image arranging unit 19, an object deletion unit 20, and a density imbalance relaxing object arranging unit 21.

(Outline Extraction Unit)

The outline extraction unit 18 extracts the outline of the first image data 23 shown in FIG. 25(a) and generates outline image data 24 of the first image data, as shown in FIG. 25(b).

(Invisible Image Arranging Unit)

Figure 25:
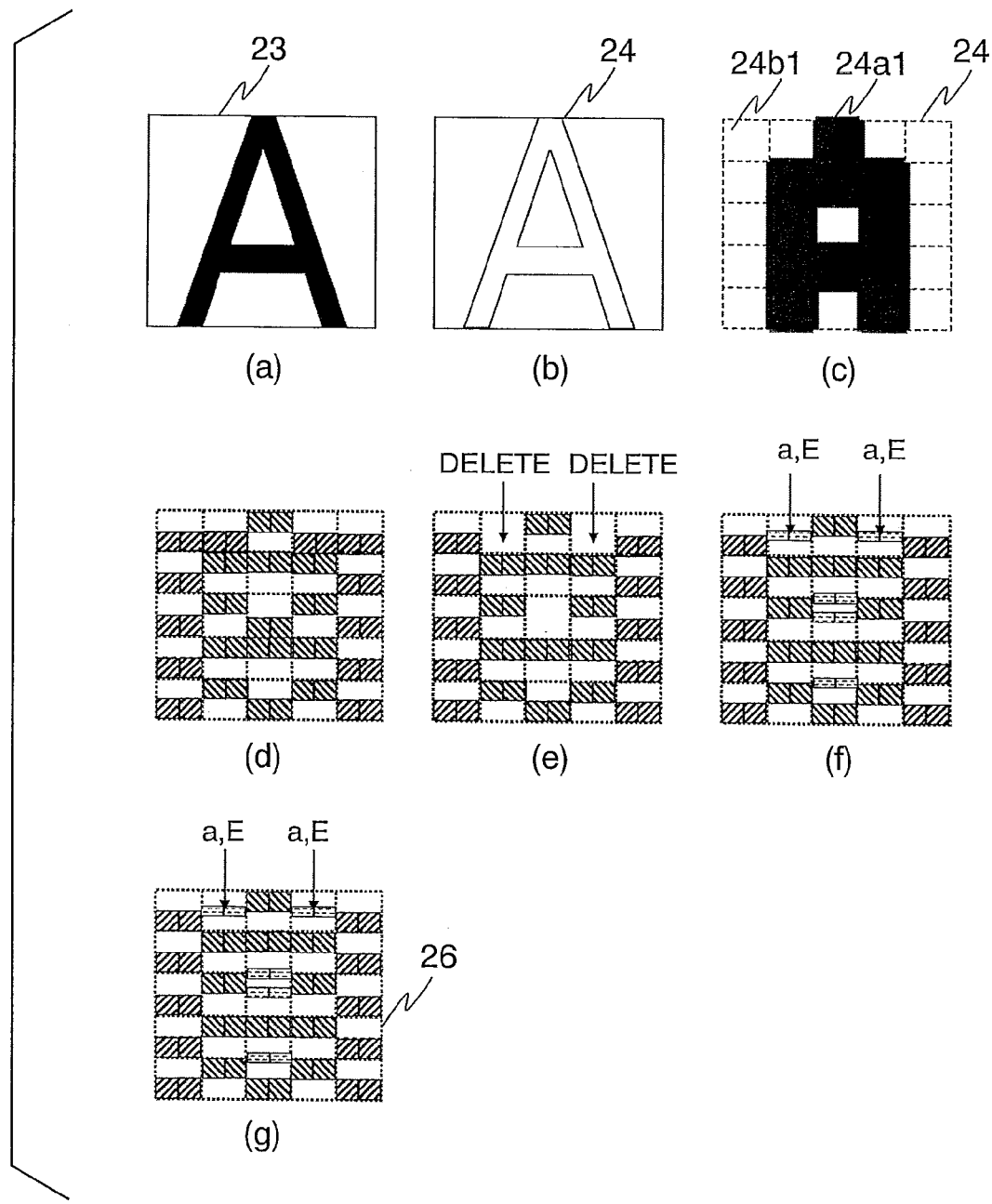
FIG. 25 shows views of the flow of data obtained by the halftone dot data creation apparatus A1 according to the present invention.

As shown in FIG. 25(c), the invisible image arranging unit 19 divides the units into intra-outline units 24a1 inside the outline and extra-outline units 24*b*1 outside the outline using the outline image data 24. Then, as shown in FIG. 25(*d*), the invisible image arranging unit 19 arranges the first and second objects inside the intra-outline units 24*a*1 while setting one kind of the objects in the on state and the other in the off state, and also arranges the first and second objects inside the extra-outline units 24*b*1 while setting the one kind in the off state and the other in the on state.

(Object Deletion Unit)

In the first and second objects arranged in the intra-outline units 24*a*1 and the extra-outline units 24*b*1, when both the first and second objects arranged adjacent to each other are on, the object deletion unit 20 deletes one of the first and second objects to set it in the off state, as shown in FIG. 25(*e*).

(Density Imbalance Relaxing Object Arranging Unit)

To relax density imbalance in predetermined regions, the density imbalance relaxing object arranging unit 21 arranges the fourth objects having an object area ratio 1/2 or almost 1/2 that of the first or second object and also having the same or almost the same color based on or almost based on the boundary between the first and second objects at the spatial positions where the first or second object has been deleted or at the positions where off portions are arranged adjacently in the plurality of units arranged adjacently, as shown in FIG. 25(*f*). In the present invention, "almost the same color" means a color having a color difference $\Delta E$ of 2 or less.

(Image Output Means)

The image output means 14 obtains a printing plate and/or a printed matter based on the created halftone dot data. Detailed examples of the image output means 14 are a storage device such as a hard disk, a plate maker such as a film plate output apparatus, and a printing apparatus such as a printer.

(Operation Window of Halftone Dot Data Creation Software)

Figure 28:
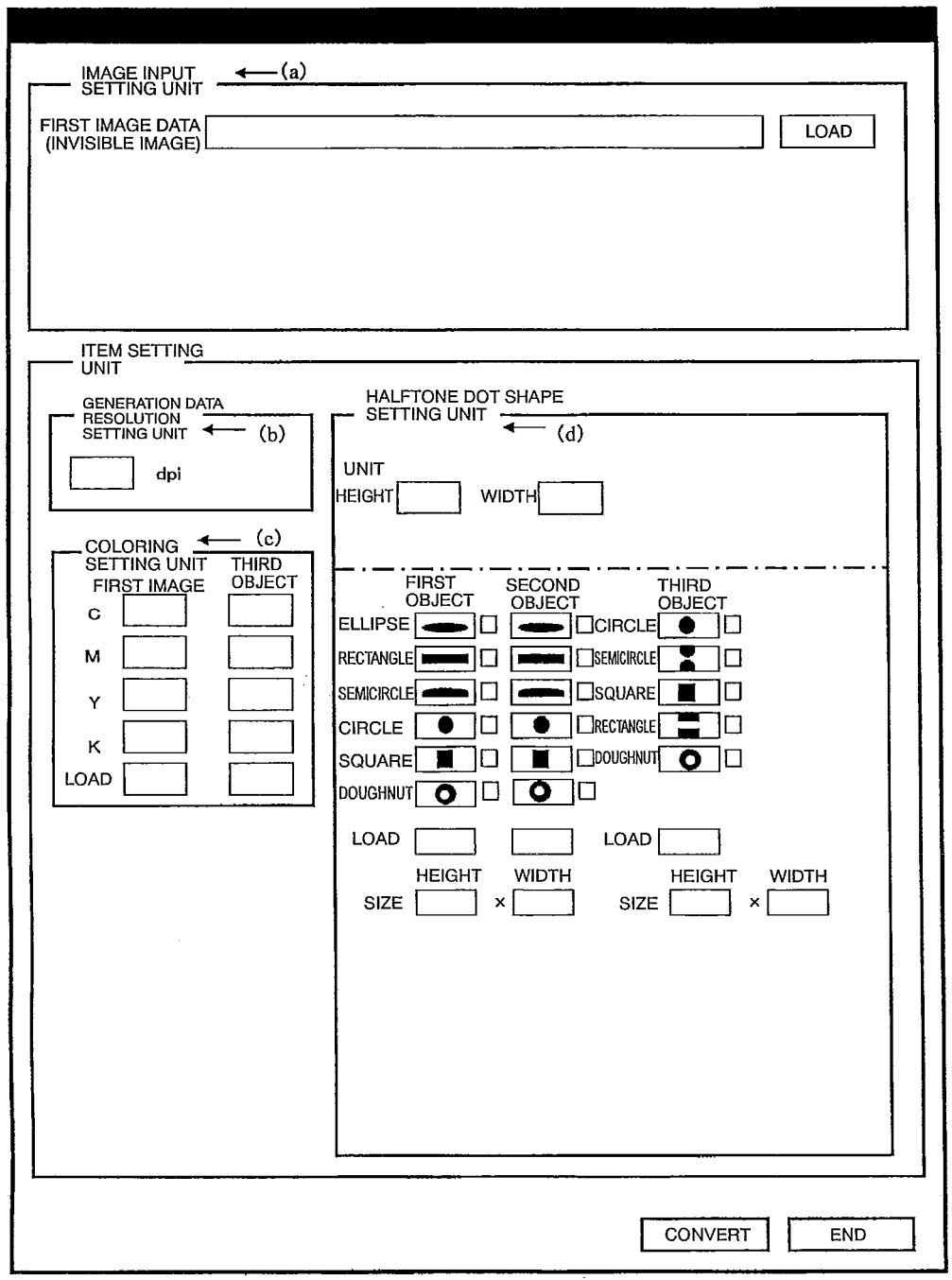
FIG. 28 is a view showing an example of the operation window of halftone dot data creation software B1 according to the present invention.

FIG. 28 shows an example of the operation window of the halftone dot data creation software. The operation window includes an "image input setting unit" and an "item setting unit". The item setting unit includes a "generation data resolution setting unit", a "coloring setting unit", and a "halftone dot shape setting unit".

(Image Input Setting Unit)

The "image input setting unit" (a) inputs first image data serving as the invisible image to be input to the above-described image input means. The first image data may be designated by causing the halftone dot data designer (to be referred to as the "designer" hereinafter) to, for example, read out an image file recorded in the hard disk in advance. Density correction of the first image data can be performed as needed.

(Generation Data Resolution Setting Unit)

The "generation data resolution setting unit" (b) sets the resolution of halftone dot data according to the present invention by the above-described item setting means. The designer sets the resolution by inputting an arbitrary resolution or selecting one of a plurality of resolutions stored in advance. The resolution to be set here preferably matches that of the plate maker or printing apparatus to be used to obtain the printed matter manufactured from the halftone dot data. For example, a film plate output apparatus generally has a resolution of 2540 PDI.

(Coloring Setting Unit)

The "coloring setting unit" (c) causes the designer to set "C", "M", "Y", and "K" of the first and second objects of the first image data having the invisible image and those of the fourth objects to relax density imbalance by the above-described item setting means. This setting is done as automatic setting based on recommended values or arbitrary setting by the designer. As "others", spot colors, fluorescent inks, gold ink, silver ink, and the like can also be set. However, the first, second, and fourth objects need to have the same color.

The coloring settings are done within the range of 0% to 100%. Perfect white is set by 0%, and the darkest color expressible as an image is set by 100%.

"C" of the color setting sets the ratio of the cyan component to the anti-counterfeit printed matter to be manufactured from halftone dot data. "M" sets the ratio of the magenta component to the anti-counterfeit printed matter. "Y" sets the ratio of the yellow component to the anti-counterfeit printed matter. "K" sets the ratio of the black component to the anti-counterfeit printed matter.

The coloring settings designated here are interpreted by the image output means later so as to affect the result of the output matter such as a printed matter or a printing plate. The coloring setting interpretation method and its influence depend on each image output means. For example, when a home inkjet printer outputs the images, the values of the color settings generally affect the values of the ink discharge amounts and landing ink densities of "C", "M", "Y", and "K". For example, when a film plate output apparatus outputs the images, the values of the color settings generally affect the values of the percent dot areas of "C", "M", "Y", and "K" on each printing plate.

(Halftone Dot Shape Setting Unit)

Figure 3:
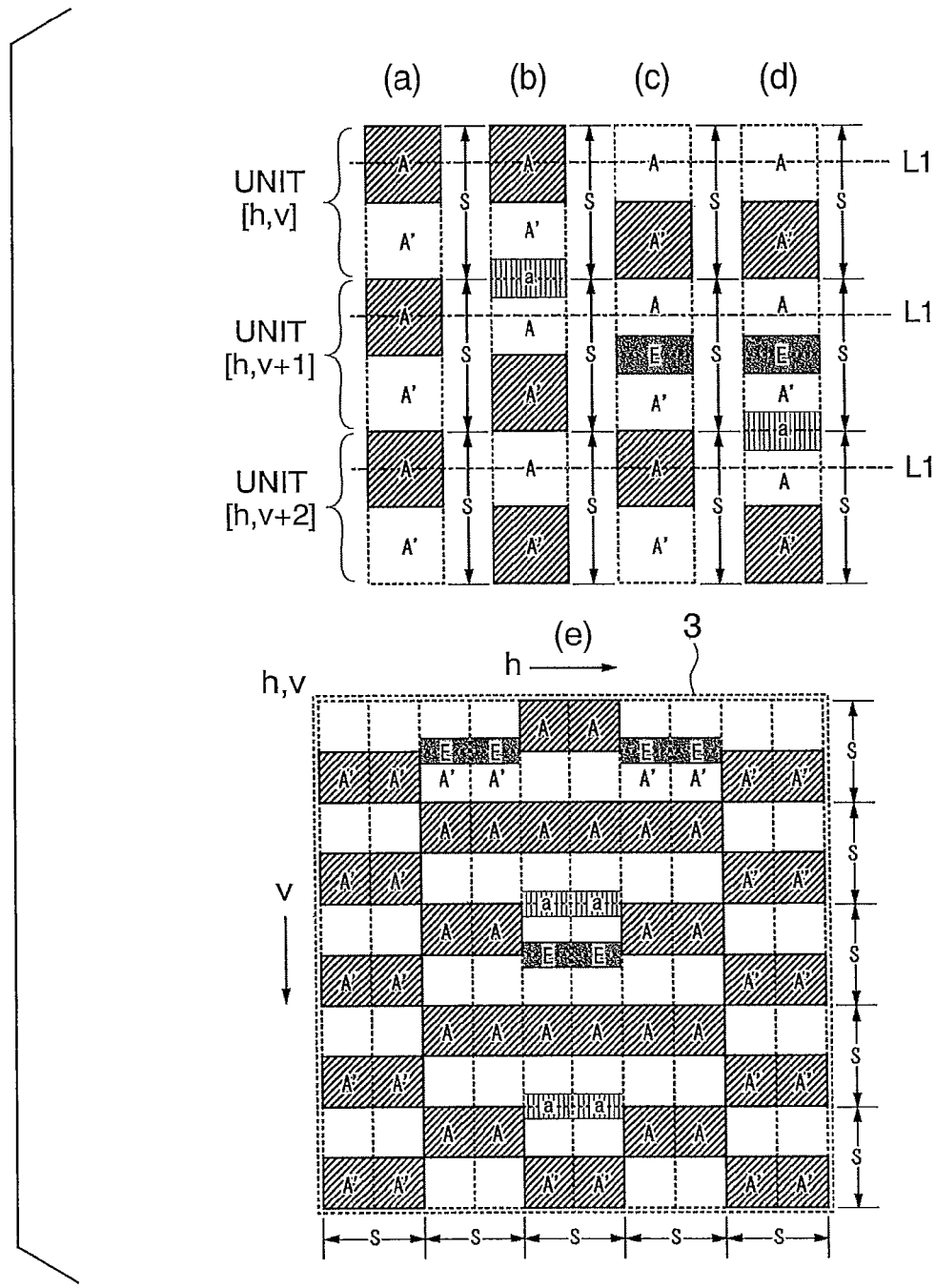
FIG. 3 shows views of a state in which objects a and E each having an object area 1/2 or almost 1/2 that of the object A or A' are added.

The "halftone dot shape setting unit" (d) sets the size of the unit of the composite image data shown in FIG. 3(*e*) by the above-described item setting means. The unit size to be set includes the height and width of the unit, which are input by the operator.

The "halftone dot shape setting unit" (d) also sets the shapes of the first and second objects of the first image data having the invisible image and the shape of the fourth objects to relax density imbalance by the above-described item setting means.

The "halftone dot shape setting unit" (d) also sets the sizes of the first and second objects of the first image data having the invisible image and the size of the fourth objects to relax density imbalance by the above-described item setting means. The object sizes to be set are the heights and widths of the first and second objects having the invisible image and the height and width of the fourth objects to relax density imbalance. Note that the first and second objects need to have the same object area ratio, and the fourth objects to relax density imbalance need to have an object area ratio 1/2 or almost 1/2 that of the first and second objects. The first and second objects to be arranged in the units are set to be smaller than the set unit size. The fourth objects are also set to be smaller than the set unit size.

The types of shapes of the first and second objects of the first image data having the invisible image are "ellipse", "rectangle", "semicircle", "doughnut", "circle", and "square". The types of shape of the fourth objects to relax density imbalance are "circle", "semicircle", "doughnut", "square", and "rectangle". However, the object shapes are not limited to those described in the embodiment, and any other shape may be added to the software and selected by reading out.

(Halftone Dot Data Creation Apparatus A2)

Figure 29:
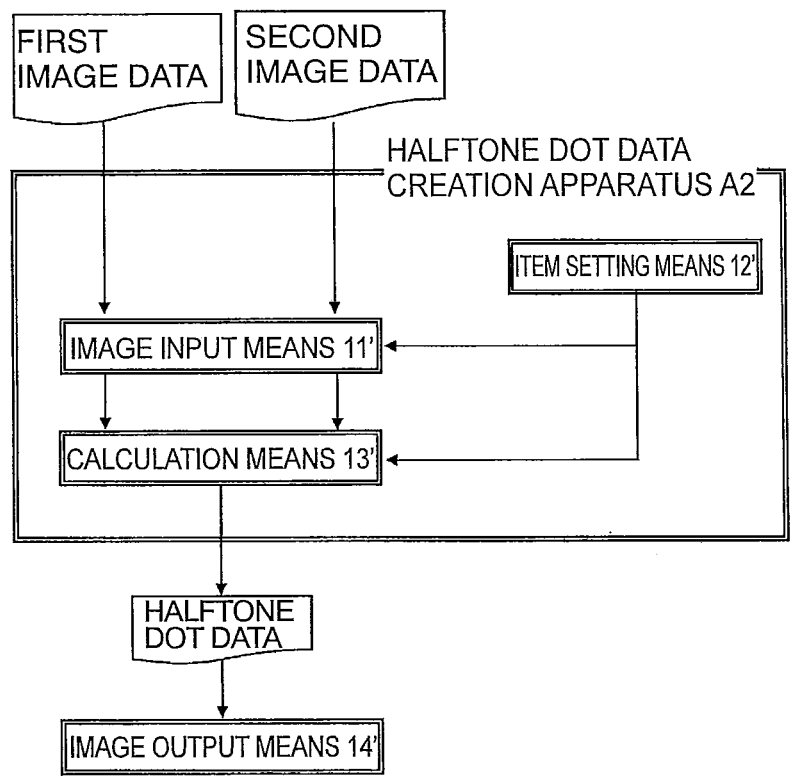
FIG. 29 is a block diagram of a halftone dot data creation apparatus A2 according to the present invention.

The apparatus A2 for creating the above-described halftone dot data will be explained with reference to the block diagram of the apparatus shown in FIG. 29. The halftone dot data creation apparatus includes an image input means 11', an item setting means 12', a calculation means 13', and an image output means 14'.

(Image Input Means)

The image input means 11' inputs first image data 23' as shown in FIG. 30(a) serving as the base of an invisible image to be visually recognized as a latent image upon overlaying a lenticular lens or a parallel line filter and second image data 25 serving as the base of a visible image to be visually recognized as shown in FIG. 30(b). The second image data 25 serving as the base of the visible image to be visually recognized may be binary image data or halftone image data. Density correction of the first image data 23' and the second image data 25 can be performed as needed. The first image data 23' may be acquired by extracting predetermined information from a text file (TXT or CSV format) of personal information and the like and converting it into an image file.

(Item Setting Means)

Figure 31:
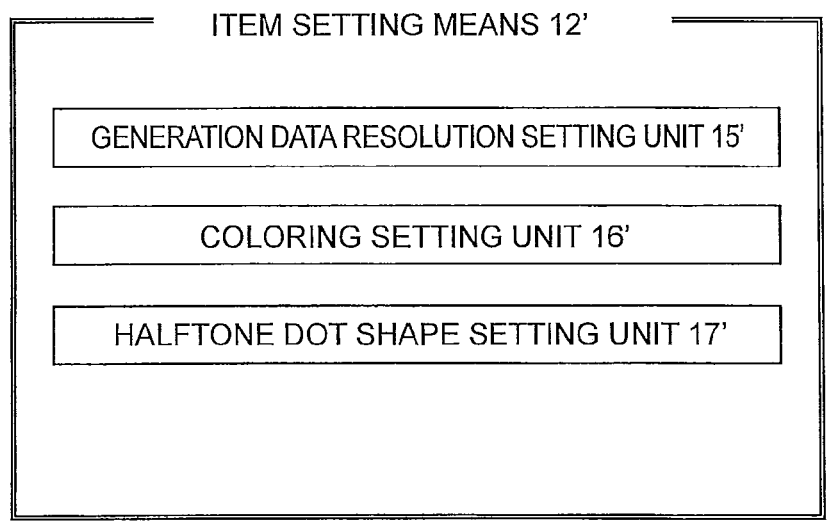
FIG. 31 is a block diagram of an item setting means 12' of the halftone dot data creation apparatus A2 according to the present invention.

As shown in FIG. 31, the item setting means 12' includes a generation data resolution setting unit 15' which sets the resolution of halftone dot data, a coloring setting unit 16' which sets coloring, and a halftone dot shape setting unit 17' which sets the shapes of the halftone dots of the first, second, third, and fourth objects. The settings are done for each setting item.

(Generation Data Resolution Setting Unit)

The generation data resolution setting unit 15' sets the resolution of halftone dot data according to the present invention. The resolution may be set by inputting an arbitrary resolution or selecting one of a plurality of resolutions stored in advance.

(Coloring Setting Unit)

The coloring setting unit 16' arbitrarily sets "C", "M", "Y", and/or "K" of the first, second, third, and fourth objects and "C", "M", "Y", and/or "K" of the background portion. "C" represents the ratio of the cyan component to the anti-counterfeit printed matter to be manufactured from halftone dot data. "M" represents the ratio of the magenta component to the anti-counterfeit printed matter. "Y" represents the ratio of the yellow component to the anti-counterfeit printed matter. "K" represents the ratio of the black component to the anti-counterfeit printed matter. Note that the colors to be set by the coloring setting unit of the present invention are not limited to "C", "M", "Y", and "K". Any other colors outputtable by a printer using spot colors, fluorescent inks, gold ink, silver ink, and the like can be set.

(Halftone Dot Shape Setting Unit)

The halftone dot shape setting unit 17' sets the height and width of a unit, and the halftone dot shapes of the first, second, third, and fourth objects to be formed in the unit.

(Calculation Means)

The calculation means 13' forms, from the first image data 23' and the second image data 25 input by the image input means 11', image data having the invisible image made of the first and second objects based on the contents set by the item setting means 12'. The calculation means 13' also forms image data serving as the visible image made of the third objects. Then, the calculation means 13' composites the image data having the invisible image, the image data serving as the visible image, and the fourth objects to relax density imbalance, thereby generating composite image data 26' (halftone dot data) as shown in FIG. 30(i).

Figure 32:
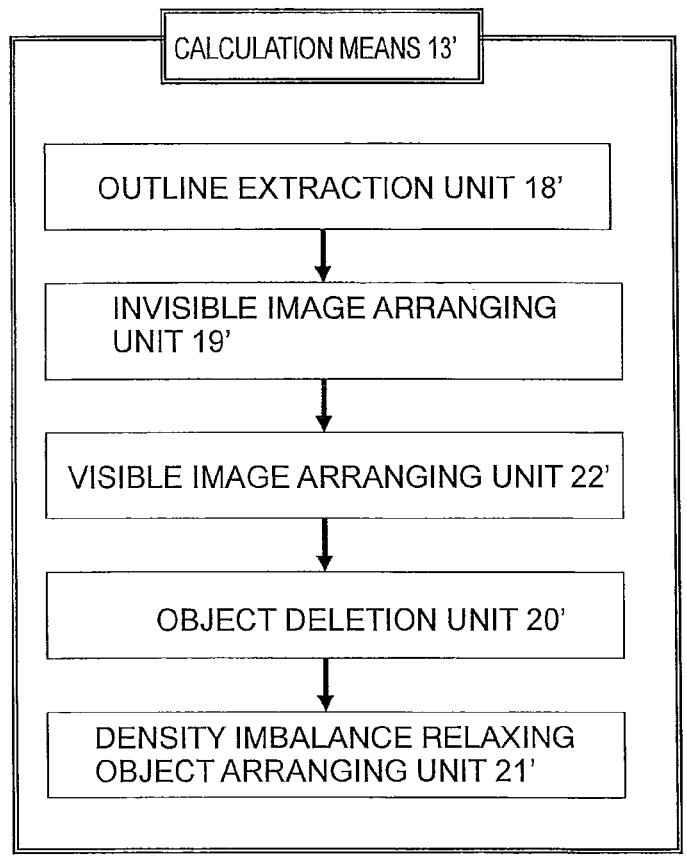
FIG. 32 is a block diagram of a calculation means 13' of the halftone dot data creation apparatus A2 according to the present invention.

As shown in FIG. 32, the calculation means 13' includes an outline extraction unit 18', an invisible image arranging unit 19', visible image arranging unit 22, an object deletion unit 20', and a density imbalance relaxing object arranging unit 21'.

(Outline Extraction Unit)

The outline extraction unit 18' extracts the outline of the first image data 23' shown in FIG. 30(a) and generates outline image data 24' of the first image data, as shown in FIG. 30(c).

As shown in FIG. 30(d), the invisible image arranging unit 19' divides the units into intra-outline units 24a1' inside the outline and extra-outline units 24b1' outside the outline using the outline image data 24'. Then, as shown in FIG. 30(e), the invisible image arranging unit 19' arranges the first and second objects inside the intra-outline units 24a1' while setting one kind of the objects in the on state and the other in the off state, and also arranges the first and second objects inside the extra-outline units 24b1' while setting the one kind in the off state and the other in the on state.

(Visible Image Arranging Unit)

As shown in FIG. 30(f), the visible image arranging unit arranges the third objects to form the visible image in the units where the first or second objects are formed and/or based on or almost based on the boundaries between the units.

(Object Deletion Unit)

In the first and second objects arranged in the intra-outline units 24a1' and the extra-outline units 24b1', when both the first and second objects arranged adjacent to each other are on, the object deletion unit 20 deletes one of the first and second objects to set it in the off state, as shown in FIG. 30(g).

(Density Imbalance Relaxing Object Arranging Unit)

To relax density imbalance in predetermined regions, the density imbalance relaxing object arranging unit 21' arranges the fourth objects having an object area ratio 1/2 or almost 1/2 that of the first or second objects and also having the same or almost the same color in predetermined regions without the first, second, and third objects at the spatial positions where the first or second object has been deleted or at the positions where off portions are arranged adjacently in the plurality of units arranged adjacently, as shown in FIG. 30(h).

(Image Output Means)

The image output means 14' obtains a printing plate and/or a printed matter based on the created halftone dot data. Detailed examples of the image output means 14' are a storage device such as a hard disk, a plate maker such as a film plate output apparatus, and a printing apparatus such as a printer.

(Operation Window of Halftone Dot Data Creation Software)

Figure 33:
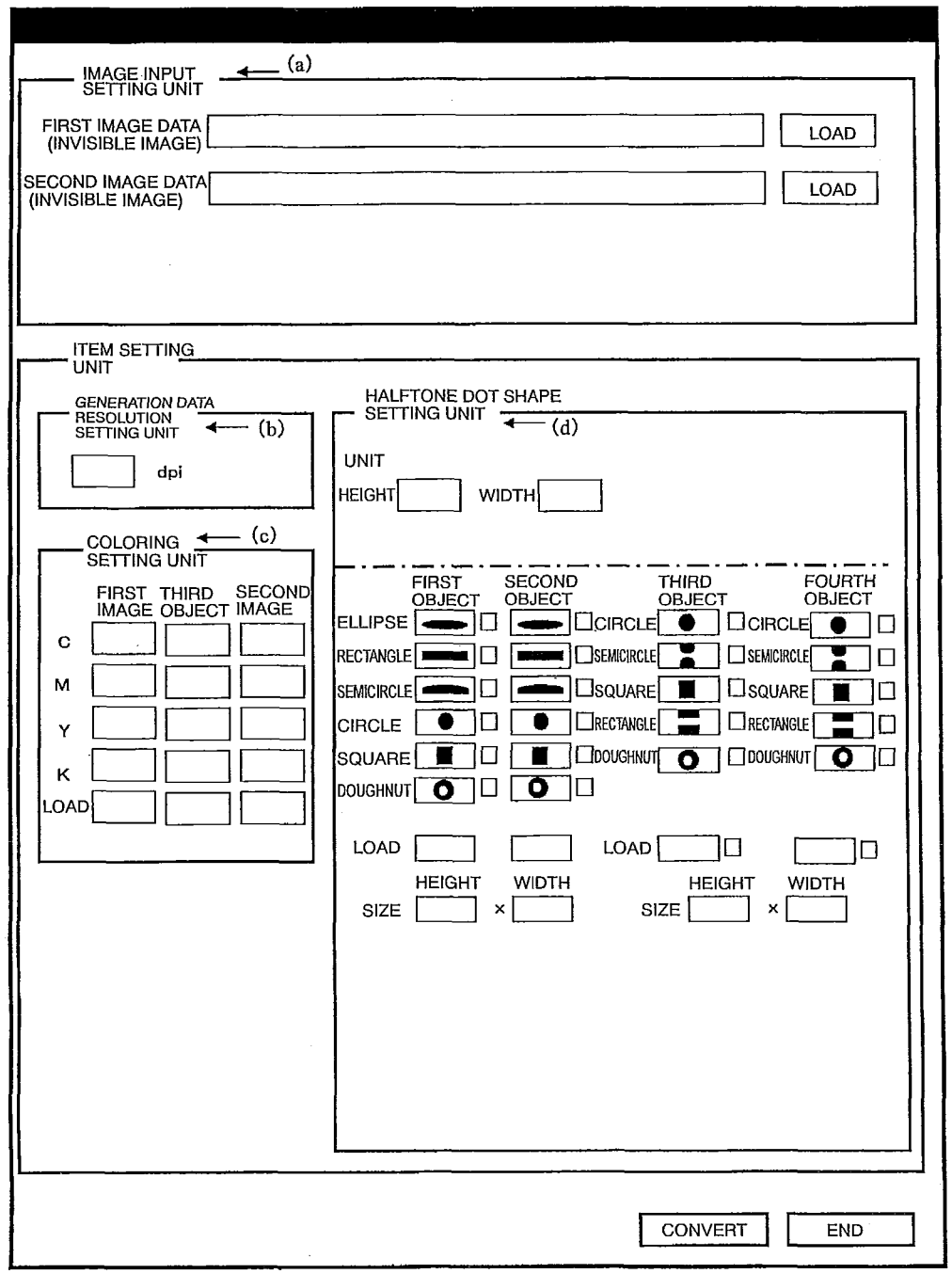
FIG. 33 is a view showing an example of the operation window of halftone dot data creation software B2 according to the present invention.

FIG. 33 shows an example of the operation window of the halftone dot data creation software. The operation window includes an "image input setting unit" and an "item setting unit". The item setting unit includes a "generation data resolution setting unit", a "coloring setting unit", and a "halftone dot shape setting unit".

(Image Input Setting Unit)

The "image input setting unit" (a) inputs first image data serving as the invisible image and the second image serving as the visible image to be input to the above-described image input means. The first image data and the second image data may be designated by causing the halftone dot data designer to, for example, read out an image file recorded in the hard disk in advance. Density correction of the first image data and the second image data can be performed as needed.

(Generation Data Resolution Setting Unit)

The "generation data resolution setting unit" (b) sets the resolution of halftone dot data according to the present invention by the above-described item setting means. The designer sets the resolution by inputting an arbitrary resolution or selecting one of a plurality of resolutions stored in advance. The resolution to be set here preferably matches that of the plate maker or printing apparatus to be used to obtain the printed matter manufactured from the halftone dot data. For example, a film plate output apparatus generally has a resolution of 2540 PDI.

(Coloring Setting Unit)

The "coloring setting unit" (c) causes the designer to set "C", "M", "Y", and "K" of the first and second objects of the first image data having the invisible image, those of the third objects serving as the visible image data, and those of the fourth objects to relax density imbalance by the above-described item setting means. This setting is done as automatic setting based on recommended values or arbitrary setting by the designer. As "others", spot colors, fluorescent inks, gold ink, silver ink, and the like can also be set. However, the first, second, and fourth objects need to have the same color. The color of the third objects may be the same as or different from that of the first, second, and fourth objects. The third objects may have the full color of, for example, a face image having a tone.

The coloring settings are done within the range of 0% to 100%. Perfect white is set by 0%, and the darkest color expressible as an image is set by 100%.

"C" of the color setting sets the ratio of the cyan component to the anti-counterfeit printed matter to be manufactured from halftone dot data. "M" sets the ratio of the magenta component to the anti-counterfeit printed matter. "Y" sets the ratio of the yellow component to the anti-counterfeit printed matter. "K" sets the ratio of the black component to the anti-counterfeit printed matter.

The coloring settings designated here are interpreted by the image output means later so as to affect the result of the output matter such as a printed matter or a printing plate. The coloring setting interpretation method and its influence depend on each image output means. For example, when a home inkjet printer outputs the images, the values of the color settings generally affect the values of the ink discharge amounts and landing ink densities of "C", "M", "Y", and "K". For example, when a film plate output apparatus outputs the images, the values of the color settings generally affect the values of the percent dot areas of "C", "M", "Y", and "K" on each printing plate.

(Halftone Dot Shape Setting Unit)

The "halftone dot shape setting unit" (d) sets the size of the unit of the composite image data shown in FIG. 11(e) by the above-described item setting means. The unit size to be set includes the height and width of the unit, which are input by the operator.

The "halftone dot shape setting unit" (d) also sets the shapes of the first and second objects of the first image data having the invisible image, the shape of the third objects of the second image data serving as the visible image, and the shape of the fourth objects to relax density imbalance by the above-described item setting means.

The "halftone dot shape setting unit" (d) also sets the sizes of the first and second objects of the first image data having the invisible image, the size of the third objects of the second image data serving as the visible image, and the size of the fourth objects to relax density imbalance by the above-described item setting means. The object sizes to be set are the heights and widths of the first and second objects having the invisible image, the height and width of the third objects serving as the visible image, and the height and width of the fourth objects to relax density imbalance. Note that the first and second objects need to have the same object area ratio, and the fourth objects to relax density imbalance need to have an object area ratio 1/2 or almost 1/2 that of the first and second objects. The first and second objects to be arranged in the units are set to be smaller than the set unit size. The third and fourth objects are also set to be smaller than the set unit size. Note that if the visible image is a halftone image, the height and width of the third objects are not constant. Instead, the size of the third objects gradually changes from a highlight portion to a shadow portion.

The types of shapes of the first and second objects of the first image data having the invisible image are "ellipse", "rectangle", "semicircle", "doughnut", "circle", and "square". The types of shape of the fourth objects serving as the visible image are "circle", "semicircle", "doughnut", "square", and "rectangle". The types of shape of the fourth objects to relax density imbalance are "circle", "semicircle", "doughnut", "square", and "rectangle". However, the object shapes are not limited to those described in the embodiment, and any other shape may be added to the software and selected by reading out.

(Halftone Dot Data Creation Software B1)

Figure 34:
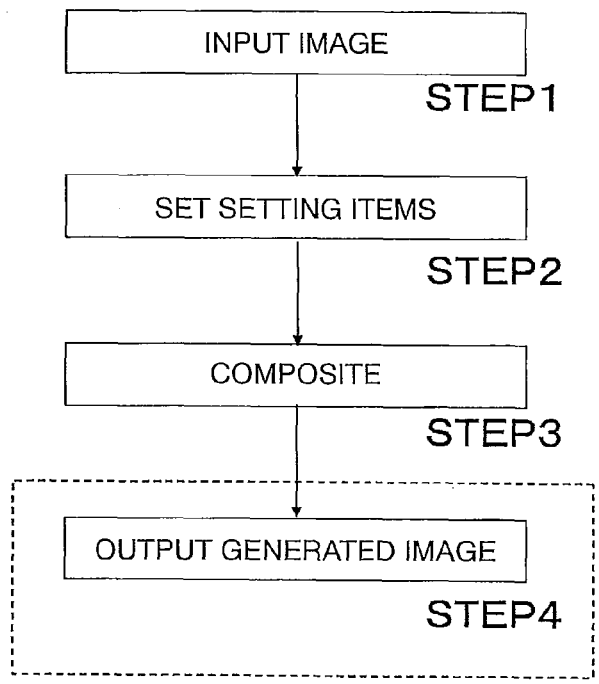
FIG. 34 is a flowchart illustrating the halftone dot data creation software B1 according to the present invention.

The software B1 for creating halftone dot data using the above-described halftone dot data creation apparatus A1 will be described with reference to the flowchart of FIG. 34.

(Image Input Step)

First, the designer inputs the first image data 23 as shown in FIG. 25(a) serving as the base of an invisible image to be visually recognized as a latent image upon overlaying a lenticular lens or a parallel line filter to the "image input setting unit" (a) of the operation window via the image input means (STEP 1). As for the image input method, the halftone dot data designer designates the image data by reading out an image file recorded in the hard disk in advance. Density correction of the input image data can be performed as needed. The first image data 23 may be acquired by extracting predetermined information from a text file (TXT or CSV format) of personal information and the like and converting it into an image file.

(Setting Item Step)

Second, the item setting means sets, for each setting item, the resolution of halftone dot data, coloring, and the halftone dot shapes of the first, second, and fourth objects to generate the composite image data 26 as shown in FIG. 25(g) (STEP 2).

(Calculation Step)

Third, the calculation means generates, from the input first image data, image data having the invisible image made of the first and second objects based on the contents set by the item setting means. Then, the calculation means composites the image data having the invisible image and the fourth objects to relax density imbalance, thereby generating the composite image data 26 (halftone dot data) as shown in FIG. 25(g). When image input by the image input means and setting of the generation data resolution and halftone dots by the item setting means have ended, "conversion" on the operation window is performed. All the subsequent processes are performed by the calculation means.

(Setting Item Step)

Figure 35:
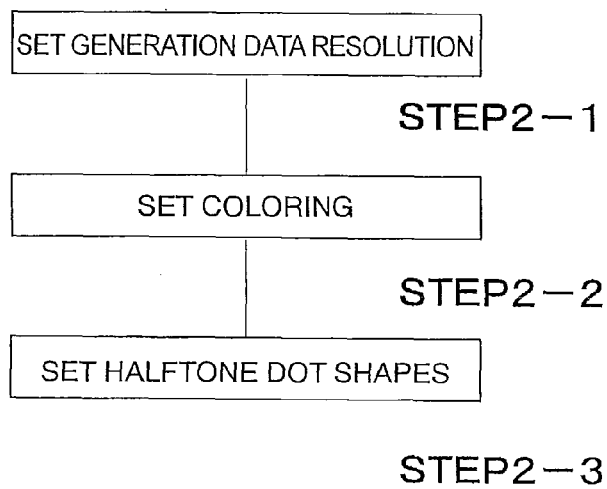
FIG. 35 is a flowchart illustrating the item setting step of the halftone dot data creation software B1 according to the present invention.

The setting item step will be described in detail. As shown in FIG. 35, the setting item step includes the generation data resolution setting step, the coloring setting step, and the halftone dot shape setting step.

(Generation Data Resolution Setting Step)

The designer sets the resolution of halftone dot data according to the present invention in the "generation data resolution setting unit" (b) of the operation window via the item setting means. The designer sets the resolution of the generation data by inputting an arbitrary resolution or selecting one of a plurality of resolutions stored in advance (STEP 2-1).

(Coloring Setting Step)

The designer sets "C", "M", "Y", and "K" of the first and second objects of the first image data having the invisible image and those of the fourth objects to relax density imbalance in the coloring setting unit (c) of the operation window via the item setting means. This setting is done as automatic setting based on recommended values or arbitrary setting by the designer (STEP 2-2).

(Halftone Dot Shape Setting Step)

The size of the unit of the first image data having the invisible image is set in the "halftone dot shape setting unit" (d) of the operation window via the item setting means. The unit size to be set includes the height and width of the unit (STEP 2-3), which are input by the operator.

The "halftone dot shape setting unit" (d) also sets the shapes of the first and second objects of the first image data having the invisible image and the shape of the fourth objects to relax density imbalance by the above-described item setting means.

The "halftone dot shape setting unit" (d) also sets the sizes of the first and second objects of the first image data having the invisible image and the size of the fourth objects to relax density imbalance by the above-described item setting means. The object sizes to be set are the heights and widths of the first and second objects having the invisible image and the height and width of the fourth objects to relax density imbalance. Note that the fourth objects to relax density imbalance need to have an object area ratio 1/2 or almost 1/2 that of the first and second objects. The first and second objects to be arranged in the units are set to be smaller than the set unit size. The fourth objects are also set to be smaller than the set unit size. The order of STEP 2-1 to STEP 2-3 is not particularly limited.

(Calculation Step)

Figure 36:
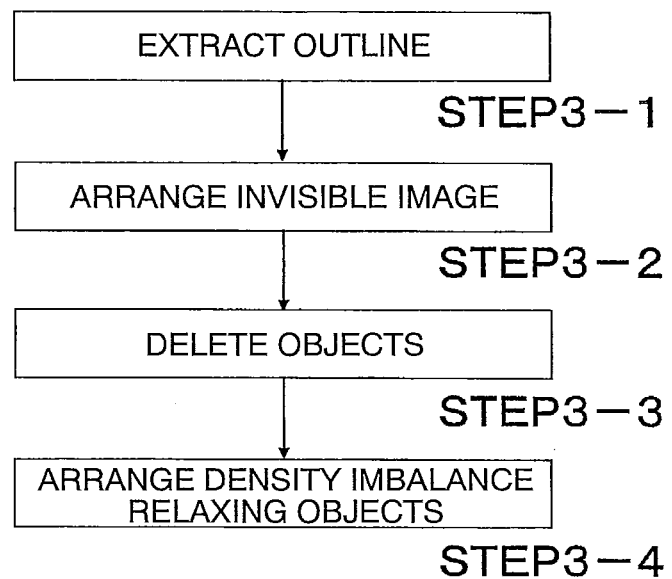
FIG. 36 is a flowchart illustrating the calculation step of the halftone dot data creation software B1 according to the present invention.

The calculation step will be described in detail. As shown in FIG. 36, the calculation step includes the outline extraction step, the invisible image arranging step, the object deletion step, and the density imbalance relaxing object arranging step.

(Outline Extraction Step)

First, the outline extraction unit extracts the outline of the first image data shown in FIG. 25(*a*) and generates the outline image data 24 of the first image data, as shown in FIG. 25(*b*) (STEP 3-1).

(Invisible Image Arranging Step)

Second, as shown in FIG. 25(*c*), the invisible image arranging unit divides the units into intra-outline units inside the outline and extra-outline units outside the outline using the outline image data shown in FIG. 25(*b*). Then, as shown in FIG. 25(*d*), the invisible image arranging unit arranges the first and second objects inside the intra-outline units while setting one kind of the objects in the on state and the other in the off state, and also arranges the first and second objects inside the extra-outline units while setting the one kind in the off state and the other in the on state (STEP 3-2).

(Object Deletion Step)

Third, in the first and second objects arranged in the intra-outline units and the extra-outline units, when both the first and second objects arranged adjacent to each other are on, the object deletion unit deletes one of the first and second objects to set it in the off state, as shown in FIG. 25(*e*) (STEP 3-3).

(Density Imbalance Relaxing Object Arranging Step)

Fourth, to relax density imbalance in predetermined regions, the density imbalance relaxing object arranging unit arranges the fourth objects having an object area ratio 1/2 or almost 1/2 that of the first or second object and also having the same or almost the same color based on or almost based on the boundary between the first and second objects at the spatial positions where the first or second object has been deleted or at the positions where off portions are arranged adjacently in the plurality of units arranged adjacently, as shown in FIG. 25(*f*), thereby generating the composite image data 26 (halftone dot data) shown in FIG. 25(*g*) (STEP 3-4).

Figure 37:
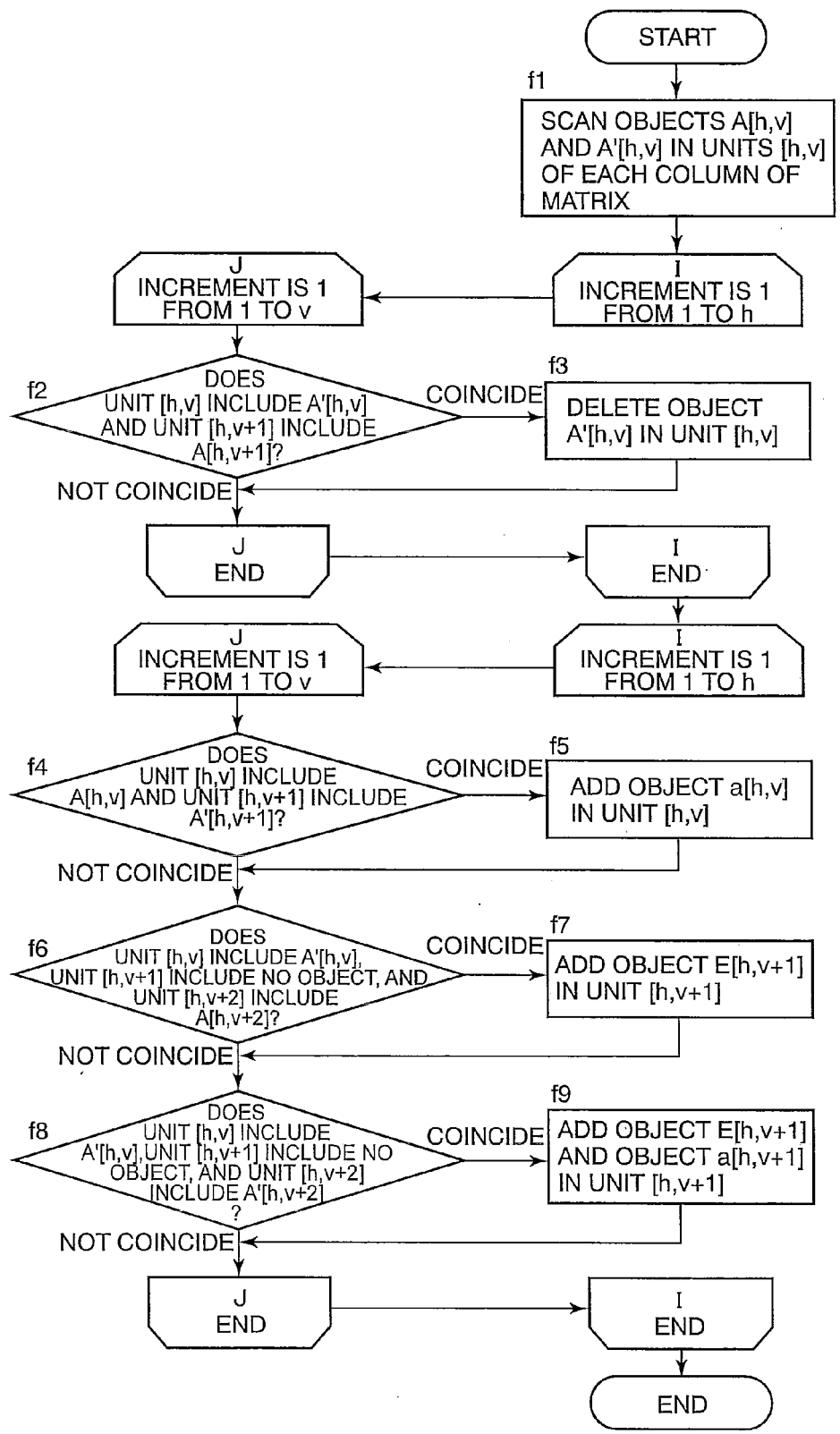
FIG. 37 is a flowchart of the object deletion step and the density imbalance relaxing object arranging step.

The object deletion step and the density imbalance relaxing object arranging step will be described in more detail. To relax the apparent density imbalance, object deletion and addition are executed for each unit [h,v] that is the minimum unit, as shown in FIG. 37. Note that [v] is the number of steps corresponding to the number of units counted vertically from the upper side, and [h] is the number of steps corresponding to the number of units counted horizontally from the left side. First, in a process f1, concerning the unit [h,v] of each column of the matrix, the objects A[h,v] and A'[h,v] are sequentially detected. Note that as for the method of detecting the objects A[h,v] and A'[h,v], for example, if the printed pattern 3 is a binary image having the bitmap format, the object A[h,v] or A'[h,v] may be identified and deleted in a process target unit by processing called labeling in general.

Figure 2:
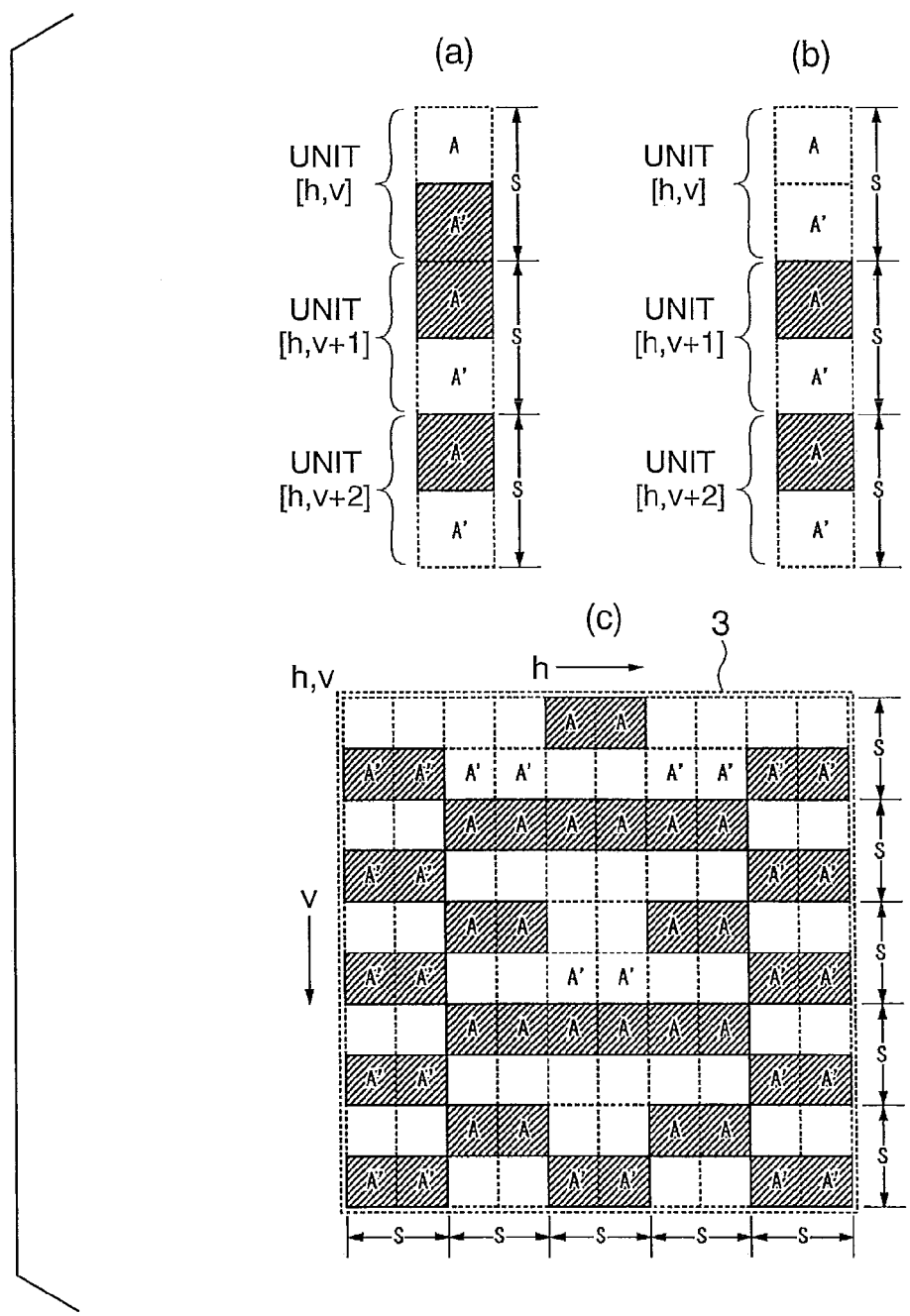
FIG. 2 shows views of a state in which an object A'[h,v] of a unit [h,v] is deleted.

Next, if the condition that the unit [h,v] includes the object A'[h,v], and the unit [h,v+1] includes the object A[h,v+1] is satisfied in a process f2, the object A'[h,v] which should be arranged originally in the unit [v] is deleted in a process f3. More specifically, when the unit [h,v], unit [h,v+1], and unit [h,v+2] are arranged, and the object A'[h,v] of the unit [h,v] is adjacent to the object A[h,v+1] of the unit [h,v+1], as shown in FIG. 2(*a*), the object A'[h,v] of the unit [h,v] is deleted, as shown in FIG. 2(*b*). If the condition of the process f2 is not satisfied, the process advances to a process 4. Note that if the process f2 or f3 is applied to the printed pattern 3 in FIG. 1(*b*), the printed pattern 3 shown in FIG. 2(*c*) is obtained. In addition, since the objects A' are partially deleted, the total area of the objects A' is smaller than that of the objects A.

If the condition that the unit [h,v] includes the object A[h,v], and the unit [h,v+1] includes the object A'[h,v+1] is satisfied in the process f4, the object a is added between the unit [h,v] and the unit [h,v+1] in a process f5. More specifically, as shown in FIG. 3(*b*), the object a having an object area 1/2 or almost 1/2 that of the object A or A' is added at the midpoint between the unit [h,v] and the unit [h,v+1]. This relaxes the density imbalance upon naked eye observation between the unit [h,v] and the unit [h,v+1].

If the condition that the unit [h,v] includes the object A'[h,v], the unit [h,v+1] includes no object, and the unit [h,v+2] includes the object A[h,v+2] is satisfied in a process f6, the object E is added at or almost at the center of the unit [h,v+1] in a process f7. More specifically, as shown in FIG. 3(*c*), the object E having an object area 1/2 or almost 1/2 that of the object A or A' is added at or almost at the center of the unit [h,v+1]. This relaxes the density imbalance upon naked eye observation between the unit [h,v] and the unit [h,v+2].

If the condition that the unit [h,v] includes the object A'[h,v], the unit [h,v+1] includes no object, and the unit [h,v+2] includes the object A[h,v+2] is satisfied in a process f8, the object E is added at or almost at the center of the unit [h,v+1], and the object a is added between the unit [h,v+1] and the unit [h,v+2] in a process f9. More specifically, as shown in FIG. 3(*d*), the object E having an object area 1/2 or almost 1/2 that of the object A or A' is added at or almost at the center of the unit [h,v+1], and the object a having an object area 1/2 or almost 1/2 that of the object A or A' is added between the unit [h,v+1] and the unit [h,v+2]. This relaxes the density imbalance upon naked eye observation between the unit [h,v] and the unit [h,v+2]. Hence, when the processes f4 to f8 are applied to the printed pattern 3 shown in FIG. 1(*b*), the density imbalance upon naked eye observation is relaxed throughout the printed pattern 3 shown in FIG. 3(*e*).

The operator inputs the unit size. Note that the unit width information and unit height information change depending on the image format to be used. When the image format is, for example, EPS, a tag that describes the image width information and image height information is searched from the image file to acquire the information. Alternatively, when the image format is, for example, BMP, the unit width information and unit height information can be obtained by acquiring image resolution information and pixel number information described at a predetermined position of the image file and performing calculations.

With the above-described processes, the composite image data (halftone dot data) is created. The created halftone dot data includes the image data having the invisible image made of the first and second objects and the fourth objects to relax density imbalance.

(Image Output Step)

An anti-counterfeit printed matter can also be manufactured based on the created halftone dot data (STEP 4). To manufacture the anti-counterfeit printed matter, for example, the image data undergoes color separation to output a printing plate, and printing is performed by a commercial printing press. Alternatively, an inkjet printer outputs the printed matter directly based on the image data.

(Halftone Dot Data Creation Software B2)

Figure 38:
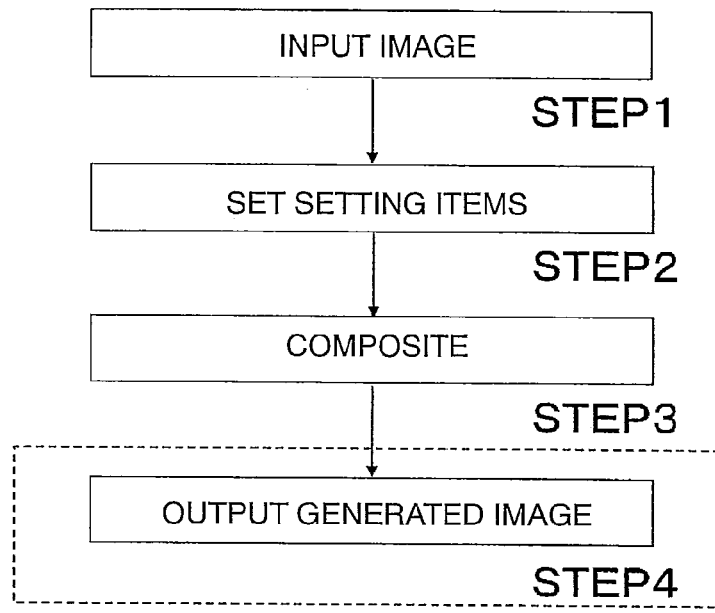
FIG. 38 is a flowchart illustrating the halftone dot data creation software B2 according to the present invention.

The software B2 for creating halftone dot data using the above-described halftone dot data creation apparatus A2 will be described with reference to the flowchart of FIG. 38.

(Image Input Step)

Figure 30:
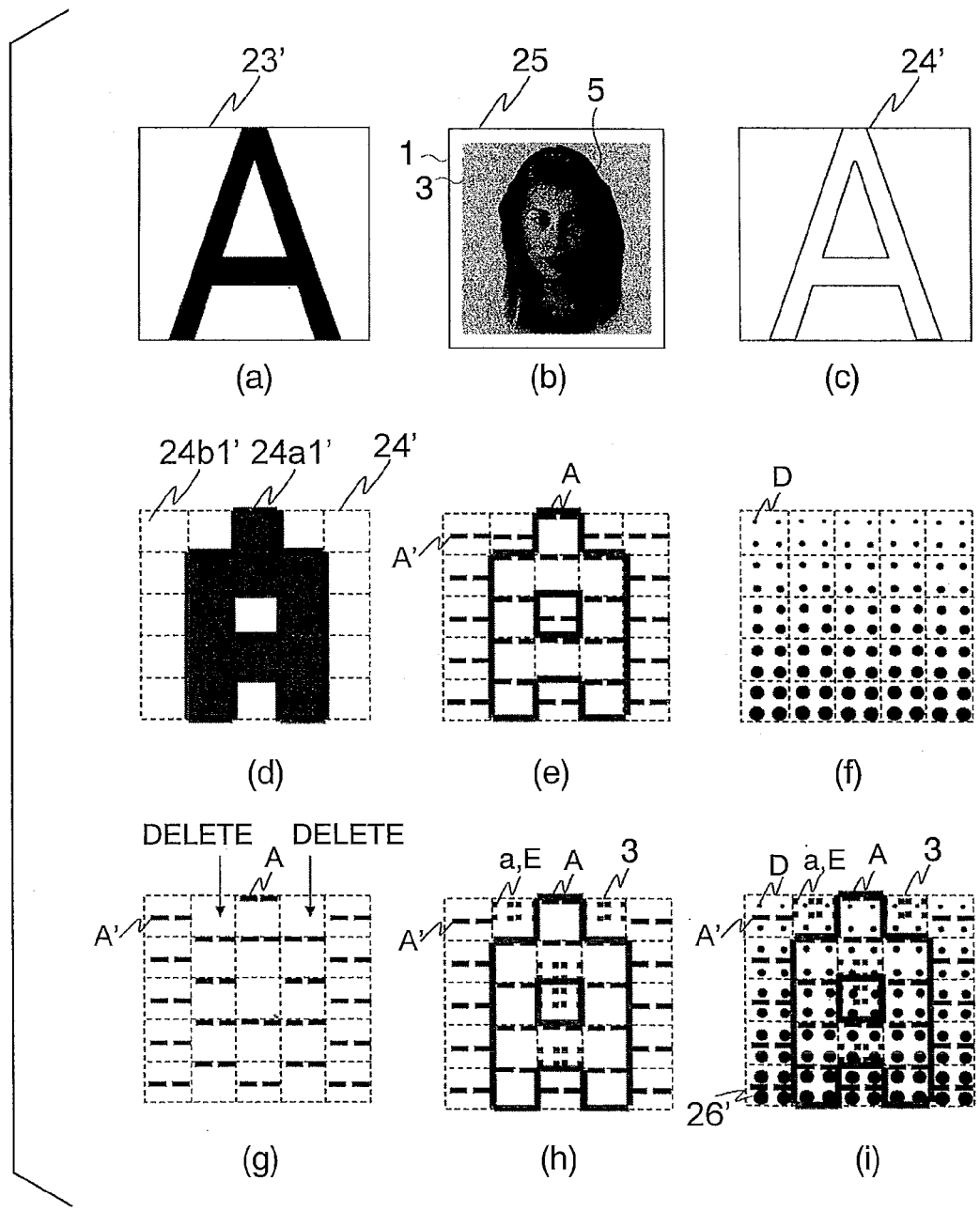
FIG. 30 shows views of the flow of data obtained by the halftone dot data creation apparatus A2 according to the present invention.

First, the designer inputs the first image data 23' as shown in FIG. 30(*a*) serving as the base of an invisible image to be visually recognized as a latent image upon overlaying a lenticular lens or a parallel line filter and the second image data 25 serving as the base of a visible image to be visually recognized to the "image input setting unit" (a) of the operation window via the image input means (STEP 1). The second image data 25 serving as the base of the visible image to be visually recognized may be binary image data or halftone image data. As for the image input method, the halftone dot data designer designates the image data by reading out an image file recorded in the hard disk in advance. Density correction of the input image data can be performed as needed. The first image data 23' may be acquired by extracting predetermined information from a text file (TXT or CSV format) of personal information and the like and converting it into an image file.

(Setting Item Step)

Second, the item setting means sets, for each setting item, the resolution of halftone dot data, coloring, and the halftone dot shapes of the first, second, and fourth objects to generate the composite image data 26' as shown in FIG. 30(*i*) (STEP 2).

(Calculation Step)

Third, the calculation means generates, from the input first image data, image data having the invisible image made of the first and second objects based on the contents set by the item setting means. The calculation means also generates, from the input second image data, image data serving as the visible image made of the third objects based on the contents set by the item setting means. Then, the calculation means composites the image data having the invisible image, the image data serving as the visible image, and the fourth objects to relax density imbalance, thereby generating the composite image data 26' (halftone dot data) as shown in FIG. 30(*i*). When image input by the image input means and setting of the generation data resolution and halftone dots by the item setting means have ended, "conversion" on the operation window is performed. All the subsequent processes are performed by the calculation means.

(Setting Item Step)

Figure 39:
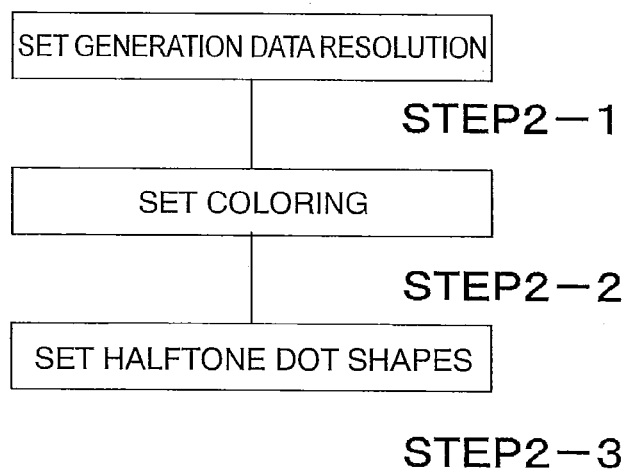
FIG. 39 is a flowchart illustrating the item setting step of the halftone dot data creation software B2 according to the present invention.

The setting item step will be described in detail. As shown in FIG. 39, the setting item step includes the generation data resolution setting step, the coloring setting step, and the halftone dot shape setting step.

(Generation Data Resolution Setting Step)

The designer sets the resolution of halftone dot data according to the present invention in the "generation data resolution setting unit" (b) of the operation window via the item setting means. The designer sets the resolution of the generation data by inputting an arbitrary resolution or selecting one of a plurality of resolutions stored in advance (STEP 2-1).

(Coloring Setting Step)

The designer sets "C", "M", "Y", and "K" of the first and second objects of the first image data having the invisible image, those of the second image data serving as the visible image, and those of the fourth objects to relax density imbalance in the coloring setting unit (c) of the operation window via the item setting means. This setting is done as automatic setting based on recommended values or arbitrary setting by the designer (STEP 2-2). The third objects may have the full color of, for example, a face image having a tone.

(Halftone Dot Shape Setting Step)

The designer sets the unit size in the "halftone dot shape setting unit" (d) of the operation window via the item setting means. The unit size to be set includes the height and width of the unit, which are input by the operator.

The "halftone dot shape setting unit" (d) also sets the shapes of the first and second objects of the first image data having the invisible image, the shape of the third objects of the second image data serving as the visible image, and the shape of the fourth objects to relax density imbalance by the above-described item setting means.

The "halftone dot shape setting unit" (d) also sets the sizes of the first and second objects of the first image data having the invisible image, the size of the third objects of the second image data serving as the visible image, and the size of the fourth objects to relax density imbalance by the above-described item setting means. The object sizes to be set are the heights and widths of the first and second objects having the invisible image, the height and width of the third objects serving as the visible image, and the height and width of the fourth objects to relax density imbalance. Note that the fourth objects to relax density imbalance need to have an object area ratio 1/2 or almost 1/2 that of the first and second objects. The first and second objects to be arranged in the units are set to be smaller than the set unit size. The third and fourth objects are also set to be smaller than the set unit size. Note that if the visible image is a halftone image, the height and width of the third objects are not constant. Instead, the size of the third objects gradually changes from a highlight portion to a shadow portion. The order of STEP 2-1 to STEP 2-3 is not particularly limited.

(Calculation Step)

Figure 40:
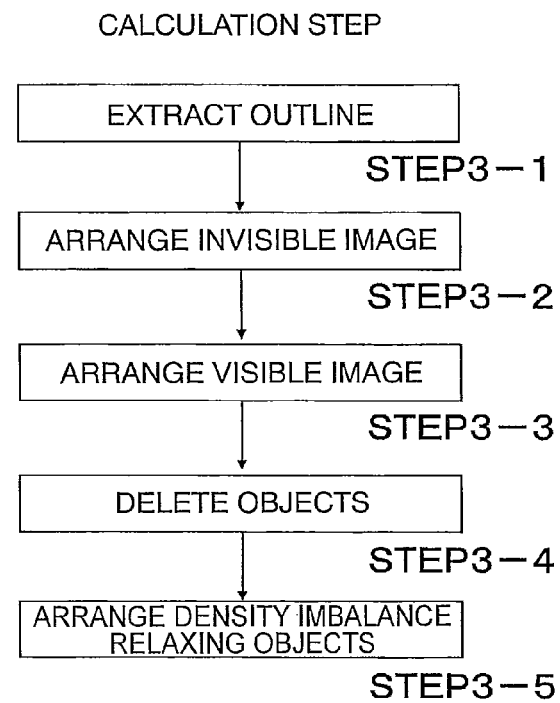
FIG. 40 is a flowchart illustrating the calculation step of the halftone dot data creation software B2 according to the present invention.

The calculation step will be described in detail. As shown in FIG. 40, the calculation step includes the outline extraction step, the invisible image arranging step, the visible image arranging step, the object deletion step, and the density imbalance relaxing object arranging step.

(Outline Extraction Step)

First, the outline extraction unit extracts the outline of the first image data shown in FIG. 30(a) and generates the outline image data of the first image data shown in FIG. 30(c) (STEP 3-1).

(Invisible Image Arranging Step)

Second, as shown in FIG. 30(d), the invisible image arranging unit divides the units into intra-outline units inside the outline and extra-outline units outside the outline using the outline image data shown in FIG. 30(c). Then, as shown in FIG. 30(e), the invisible image arranging unit arranges the first and second objects inside the intra-outline units while setting one kind of the objects in the on state and the other in the off state, and also arranges the first and second objects inside the extra-outline units while setting the one kind in the off state and the other in the on state (STEP 3-2).

(Visible Image Arranging Step)

Fifth, as shown in FIG. 30(f), the visible image arranging unit arranges the third objects to form the visible image in the units where the first or second objects are formed and/or based on or almost based on the boundaries between the units (STEP 3-3).

(Object Deletion Step)

Third, in the first and second objects arranged in the intra-outline units and the extra-outline units, when both the first and second objects arranged adjacent to each other are on, the object deletion unit deletes one of the first and second objects to set it in the off state, as shown in FIG. 30(g) (STEP 3-4).

(Density Imbalance Relaxing Object Arranging Step)

Fourth, to relax density imbalance in predetermined regions, the density imbalance relaxing object arranging unit arranges the fourth objects having an object area ratio 1/2 or almost 1/2 that of the first or second objects and also having the same or almost the same color in predetermined regions without the first, second, and third objects at the spatial positions where the first or second object has been deleted or at the positions where off portions are arranged adjacently in the plurality of units arranged adjacently, as shown in FIG. 30(h) (STEP 3-5). Note that the order of the visible image arranging step is not particularly limited.

The object deletion step and the density imbalance relaxing object arranging step will be described in more detail. To relax the apparent density imbalance, object deletion and addition are executed for each unit [h,v] that is the minimum unit, as shown in FIG. 37. Note that [v] is the number of steps corresponding to the number of units counted vertically from the upper side, and [h] is the number of steps corresponding to the number of units counted horizontally from the left side. First in the process f1, concerning the unit [h,v] of each column of the matrix, the objects A[h,v] and A'[h,v] are sequentially detected. Note that as for the method of detecting the objects A[h,v] and A'[h,v], for example, if the printed pattern is a binary image having the bitmap format, the object A[h,v] or A'[h,v] may be identified and deleted in a process target unit by processing called labeling in general.

Next, if the condition that the unit [h,v] includes the objects A'[h,v], and the unit [h,v+1] includes the objects A[h,v+1] is satisfied in the process f2, the objects A'[h,v] which should be arranged originally in the unit [h,v] are deleted in the process f3. More specifically, when the unit [h,v], unit [h,v+1], and unit [h,v+2] are arranged, and the objects A'[h,v] of the unit [h,v] are adjacent to the objects A[h,v+1] of the unit [h,v+1], as shown in FIG. 8(a), the objects A'[h,v] of the unit [h,v] are deleted, as shown in FIG. 8(b). If the condition of the process f2 is not satisfied, the process advances to the process 4. Note that if the process f2 or f3 is applied to the printed pattern 3 in FIG. 7, the printed pattern 3 shown in FIG. 8(c) is obtained. In addition, since the objects A' are partially deleted, the total area of the objects A' is smaller than that of the objects A.

If the condition that the unit [h,v] includes the objects A[h,v], and the unit [h,v+1] includes the objects A'[h,v] is satisfied in the process f4, the objects a are added between the unit [h,v] and the unit [h,v+1] in the process f5. More specifically, as shown in FIG. 11(b), the objects a having an object area 1/2 or almost 1/2 that of the objects A or A' are added near the midpoint between the objects A of the unit [h,v] and the objects A' of the unit [h,v+1]. This relaxes the density imbalance upon naked eye observation between the unit [h,v] and the unit [h,v+1].

If the condition that the unit [h,v] includes the objects A'[h,v], the unit [h,v+1] includes no object, and the unit [h,v+2] includes the objects A[h,v+2] is satisfied in the process f6, the objects E are added between the objects A' of the unit [h,v] and the unit [h,v+2] in the process f7. More specifically, as shown in FIG. 11(c), the objects E having an object area 1/2 or almost 1/2 that of the objects A or A' are added near the midpoint between the objects A' of the unit [h,v] and the objects A of the unit [h,v+2]. This relaxes the density imbalance upon naked eye observation between the unit [h,v] and the unit [h,v+2].

If a condition that the unit [h,v] includes the objects A'[h,v], the unit [h,v+1] includes no object, and the unit [h,v+2] includes the objects A'[h,v+2] is satisfied in the process f8, the objects E and a are added between the unit [h,v] and the unit [h,v+2] in the process f9. More specifically, as shown in FIG. 11(d), the objects E and a having an object area 1/2 or almost 1/2 that of the objects A or A' are added almost at the midpoint between the objects A' of the unit [h,v] and the objects A' of the unit [h,v+2]. This relaxes the density imbalance upon naked eye observation between the unit [h,v] and the unit [h,v+2]. Hence, when the processes f4 to f8 are applied to the printed pattern 3 in FIG. 7, the density imbalance upon naked eye observation is relaxed throughout the printed pattern 3 shown in FIG. 11(e).

Note that the method of acquiring the unit width information and unit height information changes depending on the image format to be used. When the image format is, for example, EPS, a tag that describes the image width information and image height information is searched from the image file to acquire the information. Alternatively, when the image format is, for example, BMP, the unit width information and unit height information are obtained by acquiring image resolution information and pixel number information described at a predetermined position of the image file and performing calculations.

With the above-described processes, the composite image data (halftone dot data) is created. The created halftone dot data includes the image data having the invisible image made of the first and second objects, the third objects serving as the visible image, and the fourth objects to relax density imbalance.

(Image Output Step)

An anti-counterfeit printed matter can also be manufactured based on the created halftone dot data (STEP 4). To manufacture the anti-counterfeit printed matter, for example, the image data undergoes color separation to output a printing plate, and printing is performed by a commercial printing press. Alternatively, an inkjet printer outputs the printed matter directly based on the image data.

(Anti-Counterfeit Printed Matter C8)

A visible image is an image that can visually be recognized under normal visible light. An invisible image is an image of which visual recognition is impossible or very difficult under normal visible light.

Figure 41:
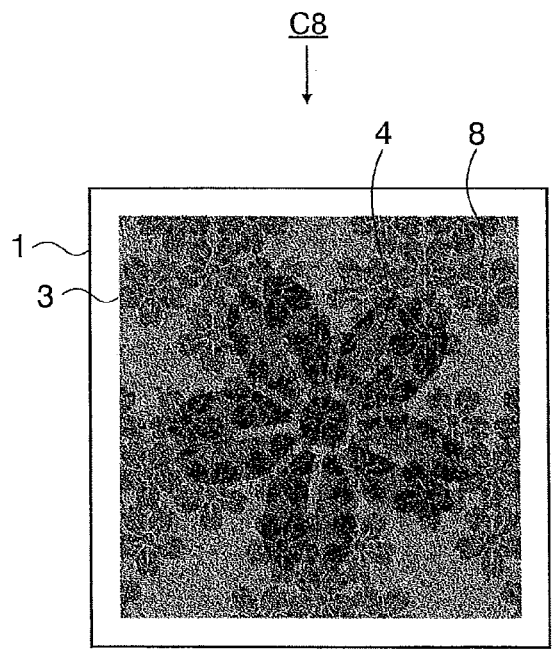
FIG. 41 is a view showing an anti-counterfeit printed matter C8.
Figure 42:
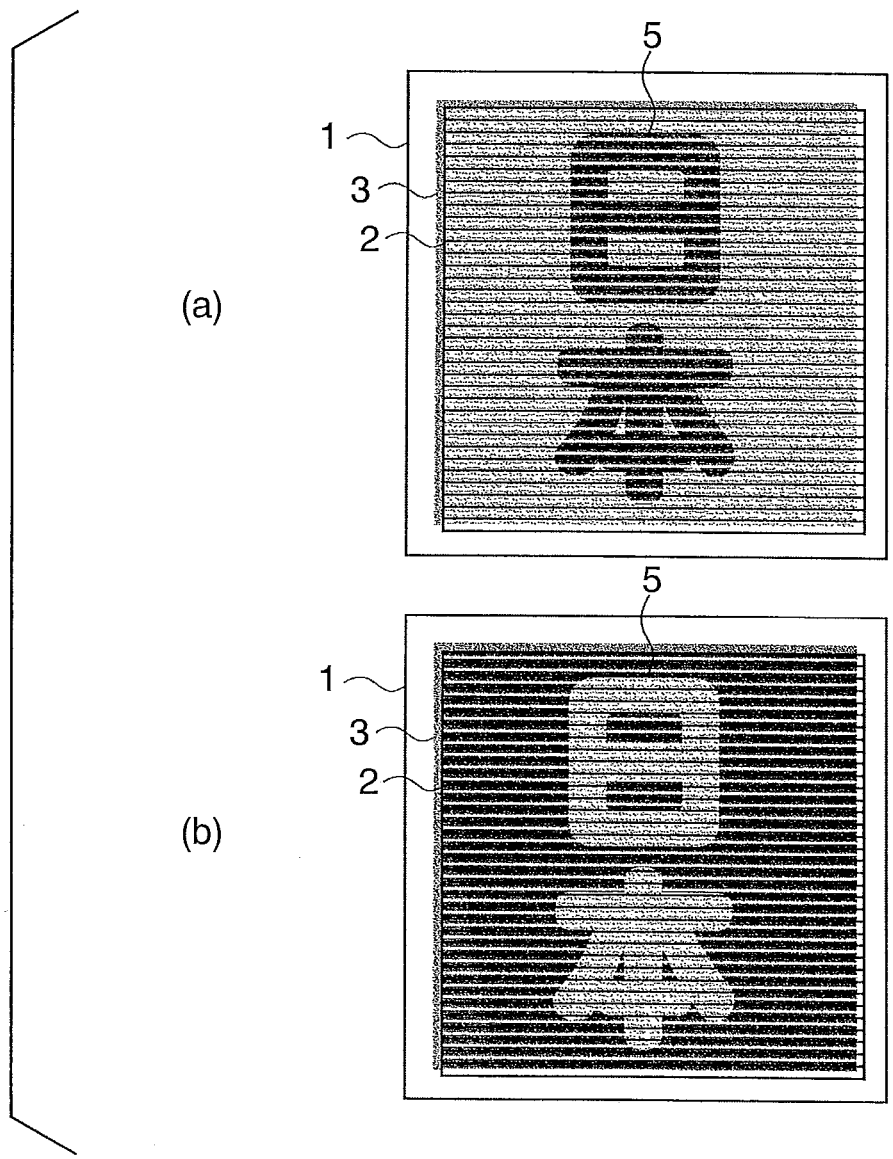
FIG. 42 shows explanatory views of examples of patterns visually recognized when a discrimination tool is overlaid on the anti-counterfeit printed matter C8 at predetermined angles.
Figure 43:
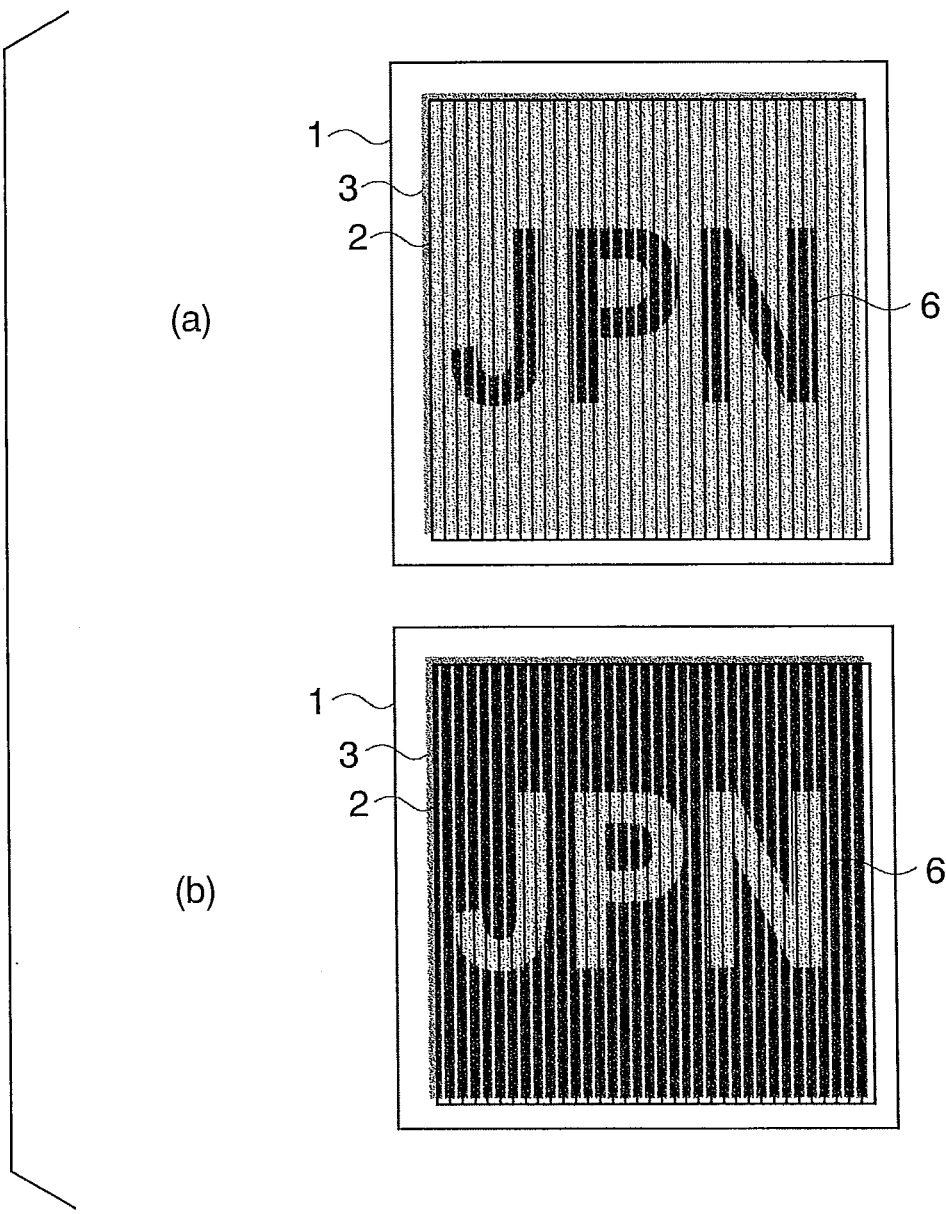
FIG. 43 shows explanatory views of examples of patterns visually recognized when the discrimination tool is overlaid on the anti-counterfeit printed matter C8 at 90° with respect to the predetermined angles.

As shown in FIG. 41, when the printed pattern 3 of the anti-counterfeit printed matter C8 is visually observed under a normal visual condition, the pattern 4 made of an arbitrary graphic pattern, characters, and the like and a pattern 8 made of an arbitrary graphic pattern and characters are visually recognized. The patterns 4 and 8 shown in FIG. 41 overlap each other so as to obtain not only the illustrated design but also various other design expressions. When the discrimination tool 2 is overlaid on the printed matter C8 at a predetermined angle (assumed to be 0°), the first invisible image 5 as shown in FIG. 42(a) or 42(b) is visualized as a visible image. When the discrimination tool 2 is overlaid on the printed matter 1 at 90° with respect to the predetermined angle, a second invisible image 6 as shown in FIG. 43(a) or 43(b) is visualized as a visible image. Each image is observed as a negative or positive image, as shown in FIG. 42(a) or 42(b) and FIG. 43(a) or 43(b), depending on the relative positional relationship between the discrimination tool 2 and the printed matter 1. This is incorporated within the range of the effects of the present invention. Note that the visible image will be explained using the two patterns 4 and 8. However, the present invention is not limited to this, and the visible image can be made of the pattern 4 or 8.

Figure 44:
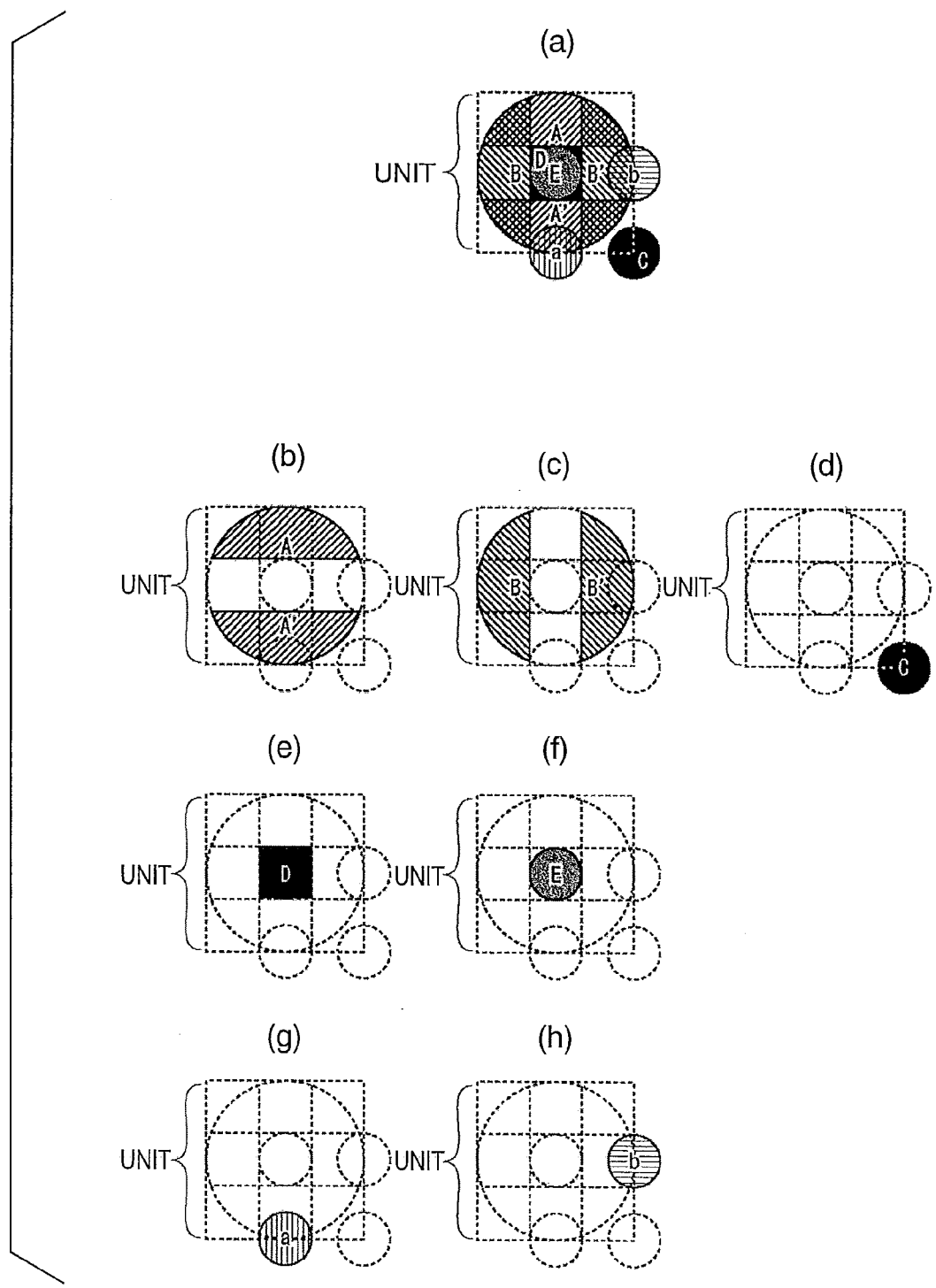
FIG. 44 shows explanatory views of the arrangement of objects of the anti-counterfeit printed matter C8.

FIG. 44 shows enlarged views of the constituent elements of the objects of a printed pattern formed on the anti-counterfeit printed matter C8. As shown in FIG. 44(a), the printed pattern 3 includes at least seven object elements. As shown in FIG. 44(b), objects A and A' pair off to form the first invisible image. The objects A and A' are arranged in the first direction in the unit (square) to be vertically symmetrical with respect to the center. As shown in FIG. 44(c), objects B and B' pair off to form the second invisible image. The objects B and B' are arranged in the second direction in the (square) to be bilaterally symmetrical with respect to the center. As shown in FIG. 44(d), objects C form the first visible image (design: pattern). The objects C construct the pattern 4 made of an arbitrary graphic pattern and characters as shown in FIG. 41. The objects C are arranged while aligning their centers or approximate centers with the four corners of the unit (square). As shown in FIG. 44(e), an object D forms the second visible image (design: pattern). The objects D construct the pattern 8 made of an arbitrary graphic pattern and characters as shown in FIG. 41. The object D is arranged while aligning its center or approximate center with the center of the unit (square). The object E shown in FIG. 44(f), the object a shown in FIG. 44(g), and an object b shown in FIG. 44(h) are provided to relax the density imbalance upon naked eye observation. Addition of these objects will be described later in detail.

Figure 45:
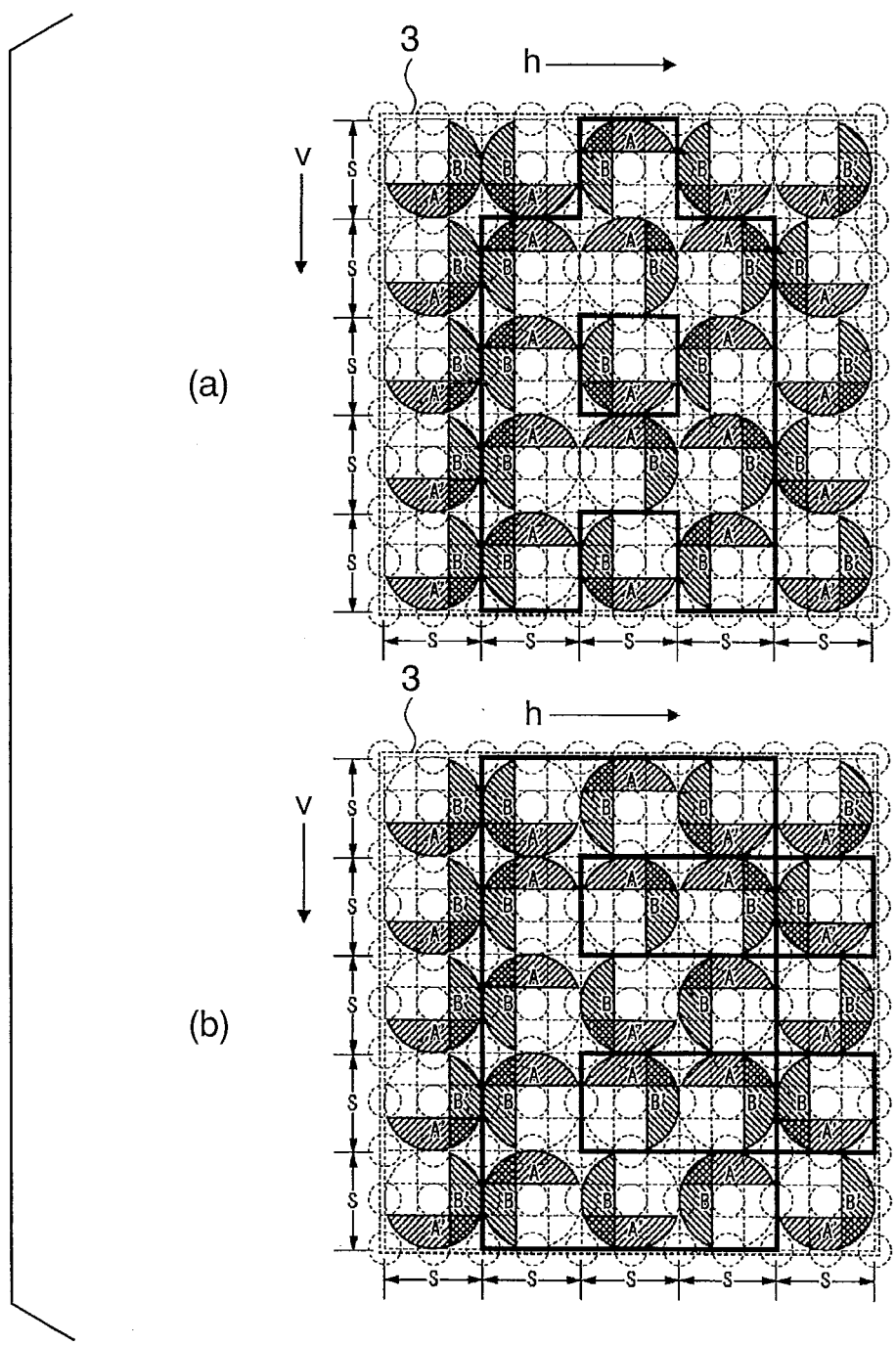
FIG. 45 shows explanatory views of states in which the objects of the anti-counterfeit printed matter C8 are arranged in a matrix.

The objects having such an arrangement are continuously periodically arranged in a matrix on the printed matter tightly in the vertical and horizontal directions to obtain an arrangement shown in FIG. 45. FIG. 45 shows views schematically illustrating the plurality of objects arranged in the number v of vertical steps and the number h of horizontal steps in a matrix to form the printed pattern 3 on the printed matter so as to clarify the composition of the invisible image indicated by bold solid lines. FIGS. 45(a) and 45(b) explain the difference between the invisible images on the same printed pattern 3. Note that in this embodiment, the number of steps indicates the number of units repeated on the printed pattern 3. The number of steps is not particularly limited. The number of steps is proportional to the resolution of the visible image and the invisible image. The bold solid lines indicating the invisible image only explain the position and are not visually recognized as shown in FIG. 45 in fact. In the printed pattern 3, the total area of the objects A equals that of the objects A', and the total area of the objects B equals that of the objects B'.

That is, FIG. 45 shows a state in which two types of invisible images shown in FIGS. 45(a) and 45(b) are formed by dot phase modulation. In this state, however, upon naked eye observation, near a portion where a plurality of objects A, a plurality of objects A', a plurality of objects B, and a plurality of objects B' are arranged in a matrix, the density appears to be high. Additionally, at a blank portion where the objects are arranged in a matrix, the density appears to be low. That is, density imbalance may occur upon naked eye observation.

Figure 46:
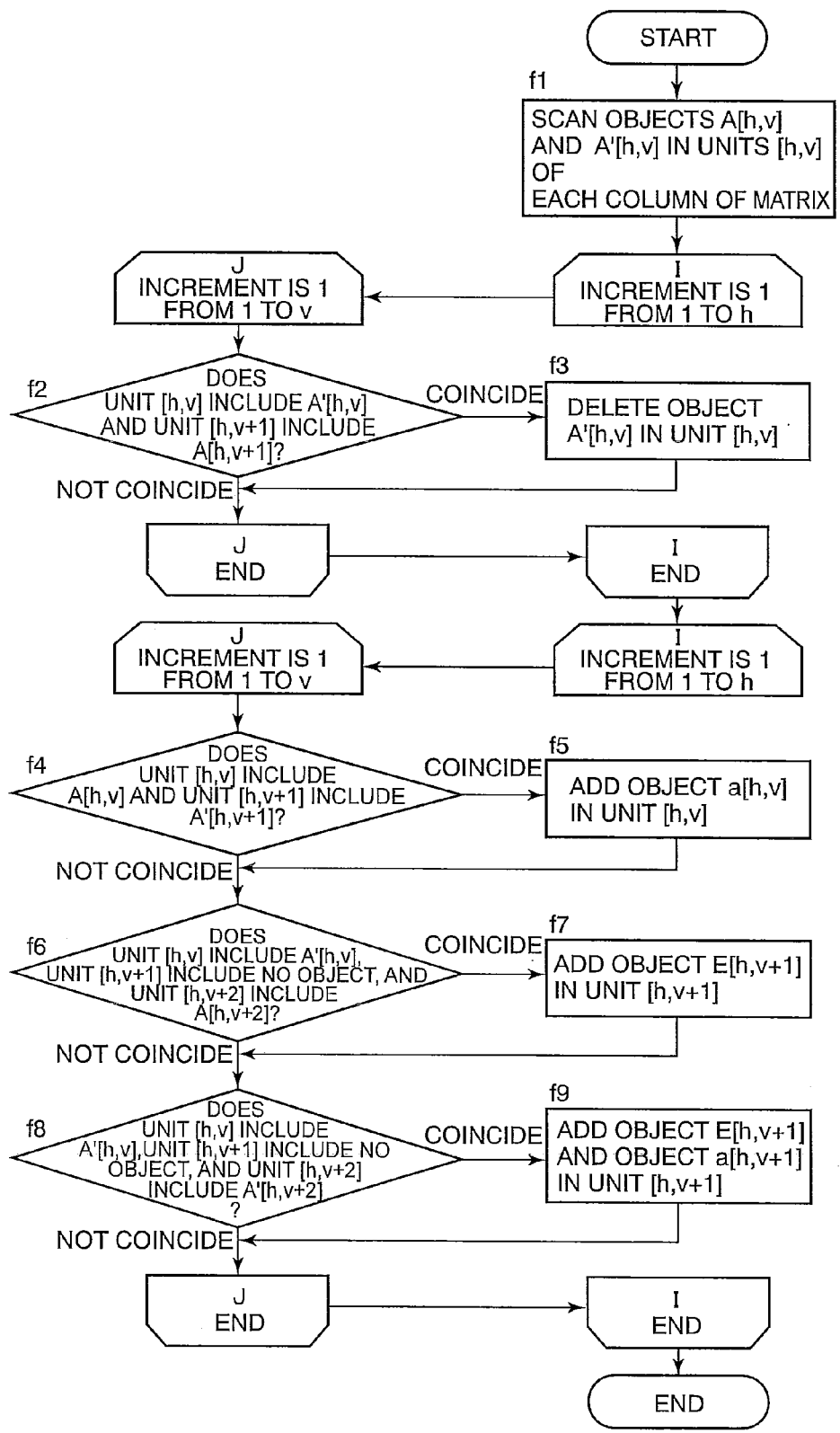
FIG. 46 is a flowchart illustrating an algorithm that executes object deletion and addition in the vertical direction to relax density imbalance upon naked eye observation.
Figure 47:
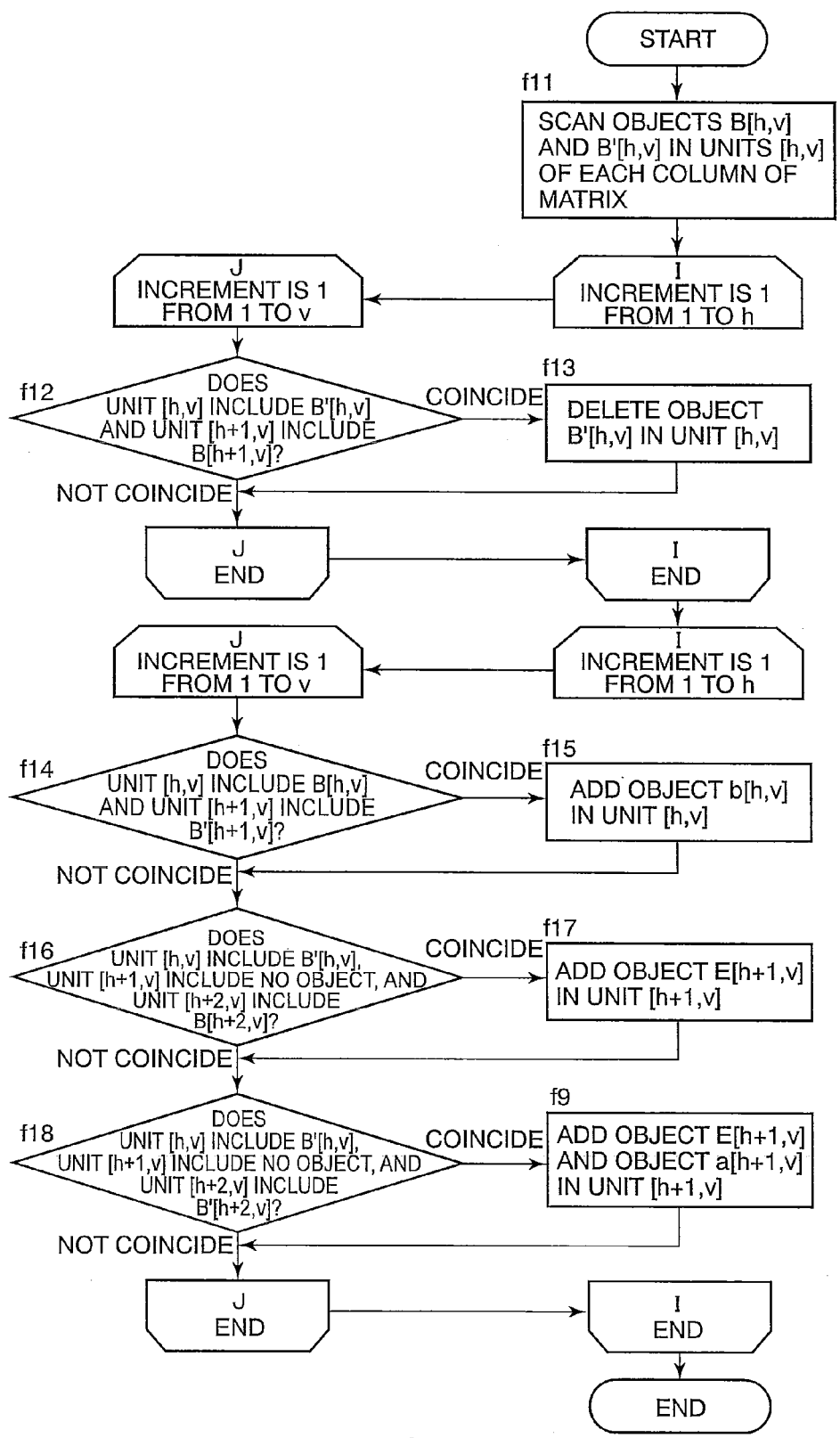
FIG. 47 is a flowchart illustrating an algorithm that executes object deletion and addition in the horizontal direction to relax density imbalance upon naked eye observation.

To relax the apparent density imbalance, object deletion and addition are executed for each unit [h,v] that is the minimum unit using the algorithm for processing in the vertical direction shown in FIG. 46 and the algorithm for processing in the horizontal direction shown in FIG. 47. Note that [v] is the number of steps corresponding to the number of units counted vertically from the upper side, and [h] is the number of steps corresponding to the number of units counted horizontally from the left side. In the process f1, concerning the units [h,v] of each column of the matrix, the objects A[h,v], A'[h,v], B[h,v], and B'[h,v] are sequentially detected. Note that as for the method of detecting the objects A[h,v], A'[h,v], B[h,v], and B'[h,v], for example, if the printed pattern 3 is a binary image having the bitmap format, the object A[h,v] or A'[h,v] and the object B[h,v] or B'[h,v] may be identified and deleted in a process target unit by processing called labeling in general.

Figure 48:
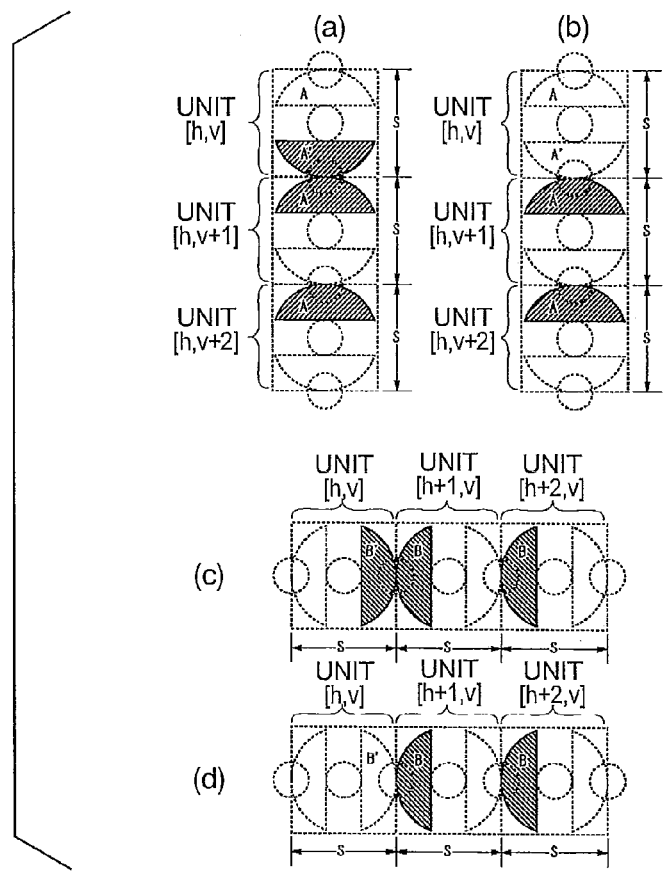
FIG. 48 shows views of a state in which the object A'[h,v] of the unit [h,v] is deleted in accordance with the algorithm in FIG. 46 and a state in which an object B'[h,v] of the unit [h,v] is deleted in accordance with the algorithm in FIG. 47.
Figure 49:
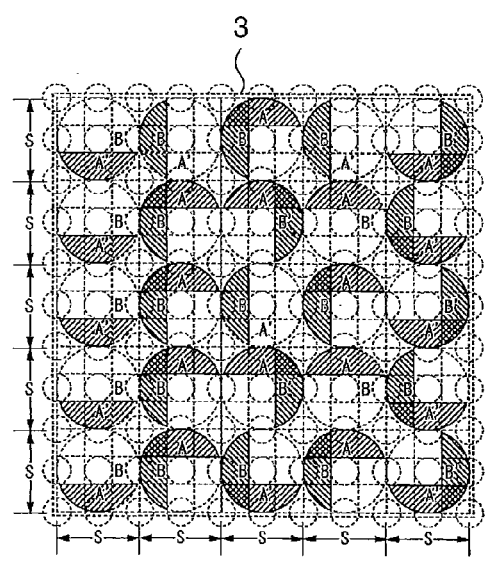
FIG. 49 is a view showing a state in which deletion of the object A'[h,v] of the unit [h,v] and deletion of the object B'[h,v] of the unit [h,v] are applied to the printed pattern 3.

Next, if a condition that the unit [h,v] includes the object A'[h,v], and the unit [h,v+1] includes the object A[h,v+1] is satisfied in the process f2 shown in FIG. 46, the object A'[h,v] which should be arranged originally in the unit [h,v] is deleted in the process f3. More specifically, when the unit [h,v], unit [h,v+1], and unit [h,v+2] are arranged, and the object A'[h,v] of the unit [h,v] is adjacent to the object A[h,v+1] of the unit [h,v+1], as shown in FIG. 48(a), the object A'[h,v] of the unit [h,v] is deleted, as shown in FIG. 48(b). If the condition of the process f2 is not satisfied, the process advances to the process f4. On the other hand, if a condition that the unit [h,v] includes the object B'[h,v], and the unit [h+1,v] includes the object B[h+1,v] is satisfied in a process f12 shown in FIG. 47, the object B'[h,v] which should be arranged originally in the unit [h,v] is deleted in a process f13. More specifically, when the unit [h,v], unit [h+1,v], and unit [h+2,v] are arranged, and the object B'[h,v] of the unit [h,v] is adjacent to the object B[h+1,v] of the unit [h+1,v], as shown in FIG. 48(c), the object B'[h,v] of the unit [h,v] is deleted, as shown in FIG. 48(d). If the condition of the process f12 is not satisfied, the process advances to a process f14. Note that when the processes f12 and f13 are applied to the printed pattern 3 shown in FIG. 45, the printed pattern 3 shown in FIG. 49 is obtained. In addition, since the objects A' and B' are partially deleted, the total area of the objects A' is smaller than that of the objects A, and the total area of the objects B' is smaller than that of the objects B.

Figure 50:
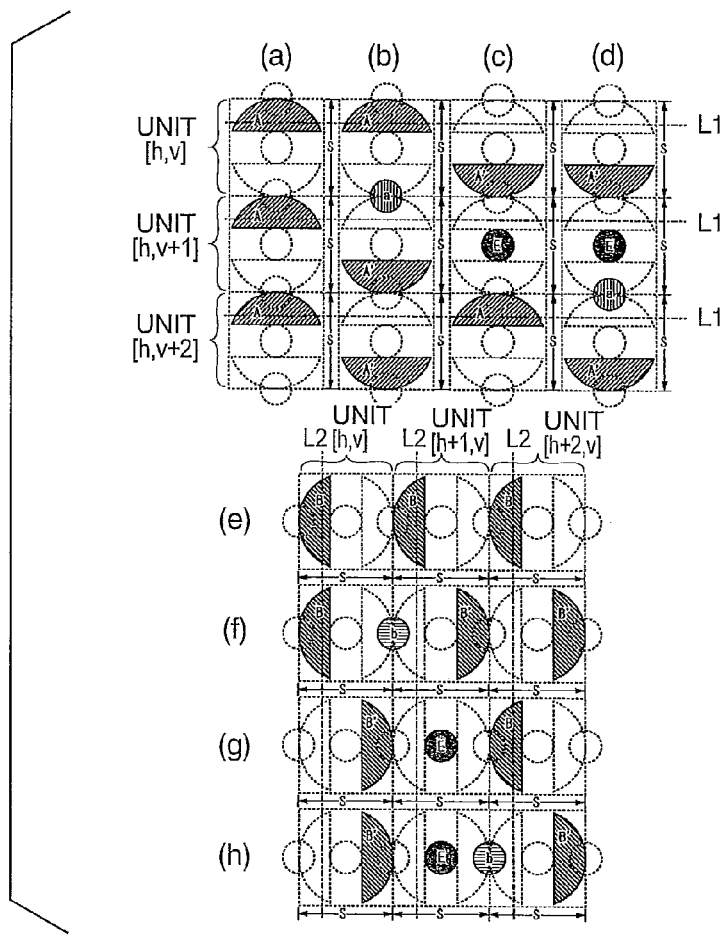
FIG. 50 shows views of a state in which the objects a and E having an object area 1/2 that of the object A or A' are added in accordance with the algorithm in FIG. 46 and a state in which objects b and E having an object area 1/2 that of the object B or B' are added in accordance with the algorithm in FIG. 47.

If a condition that the unit [h,v] includes the object A[h,v], and the unit [h,v+1] includes the object A'[h,v+1] is satisfied in the process f4 shown in FIG. 46, the object a is added between the unit [h,v] and the unit [h,v+1] in the process f5. More specifically, the object a having an object area 1/2 or almost 1/2 that of the object A or A' is added at the midpoint between the unit [h,v] and the unit [h,v+1], as shown in FIG. 50(b). This relaxes the density imbalance upon naked eye observation between the unit [h,v] and the unit [h,v+1]. On the other hand, if a condition that the unit [h,v] includes the object B[h,v], and the unit [h+1,v] includes the object B'[h+1,v] is satisfied in the process f14 shown in FIG. 47, the object b is added between the unit [h,v] and the unit [h+1,v] in a process f15. More specifically, the object b having an object area 1/2 or almost 1/2 that of the object B or B' is added at the midpoint between the unit [h,v] and the unit [h+1,v], as shown in FIG. 50(*f*). This relaxes the density imbalance upon naked eye observation between the unit [h,v] and the unit [h+1,v].

If a condition that the unit [h,v] includes the object A'[h,v], the unit [h,v+1] includes no object, and the unit [h,v+2] includes the object A[h,v+2] is satisfied in the process f6 shown in FIG. 46, the object E is added at or almost at the center of the unit [h,v+1] in the process f7. More specifically, the object E having an object area 1/2 or almost 1/2 that of the object A or A' is added at or almost at the center of the unit [h,v+1], as shown in FIG. 50(*c*). This relaxes the density imbalance upon naked eye observation between the unit [h,v] and the unit [h,v+2]. On the other hand, if a condition that the unit [h,v] includes the object B'[h,v], the unit [h+1,v] includes no object, and the unit [h,v+2] includes the object B[h,v] is satisfied in a process f16 shown in FIG. 47, the object E is added at or almost at the center of the unit [h+1,v] in a process f17. More specifically, the object E having an object area 1/2 or almost 1/2 that of the object B or B' is added at or almost at the center of the unit [h+1,v], as shown in FIG. 50(*g*). This relaxes the density imbalance upon naked eye observation between the unit [h,v] and the unit [h+2,v].

Figure 51:
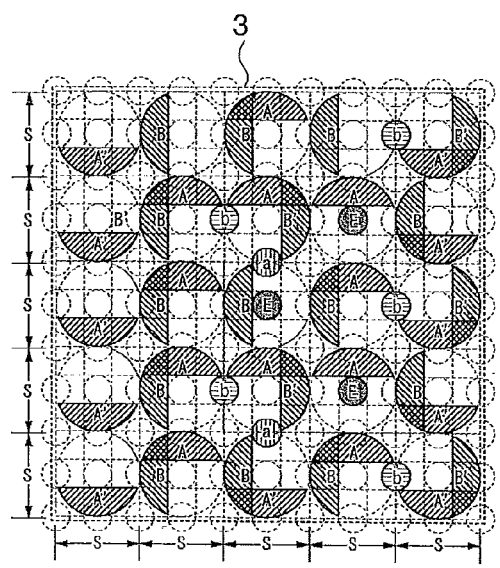
FIG. 51 is a view showing a state in which addition of the objects a, b, and E is applied to the printed pattern 3.

If a condition that the unit [h,v] includes the object A'[h,v], the unit [h,v+1] includes no object, and the unit [h,v+2] includes the object A'[h,v+2] is satisfied in the process f8 shown in FIG. 46, the objects E and a are added between the unit [h,v+1] and the unit [h,v+2] in the process f9. More specifically, the object E having an object area 1/2 or almost 1/2 that of the object A or A' is added at or almost at the center of the unit [h,v+1], and the object a having an object area 1/2 or almost 1/2 that of the object A or A' is added between the unit [h,v+1] and the unit [h,v+2], as shown in FIG. 50(*d*). This relaxes the density imbalance upon naked eye observation between the unit [h,v] and the unit [h,v+2]. On the other hand, if a condition that the unit [h,v] includes the object B'[h,v], the unit [h+1,v] includes no object, and the unit [h+2,v] includes the object B'[h+2,v] is satisfied in a process f18 shown in FIG. 47, the object E is added at or almost at the center of the unit [h+1,v], and the object b is added between the unit [h+1,v] and the unit [h+2,v] in a process f19. More specifically, the object E having an object area 1/2 or almost 1/2 that of the object B or B' is added at or almost at the center of the unit [h+1,v], and the object b having an object area 1/2 or almost 1/2 that of the object B or B' is added between the unit [h+1,v] and the unit [h+2,v], as shown in FIG. 50(*h*). This relaxes the density imbalance upon naked eye observation between the unit [h,v] and the unit [h+2,v]. Hence, when the processes f4 to f8 in FIG. 46 and the processes f14 to F18 in FIG. 47 are applied, the density imbalance upon naked eye observation is relaxed throughout the printed pattern 3 shown in FIG. 51.

Figure 52:
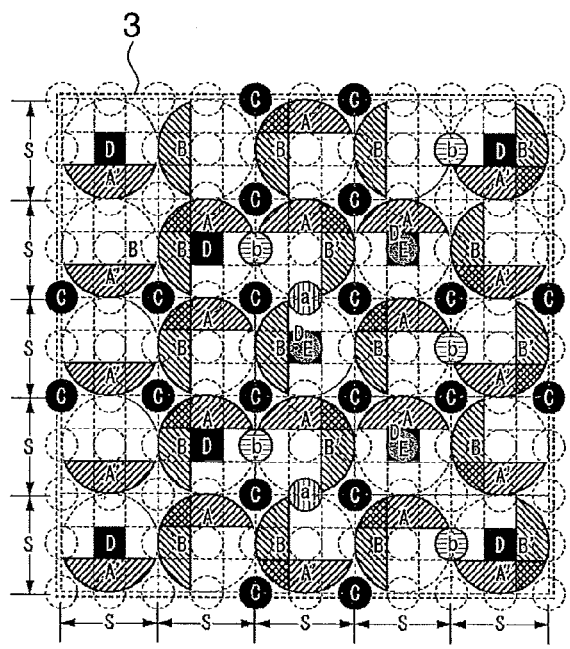
FIG. 52 is a view showing the printed pattern 3 on which objects C to form a first visible image (design: pattern) and objects D to form a second visible image (design: pattern) are arranged.
Figure 53:
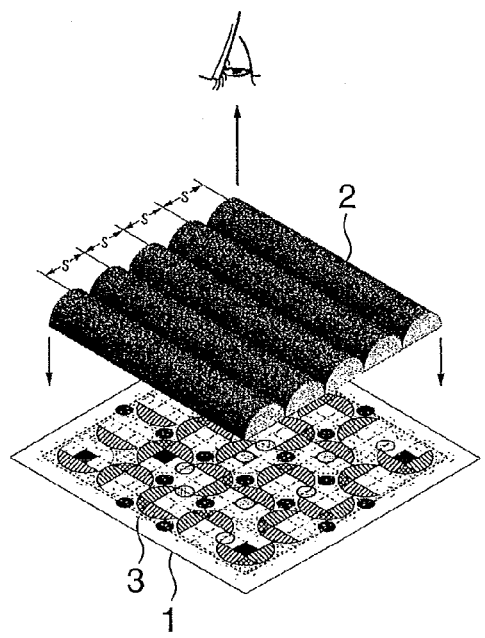
FIG. 53 is an explanatory view showing a state in which visual observation is done while overlaying a lenticular lens on the anti-counterfeit printed matter C8.

Next, as shown in FIG. 52, the objects C and D are arranged. The objects C form the first visible image (design: pattern) so as to serve as objects that construct the pattern 4 made of an arbitrary graphic pattern and characters as shown in FIG. 41. The objects D form the second visible image (design: pattern) so as to serve as objects that construct the pattern 8 made of an arbitrary graphic pattern and characters as shown in FIG. 41. As shown in FIG. 53, the discrimination tool 2 formed from, for example, a lenticular lens is overlaid on the printed pattern 3 of the printed matter 1 in this state, and the printed pattern is visually observed from the front. This allows to visualize the invisible image formed on the printed pattern 3 as a visible image. Note that in the anti-counterfeit printed matter C8, the length S is 340 μm, and the printed pattern 3 is printed on a coated paper sheet by offset printing. However, the length S, the base material of the printed matter, the printing method, the printing material, the printing apparatus, and the like are not particularly limited.

Figure 54:
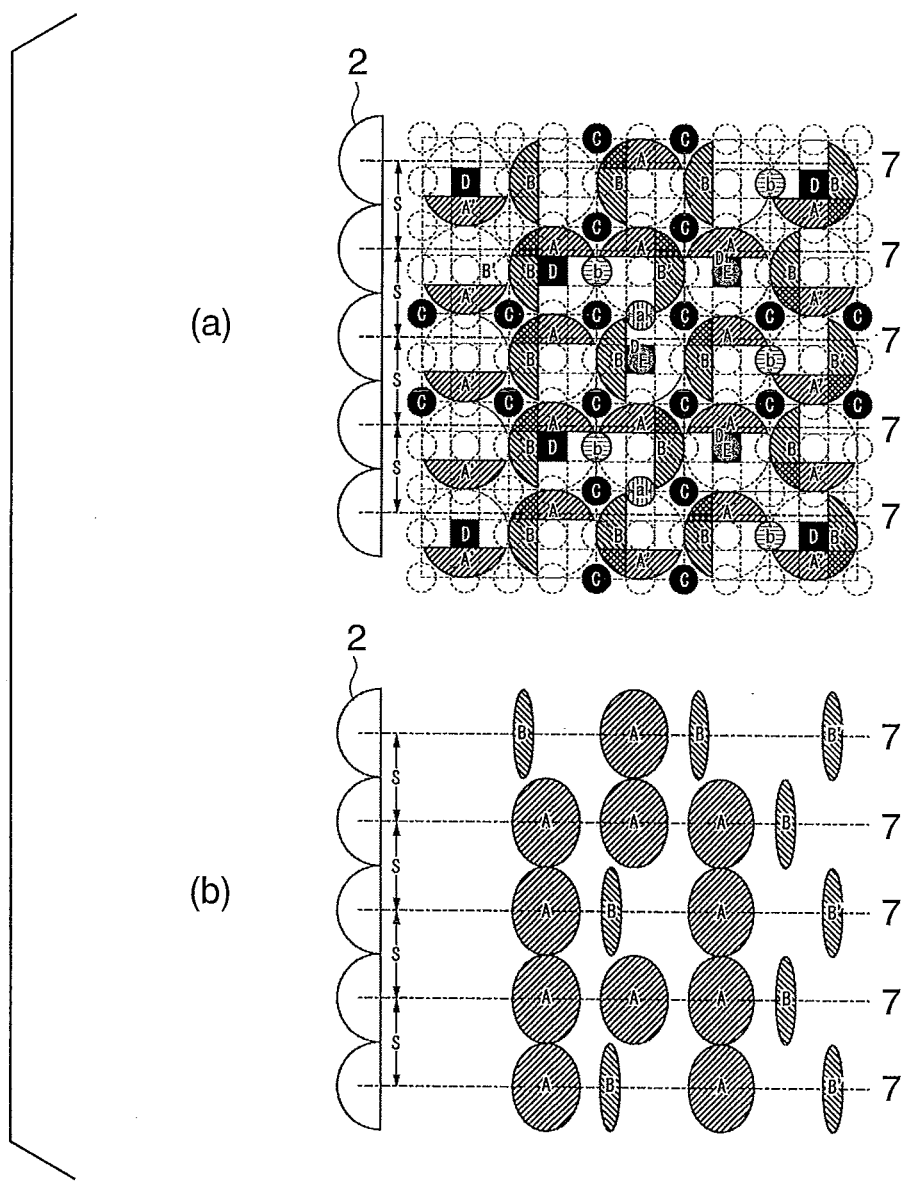
FIG. 54 shows explanatory views of a state in which the lenticular lens is placed on the anti-counterfeit printed matter C8 so as to locate the center lines on the objects A, and a magnified state of the objects visually recognized at this time.

FIG. 54 shows a state in which the discrimination tool 2 formed from a lenticular lens is overlaid on the printed pattern 3 of the printed matter 1 so as to make a center line 7 of each lens element of the lenticular lens coincide with a line L1 in FIG. 50, and the printed pattern is visually observed from the front. In this case, each center line 7 of the lenticular lens exists at the position shown in FIG. 54(*a*), and the objects A, B, and B' are located on the center lines 7. Since the objects A, B, and B' located on the center lines 7 look enlarged due to the characteristics of the lenticular lens, a visible image having the graphic pattern shown in FIG. 54(*b*) is visualized upon visual observation. Since the tangents of the objects B and B' to the center lines 7 are less than those of the objects A, the image made of these objects is hard to visually recognize. For this reason, only the first invisible image made of the objects A is visually recognized.

Figure 55:
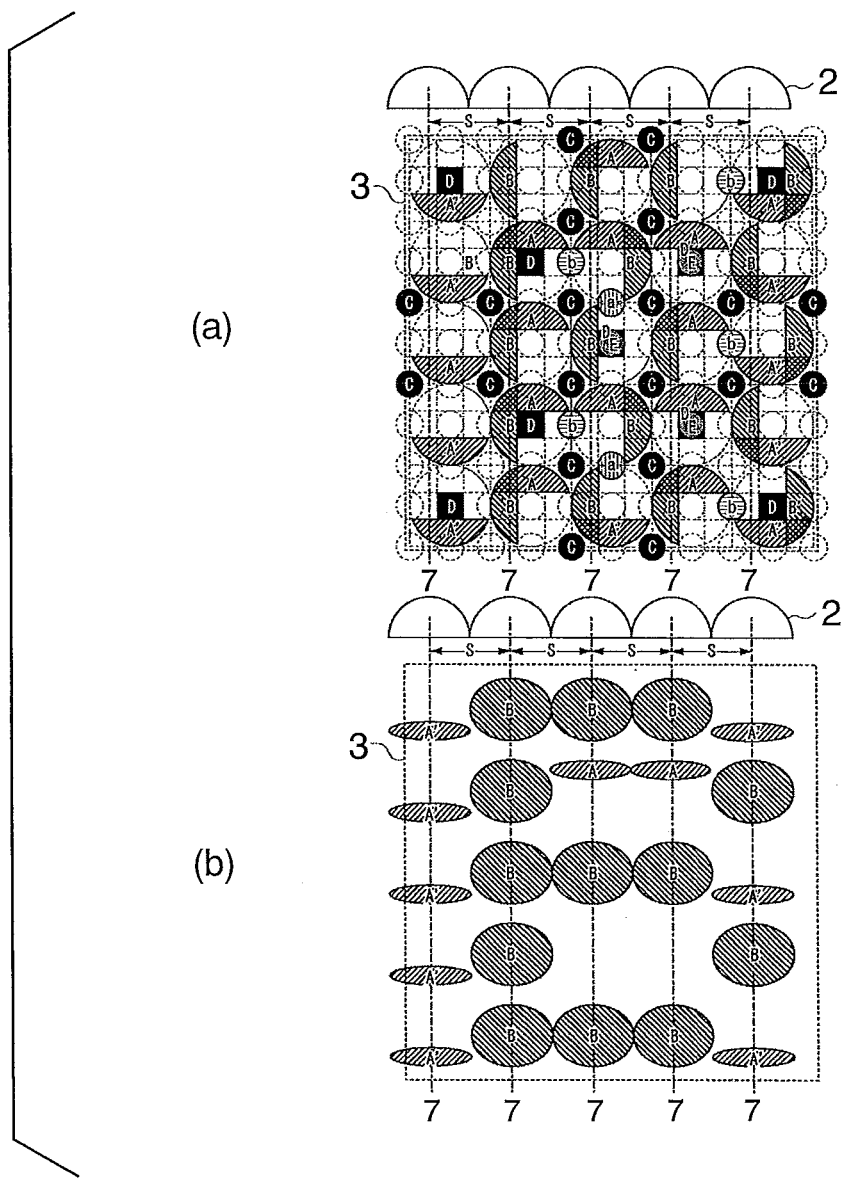
FIG. 55 shows explanatory views of a state in which the lenticular lens is placed on the anti-counterfeit printed matter C8 so as to locate the center lines on the objects B, and a magnified state of the objects visually recognized at this time.

FIG. 55 shows a state in which the discrimination tool 2 formed from a lenticular lens is overlaid on the printed pattern 3 of the printed matter 1 so as to make the center line 7 of each lens element of the lenticular lens coincide with a line L2 in FIG. 50, and the printed pattern is visually observed from the front. In this case, each center line 7 of the lenticular lens exists at the position shown in FIG. 55(*a*), and the objects B, A, and A' are located on the center lines 7. Since the objects B, A, and A' located on the center lines 7 look enlarged due to the characteristics of the lenticular lens, a visible image having the graphic pattern shown in FIG. 55(*b*) is visualized upon visual observation. Since the tangents of the objects A and A' to the center lines 7 are less than those of the objects B, the image made of these objects is hard to visually recognize. For this reason, only the second invisible image made of the objects B is visually recognized.

In the anti-counterfeit printed matter C8, a lenticular lens is used as the discrimination tool. However, as in the above-described anti-counterfeit printed matters C1 to C7, the same effect can be obtained using, for example, a parallel line filter. In observation using the lenticular lens, the objects a, b, C, D, and E are rarely visually recognized. Hence, when the first and second invisible images are visualized as visible images, their visibility is not impeded.

Figure 56:
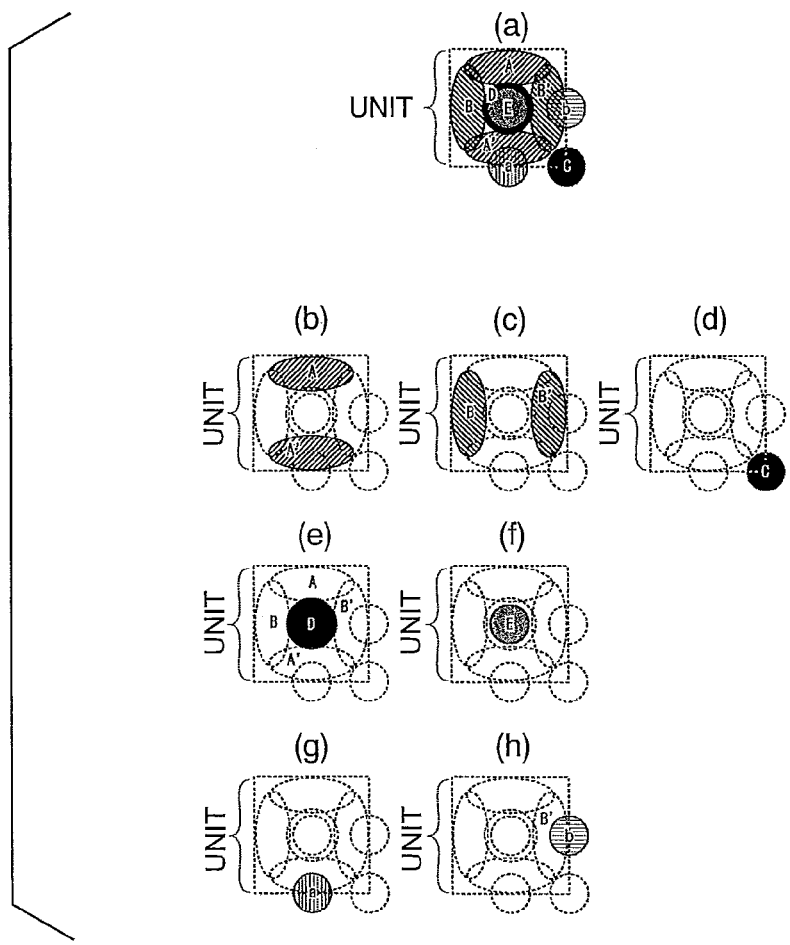
FIG. 56 shows explanatory views of examples of other shapes of the objects on the anti-counterfeit printed matter C8.

Each object of the printed pattern 3 anti-counterfeit printed matter C8 need not always have the circular shape shown in FIG. 44 but may have an elliptical shape as shown in FIG. 56. The printed pattern 3 includes at least seven object elements, as shown in FIG. 56(*a*). As shown in FIG. 56(*b*), the objects A and A' pair off to form the first invisible image, and are arranged in the first direction in the unit (square) to be vertically symmetrical with respect to the center. As shown in FIG. 56(*c*), the objects B and B' pair off to form the second invisible image, and are arranged in the second direction in the unit (square) to be bilaterally symmetrical with respect to the center. As shown in FIG. 56(*d*), the objects C form the first visible image (design: pattern) so as to serve as objects that construct the pattern 4 made of an arbitrary graphic pattern and characters as shown in FIG. 41. The objects C are arranged while aligning their centers or approximate centers with the four corners of the unit (square). As shown in FIG. 56(*e*), the objects D form the second visible image (design: pattern) so as to serve as objects that construct the pattern 8 made of an arbitrary graphic pattern and characters as shown in FIG. 41. The object D is arranged while aligning its center or approximate center with the center of the unit (square). The object E shown in FIG. 56(*f*), the object a shown in FIG. 56(*g*), and the object b shown in FIG. 56(*h*) are provided to relax the density imbalance upon naked eye observation. The shape of each object is not limited as far as they have the above-described arrangement.

The anti-counterfeit printed matter C8 is useful for printed matters such as securities because it is possible to form clear visible images each having a design and high degree of freedom using the objects C and D without impeding the visibility of visualized invisible images. In addition, overlaying a single discrimination tool on the printed matter enables to easily and clearly visualize the invisible image made of the objects A and A'. Furthermore, the cost can be reduced because only single color printing for printing the objects of the printed matter according to the present invention in the same color can provide a sufficient anti-counterfeit effect, and the plate making and printing methods and the like are not particularly limited. Moreover, the minimum width of the objects a and E is set to be equal to or more than the minimum object width that allows to maintain printed matter quality. This inevitably eliminates the instability factor of the printed matter quality.

(Example in which Pattern 4 is Halftone Image)

Figure 57:
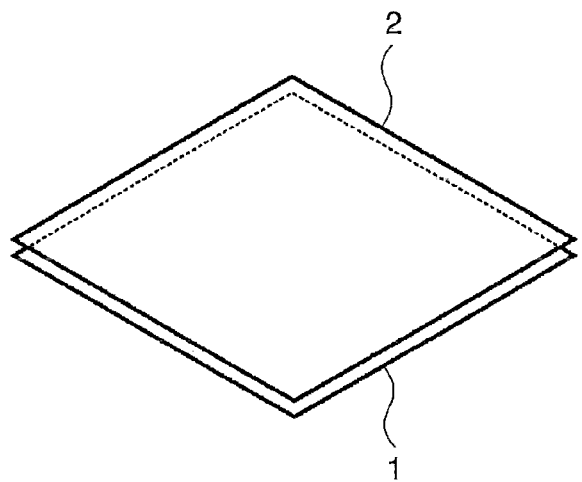
FIG. 57 is a perspective view showing the printed matter and the discrimination tool.
Figure 58:
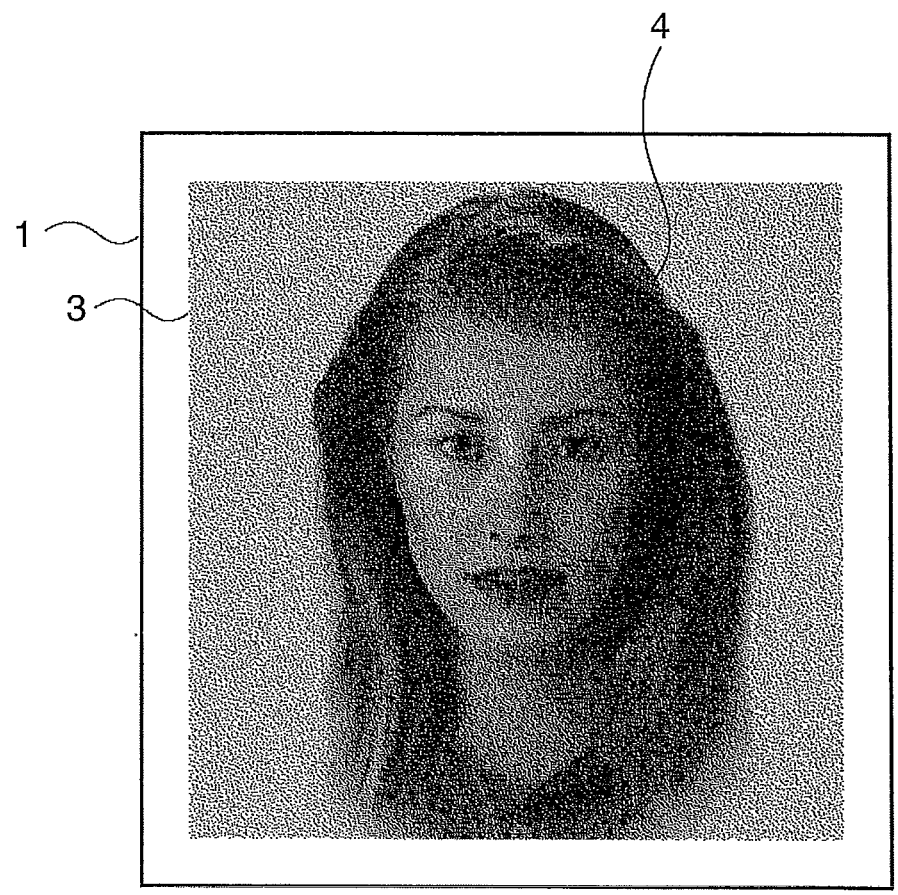
FIG. 58 is an explanatory view showing a printed matter 1 on which the pattern 4 having an arbitrary continuous tone is formed.
Figure 59:
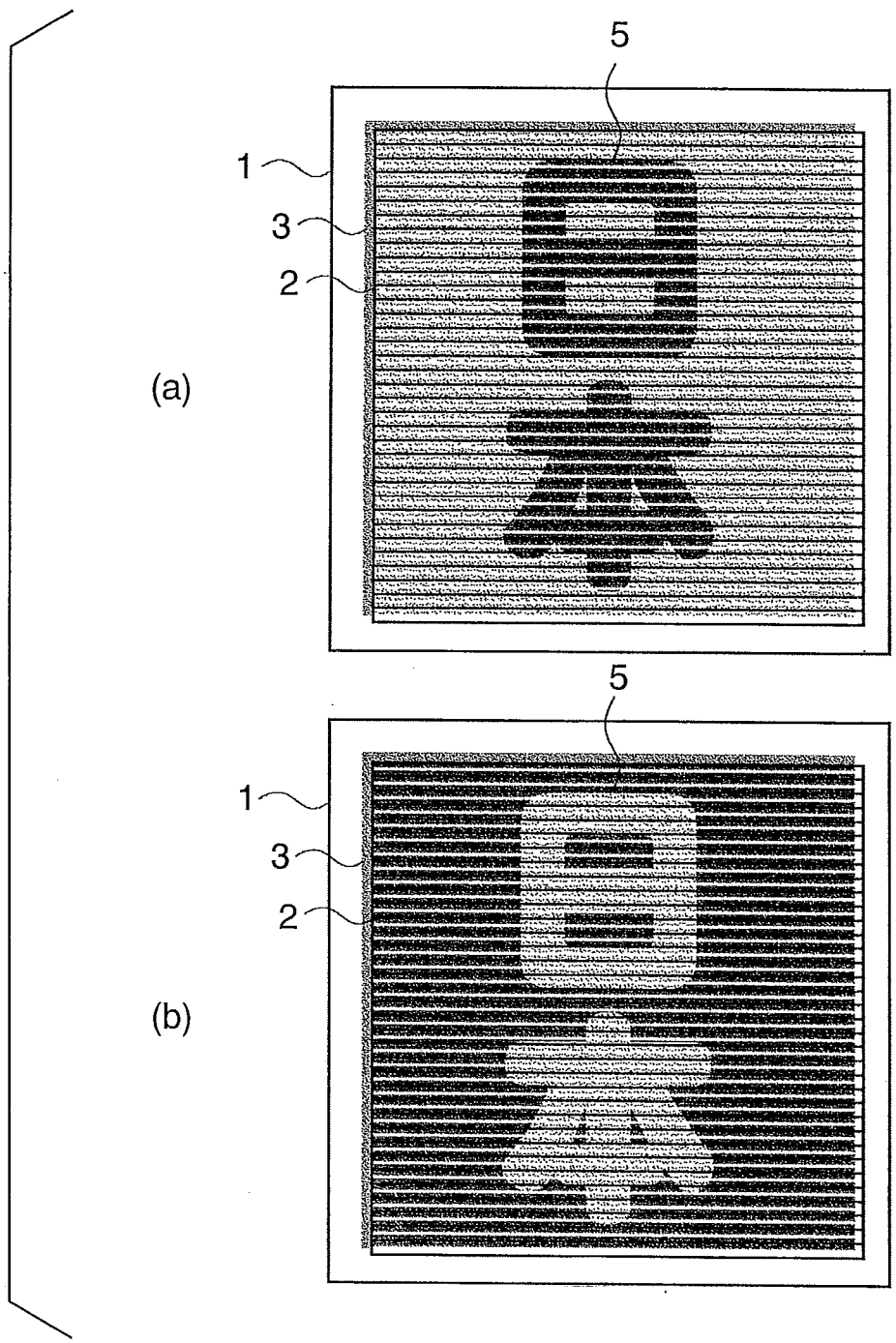
FIG. 59 shows explanatory views of a state in which a first invisible image 5 is visualized as a visible image by overlaying the lenticular lens on the printed matter 1.
Figure 60:
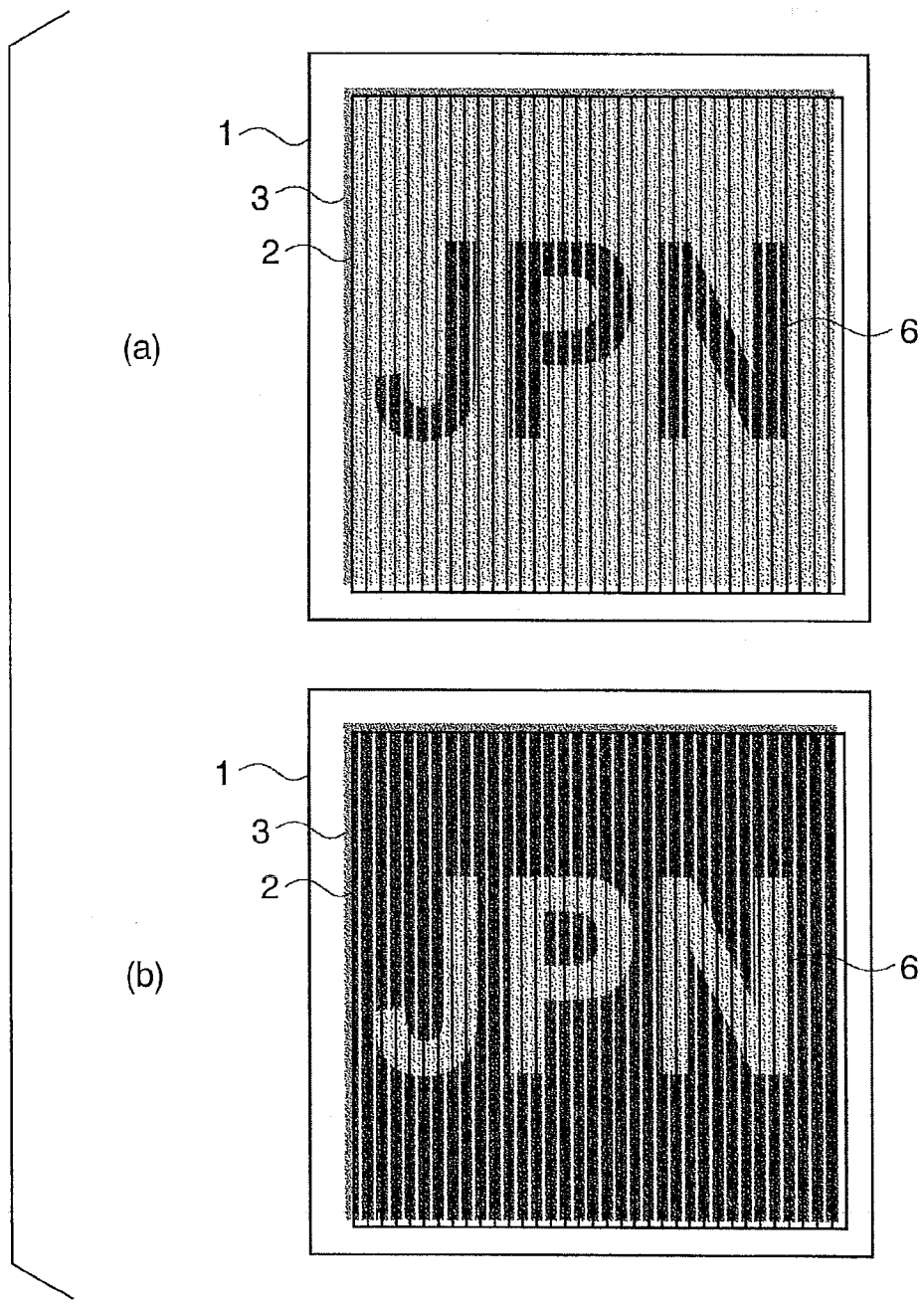
FIG. 60 shows explanatory views of a state in which a second invisible image 6 is visualized as a visible image by overlaying the lenticular lens on the printed matter 1.

In an anti-counterfeit printed matter whose pattern 4 is a halftone image, invisible images can easily be visualized to determine the authenticity by overlaying the discrimination tool on the printed matter 1, as shown in FIG. 57. The discrimination tool 2 is, for example, a lenticular lens or a parallel line filter which is made by forming a plurality of straight lines on a transparent filter in parallel along one direction. When the printed pattern 3 of the printed matter 1 is visually observed under a normal visual condition without overlaying the parallel line filter, the lenticular lens, or the like, the pattern 4 (for example, face photo) having an arbitrary continuous tone is visually recognized, as shown in FIG. 58. When the discrimination tool 2 is overlaid on the printed matter 1 at a predetermined angle (assumed to be 0°), the first invisible image 5 as shown in FIG. 59($a$) or 59($b$) is visualized as a visible image. When the discrimination tool 2 is overlaid on the printed matter 1 at 90° with respect to the predetermined angle, the second invisible image 6 as shown in FIG. 60($a$) or 60($b$) is visualized as a visible image. Each image is observed as a negative or positive image, as shown in FIG. 59($a$) or 59($b$) and FIG. 60($a$) or 60($b$), depending on the relative positional relationship between the discrimination tool 2 and the printed matter 1. This is incorporated within the range of the effects of the present invention. Note that a visible image is an image that can visually be recognized under normal visible light, whereas an invisible image is an image of which visual recognition is impossible or very difficult under normal visible light. The invisible image is visually recognized by overlaying a parallel line filter, a lenticular lens, or the like.

Figure 61:
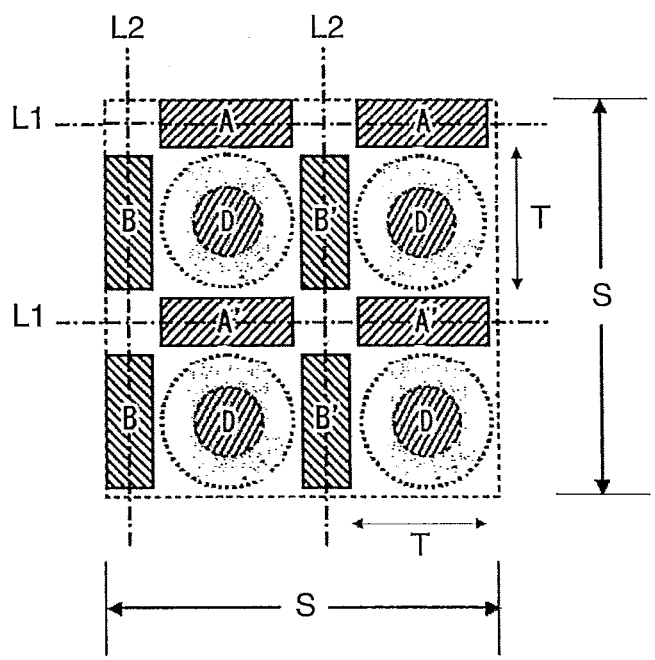
FIG. 61 is an explanatory view showing the basic structure of the printed pattern of the printed matter according to the present invention.

FIG. 61 is a partially enlarged view of the basic arrangement of objects of the printed pattern of a printed matter according to the present invention. The vertical/horizontal size S is 1 mm or less, and for example, 423 µm. The objects form a minimum unit called a unit and are periodically arranged in a matrix on the surface of the printed matter. Each object includes at least three object elements. The objects A and A' pair off and have an on/off relationship. The on/off relationship indicates that for example, when one is black (on), the other is white (off), and when one is colored, the other is colorless. That is, the two objects are never black or white simultaneously. The objects A and A' have the same area. Since the objects A and A' exist, a first invisible image (one of negative and positive images) that is not visually recognized under a normal visual condition is formed by only the objects A, and another first invisible image (the other of the positive and negative images) is formed by only the objects A'.

Similarly, the objects B and B' pair off and have an on/off relationship and the same area. A second invisible image (one of negative and positive images) is formed by only the objects B, and another second invisible image (the other of the positive and negative images) is formed by only the objects B'.

The object D is an element of a visible image, and forms the pattern 4 having an arbitrary continuous tone visually recognized by naked eye observation in a normal visual recognition state. Note that the object D is arranged between the objects A and A' and between the objects B and B'. The region T shown in FIG. 61 indicates the maximum region of the object D. Within this region, the object D can be formed by not only a normal halftone dot for printing but also increasing/decreasing the object size, changing the object density, changing the object sparseness, or a set of random dots of an FM screen or the like, and its shape is not particularly limited. The above-described "sparseness" means a change in the amount of objects having the same object area and arranged in a predetermined region. A region with a high arrangement density reproduces shadow, and a region with a low arrangement density reproduces highlight. Hence, the continuous tone is reproduced by arbitrarily setting the object sparseness.

The objects D need not always have a single color and may include a plurality of objects of additive color mixture of, for example, cyan, magenta, yellow, and black. This allows to express the pattern 4 having an arbitrary continuous tone as a color image. The colors are not particularly limited. In addition, the objects D can also be printed using a photoluminescent ink such as silver ink.

Figure 62:
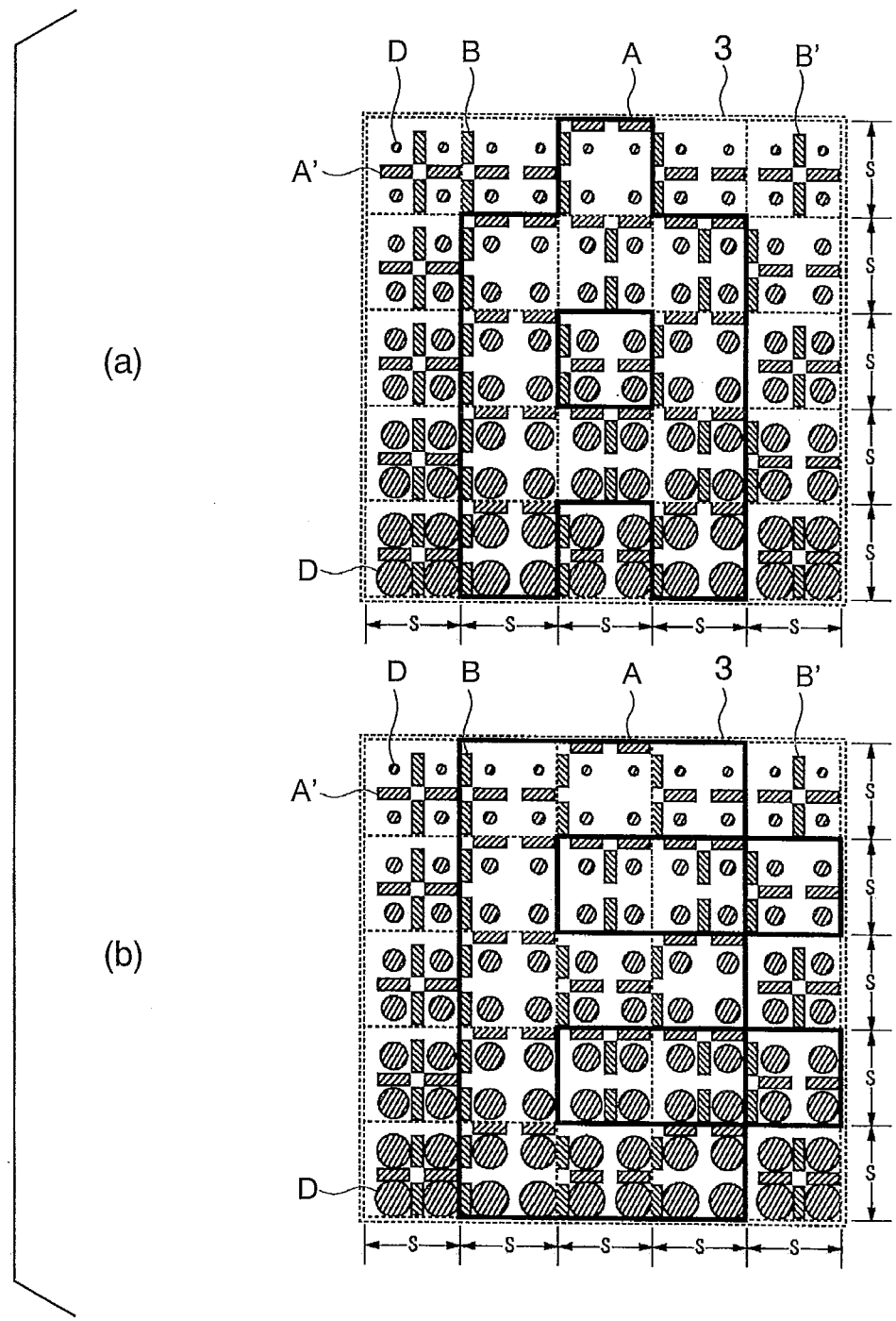
FIG. 62 shows views schematically illustrating the objects arranged in a matrix to form the printed pattern 3 on the printed matter so as to clarify the composition.

FIG. 62 shows views schematically illustrating the objects arranged in a matrix to form the printed pattern 3 on the printed matter so as to clarify the composition. Note that FIGS. 62($a$) and 62($b$) are views schematically illustrating the same printed matter so as to clarify the positions and compositions of the invisible images indicated by bold solid lines. FIG. 62($a$) shows the position of the invisible image "A". FIG. 62(B) shows the position of the invisible image "B".

Figure 63:
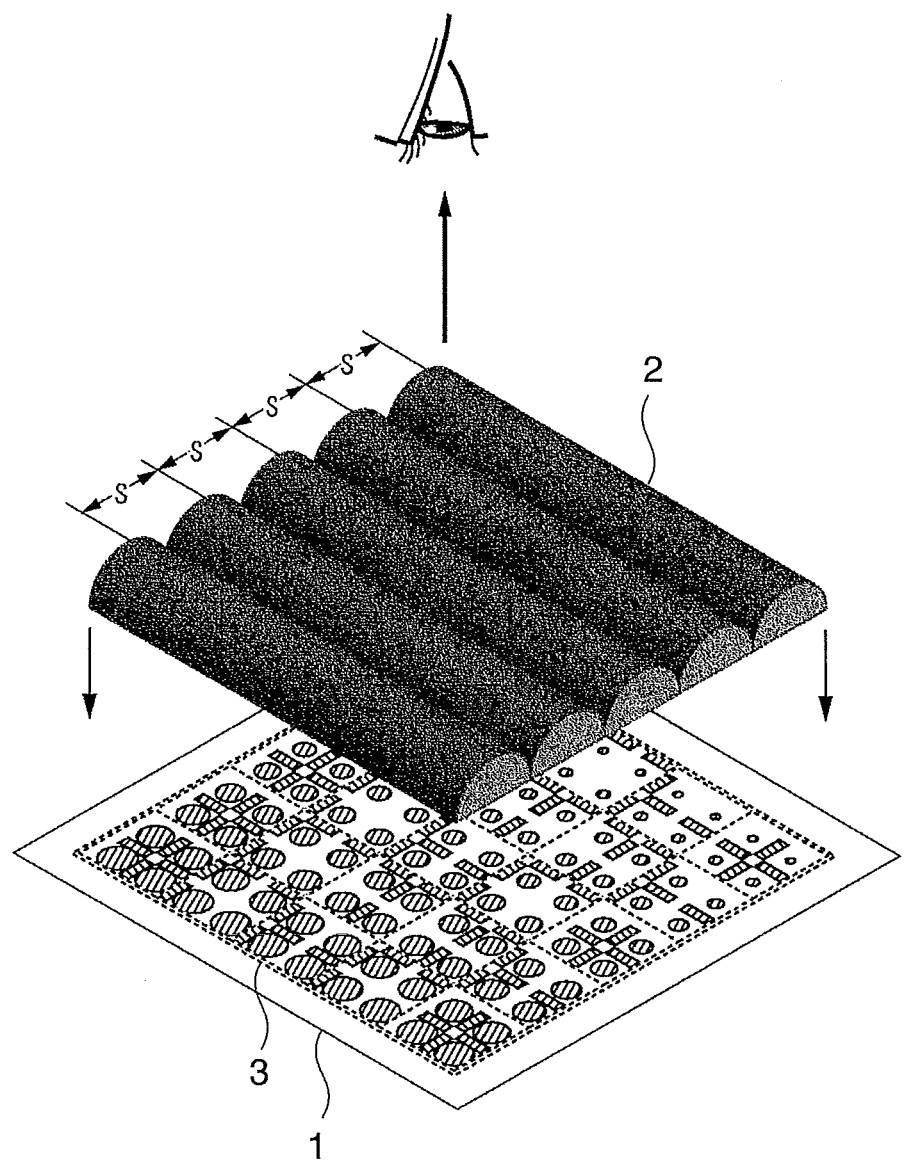
FIG. 63 is a perspective view showing a state in which visual observation from the front is done while overlaying the discrimination tool 2 on the printed pattern 3 of the printed matter 1.

As shown in FIG. 63, the discrimination tool 2 formed from, for example, a lenticular lens is overlaid on the printed pattern 3 of the printed matter 1 in this state, and the printed pattern is visually observed from the front. This allows to visualize the invisible image formed on the printed pattern 3 as a visible image. Note that in the anti-counterfeit printed matter, the length S is 423 µm, and the printed pattern 3 is printed on a coated paper sheet by offset printing. However, the length S, the base material of the printed matter, the printing method, the printing material, the printing apparatus, and the like are not particularly limited.

Figure 64:
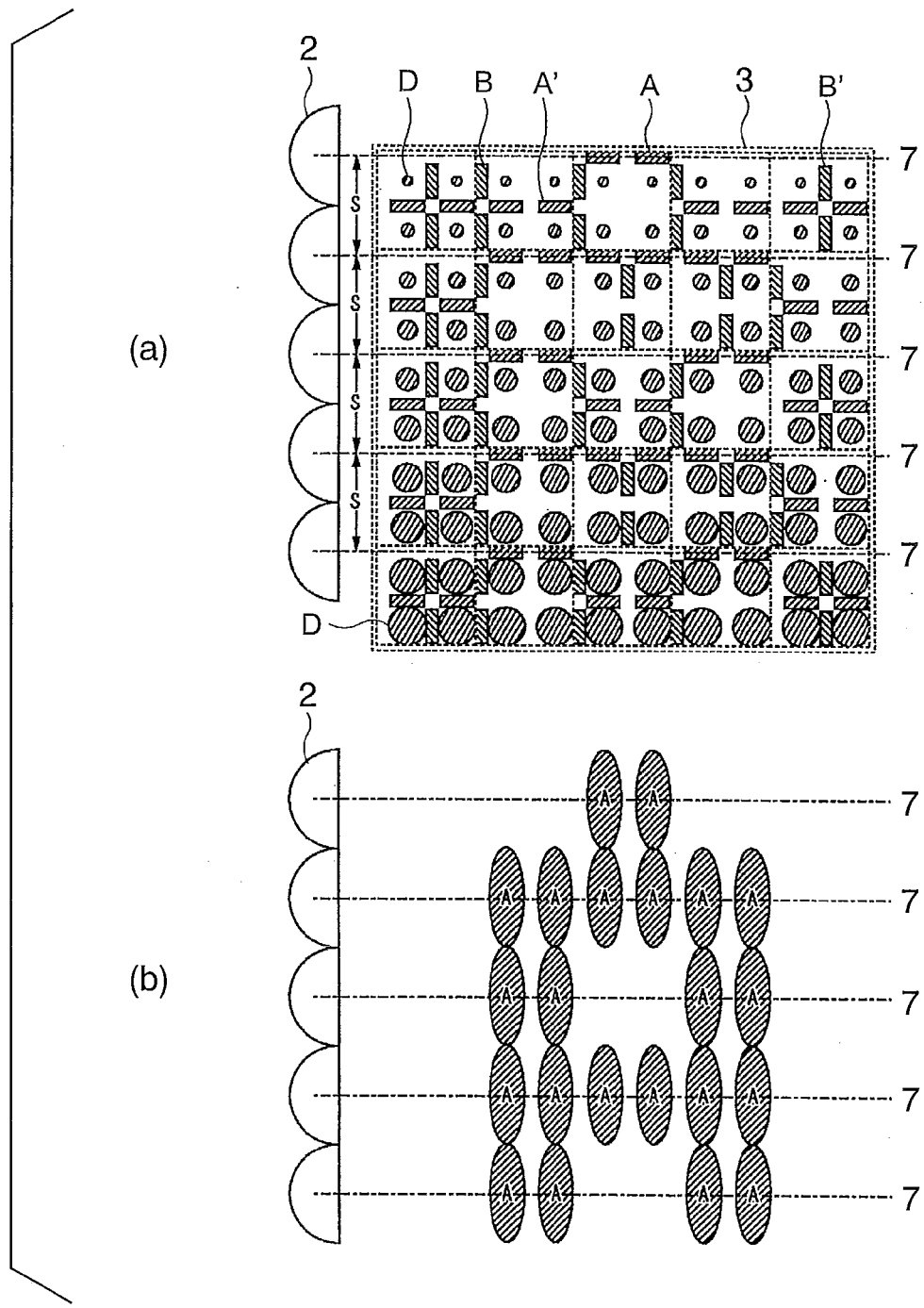
FIG. 64 shows explanatory views of a state in which the objects A located on center lines 7 are enlarged to visualize a visible image by the characteristic of the lenticular lens.

FIG. 64 shows a state in which the discrimination tool 2 formed from a lenticular lens is overlaid on the printed pattern 3 of the printed matter 1, and the printed pattern is visually observed from the front. When the center lines 7 of the lenticular lens exist at the positions shown in FIG. 64($a$) in correspondence with the lines L1 in FIG. 61, the objects A are located on the center lines 7. Since the objects A located on the center lines 7 look enlarged due to the characteristics of the lenticular lens, a visible image having the graphic pattern shown in FIG. 64($b$) is visualized upon visual observation. The objects A and A' have an on/off relationship. Hence, the first invisible image is visualized as a visible image that looks negative or positive.

Figure 65:
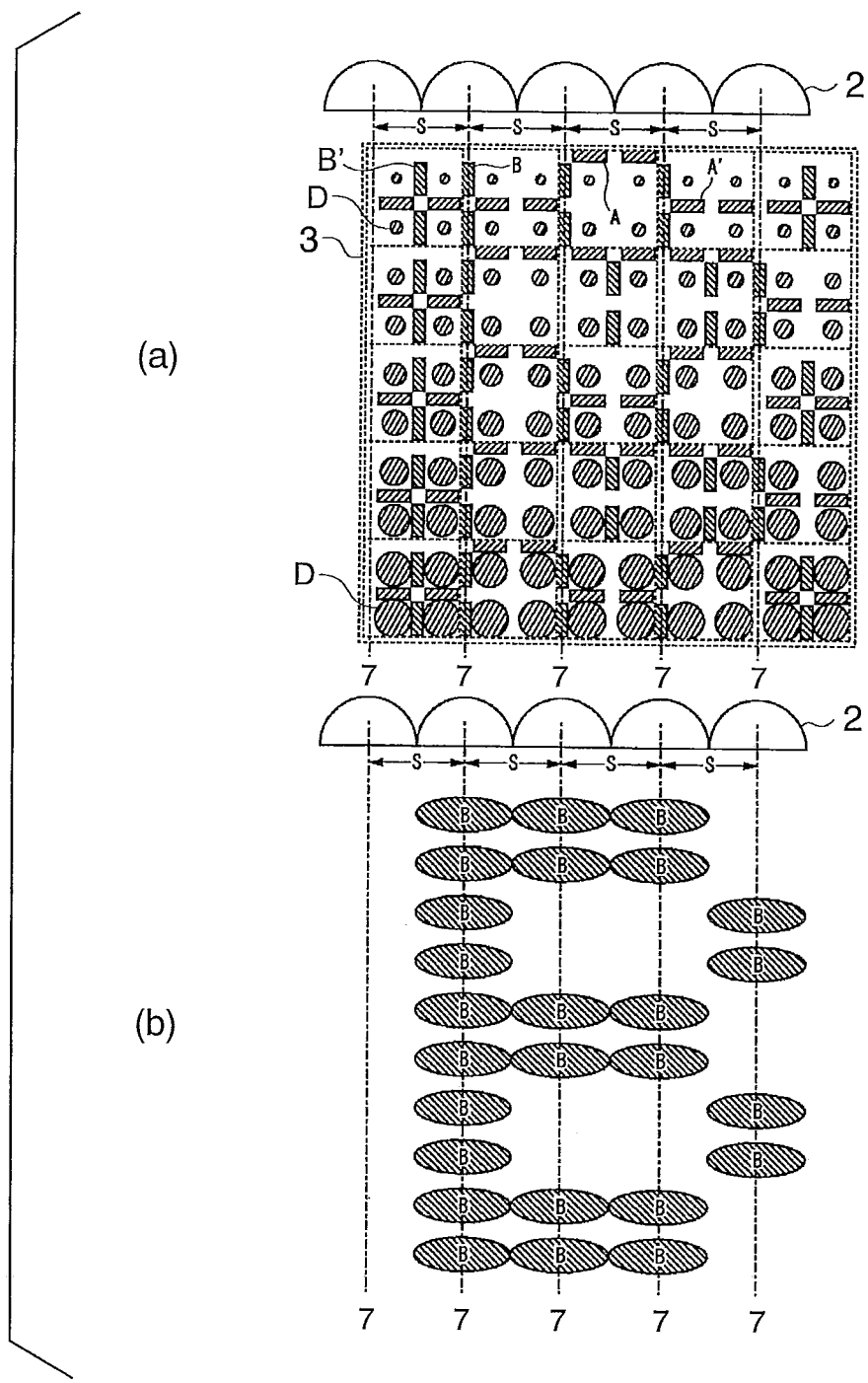
FIG. 65 shows explanatory views of a state in which the objects B located on the center lines 7 are enlarged to visualize a visible image by the characteristic of the lenticular lens.

On the other hand, when the center lines 7 of the lenticular lens exist at the positions shown in FIG. 65($a$) in correspondence with the lines L2 in FIG. 61, the objects B are located on the center lines 7. Since the objects B located on the center lines 7 look enlarged due to the characteristics of the lenticular lens, a visible image having the graphic pattern shown in FIG. 65(b) is visualized upon visual observation. The objects B and B' have an on/off relationship. Hence, the second invisible image is visualized as a visible image that looks negative or positive.

The discrimination tool 2 need not always be the lenticular lens. The same effect can be obtained using, for example, a parallel line filter. In the parallel line filter, portions corresponding to the parallel lines on the filter hide objects constructing the visible image so that only the objects constructing the invisible image can be confirmed. The filter may fail in completely hiding the visible image and allow to visually recognize it to some extent. However, this does not impair the effect of the present invention, and the parallel line filter suffices for simple discrimination. Note that this also applies to the embodiments to be described later.

(Anti-Counterfeit Printed Matter C9)

Even in the state of the printed pattern 3 shown in FIG. 62, the invisible images are formed upon naked eye observation. However, the density partially appears to be high (dark) or low (light) near the units arranged in a matrix. That is, density imbalance may occur upon naked eye observation. Such density imbalance acts as a noise component in the pattern 4 having the continuous tone expressed by the objects D and degrades the visibility of the visible image.

To relax the apparent density imbalance, object deletion and addition are executed for each unit [h,v] that is the minimum unit by the algorithm shown in FIG. 46. Note that [h,v] is the number of steps corresponding to the number of units counted vertically from the upper side, and [h] is the number of steps corresponding to the number of units counted horizontally from the left side. First, in the process f1, concerning the units [h,v] of each column of the matrix, the objects A[h,v] and A'[h,v] are sequentially detected. Note that as for the method of detecting the objects A[h,v] and A'[h,v], for example, if the printed pattern 3 is a binary image having the bitmap format, the object A[h,v] or A[h,v] may be identified and deleted in a process target unit by processing called labeling in general.

Next, if a condition that the unit [h,v] includes the objects A'[h,v], and the unit [h,v+1] includes the objects A[h,v+1] is satisfied in the process f2, the objects A'[h,v] which should be arranged originally in the unit [v] are deleted in the process f3. More specifically, when the unit [h,v], unit [h,v+1], and unit [h,v+2] are arranged, and the objects A'[h,v] of the unit [h,v] are adjacent to the objects A[h,v+1] of the unit [h,v+1], as shown in FIG. 66(a), the objects A'[h,v] of the unit [h,v] are deleted, as shown in FIG. 66(b). If the condition of the process f2 is not satisfied, the process advances to the process f4. Since the objects A' are partially deleted, the total area of the objects A' is smaller than that of the objects A.

In addition, object deletion and addition are executed for each unit [h,v] that is the minimum unit by the algorithm shown in FIG. 47. First, in the process f11, concerning the units [h,v] of each column of the matrix, the objects B[h,v] and B'[h,v] are sequentially detected. Note that as for the method of detecting the objects B[h,v] and B'[h,v], for example, if the printed pattern 3 is a binary image having the bitmap format, the object B[h,v] or B'[h,v] may be identified and deleted in a process target unit by processing called labeling in general.

Next, if a condition that the unit [h,v] includes the objects B'[h,v], and the unit [h+1,v] includes the objects B[h+1,v] is satisfied in the process f12, the object B'[h,v] which should be arranged originally in the unit [h,v] are deleted in the process f13. More specifically, when the unit [h,v], unit [h+1,v], and unit [h+2,v] are arranged, and the object B'[h,v] of the unit [h,v] is adjacent to the object B[h+1,v] of the unit [h+1,v], as shown in FIG. 66(c), the objects B'[h,v] of the unit [h,v] are deleted, as shown in FIG. 66(d). If the condition of the process f12 is not satisfied, the process advances to the process 14. In addition, since the objects A' are partially deleted, the total area of the objects B' is smaller than that of the objects B.

Figure 67:
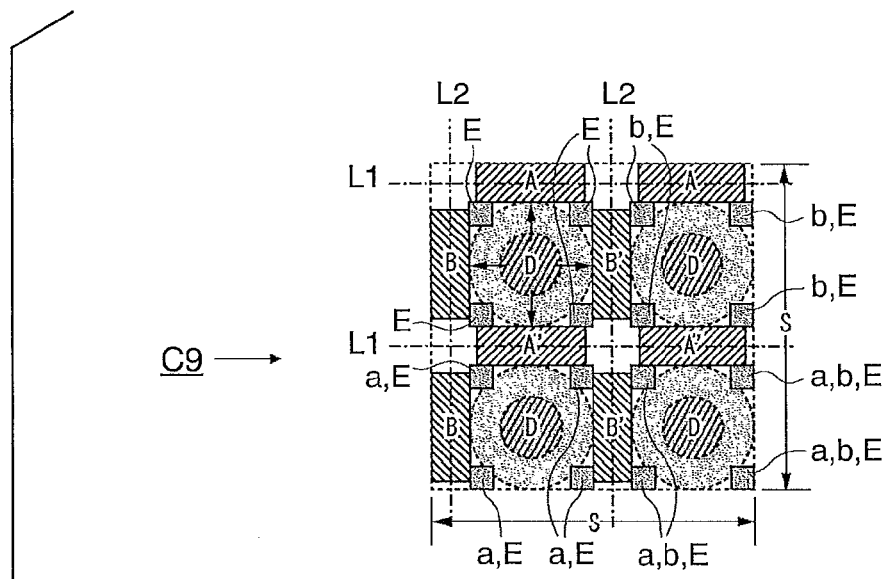
FIG. 67 shows a plan view and a conceptual view of the object arrangement of the unit [h,v] of an anti-counterfeit printed matter C9.
Figure 67:
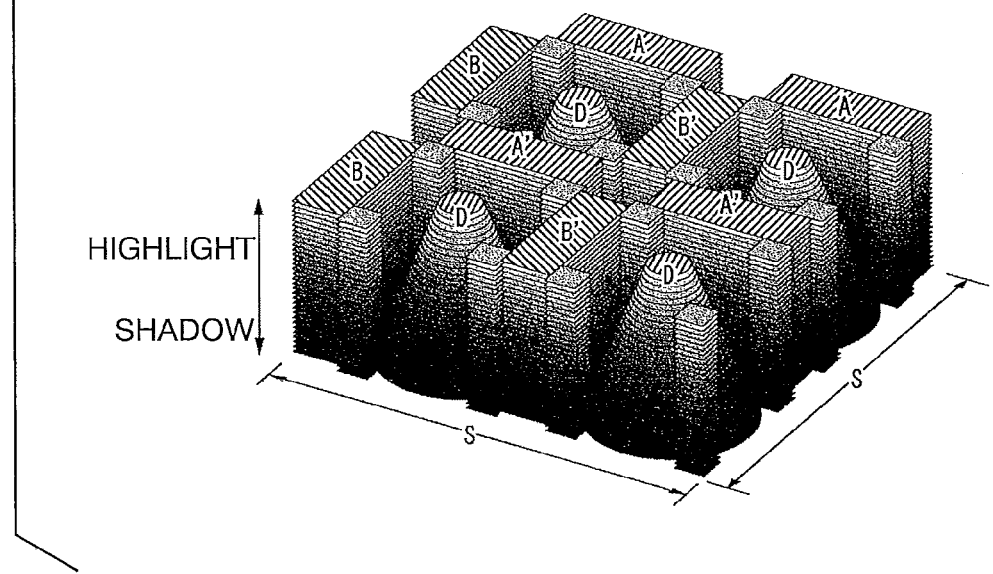

FIG. 67(a) is a plan view showing the object arrangement of the unit [h,v] of the anti-counterfeit printed matter C9. The basic object arrangement is the same as that shown in FIG. 61. In addition to the objects D that produce the continuous tone, the objects a, b, and E are provided to relax density imbalance. The objects a, b, and E are located in the regions occupied by the objects D in FIG. 61 and arranged around the objects D so as to be adjacent to the objects A, A', B, and B'. The total object area of the objects a, b, or E in the unit [h,v] is 1/2 or almost 1/2 the object area of the objects A, A', B, or B' in the unit [h,v]. The almost 1/2 object area indicates an object area ratio of 40% to 60% when the object area ratio of the objects A, A', B, or B' is defined as 100%. At an object area ratio of 40% or less, the density appears to be low, and the density imbalance cannot be relaxed. At an object area ratio higher than 60%, the density appears to be high, and the density imbalance cannot be relaxed. Note that this also applies to the following embodiments. Note that the objects D construct the pattern 4 having an arbitrary continuous tone shown in FIG. 58. As shown in the conceptual view of FIG. 67(b), the size of the object D changes in accordance with the continuous tone from highlight to shadow, thereby determining the density of the printed pattern 3 shown in FIG. 58.

Figure 68:
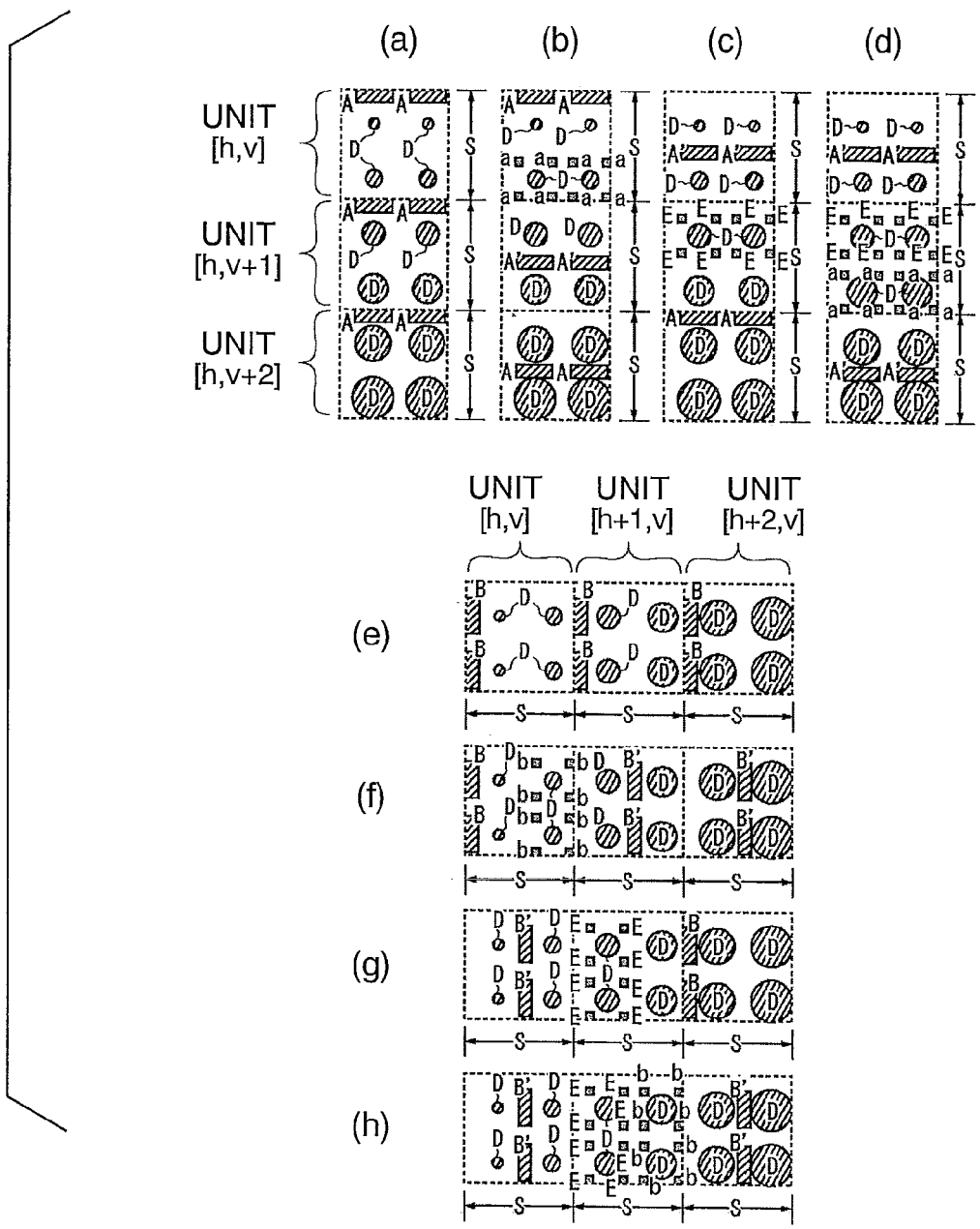
FIG. 68 shows views of a state in which the objects a and E having an object area 1/2 or almost 1/2 that of the object A, A', B, or B' are added in accordance with the algorithms in FIGS. 46 and 47.

If a condition that the unit [h,v] includes the objects A[h,v], and the unit [h,v+1] includes the objects A'[h,v+1] is satisfied in the process f4 shown in FIG. 46, the objects a[h,v] are added to the unit [h,v] in the process f5. More specifically, as shown in FIG. 68(b), the objects a having an object area 1/2 or almost 1/2 that of the objects A or A' are added to the unit [h,v]. This relaxes the density imbalance upon naked eye observation between the unit [h,v] and the unit [h,v+1]. On the other hand, if a condition that the unit [h,v] includes the objects B[h,v], and the unit [h+1,v] includes the objects B'[h+1,v] is satisfied in the process f14 shown in FIG. 47, the objects b[h,v] are added to the unit [h,v] in the process f15. More specifically, as shown in FIG. 68(f), the objects b having an object area 1/2 or almost 1/2 that of the objects B or B' are added to the unit [h,v]. This relaxes the density imbalance upon naked eye observation between the unit [h,v] and the unit [h+1,v].

If a condition that the unit [h,v] includes the objects A'[h,v], the unit [h,v+1] includes no object, and the unit [h,v+2] includes the objects A[h,v+2] is satisfied in the process f6 shown in FIG. 46, the objects E are added to the unit [h,v+1] in the process f7. More specifically, as shown in FIG. 68(c), the objects E having an object area 1/2 or almost 1/2 that of the objects A or A' are added to the unit [h,v+1]. This relaxes the density imbalance upon naked eye observation between the unit [h,v] and the unit [h,v+2]. On the other hand, if a condition that the unit [h,v] includes the objects B'[h,v], the unit [h+1,v] includes no object, and the unit [h+2,v] includes the objects B[h+2,v] is satisfied in the process f16 shown in FIG. 47, the objects E are added to the unit [h+1,v] in the process f17. More specifically, as shown in FIG. 68(g), the objects E having an object area 1/2 or almost 1/2 that of the objects B or B' are added to the unit [h+1,v]. This relaxes the density imbalance upon naked eye observation between the unit [h,v] and the unit [h+2,v].

Figure 69:
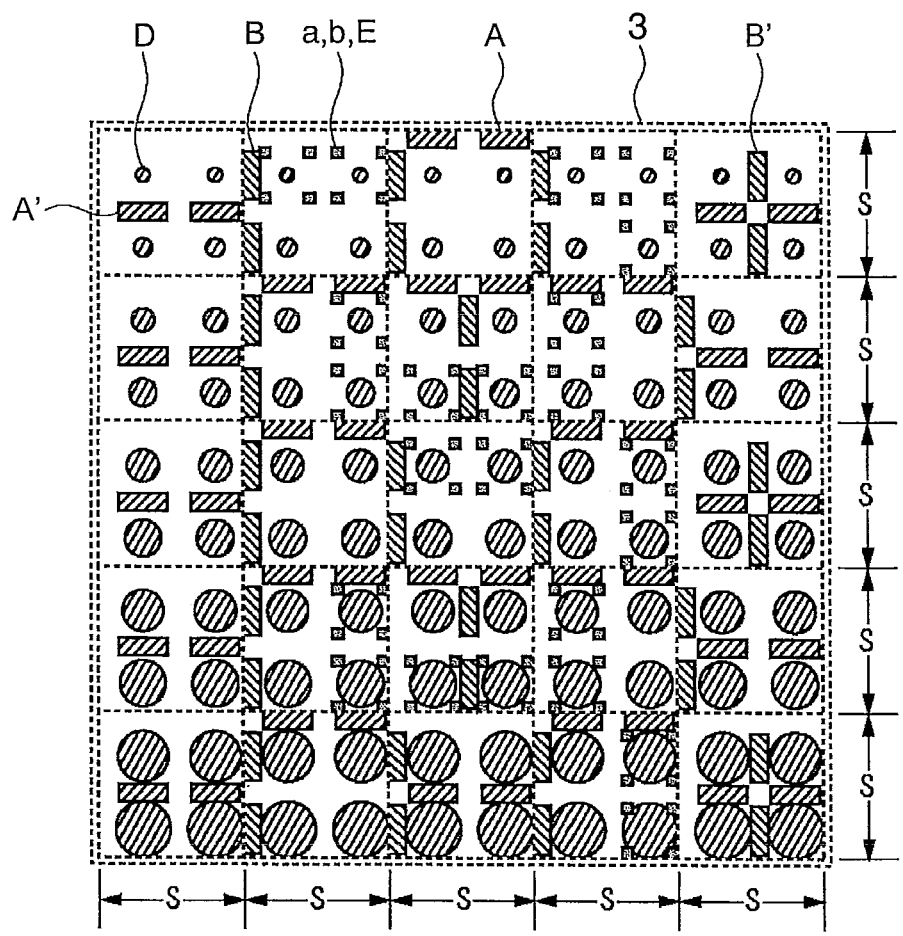
FIG. 69 is an explanatory view showing a state in which the density imbalance upon naked eye observation is relaxed throughout the printed pattern 3 in accordance with the algorithms in FIGS. 46 and 47.

If a condition that the unit [h,v] includes the objects A'[h,v], the unit [h,v+1] includes no object, and the unit [h,v+2] includes the objects A'[h,v+2] is satisfied in the process f8 shown in FIG. 46, the objects E and a are added to the unit [h,v+1] in the process f9. More specifically, as shown in FIG. 68(d), the objects E and a having an object area 1/2 or almost 1/2 that of the objects A or A' are added to the unit [h,v+1]. This relaxes the density imbalance upon naked eye observation between the unit [h,v] and the unit [h,v+2]. On the other hand, if a condition that the unit [h,v] includes the objects B'[h,v], the unit [h+1,v] includes no object, and the unit [h+2,v] includes the objects B'[h+2,v] is satisfied in the process f18 shown in FIG. 47, the objects E and b are added to the unit [h+1,v] in the process f19. More specifically, as shown in FIG. 68(h), the objects E and b having an object area 1/2 or almost 1/2 that of the objects B or B' are added to the unit [h+1,v]. This relaxes the density imbalance upon naked eye observation between the unit [h,v] and the unit [h+2,v]. Hence, when the processes f4 to f8 in FIG. 46 and the processes f14 to f18 in FIG. 47 are applied to the printed pattern 3 in FIG. 64(a), the density imbalance upon naked eye observation is relaxed throughout the printed pattern 3 shown in FIG. 69.

(Anti-Counterfeit Printed Matter C10)

Figure 70:
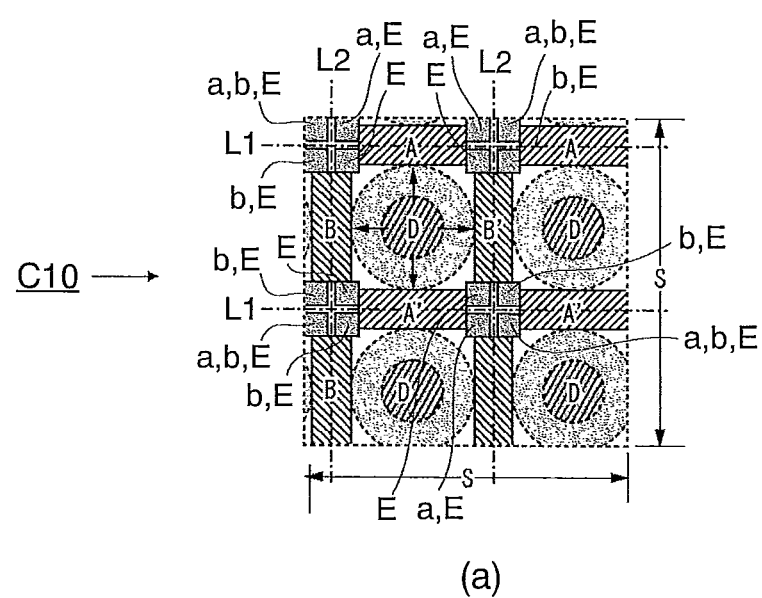
FIG. 70 shows a plan view and a conceptual view of the object arrangement of the unit [h,v] of an anti-counterfeit printed matter C10.
Figure 70:
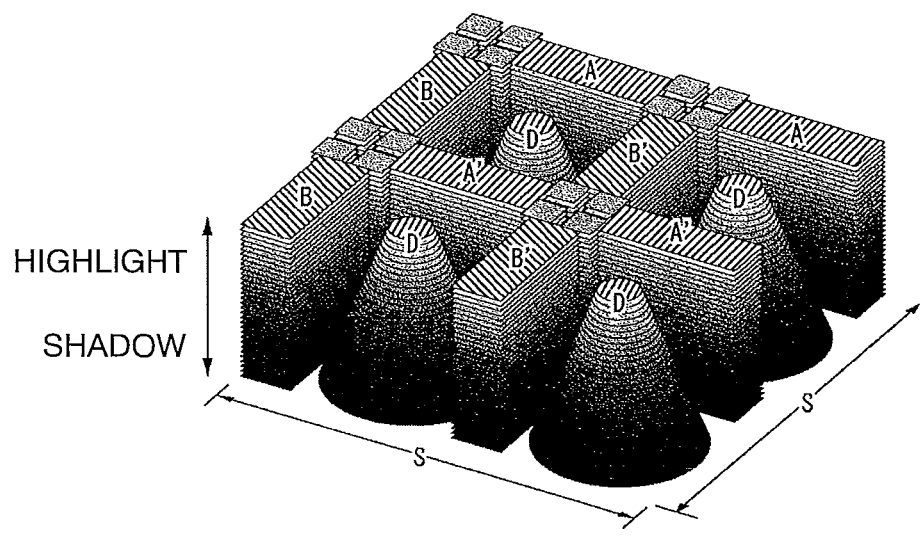
Figure 71:
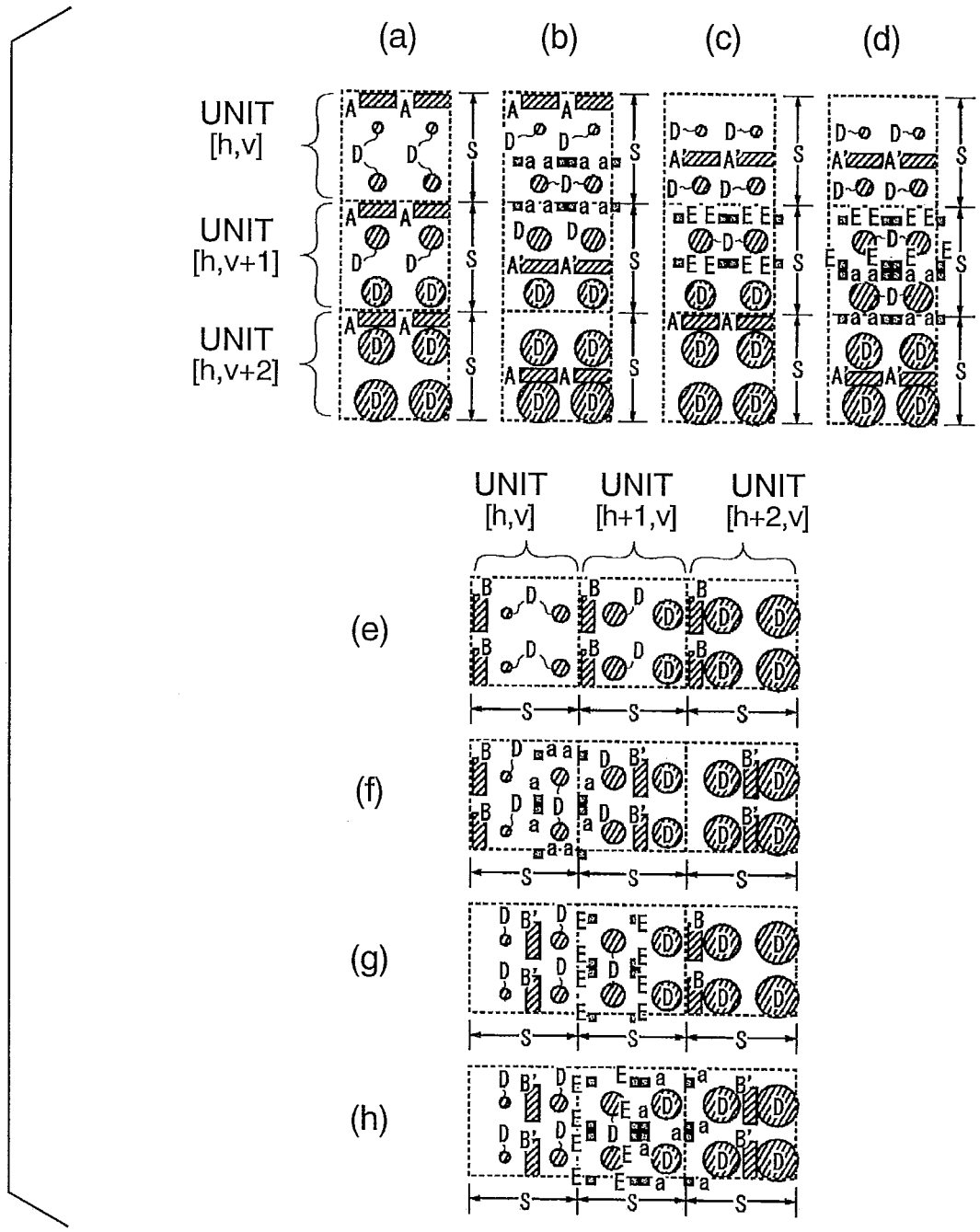
FIG. 71 shows views of a state in which the objects a and E having an object area 1/2 or almost 1/2 that of the object A, A', B, or B' are added in accordance with the algorithms in FIGS. 46 and 47.

To relax density imbalance in the anti-counterfeit printed matter C9, in the object arrangement of the unit [h,v], the objects a, b, and E are provided in the regions T occupied by the objects D in FIG. 61 to relax density imbalance in addition to the objects D that produce the continuous tone. The objects a, b, and E may be provided outside the regions T occupied by the objects D if the effects of the present invention are not impeded. FIG. 70(a) shows the object arrangement of the unit [h,v] of the anti-counterfeit printed matter C10. The basic object arrangement is the same as that shown in FIG. 61. The role of the objects a, b, and E to relax density imbalance is the same as in the anti-counterfeit printed matter C9. The objects a, b, and E are located outside the regions occupied by the objects D shown in FIG. 61 so as to be adjacent to the objects A, A', B, and B'. The total object area of the objects a, b, or E in the unit [h,v] is 1/2 or almost 1/2 the object area of the objects A, A', B, or B' in the unit [h,v]. Note that the objects D construct the pattern 4 having an arbitrary continuous tone shown in FIG. 58. As shown in the conceptual view of FIG. 70(b), the size of the object D changes in accordance with the continuous tone from highlight to shadow, thereby determining the density of the printed pattern 3 shown in FIG. 58.

In addition, the density partially appears to be high (dark) or low (light) near the units arranged in a matrix. That is, density imbalance occurs upon naked eye observation. To relax this, the objects A' that satisfy the conditions of the processes f1 to f3 of the algorithm shown in FIG. 46 are deleted, and additionally, the objects B' that satisfy the conditions of the processes f11 to f13 of the algorithm shown in FIG. 47 are deleted, as in the anti-counterfeit printed matter C9. As a result, the same arrangements as those shown in FIGS. 66(b) and 66(d) are obtained.

Figure 72:
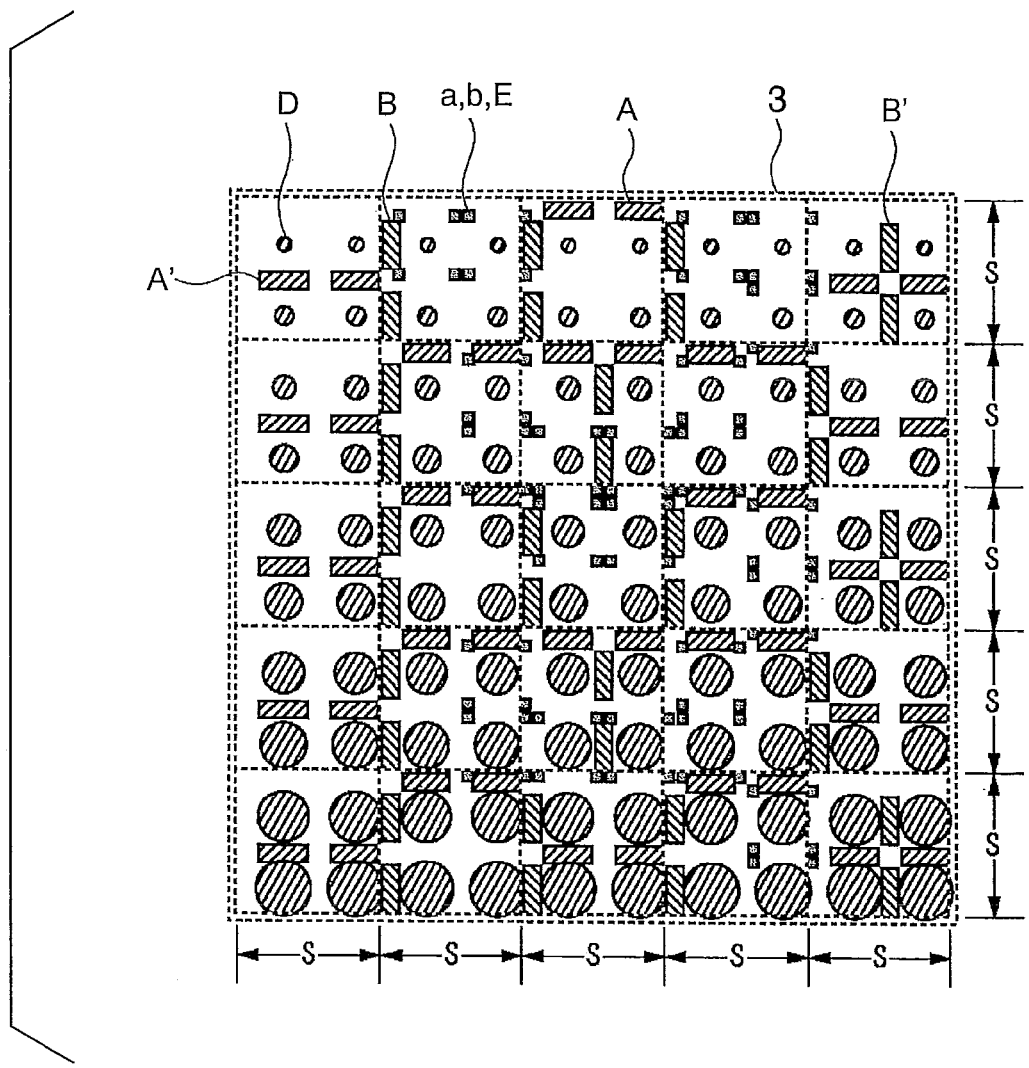
FIG. 72 is an explanatory view showing a state in which the density imbalance upon naked eye observation is relaxed throughout the printed pattern 3 in accordance with the algorithms in FIGS. 46 and 47.

Next, as in the anti-counterfeit printed matter C9, the objects a, b, and E to relax density imbalance upon naked eye observation are applied to the printed pattern 3 in FIG. 64(a) by the processes f4 to f8 in FIG. 46 and the processes f14 to f18 in FIG. 47 to obtain the object arrangements shown in FIGS. 71(a) to 71(h). Additionally, the density imbalance upon naked eye observation is relaxed throughout the printed pattern 3 shown in FIG. 72.

(Anti-Counterfeit Printed Matter C11)

Figure 73:
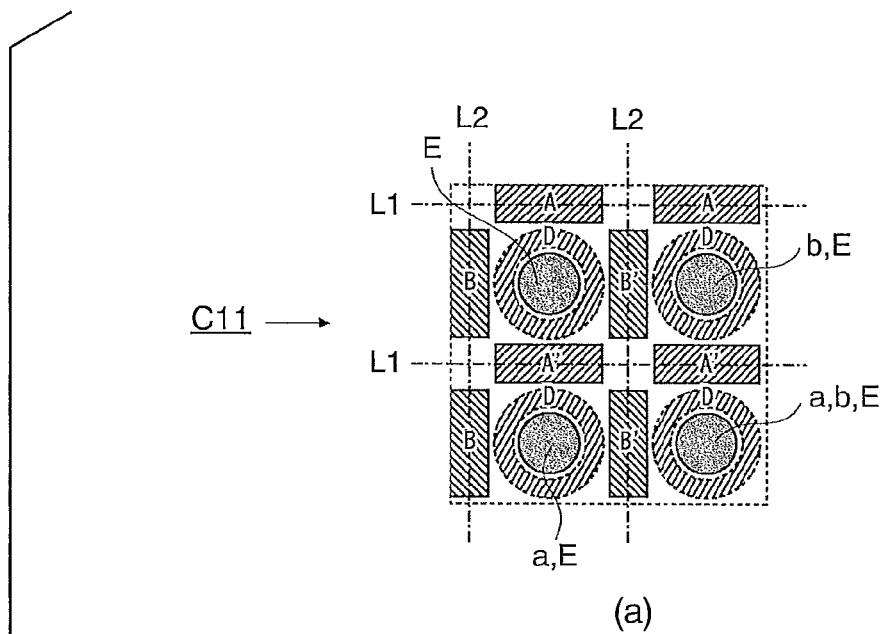
FIG. 73 shows a plan view and a conceptual view of the object arrangement of the unit [h,v] of an anti-counterfeit printed matter C11.
Figure 73:
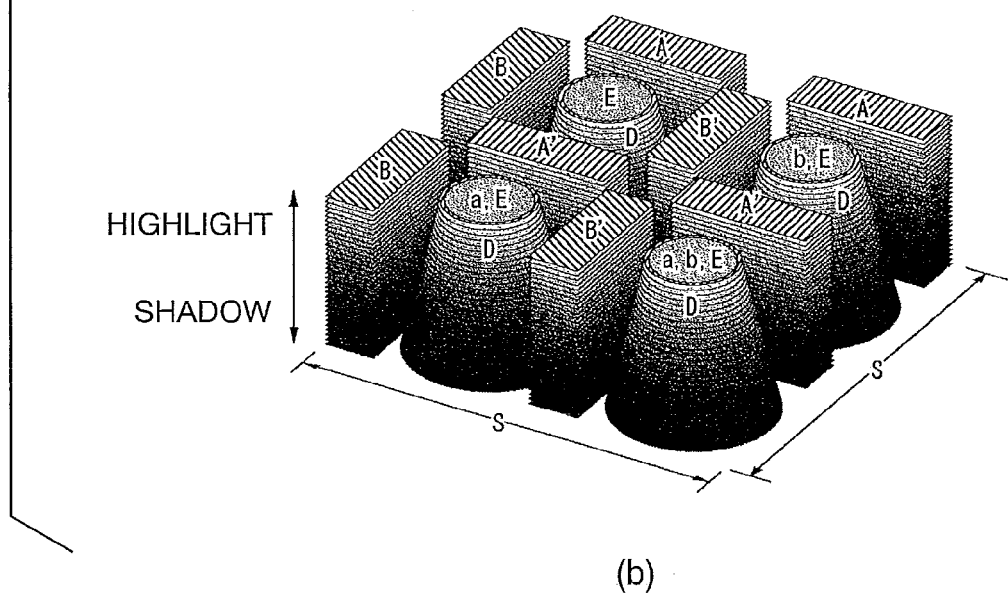
Figure 74:
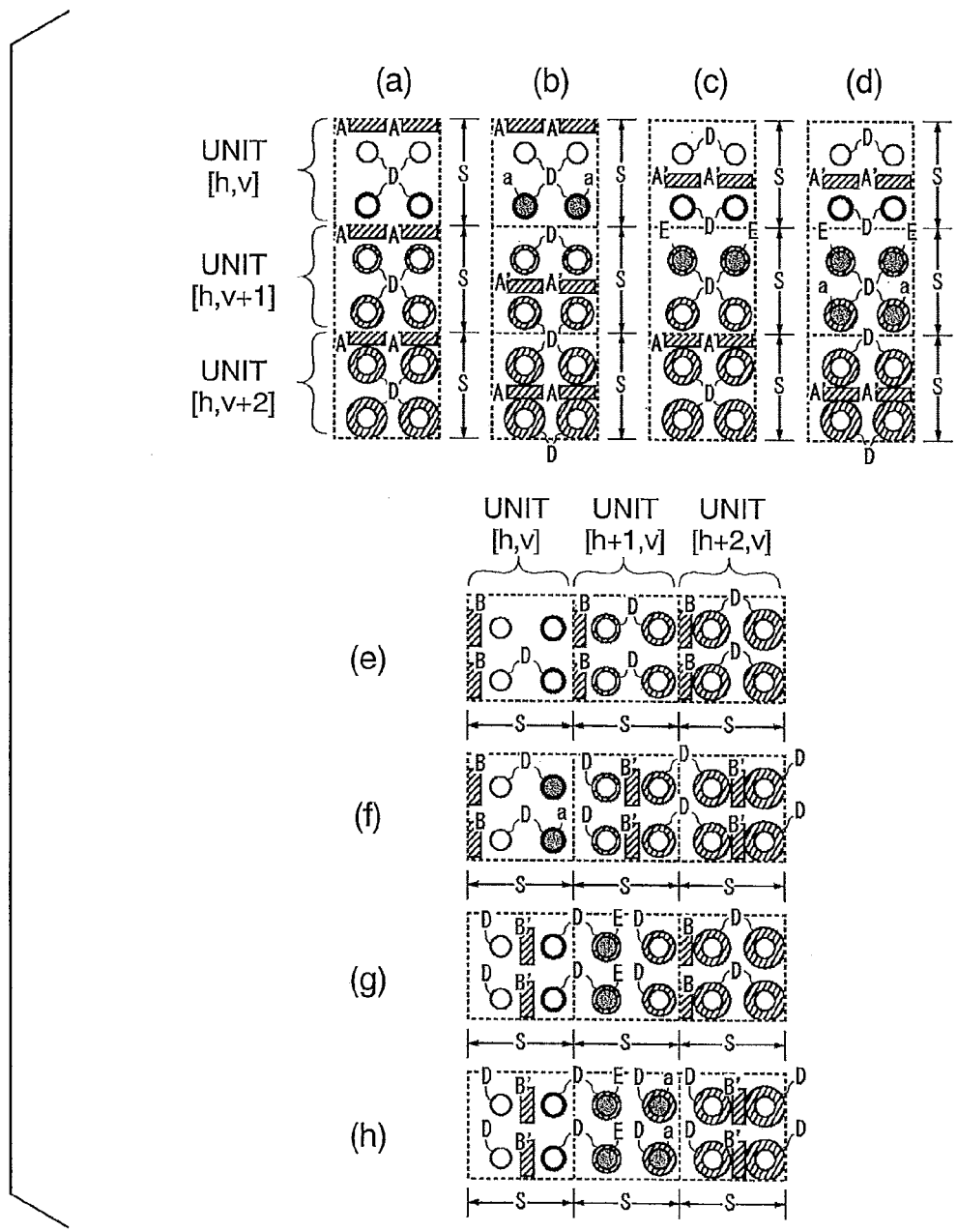
FIG. 74 shows views of a state in which the objects a and E having an object area 1/2 or almost 1/2 that of the object A, A', B, or B' are added in accordance with the algorithms in FIGS. 46 and 47.

To relax density imbalance in the anti-counterfeit printed matters C9 and C10, in the object arrangement of the unit [h,v], the objects a, b, and E are provided around the objects D that produces the continuous tone to relax the density imbalance. The objects a, b, and E may be provided at or almost at the centers of the regions T occupied by the objects D shown in FIG. 61 if the effects of the present invention are not impeded. FIG. 73(a) shows the object arrangement of the unit [h,v] of the anti-counterfeit printed matter C11. The basic object arrangement is the same as that shown in FIG. 61. The role of the objects a, b, and E to relax density imbalance is the same as in the anti-counterfeit printed matters C9 and C10. The objects a, b, and E are located at or almost at the centers of the regions occupied by the objects D shown in FIG. 61 not to come into contact with the objects A, A', B, and B'. The object area of the objects a, b, or E in the unit [h,v] is 1/2 or almost 1/2 the object area of the objects A, A', B, or B' in the unit [h,v]. Note that the objects D are doughnut-shaped objects surrounding the objects a, b, and E to relax density imbalance and construct the pattern 4 having an arbitrary continuous tone shown in FIG. 58. As shown in the conceptual view of FIG. 73(b), the width of the doughnut-shaped object D changes in accordance with the continuous tone from highlight to shadow, thereby determining the density of the printed pattern 3 shown in FIG. 58.

In addition, the density partially appears to be high (dark) or low (light) near the units arranged in a matrix. That is, density imbalance occurs upon naked eye observation. To relax this, the objects A' that satisfy the conditions of the processes f1 to f3 of the algorithm shown in FIG. 46 are deleted, and additionally, the objects B' that satisfy the conditions of the processes f11 to f13 of the algorithm shown in FIG. 47 are deleted, as in the anti-counterfeit printed matter C9. As a result, the same arrangements as those shown in FIGS. 66(b) and 66(d) are obtained.

Figure 75:
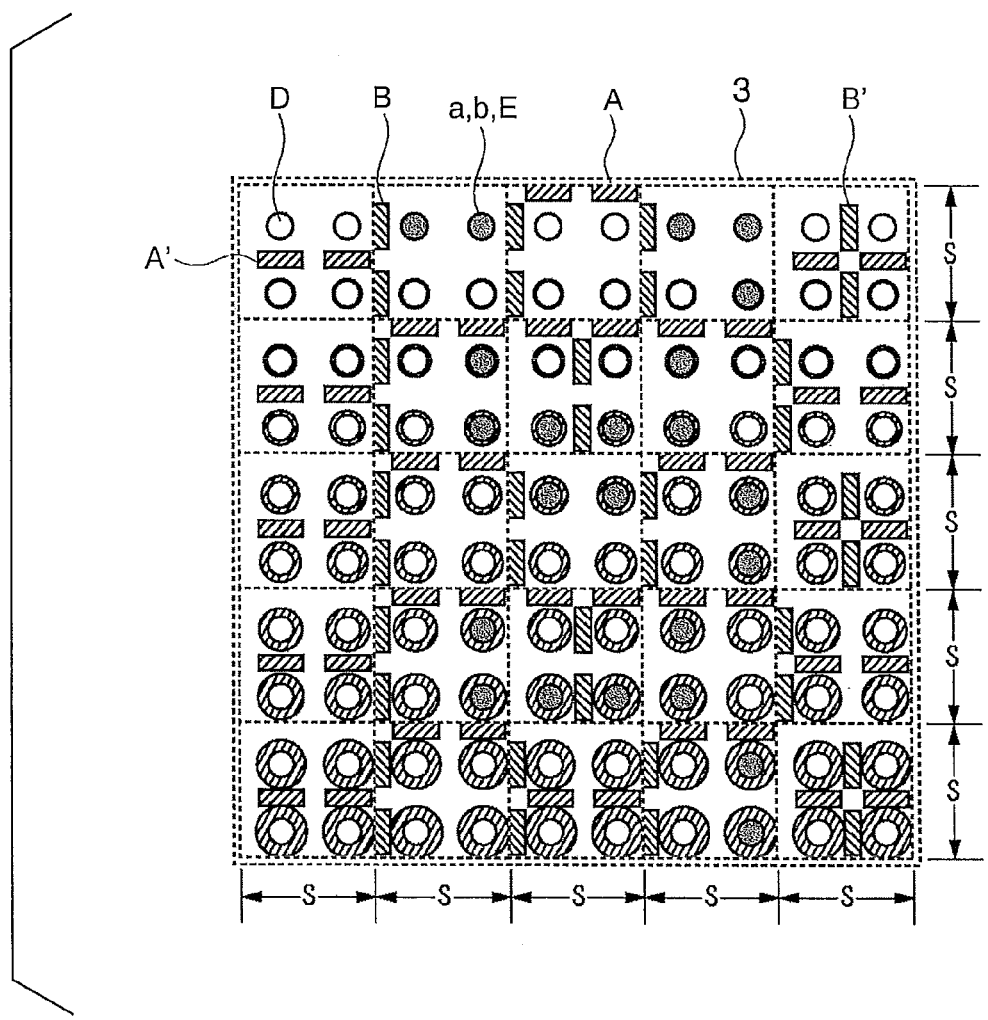
FIG. 75 is an explanatory view showing a state in which the density imbalance upon naked eye observation is relaxed throughout the printed pattern 3 in accordance with the algorithms in FIGS. 46 and 47.

Next, as in the anti-counterfeit printed matters C9 and C10, the objects a, b, and E to relax density imbalance upon naked eye observation are applied to the printed pattern 3 in FIG. 64(a) by the processes f4 to f8 in FIG. 46 and the processes f14 to f18 in FIG. 47 to obtain the object arrangements shown in FIGS. 74(a) to 74(h). Additionally, the density imbalance upon naked eye observation is relaxed throughout the printed pattern 3 shown in FIG. 75.

(Anti-Counterfeit Printed Matter C12)

Figure 76:
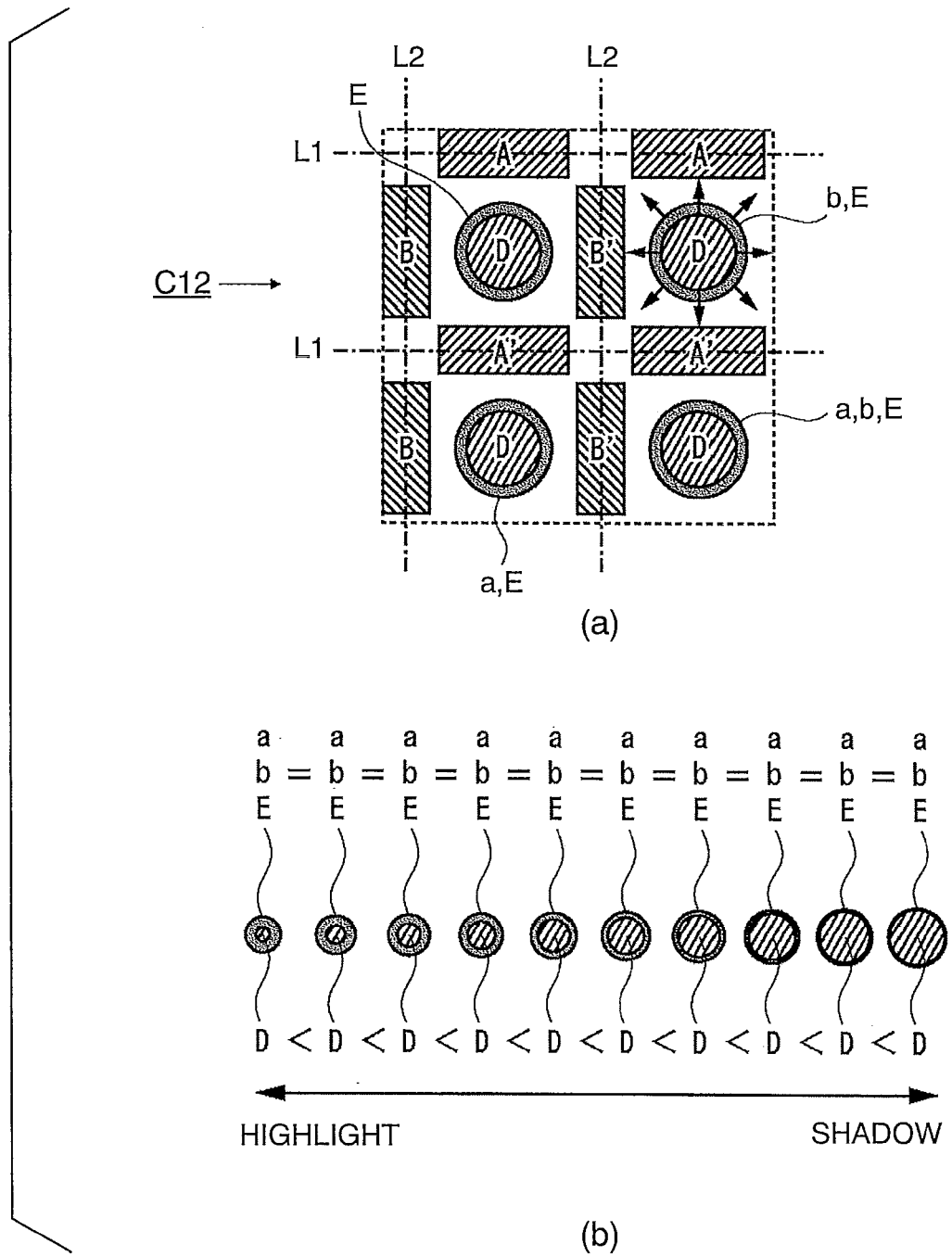
FIG. 76 shows a plan view and a conceptual view of the object arrangement of the unit [h,v] of an anti-counterfeit printed matter C12.

To relax density imbalance in the anti-counterfeit printed matters C9 and C10, in the object arrangement of the unit [h,v], the objects a, b, and E are provided around the objects D that produces the continuous tone to relax the density imbalance. The objects a, b, and E may be arranged to surround the objects D shown in FIG. 61 if the effects of the present invention are not impeded. FIG. 76(a) shows the object arrangement of the unit [h,v] of the anti-counterfeit printed matter C12. The basic object arrangement is the same as that shown in FIG. 61. The role of the objects a, b, and E to relax density imbalance is the same as in the anti-counterfeit printed matters C9 to C11. The objects a, b, and E are arranged to surround the objects D shown in FIG. 61 not to come into contact with the objects A, A', B, and B'. The object area of the objects a, b, or E in the unit [h,v] is 1/2 or almost 1/2 the object area of the objects A, A', B, or B' in the unit [h,v]. Note that the objects D are circular objects, and the objects a, b, and E to relax density imbalance are arranged to surround the objects D and construct the pattern 4 having an arbitrary continuous tone shown in FIG. 58. As shown in the conceptual view of FIG. 76(b), the amount of the object D changes in accordance with the continuous tone from highlight to shadow, whereas the object a, b, or E surrounding the object D does not change the object area from highlight to shadow while conforming to the shape of the object D, thereby determining the density of the printed pattern 3 shown in FIG. 58.

In addition, the density partially appears to be high (dark) or low (light) near the units arranged in a matrix. That is, density imbalance occurs upon naked eye observation. To relax this, the objects A' that satisfy the conditions of the processes f1 to f3 of the algorithm shown in FIG. 46 are deleted, and additionally, the objects B' that satisfy the conditions of the processes f11 to f13 of the algorithm shown in FIG. 47 are deleted, as in the anti-counterfeit printed matter C9. As a result, the same arrangements as those shown in FIGS. 66(*b*) and 66(*d*) are obtained.

Figure 77:
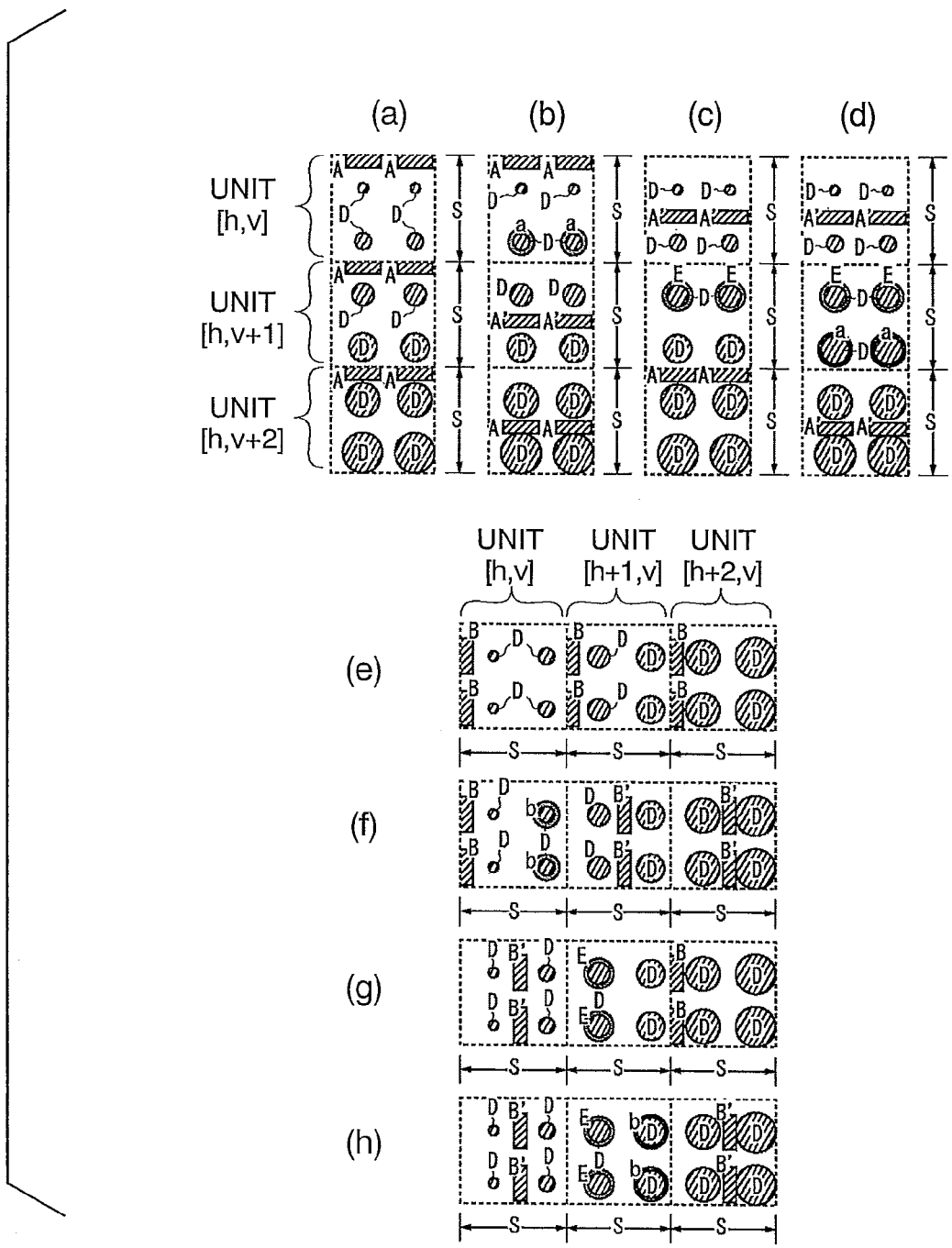
FIG. 77 shows views of a state in which the objects a and E having an object area 1/2 or almost 1/2 that of the object A, A', B, or B' are added in accordance with the algorithms in FIGS. 46 and 47.
Figure 78:
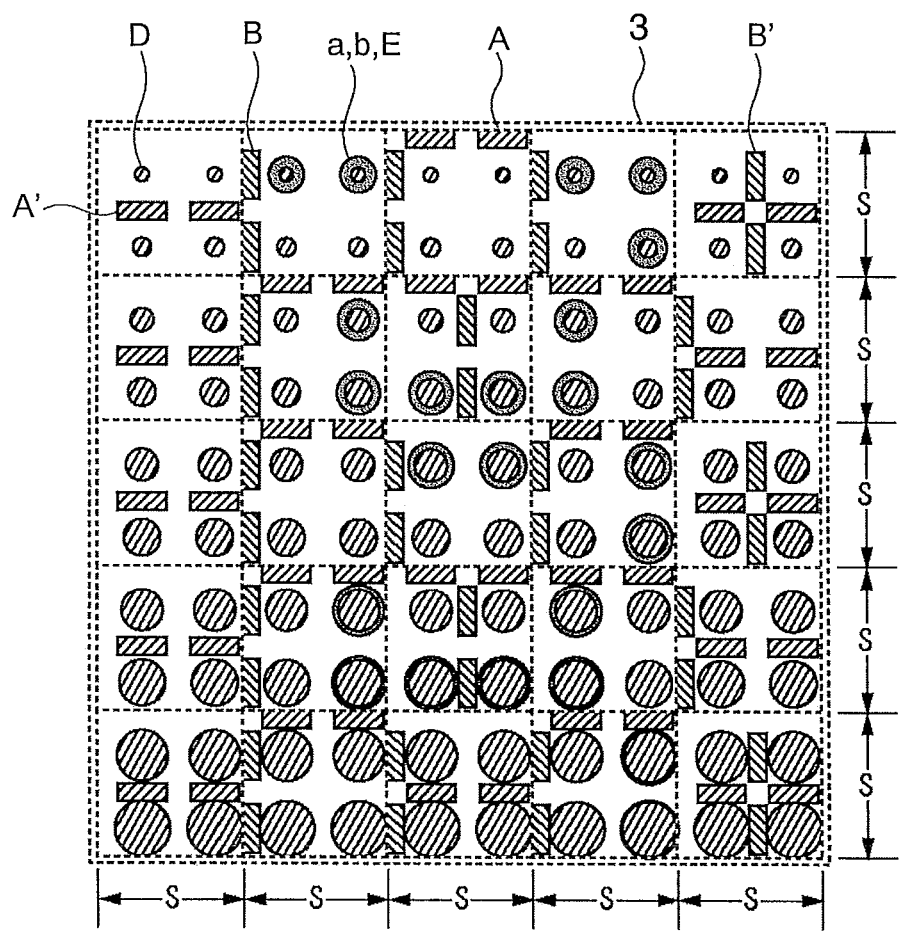
FIG. 78 is an explanatory view showing a state in which the density imbalance upon naked eye observation is relaxed throughout the printed pattern 3 in accordance with the algorithms in FIGS. 46 and 47.

Next, as in the anti-counterfeit printed matters C9 to C11, the objects a, b, and E to relax density imbalance upon naked eye observation are applied to the printed pattern 3 in FIG. 64(*a*) by the processes f4 to f8 in FIG. 46 and the processes f14 to f18 in FIG. 47 to obtain the object arrangements shown in FIGS. 77(*a*) to 77(*h*). Additionally, the density imbalance upon naked eye observation is relaxed throughout the printed pattern 3 shown in FIG. 78.

In addition, when the processes shown in FIGS. 46 and 47 are performed, a unit [h,v] which completely lacks the objects A or A' or the objects B or B' may be generated in the objects of the printed pattern 3. In this case, objects having almost the same object area as the objects A or A' or the objects B or B' are preferably added at least in the regions where the objects D shown in FIG. 61 are arranged. This further relaxes the density imbalance upon naked eye observation.

Furthermore, the objects A, A', B, B', a, b, and E of the anti-counterfeit printed matters C9 to C12 can have any shape as far as the effects of the present invention can be obtained.
(Anti-Counterfeit Printed Matter C13)

Figure 79:
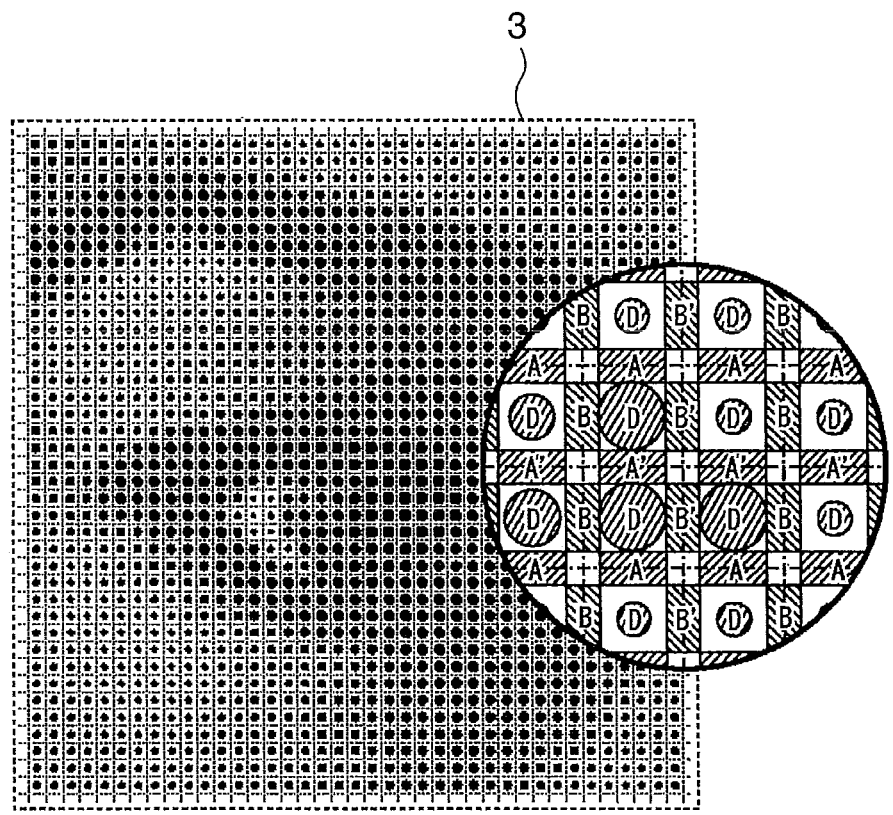
FIG. 79 is an explanatory view showing a state in which a pattern having a continuous tone in the printed pattern 3 expresses a photo image by continuously changing the size of the object D.
Figure 80:
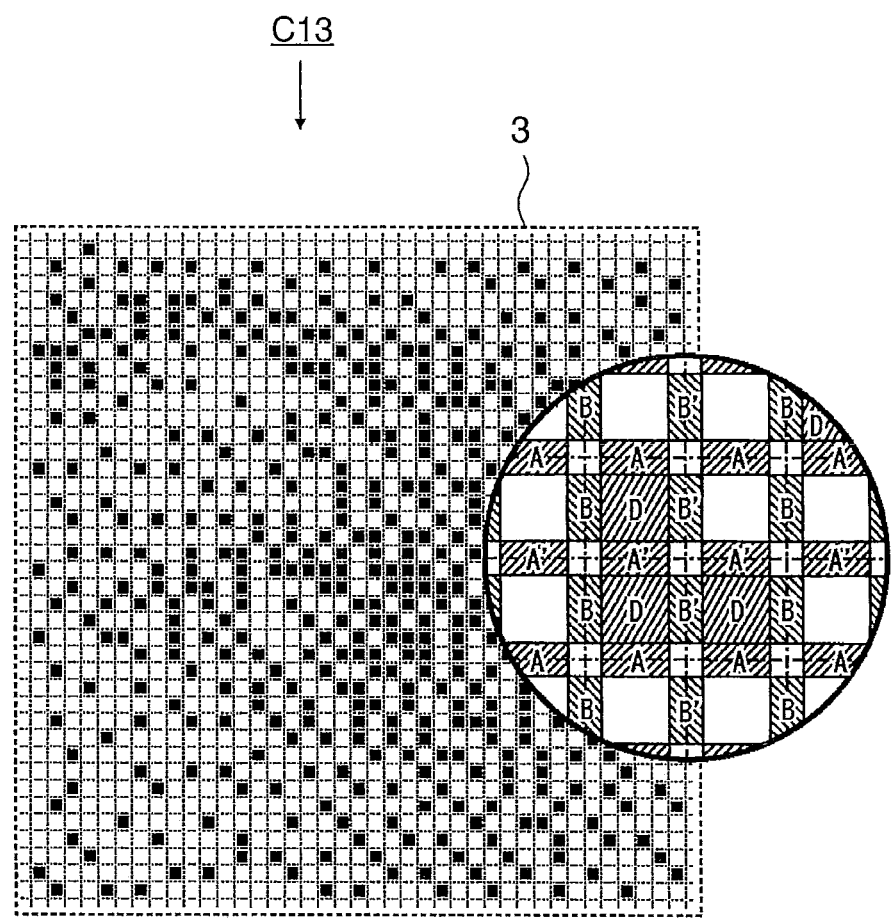
FIG. 80 is an explanatory view showing a state in which the objects in the regions occupied by the objects D having the same object area are colored at random in each of the units arranged in a matrix so as to express a relative photo tone.

In the above-described anti-counterfeit printed matters C9 to C12, the pattern having the continuous tone in the printed pattern 3 expresses a photo image by continuously changing the size of the object D, as shown in the partially enlarged view (the circle in FIG. 79) of the printed pattern 3 shown in FIG. 79. However, since the unit size is 423 µm in the anti-counterfeit printed matters C9 to C12, the highlight portion in the continuous tone is expressed by fine objects. Hence, a printing method and means having a resolution allowing to express the fine objects are necessary. The anti-counterfeit printed matter C13 may include the objects D having the same size so that it can be implemented by a printing method and means capable of solving at least the objects A, A', B, and B'. More specifically, the objects in the regions occupied by the objects D having the same object area shown in FIG. 61 may be colored at random in each of the units arranged in a matrix so as to express a relative photo tone, as shown in the partially enlarged view (the circle in FIG. 80) of the printed pattern 3 shown in FIG. 80. To color the objects D, dithering that is a known tone expression method may be used. This enables, for example, a printer having a low resolution to provide a visible image having a continuous tone image. Note that FIGS. 79 and 80 illustrate the objects A, A', B, and B' that are all colored to help understanding the basic positional relationship of the objects in the units.
(Anti-Counterfeit Printed Matter C14)

Figure 81:
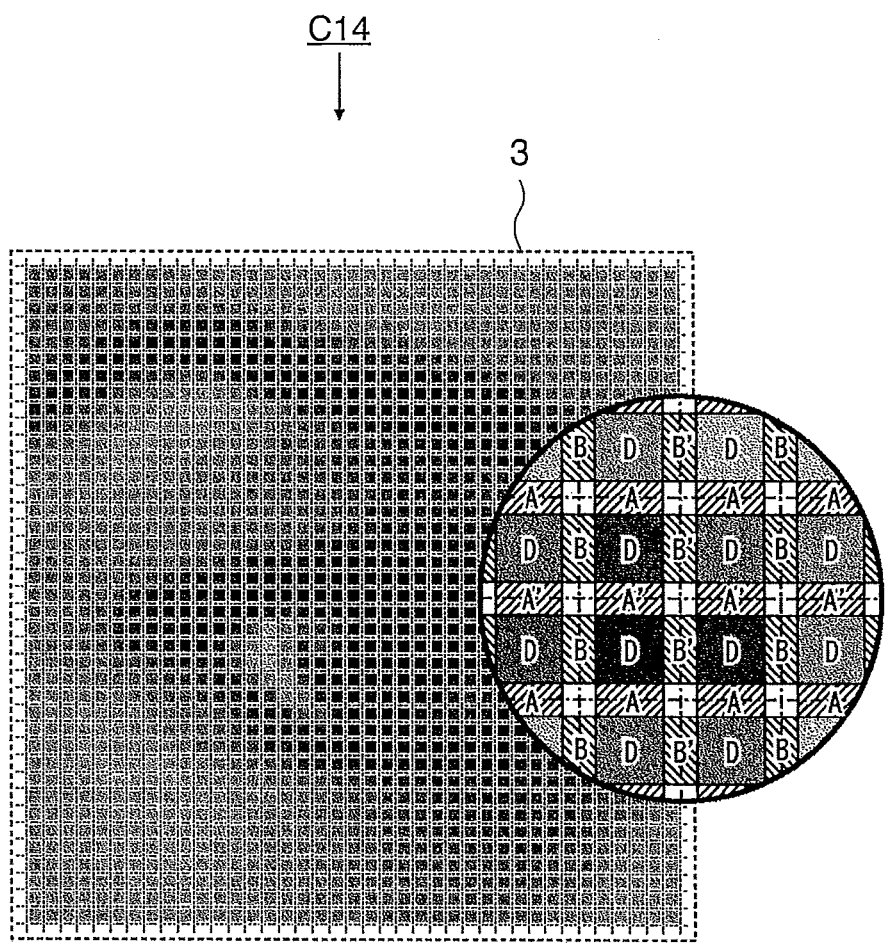
FIG. 81 is an explanatory view showing a state in which objects having different densities are arranged in a matrix in the regions occupied by the objects D so as to express a photo tone.

In the above-described anti-counterfeit printed matters C9 to C12, the pattern having the continuous tone in the printed pattern 3 expresses a photo image by continuously changing the size of the object D, as shown in the partially enlarged view (the circle in FIG. 79) of the printed pattern 3 shown in FIG. 79. However, the anti-counterfeit printed matters C9 to C12 particularly increase the applicability in commercial printing generally called prepress such as offset printing, letterpress printing, and screen printing, and the technique of the present invention is not limited to this. The anti-counterfeit printed matter C14 includes the objects D that are filled to appropriate densities in terms of grayscale. More specifically, the objects in the regions occupied by the objects D shown in FIG. 61 are colored to appropriate densities in terms of grayscale in each of the units arranged in a matrix so as to express a relative photo tone, as shown in the partially enlarged view (the circle in FIG. 81) of the printed pattern 3 shown in FIG. 81. Even when an inkjet printer capable of printing an image of photo quality is used as the method of coloring the regions occupied by the objects D, a visible image having a continuous tone image can be provided. In addition, photographic paper having a coating of a silver-halide photosensitive material may be used for the printed matter 1. Note that FIGS. 79 to 81 illustrate the objects A, A', B, and B' that are all colored to help understanding the basic positional relationship of the objects in the units.
(Anti-Counterfeit Printed Matter C15)

In the anti-counterfeit printed matters C9 to C14 having a continuous tone, the objects D shown in FIG. 61 need not always have a single color and may include a plurality of objects of subtractive color mixture of, for example, cyan, magenta, yellow, and black. This allows to express the pattern 4 having an arbitrary continuous tone in the printed pattern 3 shown in FIG. 58 as a color image. In this case, the elements to be multicolored for the color image is the objects D that construct the visible image having a continuous tone. Instead, multicoloring for the color image may be applied to an invisible image. That is, arbitrary colors may be used for the objects A, A', B, and B' that are elements of the invisible image. At this time, if the color of the objects A and A' and that of the objects B and B' are complementary colors, the image looks almost light gray upon normal observation. For example, in the printed matter 1 shown in FIG. 58, the objects A and A' in the printed pattern 3 are colored to magenta, the complementary color of magenta, that is, green is used for the objects B and B'. When the discrimination tool 2 is overlaid on the printed matter 1 at a predetermined angle (assumed to be 0°), the first invisible image 5 as shown in FIG. 59(*a*) or 59(*b*) is visualized as a visible image in magenta. When the discrimination tool 2 is overlaid on the printed matter 1 at 90° with respect to the predetermined angle, the second invisible image 6 as shown in FIG. 60(*a*) or 60(*b*) is visualized as a visible image in green. The color combination is arbitrary. For example, when the objects D that construct the visible image are monochrome, the first invisible image 5 and the second invisible image 6 visualized by the discrimination tool 2 are color images. For this reason, the observer recognizes a dramatic change. When the objects D, A, A', B, and B' are variously colored in the above-described way, printed matters can be obtained in a wide range of variations.

The significant visible image having a continuous tone is not particularly limited and can be any one of a smiley, character, number, pattern, design, and logotype if it has a continuous tone from highlight to shadow. The visible image is not particularly limited and can be any one of a character, number, pattern, design, and logotype. Note that when forming a printed matter such as an identification card or a ticket that requires personal identification, the significant visible image having a continuous tone is preferably a face image, and the invisible image is preferably personal information or the date of issue. The anti-counterfeit printed matter having a continuous tone according to the present invention is not particularly limited to an inkjet printer or a laser printer. The base material of the anti-counterfeit printed matters C8 to C15 is not particularly limited to paper or plastic.

(Halftone Dot Data Creation Apparatus A3)

Figure 82:
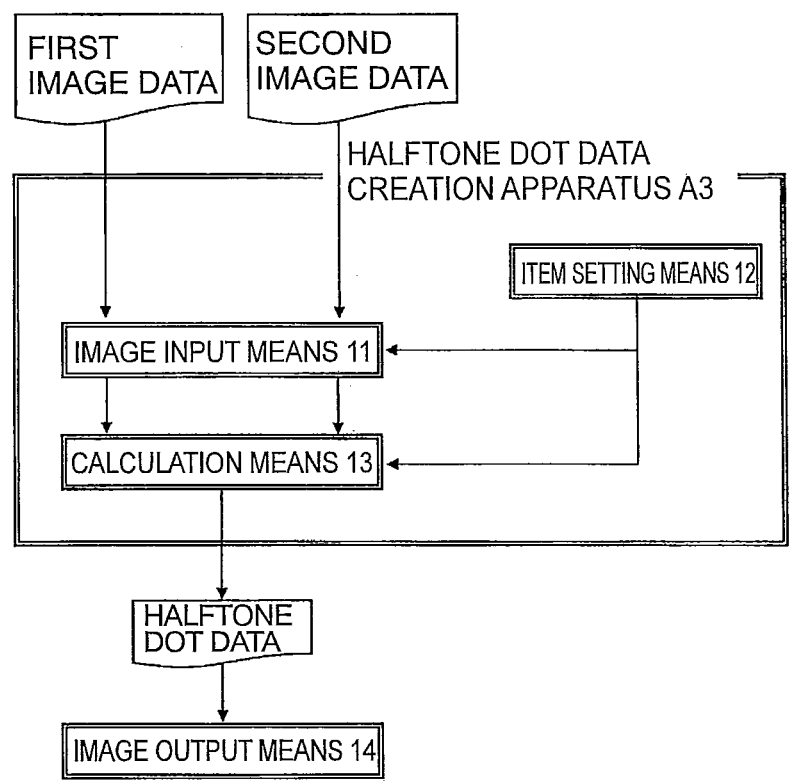
FIG. 82 is a block diagram of a halftone dot data creation apparatus A3 according to the present invention.

An apparatus for creating the above-described halftone dot data will be explained with reference to the block diagram of the apparatus shown in FIG. 82. The halftone dot data creation apparatus A3 includes the image input means 11, the item setting means 12, the calculation means 13, and the image output means 14.

(Image Input Means)

Figure 83:
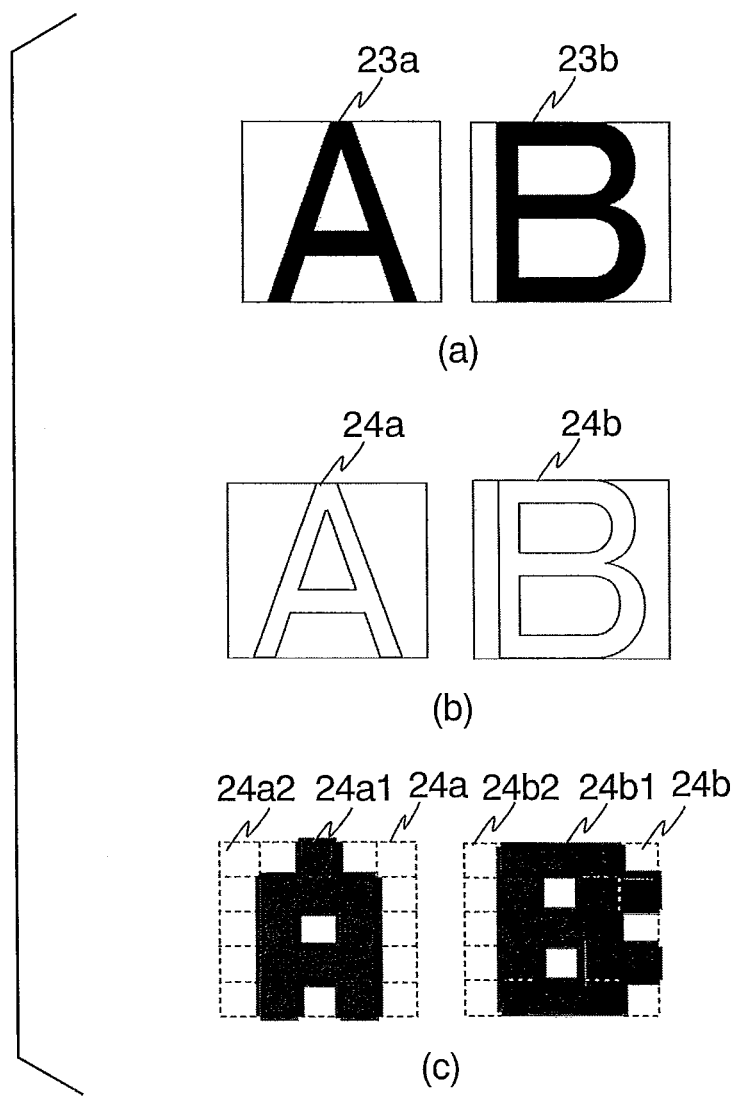
FIG. 83 shows views of the flow of data obtained by the halftone dot data creation apparatus A3 according to the present invention.

The image input means 11 inputs first image data 23a and second image data 23b as shown in FIG. 83(a) serving as the base of invisible images to be visually recognized as latent images upon overlaying a lenticular lens or a parallel line filter. The first image data 23a and the second image data 23b may be acquired by extracting predetermined information from a text file (TXT or CSV format) of personal information and the like and converting it into an image file.

(Item Setting Means)

Figure 86:
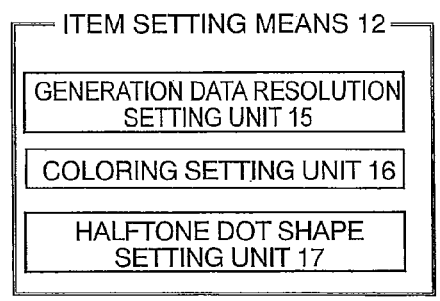
FIG. 86 is a block diagram of the item setting means of the halftone dot data creation apparatus A3 according to the present invention.

As shown in FIG. 86, the item setting means 12 includes the generation data resolution setting unit 15 which sets the resolution of halftone dot data, the coloring setting unit 16 which sets coloring, and the halftone dot shape setting unit 17 which sets the shapes of the halftone dots of the first, second, fourth, fifth, sixth, and seventh objects. The settings are done for each setting item.

(Generation Data Resolution Setting Unit)

The generation data resolution setting unit 15 sets the resolution of halftone dot data according to the present invention. The resolution may be set by inputting an arbitrary resolution or selecting one of a plurality of resolutions stored in advance.

(Coloring Setting Unit)

The coloring setting unit 16 arbitrarily sets "C", "M", "Y", and/or "K" of the first, second, fourth, fifth, sixth, and seventh objects and "C", "M", "Y", and/or "K" of the background portion. "C" represents the ratio of the cyan component to the anti-counterfeit printed matter to be manufactured from halftone dot data. "M" represents the ratio of the magenta component to the anti-counterfeit printed matter. "Y" represents the ratio of the yellow component to the anti-counterfeit printed matter. "K" represents the ratio of the black component to the anti-counterfeit printed matter. Note that the colors to be set by the coloring setting unit of the present invention are not limited to "C", "M", "Y", and "K". Any other colors outputtable by a printer using spot colors, fluorescent inks, gold ink, silver ink, and the like can be set.

(Halftone Dot Shape Setting Unit)

The halftone dot shape setting unit 17 sets the height and width of a unit, and the halftone dot shapes of the first, second, fourth, fifth, sixth, and seventh objects to be formed in the unit.

(Calculation Means)

The calculation means 13 forms, from the first image data 23a input by the image input means 11, image data having the first invisible image made of the first and second objects based on the contents set by the item setting means 12. The calculation means 13 also forms, from the second image data 23b, image data having the second invisible image made of the fifth and sixth objects based on the contents set by the item setting means 12. Then, the calculation means 13 composites the image data having the first invisible image and the fourth objects to relax density imbalance, composites the image data having the second invisible image and the seventh objects to relax density imbalance, and composites the image data having the first invisible image that has undergone density imbalance relaxation and the image data having the second invisible image that has undergone density imbalance relaxation, thereby generating the composite image data 26 (halftone dot data) as shown in FIG. 85(b).

Figure 87:
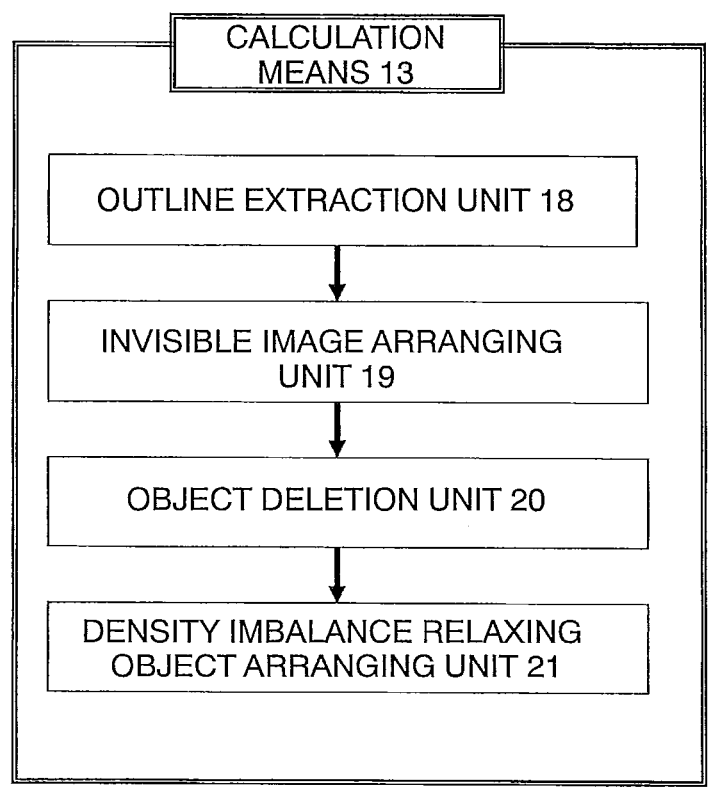
FIG. 87 is a block diagram of the calculation means of the halftone dot data creation apparatus A3 according to the present invention.

As shown in FIG. 87, the calculation means 13 includes the outline extraction unit 18, the invisible image arranging unit 19, the object deletion unit 20, and the density imbalance relaxing object arranging unit 21.

(Outline Extraction Unit)

The outline extraction unit 18 extracts the outline of the first image data 23a and the outline of the second image data 23b shown in FIG. 83(a) and generates outline image data 24a of the first image data and outline image data 24b of the second image data 23b, as shown in FIG. 83(b).

(Invisible Image Arranging Unit)

Figure 84:
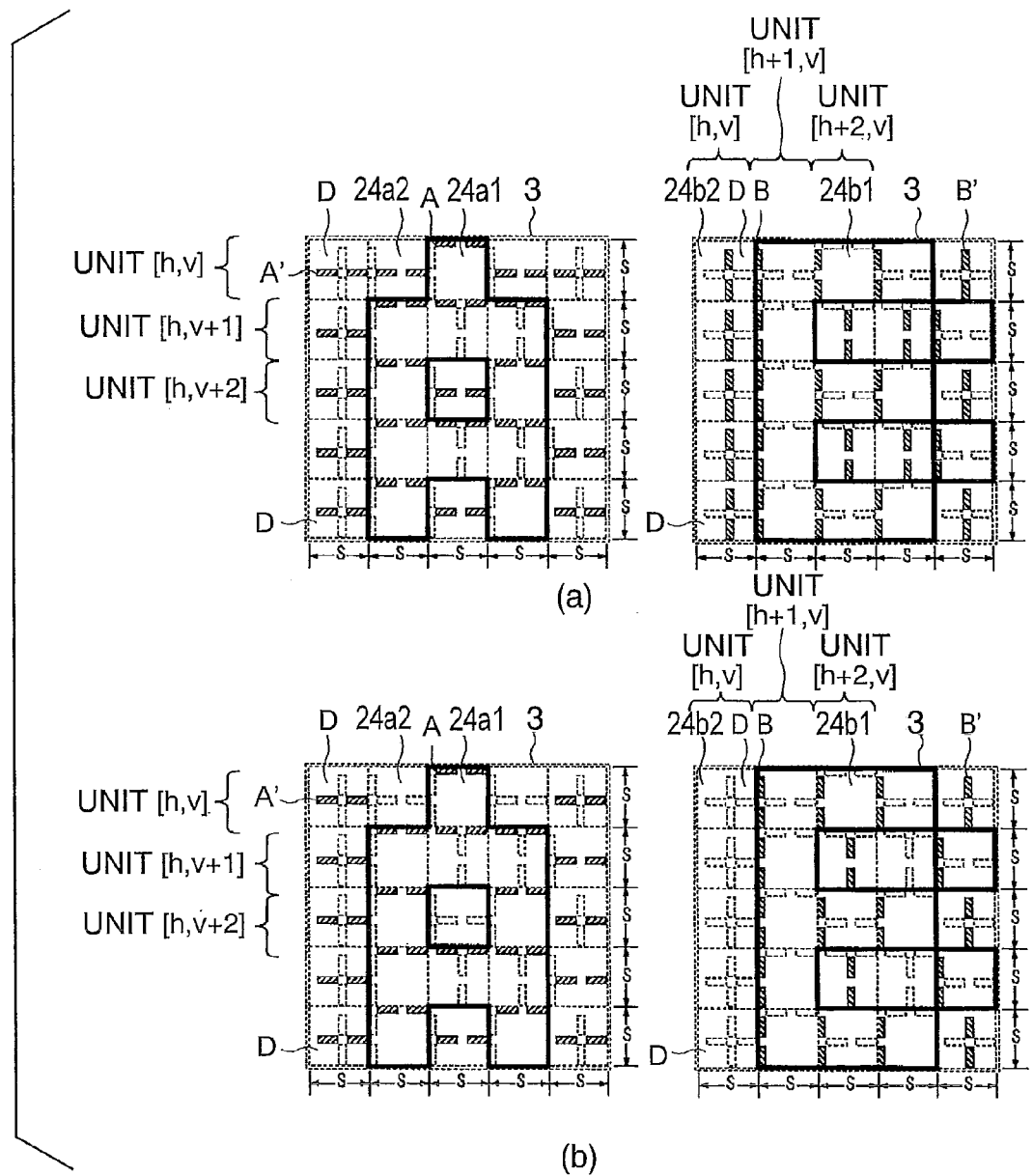
FIG. 84 shows views of the flow of data obtained by the halftone dot data creation apparatus A3 according to the present invention.

As shown in FIG. 83(c), the invisible image arranging unit divides the units of the outline image data 24a into intra-outline units 24a1 inside the outline and extra-outline units 24a2 and the units of the outline image data 24b into intra-outline units 24b1 inside the outline and extra-outline units 24b2 using the outline image data 24a and 24b. Then, as shown in FIG. 84(a), the invisible image arranging unit 19 arranges the first objects (A) and the second objects (A') inside the intra-outline units 24a1 while setting one kind of the objects in the on state and the other in the off state, and also arranges the first and second objects inside the extra-outline units 24a2 while setting the one kind in the off state and the other in the on state. The invisible image arranging unit 19 arranges the fifth objects (B) and the sixth objects (B') inside the intra-outline units 24b1 while setting one kind of the objects in the on state and the other in the off state, and also arranges the fifth and sixth objects inside the extra-outline units 24b2 while setting the one kind in the off state and the other in the on state.

(Object Deletion Unit)

In the first and second objects arranged in the intra-outline units 24a1 and the extra-outline units 24a2 of the outline image data 24a, when both the first and second objects arranged adjacent to each other are on, the object deletion unit 20 deletes one of the first and second objects to set it in the off state, as shown in FIG. 84(b). In addition, in the fifth and sixth objects arranged in the intra-outline units 24b1 and the extra-outline units 24b2 of the outline image data 24b, when both the fifth and sixth objects arranged adjacent to each other are on, the object deletion unit 20 deletes one of the fifth and sixth objects to set it in the off state.

(Density Imbalance Relaxing Object Arranging Unit)

To relax density imbalance in predetermined regions, the density imbalance relaxing object arranging unit 21 arranges the fourth objects a having an object area ratio 1/2 or almost 1/2 that of the first or second objects and also having the same or almost the same color at or almost at the center of the first and second objects sandwiching continuous off objects at the spatial positions where the first or second object has been deleted or at the positions where off portions are arranged adjacently in the plurality of units arranged adjacently, as shown in FIG. 85(a). In addition, to relax density imbalance in predetermined regions, the density imbalance relaxing object arranging unit 21 arranges the seventh objects b having an object area ratio 1/2 or almost 1/2 that of the fifth or sixth objects and also having the same or almost the same color at or almost at the center of the fifth and sixth objects sandwiching continuous off objects at the spatial positions where the fifth or sixth object has been deleted or at the positions where off portions are arranged adjacently in the plurality of units arranged adjacently. In the present invention, "almost the same color" means a color having a color difference ΔE of 2 or less.

(Image Output Means)

The image output means 14 obtains a printing plate and/or a printed matter based on the created halftone dot data.

Detailed examples of the image output means 14 are a storage device such as a hard disk, a plate maker such as a film plate output apparatus, and a printing apparatus such as a printer.

(Operation Window of Halftone Dot Data Creation Software)

Figure 88:
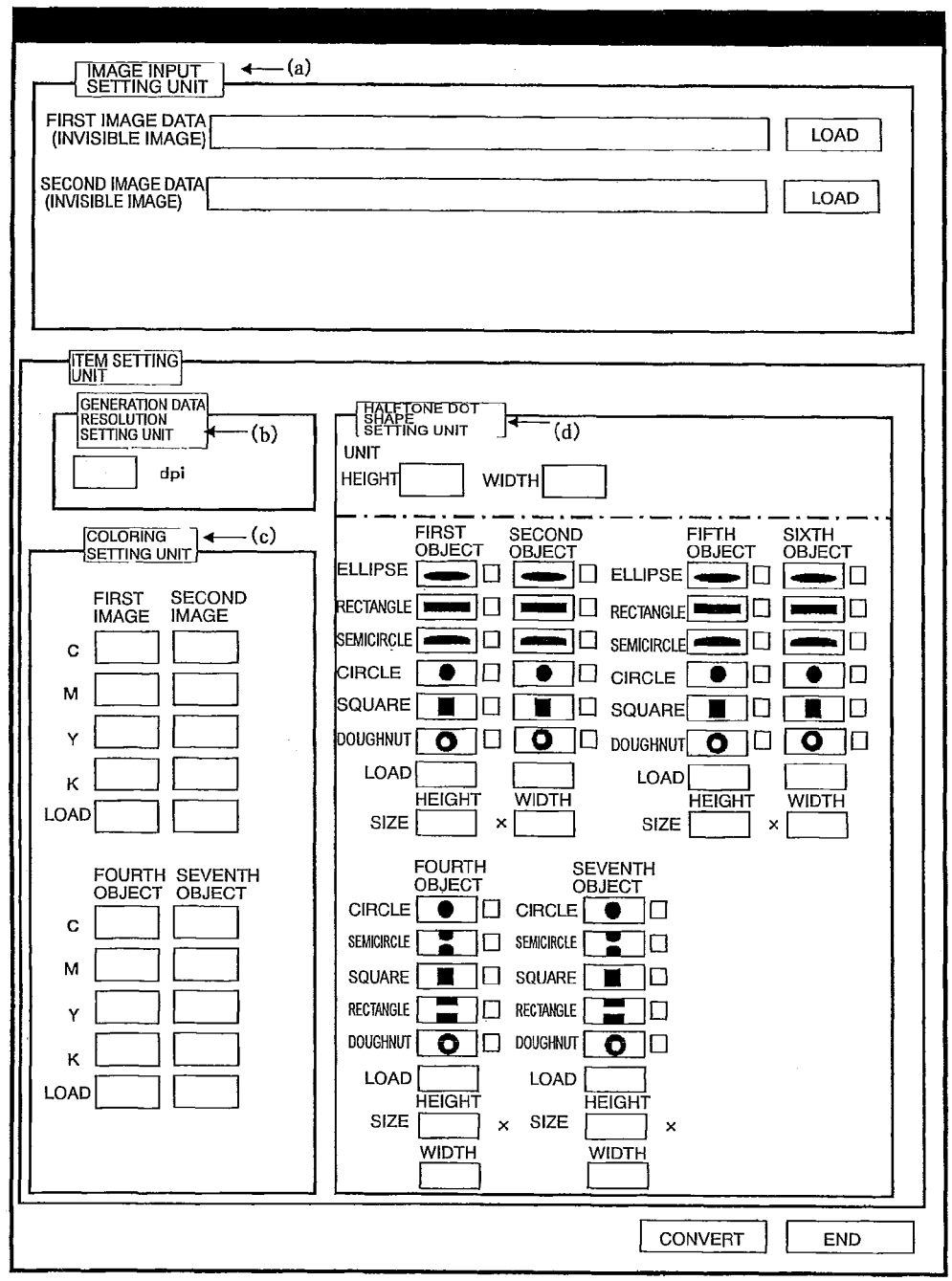
FIG. 88 is a view showing an example of the operation window of halftone dot data creation software B3 according to the present invention.

FIG. 88 shows an example of the operation window of the halftone dot data creation software. The operation window includes an "image input setting unit" and an "item setting unit". The item setting unit includes a "generation data resolution setting unit", a "coloring setting unit", and a "halftone dot shape setting unit".

(Image Input Setting Unit)

The "image input setting unit" (a) inputs the first image data 23a serving as the first invisible image and the second image data 23b serving as the second invisible image to be input to the above-described image input means. The first image data and the second image data may be designated by causing the designer to, for example, read out an image file recorded in the hard disk in advance.

(Generation Data Resolution Setting Unit)

The "generation data resolution setting unit" (b) sets the resolution of halftone dot data according to the present invention by the above-described item setting means. The designer sets the resolution by inputting an arbitrary resolution or selecting one of a plurality of resolutions stored in advance. The resolution to be set here preferably matches that of the plate maker or printing apparatus to be used to obtain the printed matter manufactured from the halftone dot data. For example, a film plate output apparatus generally has a resolution of 2540 PDI.

(Coloring Setting Unit)

The "coloring setting unit" (c) causes the designer to set "C", "M", "Y", and "K" of the first and second objects of the first image data having the first invisible image, those of the fifth and sixth objects of the second image data having the second invisible image, and those of the fourth and seventh objects to relax density imbalance by the above-described item setting means. This setting is done as automatic setting based on recommended values or arbitrary setting by the designer. As "others", spot colors, fluorescent inks, gold ink, silver ink, and the like can also be set. Note that the first, second, and fourth objects need to have the same color. The fifth, sixth, and seventh objects need to have the same color. However, the first, second, fourth, fifth, sixth, and seventh objects preferably have the same color.

The coloring settings are done within the range of 0% to 100%. Perfect white is set by 0%, and the darkest color expressible as an image is set by 100%.

"C" of the color setting sets the ratio of the cyan component to the anti-counterfeit printed matter to be manufactured from halftone dot data. "M" sets the ratio of the magenta component to the anti-counterfeit printed matter. "Y" sets the ratio of the yellow component to the anti-counterfeit printed matter. "K" sets the ratio of the black component to the anti-counterfeit printed matter.

The coloring settings designated here are interpreted by the image output means later so as to affect the result of the output matter such as a printed matter or a printing plate. The coloring setting interpretation method and its influence depend on each image output means. For example, when a home inkjet printer outputs the images, the values of the color settings generally affect the values of the ink discharge amounts and landing ink densities of "C", "M", "Y", and "K". For example, when a film plate output apparatus outputs the images, the values of the color settings generally affect the values of the percent dot areas of "C", "M", "Y", and "K" on each printing plate.

(Halftone Dot Shape Setting Unit)

The "halftone dot shape setting unit" (d) sets the size of the unit of the composite image data shown in FIG. 85(b) by the above-described item setting means. The unit size to be set includes the height and width of the unit, which are input by the operator.

The "halftone dot shape setting unit" (d) also sets the shapes of the first and second objects of the first image data having the first invisible image, the shapes of the fifth and sixth objects of the second image data having the second invisible image, and the shapes of the fourth and seventh objects to relax density imbalance by the above-described item setting means.

The "halftone dot shape setting unit" (d) also sets the sizes of the first and second objects of the first image data having the first invisible image, the sizes of the fifth and sixth objects of the second image data having the second invisible image, and the sizes of the fourth and seventh objects to relax density imbalance by the above-described item setting means. The object sizes to be set are the heights and widths of the first and second objects that form the first invisible image, the heights and widths of the fifth and sixth objects that form the second invisible image, and the heights and widths of the fourth and seventh objects to relax density imbalance. Note that the first and second objects need to have the same object area ratio, the fifth and sixth objects need to have the same object area ratio, the fourth objects to relax density imbalance need to have an object area ratio 1/2 or almost 1/2 that of the first and second objects, and the seventh objects to relax density imbalance need to have an object area ratio 1/2 or almost 1/2 that of the fifth and sixth objects. The first, second, fifth, sixth, fourth, and seventh objects to be arranged in the units are set to be smaller than the set unit size.

The types of shapes of the first and second objects of the first image data having the first invisible image and the fifth and sixth objects of the second image data having the second invisible image are "ellipse", "rectangle", "semicircle", "doughnut", "circle", and "square". The types of shapes of the fourth and seventh objects to relax density imbalance are "circle", "semicircle", "doughnut", "square", and "rectangle". However, the object shapes are not limited to those described in the embodiment, and any other shape may be added to the software and selected by reading out.

(Halftone Dot Data Creation Apparatus A4)

Figure 89:
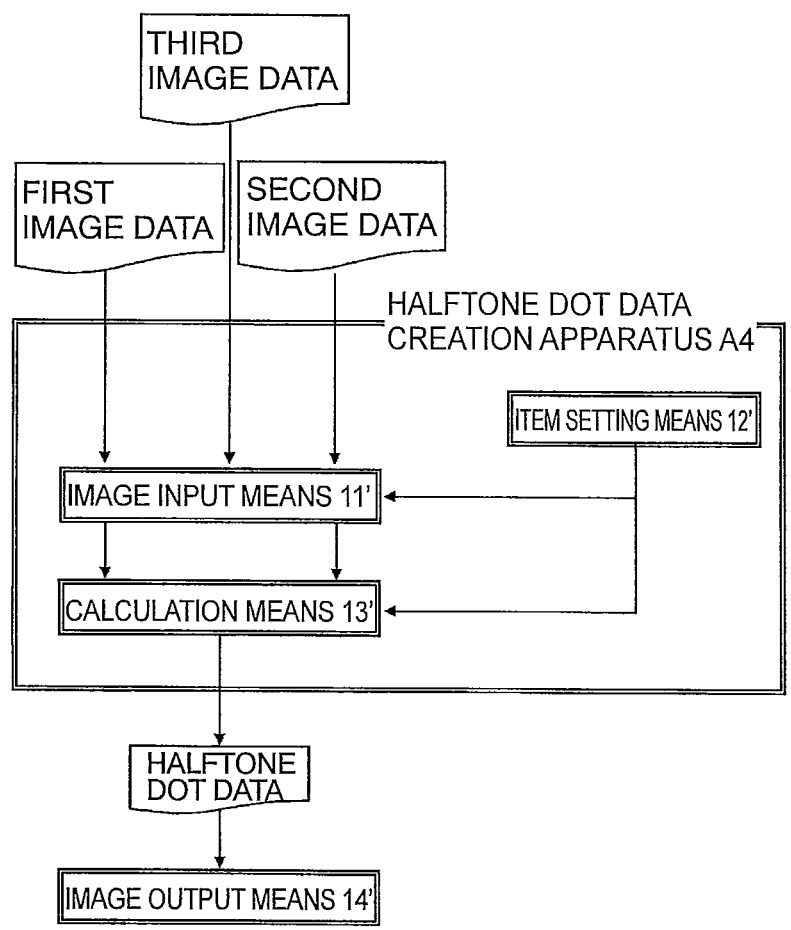
FIG. 89 is a block diagram of a halftone dot data creation apparatus A4 according to the present invention.

The apparatus A4 for creating the above-described halftone dot data will be explained with reference to the block diagram of the apparatus shown in FIG. 89. The halftone dot data creation apparatus includes the image input means 11', the item setting means 12', the calculation means 13', and the image output means 14'.

(Image Input Means)

The image input means 11' inputs first image data 23a' and second image data 23b' as shown in FIG. 90(a) serving as the base of invisible images to be visually recognized as latent images upon overlaying a lenticular lens or a parallel line filter and third image data 23c serving as the base of a visible image to be visually recognized as shown in FIG. 90(b). The third image data 23c serving as the base of the visible image to be visually recognized may be binary image data or halftone image data. The first image data 23a' and the second image data 23b' may be acquired by extracting predetermined information from a text file (TXT or CSV format) of personal information and the like and converting it into an image file.

(Item Setting Means)

Figure 93:
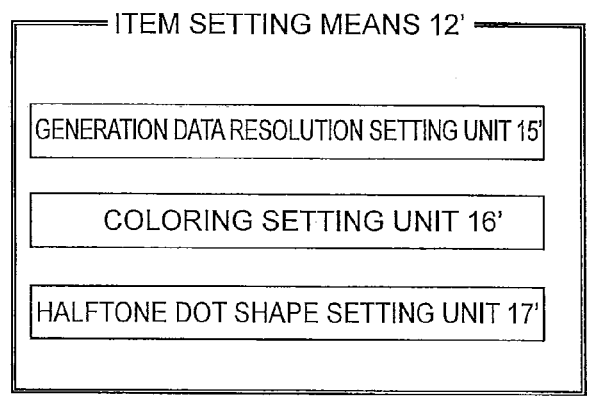
FIG. 93 is a block diagram of the item setting means of the halftone dot data creation apparatus A4 according to the present invention.

As shown in FIG. 93, the item setting means 12' includes the generation data resolution setting unit 15' which sets the resolution of halftone dot data, the coloring setting unit 16' which sets coloring, and the halftone dot shape setting unit 17' which sets the shapes of the halftone dots of the first, second, third, fourth, fifth, sixth, and seventh objects. The settings are done for each setting item.

(Generation Data Resolution Setting Unit)

The generation data resolution setting unit 15' sets the resolution of halftone dot data according to the present invention. The resolution may be set by inputting an arbitrary resolution or selecting one of a plurality of resolutions stored in advance.

(Coloring Setting Unit)

The coloring setting unit 16' arbitrarily sets "C", "M", "Y", and/or "K" of the first, second, third, fourth, fifth, sixth, and seventh objects and "C", "M", "Y", and/or "K" of the background portion. "C" represents the ratio of the cyan component to the anti-counterfeit printed matter to be manufactured from halftone dot data. "M" represents the ratio of the magenta component to the anti-counterfeit printed matter. "Y" represents the ratio of the yellow component to the anti-counterfeit printed matter. "K" represents the ratio of the black component to the anti-counterfeit printed matter. Note that the colors to be set by the coloring setting unit of the present invention are not limited to "C", "M", "Y", and "K". Any other colors outputtable by a printer using spot colors, fluorescent inks, gold ink, silver ink, and the like can be set.

(Halftone Dot Shape Setting Unit)

The halftone dot shape setting unit 17' sets the height and width of a unit, and the halftone dot shapes of the first, second, third, fourth, fifth, sixth, and seventh objects to be formed in the unit.

(Calculation Means)

Figure 92:
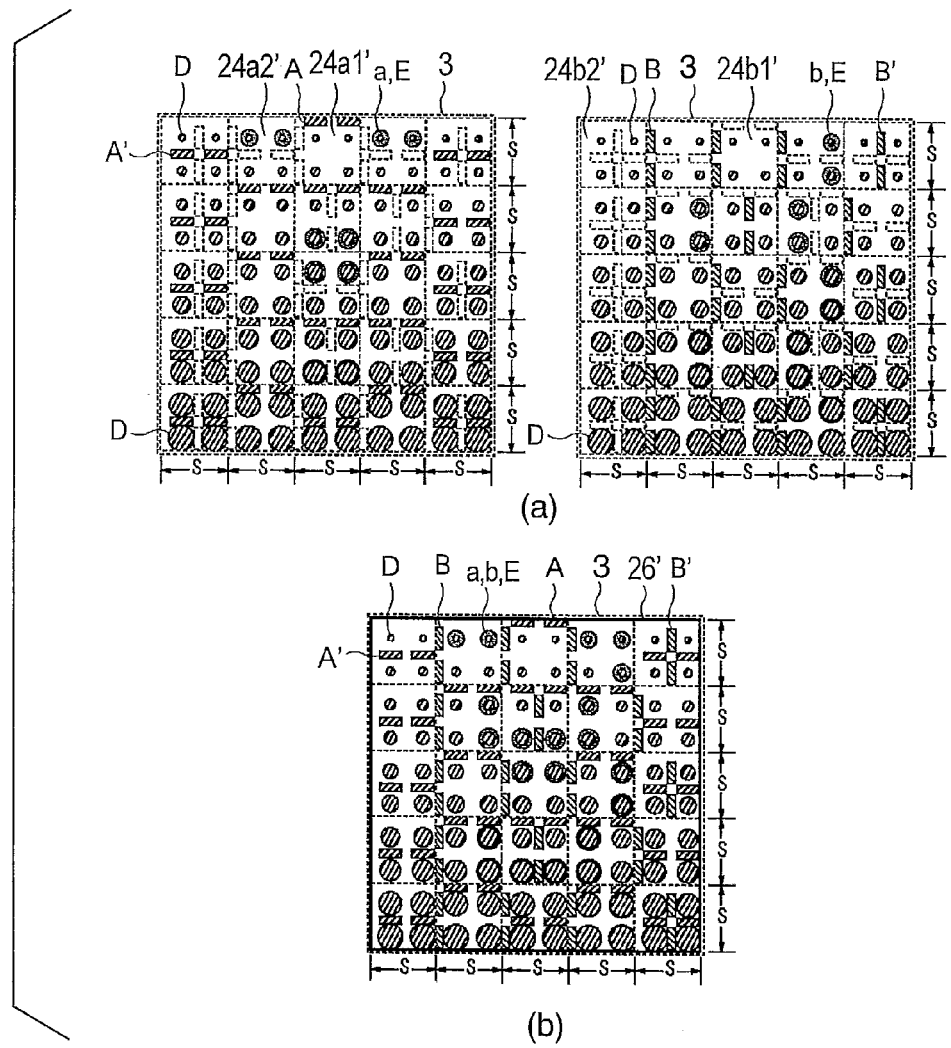
FIG. 92 shows views of the flow of data obtained by the halftone dot data creation apparatus A4 according to the present invention.

The calculation means 13' forms, from the first image data 23a' input by the image input means 11', image data having the first invisible image made of the first and second objects based on the contents set by the item setting means 12'. The calculation means 13' also forms, from the second image data 23b', image data having the second invisible image made of the fifth and sixth objects based on the contents set by the item setting means 12'. The calculation means 13' also forms, from the third image data 23c, image data having the visible image made of the third objects based on the contents set by the item setting means 12'. Then, the calculation means 13' composites the image data having the first invisible image and the fourth objects to relax density imbalance, composites the image data having the second invisible image and the seventh objects to relax density imbalance, and composites the image data having the first invisible image that has undergone density imbalance relaxation, the image data having the second invisible image that has undergone density imbalance relaxation, and the image data having the visible image made of the third objects, thereby generating the composite image data 26' (halftone dot data) as shown in FIG. 92.

Figure 94:
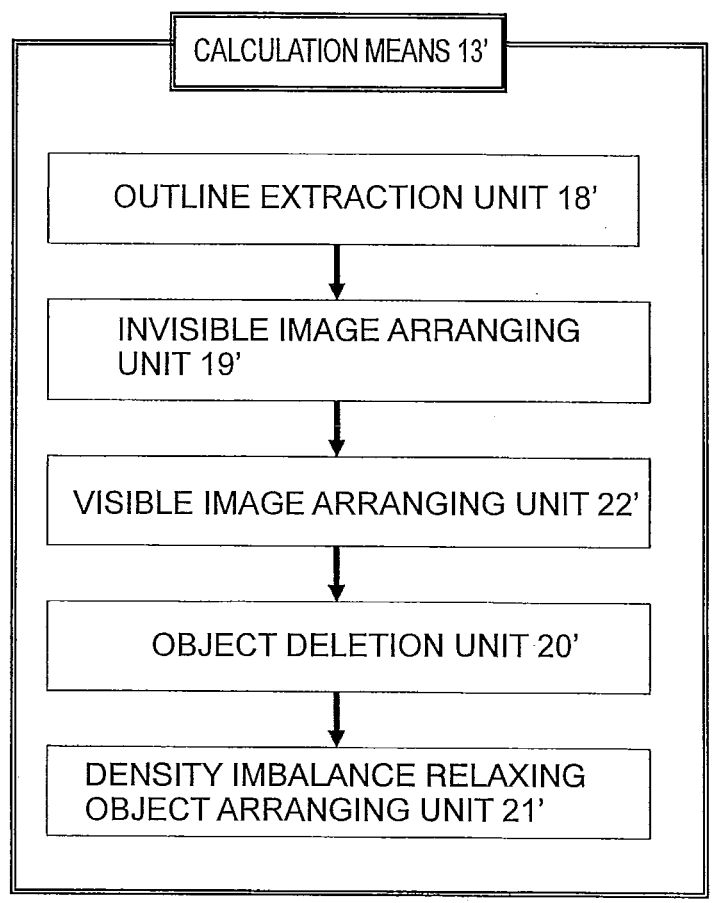
FIG. 94 is a block diagram of the calculation means of the halftone dot data creation apparatus A4 according to the present invention.

As shown in FIG. 94, the calculation means 13' includes the outline extraction unit 18', the invisible image arranging unit 19', the visible image arranging unit 22, the object deletion unit 20', and the density imbalance relaxing object arranging unit 21'.

(Outline Extraction Unit)

Figure 90:
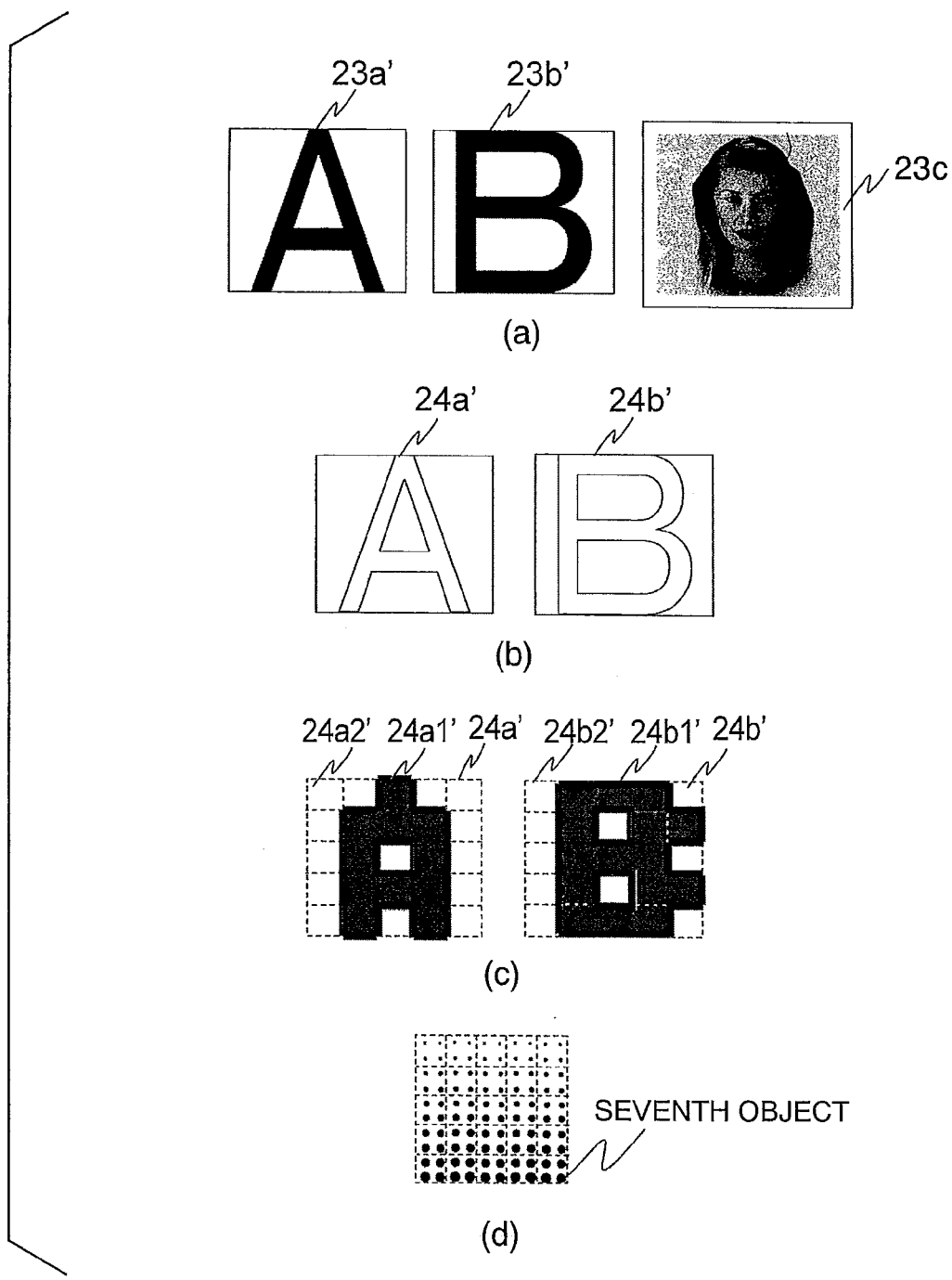
FIG. 90 shows views of the flow of data obtained by the halftone dot data creation apparatus A4 according to the present invention.

The outline extraction unit 18' extracts the outline of the first image data 23a' and the outline of the second image data 23b' shown in FIG. 90(*a*) and generates the outline image data 24a' of the first image data and the outline image data 24b' of the second image data, as shown in FIG. 90(*b*).

(Invisible Image Arranging Unit)

Figure 91:
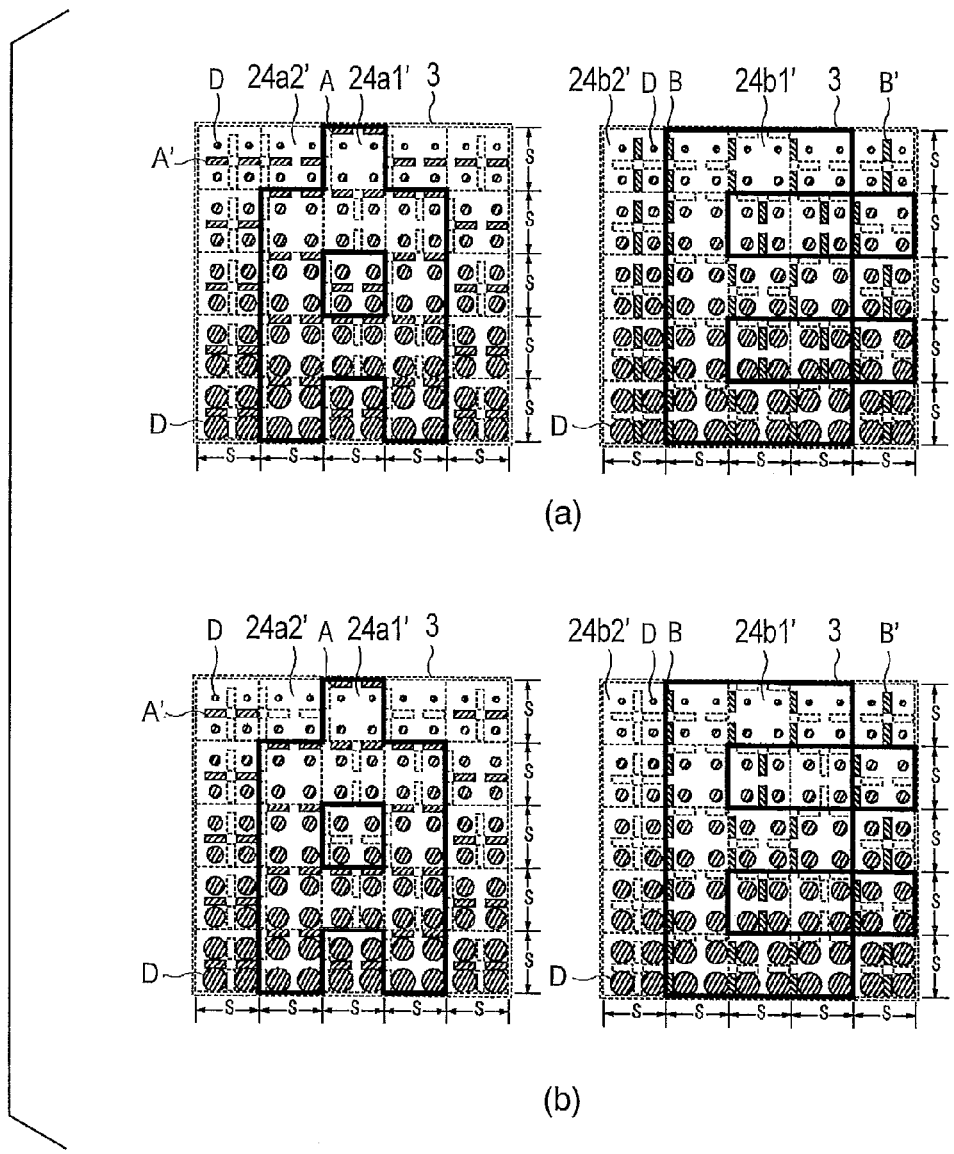
FIG. 91 shows views of the flow of data obtained by the halftone dot data creation apparatus A4 according to the present invention.

As shown in FIG. 90(*c*), the invisible image arranging unit 19' divides the units of the outline image data 24a' into intra-outline units 24a1' inside the outline and extra-outline units 24a2' and the units of the outline image data 24b' into intra-outline units 24b1' inside the outline and extra-outline units 24b2' using the outline image data 24a' and 24b'. Then, as shown in FIG. 91(*a*), the invisible image arranging unit 19' arranges the first and second objects inside the intra-outline units 24a1' while setting one kind of the objects in the on state and the other in the off state, and also arranges the first and second objects inside the extra-outline units 24a2' while setting the one kind in the off state and the other in the on state. The invisible image arranging unit 19' arranges the fifth and sixth objects inside the intra-outline units 24b1' while setting one kind of the objects in the on state and the other in the off state, and also arranges the fifth and sixth objects inside the extra-outline units 24b2' while setting the one kind in the off state and the other in the on state.

(Visible Image Arranging Unit)

The visible image arranging unit arranges the third objects to form the visible image at least at the center, almost at the center, or at the four corners of a unit. For example, FIG. 90(*d*) illustrates an example in which the third objects are formed at the four corners of a unit. The composite image data is obtained by the above-described calculation means, as shown in FIG. 92(*b*).

(Object Deletion Unit)

In the first and second objects arranged in the intra-outline units 24a1' and the extra-outline units 24a2' of the outline image data 24a', when both the first and second objects arranged adjacent to each other are on, the object deletion unit 20' sets one of the first and second objects in the off state to delete it, as shown in FIG. 91(*b*). In addition, in the fifth and sixth objects arranged in the intra-outline units 24b1' and the extra-outline units 24b2' of the outline image data 24b', when both the fifth and sixth objects arranged adjacent to each other are on, the object deletion unit 20' sets one of the fifth and sixth objects in the off state to delete it.

(Density Imbalance Relaxing Object Arranging Unit)

To relax density imbalance in predetermined regions, the density imbalance relaxing object arranging unit 21' arranges the fourth objects a having an object area ratio 1/2 or almost 1/2 that of the first or second objects and also having the same or almost the same color at the spatial positions where the first or second object has been deleted or at the positions where off portions are arranged adjacently in the plurality of units arranged adjacently, as shown in FIG. 92(*a*). In addition, to relax density imbalance in predetermined regions, the density imbalance relaxing object arranging unit 21' arranges the seventh objects b having an object area ratio 1/2 or almost 1/2 that of the fifth or sixth objects and also having the same or almost the same color at the spatial positions where the fifth or sixth object has been deleted or at the positions where off portions are arranged adjacently in the plurality of units arranged adjacently.

(Image Output Means)

The image output means 14' obtains a printing plate and/or a printed matter based on the created halftone dot data. Detailed examples of the image output means 14' are a storage device such as a hard disk, a plate maker such as a film plate output apparatus, and a printing apparatus such as a printer.

(Operation Window of Halftone Dot Data Creation Software)

Figure 95:
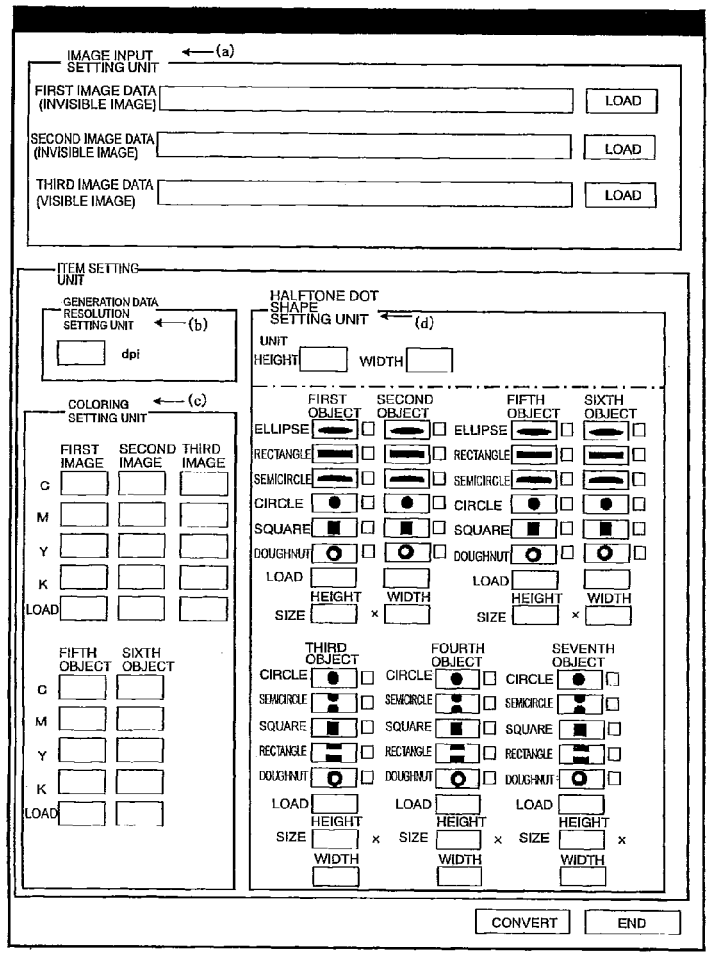
FIG. 95 is a view showing an example of the operation window of halftone dot data creation software B4 according to the present invention.

FIG. 95 shows an example of the operation window of the halftone dot data creation software. The operation window includes an "image input setting unit" and an "item setting unit". The item setting unit includes a "generation data resolution setting unit", a "coloring setting unit", and a "halftone dot shape setting unit".

(Image Input Setting Unit)

The "image input setting unit" (a) inputs first image data 23a' serving as the first invisible image, the second image data 23b' serving as the second invisible image, and the third image data 23c serving as the visible image to be input to the above-described image input means. The first image data, the second image data, and the third image data may be designated by causing the designer to, for example, read out an image file recorded in the hard disk in advance.

(Generation Data Resolution Setting Unit)

The "generation data resolution setting unit" (b) sets the resolution of halftone dot data according to the present invention by the above-described item setting means. The designer sets the resolution by inputting an arbitrary resolution or selecting one of a plurality of resolutions stored in advance.

The resolution to be set here preferably matches that of the plate maker or printing apparatus to be used to obtain the printed matter manufactured from the halftone dot data. For example, a film plate output apparatus generally has a resolution of 2540 PDI.

(Coloring Setting Unit)

The "coloring setting unit" (c) causes the designer to set "C", "M", "Y", and "K" of the first and second objects of the first image data having the first invisible image, those of the fifth and sixth objects of the second image data having the second invisible image, those of the third objects of the third image data serving as visible image data, and those of the fourth and seventh objects to relax density imbalance by the above-described item setting means. This setting is done as automatic setting based on recommended values or arbitrary setting by the designer. As "others", spot colors, fluorescent inks, gold ink, silver ink, and the like can also be set. The first, second, fifth, sixth, fourth, and seventh objects need to have the same color.

The coloring settings are done within the range of 0% to 100%. Perfect white is set by 0%, and the darkest color expressible as an image is set by 100%.

"C" of the color setting sets the ratio of the cyan component to the anti-counterfeit printed matter to be manufactured from halftone dot data. "M" sets the ratio of the magenta component to the anti-counterfeit printed matter. "Y" sets the ratio of the yellow component to the anti-counterfeit printed matter. "K" sets the ratio of the black component to the anti-counterfeit printed matter.

The coloring settings designated here are interpreted by the image output means later so as to affect the result of the output matter such as a printed matter or a printing plate. The coloring setting interpretation method and its influence depend on each image output means. For example, when a home inkjet printer outputs the images, the values of the color settings generally affect the values of the ink discharge amounts and landing ink densities of "C", "M", "Y", and "K". For example, when a film plate output apparatus outputs the images, the values of the color settings generally affect the values of the percent dot areas of "C", "M", "Y", and "K" on each printing plate.

(Halftone Dot Shape Setting Unit)

The "halftone dot shape setting unit" (d) sets the size of the unit of the composite image data shown in FIG. 92(b) by the above-described item setting means. The unit size to be set includes the height and width of the unit, which are input by the operator.

The "halftone dot shape setting unit" (d) also sets the shapes of the first and second objects of the first image data having the first invisible image, the shapes of the fifth and sixth objects of the second image data having the second invisible image, the shape of the third objects of the third image data serving as the visible image, and the shapes of the fourth and seventh objects to relax density imbalance by the above-described item setting means.

The "halftone dot shape setting unit" (d) also sets the sizes of the first and second objects of the first image data having the first invisible image, the sizes of the fifth and sixth objects of the second image data having the second invisible image, the size of the third objects of the third image data serving as the visible image, and the sizes of the fourth and seventh objects to relax density imbalance by the above-described item setting means. The object sizes to be set are the heights and widths of the first and second objects that form the first invisible image, the heights and widths of the fifth and sixth objects that form the second invisible image, the height and width of the third objects serving as the visible image, and the heights and widths of the fourth and seventh objects to relax density imbalance. Note that the first and second objects need to have the same object area ratio, the fifth and sixth objects need to have the same object area ratio, the fourth objects to relax density imbalance need to have an object area ratio 1/2 or almost 1/2 that of the first and second objects, and the seventh objects to relax density imbalance need to have an object area ratio 1/2 or almost 1/2 that of the fifth and sixth objects. The first, second, third, fourth, fifth, sixth, and seventh objects to be arranged in the units are set to be smaller than the set unit size. Note that if the visible image is a halftone image, the height and width of the third objects are not constant. Instead, the size of the third objects gradually changes from a highlight portion to a shadow portion.

The types of shapes of the first and second objects of the first image data having the first invisible image and the fifth and sixth objects of the second image data having the second invisible image are "ellipse", "rectangle", "semicircle", "doughnut", "circle", and "square". The types of shape of the third objects of the third image data serving as the visible image are "circle", "semicircle", "doughnut", "square", and "rectangle". The types of shape of the fourth and seventh objects to relax density imbalance are "circle", "semicircle", "doughnut", "square", and "rectangle". However, the object shapes are not limited to those described in the embodiment, and any other shape may be added to the software and selected by reading out.

(Halftone Dot Data Creation Software B3)

Figure 96:
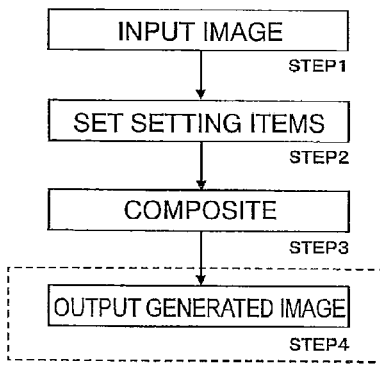
FIG. 96 is a flowchart illustrating the halftone dot data creation software B3 according to the present invention.

The software B3 for creating halftone dot data using the above-described halftone dot data creation apparatus A3 will be described with reference to the flowchart of FIG. 96.

(Image Input Step)

First, the designer inputs the first image data 23a and the second image data 23b as shown in FIG. 83(a) serving as the base of first and second invisible images to be visually recognized as latent images upon overlaying a lenticular lens or a parallel line filter to the "image input setting unit" (a) of the operation window via the image input means (STEP 1). As for the image input method, the halftone dot data designer designates the image data by reading out an image file recorded in the hard disk in advance. The first image data 23a and the second image data 23b may be acquired by extracting predetermined information from a text file (TXT or CSV format) of personal information and the like and converting it into an image file.

(Setting Item Step)

Second, the item setting means sets, for each setting item, the resolution of halftone dot data, coloring, and the halftone dot shapes of the first, second, fourth, fifth, sixth, and seventh objects to generate the composite image data 26 as shown in FIG. 85(b) (STEP 2).

(Calculation Step)

Third, the calculation means forms, from the input first image data, image data having the first invisible image made of the first and second objects based on the contents set by the item setting means. The calculation means also forms, from the second image data, image data having the second invisible image made of the fifth and sixth objects based on the contents set by the item setting means. Then, the calculation means composites the image data having the first invisible image and the fourth objects to relax density imbalance, composites the image data having the second invisible image and the seventh objects to relax density imbalance, and composites the image data having the first invisible image that has undergone density imbalance relaxation and the image data having the second invisible image that has undergone density imbalance relaxation, thereby generating the composite image data 26 (halftone dot data) as shown in FIG. 85(b). When image input by the image input means and setting of the generation data resolution and halftone dots by the item setting means have ended, "conversion" on the operation window is performed. All the subsequent processes are performed by the calculation means.

(Setting Item Step)

Figure 97:
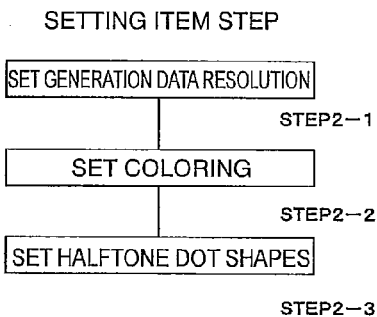
FIG. 97 is a flowchart illustrating the item setting step of the halftone dot data creation software B3 according to the present invention.

The setting item step will be described in detail. As shown in FIG. 97, the setting item step includes the generation data resolution setting step, the coloring setting step, and the halftone dot shape setting step.

(Generation Data Resolution Setting Step)

The designer sets the resolution of halftone dot data according to the present invention in the "generation data resolution setting unit" (b) of the operation window via the item setting means. The designer sets the resolution of the generation data by inputting an arbitrary resolution or selecting one of a plurality of resolutions stored in advance (STEP 2-1).

(Coloring Setting Step)

The designer sets "C", "M", "Y", and "K" of the first and second objects of the first image data having the first invisible image, those of the fifth and sixth objects of the second image data having the second invisible image, and those of the fourth and seventh objects to relax density imbalance in the coloring setting unit (c) of the operation window via the item setting means. This setting is done as automatic setting based on recommended values or arbitrary setting by the designer (STEP 2-2).

(Halftone Dot Shape Setting Step)

The designer sets the size of the unit of the first image data having the first invisible image and the second image data having the second invisible image in the "halftone dot shape setting unit" (d) of the operation window via the item setting means. The unit size to be set includes the height and width of the unit (STEP 2-3). The unit size is input by the operator.

The "halftone dot shape setting unit" (d) also sets the shapes of the first and second objects of the first image data having the first invisible image, the shapes of the fifth and sixth objects of the second image data having the second invisible image, and the shapes of the fourth and seventh objects to relax density imbalance by the above-described item setting means.

The "halftone dot shape setting unit" (d) also sets the sizes of the first and second objects of the first image data having the first invisible image, the sizes of the fifth and sixth objects of the second image data having the second invisible image, and the sizes of the fourth and seventh objects to relax density imbalance by the above-described item setting means. The object sizes to be set are the heights and widths of the first and second objects that form the first invisible image, the heights and widths of the fifth and sixth objects that form the second invisible image, and the heights and widths of the fourth and seventh objects to relax density imbalance. Note that the fourth objects to relax density imbalance need to have an object area ratio 1/2 or almost 1/2 that of the first and second objects. In addition, note that the seventh objects to relax density imbalance need to have an object area ratio 1/2 or almost 1/2 that of the fifth and sixth objects. The first, second, fourth, fifth, sixth, and seventh objects to be arranged in the units are set to be smaller than the set unit size. The order of STEP 2-1 to STEP 2-3 is not particularly limited as far as it is possible to obtain the composite image data in the end.

(Calculation Step)

Figure 98:
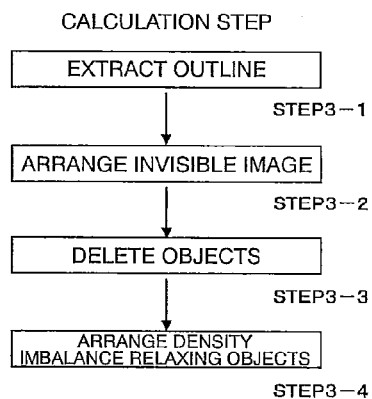
FIG. 98 is a flowchart illustrating the calculation step of the halftone dot data creation software B3 according to the present invention.

The calculation step will be described in detail. As shown in FIG. 98, the calculation step includes the outline extraction step, the invisible image arranging step, the object deletion step, and the density imbalance relaxing object arranging step.

(Outline Extraction Step)

First, the outline extraction unit extracts the outlines of the first image data and the second image data shown in FIG. 83(a) and generates the outline image data 24a of the first image data and the outline image data 24b of the second image data, as shown in FIG. 83(b) (STEP 3-1).

(Invisible Image Arranging Step)

Second, as shown in FIG. 83(c), the invisible image arranging unit divides the units of the outline image data 24a into the intra-outline units 24a1 inside the outline and the extra-outline units 24a2 and the units of the outline image data 24b into the intra-outline units 24b1 inside the outline and the extra-outline units 24b2 using the outline image data 24a and 24b shown in FIG. 83(b). Then, as shown in FIG. 84(a), the invisible image arranging unit arranges the first and second objects inside the intra-outline units 24a1 while setting one kind of the objects in the on state and the other in the off state, and also arranges the first and second objects inside the extra-outline units 24a2 while setting the one kind in the off state and the other in the on state. The invisible image arranging unit arranges the fifth and sixth objects inside the intra-outline units 24b1 while setting one kind of the objects in the on state and the other in the off state, and also arranges the fifth and sixth objects inside the extra-outline units 24b2 while setting the one kind in the off state and the other in the on state (STEP 3-2).

(Object Deletion Step)

Third, in the first and second objects arranged in the intra-outline units 24a1 and the extra-outline units 24a2 of the outline image data 24a, when both the first and second objects arranged adjacent to each other are on, the object deletion unit deletes one of the first and second objects to set it in the off state, as shown in FIGS. 84(a) and 84(b). In addition, in the fifth and sixth objects arranged in the intra-outline units 24b1 and the extra-outline units 24b2 of the outline image data 24b, when both the fifth and sixth objects arranged adjacent to each other are on, the object deletion unit deletes one of the fifth and sixth objects to set it in the off state (STEP 3-3).

(Density Imbalance Relaxing Object Arranging Step)

Figure 85:
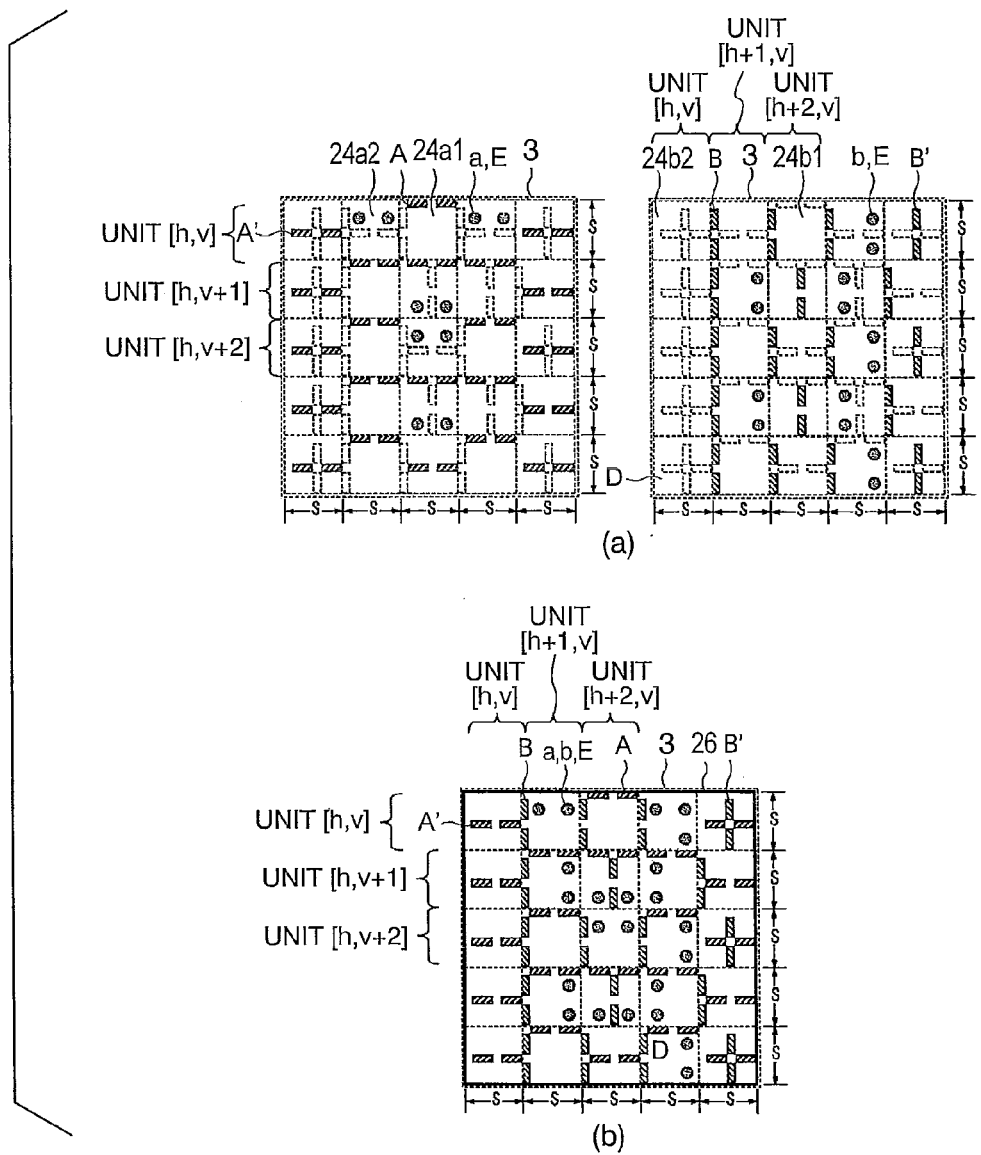
FIG. 85 shows views of the flow of data obtained by the halftone dot data creation apparatus A3 according to the present invention.

Fourth, to relax density imbalance in predetermined regions, the density imbalance relaxing object arranging unit arranges the fourth objects a having an object area ratio 1/2 or almost 1/2 that of the first or second objects and also having the same or almost the same color at or almost at the center of the first and second objects sandwiching continuous off objects at the spatial positions where the first or second object has been deleted or at the positions where off portions are arranged adjacently in the plurality of units arranged adjacently, as shown in FIG. 85(a). In addition, to relax density imbalance in predetermined regions, the density imbalance relaxing object arranging unit arranges the seventh objects b having an object area ratio 1/2 or almost 1/2 that of the fifth or sixth objects and also having the same or almost the same color at or almost at the center of the fifth and sixth objects sandwiching continuous off objects at the spatial positions where the fifth or sixth object has been deleted or at the positions where off portions are arranged adjacently in the plurality of units arranged adjacently, thereby generating the composite image data 26 (halftone dot data) shown in FIG. 85(*b*) (STEP 3-4).

With the above-described processes, the composite image data (halftone dot data) is created. The created halftone dot data includes the first image data having the first invisible image made of the first and second objects, the second image data having the second invisible image made of the fifth and sixth objects, and the fourth and seventh objects to relax density imbalance.

(Image Output Step)

An anti-counterfeit printed matter can also be manufactured based on the created halftone dot data (STEP 4). To manufacture the anti-counterfeit printed matter, for example, the image data undergoes color separation to output a printing plate, and printing is performed by a commercial printing press. Alternatively, an inkjet printer outputs the printed matter directly based on the image data.

(Halftone Dot Data Creation Software B4)

Figure 99:
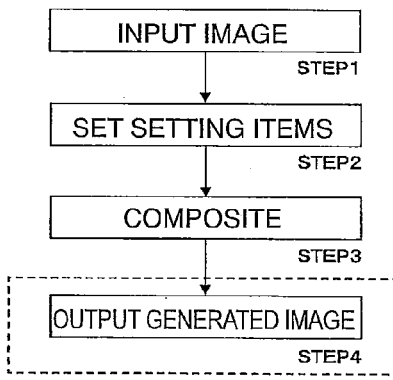
FIG. 99 is a flowchart illustrating the halftone dot data creation software B4 according to the present invention.

The software B4 for creating halftone dot data using the above-described halftone dot data creation apparatus A4 will be described with reference to the flowchart of FIG. 99.

(Image Input Step)

First, the designer inputs the first image data 23*a*' and the second image data 23*b*' serving as the base of the first and second invisible images to be visually recognized as latent images upon overlaying a lenticular lens or a parallel line filter and the third image data 23*c* serving as the base of a visible image to be visually recognized as shown in FIG. 90(*a*) to the "image input setting unit" (a) of the operation window via the image input means (STEP 1). The third image data 23*c* serving as the base of the visible image to be visually recognized may be binary image data or halftone image data. As for the image input method, the halftone dot data designer designates the image data by reading out an image file recorded in the hard disk in advance. The first image data 23*a*' and the second image data 23*b*' may be acquired by extracting predetermined information from a text file (TXT or CSV format) of personal information and the like and converting it into an image file.

(Setting Item Step)

Second, the item setting means sets, for each setting item, the resolution of halftone dot data, coloring, and the halftone dot shapes of the first, second, third, fourth, fifth, sixth, and seventh objects to generate the composite image data 26' as shown in FIG. 92(*b*) (STEP 2).

(Calculation Step)

Third, the calculation means forms, from the input first image data, image data having the first invisible image made of the first and second objects based on the contents set by the item setting means. The calculation means also forms, from the second image data, image data having the second invisible image made of the fifth and sixth objects based on the contents set by the item setting means. The calculation means also forms, from the input third image data, image data having the visible image made of the third objects based on the contents set by the item setting means. Then, the calculation means composites the image data having the first invisible image and the fourth objects to relax density imbalance, composites the image data having the second invisible image and the seventh objects to relax density imbalance, and composites the image data having the first invisible image that has undergone density imbalance relaxation, the image data having the second invisible image that has undergone density imbalance relaxation, and the image data having the visible image made of the third objects, thereby generating the composite image data 26' (halftone dot data) as shown in FIG. 92(*b*). When image input by the image input means and setting of the generation data resolution and halftone dots by the item setting means have ended, "conversion" on the operation window is performed. All the subsequent processes are performed by the calculation means.

(Setting Item Step)

Figure 100:
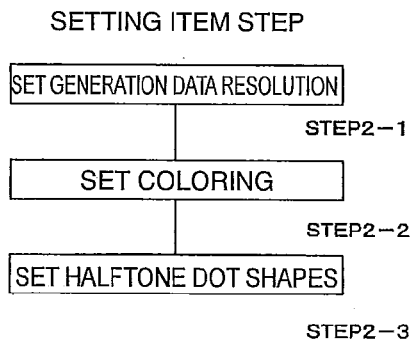
FIG. 100 is a flowchart illustrating the item setting step of the halftone dot data creation software B4 according to the present invention.

The setting item step will be described in detail. As shown in FIG. 100, the setting item step includes the generation data resolution setting step, the coloring setting step, and the halftone dot shape setting step.

(Generation Data Resolution Setting Step)

The designer sets the resolution of halftone dot data according to the present invention in the "generation data resolution setting unit" (b) of the operation window via the item setting means. The designer sets the resolution of the generation data by inputting an arbitrary resolution or selecting one of a plurality of resolutions stored in advance (STEP 2-1).

(Coloring Setting Step)

The designer sets "C", "M", "Y", and "K" of the first and second objects of the first image data having the first invisible image, those of the fifth and sixth objects of the second image data having the second invisible image, those of the third image data serving as the visible image, and those of the fourth and seventh objects to relax density imbalance in the coloring setting unit (c) of the operation window via the item setting means. This setting is done as automatic setting based on recommended values or arbitrary setting by the designer (STEP 2-2). The third objects may have the full color of, for example, a face image having a tone.

(Halftone Dot Shape Setting Step)

The unit size of the composite image data is set in the "halftone dot shape setting unit" (d) of the operation window via the item setting means. The unit size to be set includes the height and width of the unit, which are input by the operator (STEP 2-3).

The "halftone dot shape setting unit" (d) also sets the shapes of the first and second objects of the first image data having the first invisible image, the shape of the fifth and sixth objects of the second image data having the second invisible image, the shape of the third objects of the third image data serving as the visible image, and the shapes of the fourth and seventh objects to relax density imbalance by the above-described item setting means.

The "halftone dot shape setting unit" (d) also sets the sizes of the first and second objects of the first image data having the first invisible image, the sizes of the fifth and sixth objects of the second image data having the second invisible image, the size of the third objects of the third image data serving as the visible image, and the sizes of the fourth and seventh objects to relax density imbalance by the above-described item setting means. The object sizes to be set are the heights and widths of the first and second objects that form the first invisible image, the heights and widths of the fifth and sixth objects that form the second invisible image, the height and width of the third objects serving as the visible image, and the heights and widths of the fourth and seventh objects to relax density imbalance. Note that the fourth objects to relax density imbalance need to have an object area ratio 1/2 or almost 1/2 that of the first and second objects. The seventh objects to relax density imbalance need to have an object area ratio 1/2 or almost 1/2 that of the fifth and sixth objects. The first, second, third, fourth, fifth, sixth, and seventh objects to be arranged in the units are set to be smaller than the set unit size. Note that if the visible image is a halftone image, the height and width of the third objects are not constant. Instead, the size of the third objects gradually changes from a highlight portion to a shadow portion. The order of STEP 2-1 to STEP 2-3 is not particularly limited as far as it is possible to obtain the composite image data in the end.

(Calculation Step)

Figure 101:
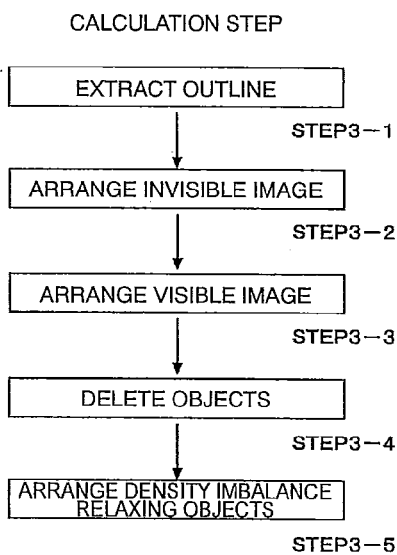
FIG. 101 is a flowchart illustrating the calculation step of the halftone dot data creation software B4 according to the present invention.

The calculation step will be described in detail. As shown in FIG. 101, the calculation step includes the outline extraction step, the invisible image arranging step, the object deletion step, the density imbalance relaxing object arranging step, and the visible image arranging step.

(Outline Extraction Step)

First, the outline extraction unit extracts the outlines of the first image data 23*a*' and the second image data 23*b*' shown in FIG. 90(*a*) and generates the outline image data 24*a*' of the first image data and the outline image data 24*b*' of the second image data shown in FIG. 90(*b*) (STEP 3-1).

(Invisible Image Arranging Step)

Second, as shown in FIG. 90(*c*), the invisible image arranging unit divides the units of the outline image data 24*a*' into the intra-outline units 24*a*1' inside the outline and the extra-outline units 24*a*2' and the units of the outline image data 24*b*' into the intra-outline units 24*b*1' inside the outline and the extra-outline units 24*b*2' using the outline image data 24*a*' and 24*b*' shown in FIG. 90(*b*). Then, as shown in FIG. 91(*a*), the invisible image arranging unit arranges the first and second objects inside the intra-outline units 24*a*1' while setting one kind of the objects in the on state and the other in the off state, and also arranges the first and second objects inside the extra-outline units 24*a*2' while setting the one kind in the off state and the other in the on state. The invisible image arranging unit 19' arranges the fifth and sixth objects inside the intra-outline units 24*b*1' while setting one kind of the objects in the on state and the other in the off state, and also arranges the fifth and sixth objects inside the extra-outline units 24*b*2' while setting the one kind in the off state and the other in the on state (STEP 3-2).

(Visible Image Arranging Step)

Fifth, the visible image arranging unit arranges the third objects to form the visible image at least at the center, almost at the center, or at the four corners of a unit in regions without the first, second, third, fourth, fifth, sixth, and seventh objects (STEP 3-3). For example, FIG. 90(*d*) illustrates an example in which the third objects are formed at the four corners of a unit. The composite image data is obtained by the above-described calculation means, as shown in FIG. 92(*b*).

(Object Deletion Step)

Third, in the first and second objects arranged in the intra-outline units 24*a*1' and the extra-outline units 24*a*2' of the outline image data 24*a*', when both the first and second objects arranged adjacent to each other are on, the object deletion unit deletes one of the first and second objects to set it in the off state, as shown in FIGS. 91(*a*) and 91(*b*). In addition, in the fifth and sixth objects arranged in the intra-outline units 24*b*1' and the extra-outline units 24*b*2' of the outline image data 24*b*', when both the fifth and sixth objects arranged adjacent to each other are on, the object deletion unit deletes one of the fifth and sixth objects to set it in the off state (STEP 3-4).

(Density Imbalance Relaxing Object Arranging Step)

Fourth, to relax density imbalance in predetermined regions, the density imbalance relaxing object arranging unit arranges the fourth objects a having an object area ratio 1/2 or almost 1/2 that of the first or second objects and also having the same or almost the same color at the spatial positions where the first or second object has been deleted or at the positions where off portions are arranged adjacently in the plurality of units arranged adjacently, as shown in FIG. 92(*a*). In addition, to relax density imbalance in predetermined regions, the density imbalance relaxing object arranging unit arranges the seventh objects b having an object area ratio 1/2 or almost 1/2 that of the fifth or sixth objects and also having the same or almost the same color at the spatial positions where the fifth or sixth object has been deleted or at the positions where off portions are arranged adjacently in the plurality of units arranged adjacently, thereby generating the composite image data 26' (halftone dot data) shown in FIG. 92(*b*) (STEP 3-5). Note that the order of the visible image arranging step is not particularly limited, and it is necessary to only eventually obtain the composite image data.

The object deletion step and the density imbalance relaxing object arranging step will be described in more detail. To relax the apparent density imbalance, object deletion and addition are executed for each unit [h,v] that is the minimum unit by the algorithm shown in FIG. 46. Note that [v] is the number of steps corresponding to the number of units counted vertically from the upper side, and [h] is the number of steps corresponding to the number of units counted horizontally from the left side. First, in the process f1, concerning the units [h,v] of each column of the matrix, the objects A[h,v] and A'[h,v] are sequentially detected. Note that as for the method of detecting the objects A[h,v] and A'[h,v], for example, if the printed pattern 3 is a binary image having the bitmap format, the object A[h,v] or A'[h,v] may be identified and deleted in a process target unit by processing called labeling in general.

Figure 66:
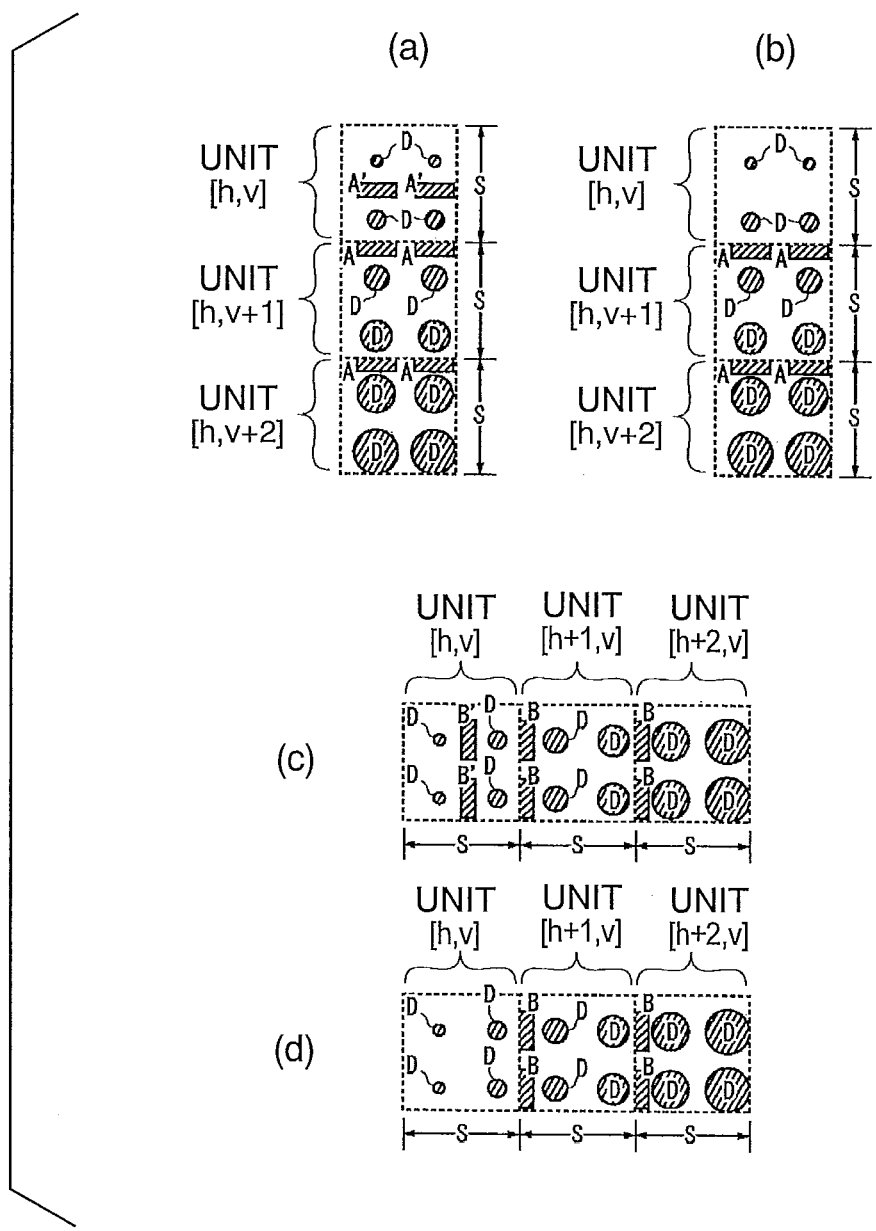
FIG. 66 shows views of a state in which the objects A'[h,v] and the objects B'[h,v] of the unit [h,v] are deleted in accordance with the algorithms in FIGS. 46 and 47.

Next, if a condition that the unit [h,v] includes the objects A'[h,v], and the unit [h,v+1] includes the objects A[h,v+1] is satisfied in the process f2, the objects A'[h,v] which should be arranged originally in the unit [h,v] are deleted in the process f3. More specifically, when the unit [h,v], unit [h,v+1], and unit [h,v+2] are arranged, and the objects A'[h,v] of the unit [h,v] are adjacent to the objects A[h,v+1] of the unit [h,v+1], as shown in FIG. 66(*a*), the objects A'[h,v] of the unit [h,v] are deleted, as shown in FIG. 66(*b*). If the condition of the process f2 is not satisfied, the process advances to the process f4. Since the objects A' are partially deleted, the total area of the objects A' is smaller than that of the objects A.

In addition, object deletion and addition are executed for each unit [h,v] that is the minimum unit by the algorithm shown in FIG. 47. First, in the process f11, concerning the units [h,v] of each column of the matrix, the objects B[h,v] and B'[h,v] are sequentially detected. Note that as for the method of detecting the objects B[h,v] and B'[h,v], for example, if the printed pattern 3 is a binary image having the bitmap format, the object B[h,v] or B'[h,v] may be identified and deleted in a process target unit by processing called labeling in general.

Next, if a condition that the unit [h,v] includes the objects B'[h,v], and the unit [h+1,v] includes the objects B[h+1,v] is satisfied in the process f12, the object B'[h,v] which should be arranged originally in the unit [h,v] are deleted in the process f13. More specifically, when the unit [h,v], unit [h+1,v], and unit [h+2,v] are arranged, and the object B'[h,v] of the unit [h,v] is adjacent to the object B'[h+1,v] of the unit [h+1,v], as shown in FIG. 66(*c*), the objects B'[h,v] of the unit [h,v] are deleted, as shown in FIG. 66(*d*). If the condition of the process f12 is not satisfied, the process advances to the process 14. In addition, since the objects B' are partially deleted, the total area of the objects B' is smaller than that of the objects B.

FIG. 67(a) is a plan view showing the object arrangement of the unit [h,v] of the anti-counterfeit printed matter. The basic object arrangement is the same as that shown in FIG. 61. In addition to the objects D that produce the continuous tone, the objects a, b, and E are provided to relax density imbalance. The objects a, b, and E are located in the regions occupied by the objects D in FIG. 61 and arranged around the objects D so as to be adjacent to the objects A, A', B, and B'. The total object area of the objects a, b, or E in the unit [h,v] is 1/2 or almost 1/2 the object area of the objects A, A', B, or B' in the unit [h,v]. The almost 1/2 object area indicates an object area ratio of 40% to 60% when the object area ratio of the objects A, A', B, or B' is defined as 100%. At an object area ratio of 40% or less, the density appears to be low, and the density imbalance cannot be relaxed. At an object area ratio higher than 60%, the density appears to be high, and the density imbalance cannot be relaxed. Note that the objects D construct the pattern 4 having an arbitrary continuous tone shown in FIG. 58. As shown in the conceptual view of FIG. 67(b), the size of the object D changes in accordance with the continuous tone from highlight to shadow, thereby determining the density of the printed pattern 3 shown in FIG. 58.

If a condition that the unit [h,v] includes the objects A[h,v], and the unit [h,v+1] includes the objects A'[h,v+1] is satisfied in the process f4 shown in FIG. 46, the objects a[h,v] are added to the unit [h,v] in the process f5. More specifically, as shown in FIG. 68(b), the objects a having an object area 1/2 or almost 1/2 that of the objects A or A' are added to the units [h,v] and [h,v+1]. This relaxes the density imbalance upon naked eye observation between the unit [h,v] and the unit [h,v+1]. On the other hand, if a condition that the unit [h,v] includes the objects B[h,v], and the unit [h+1,v] includes the objects B'[h+1,v] is satisfied in the process f14 shown in FIG. 47, the objects b[h,v] are added to the unit [h,v] in the process f15. More specifically, as shown in FIG. 68(f), the objects b having an object area 1/2 or almost 1/2 that of the objects B or B' are added to the units [h,v] and [h+1,v]. This relaxes the density imbalance upon naked eye observation between the unit [h,v] and the unit [h+1,v].

If a condition that the unit [h,v] includes the objects A'[h,v], the unit [h,v+1] includes no object, and the unit [h,v+2] includes the objects A[h,v+2] is satisfied in the process f6 shown in FIG. 46, the objects E are added to the unit [h,v+1] in the process f7. More specifically, as shown in FIG. 68(c), the objects E having an object area 1/2 or almost 1/2 that of the objects A or A' are added to the unit [h,v+1]. This relaxes the density imbalance upon naked eye observation between the unit [h,v] and the unit [h,v+2]. On the other hand, if a condition that the unit [h,v] includes the objects B'[h,v], the unit [h+1,v] includes no object, and the unit [h+2,v] includes the objects B[h+2,v] is satisfied in the process f16 shown in FIG. 47, the objects E are added to the unit [h+1,v] in the process f17. More specifically, as shown in FIG. 68(g), the objects E having an object area 1/2 or almost 1/2 that of the objects B or B' are added to the unit [h+1,v]. This relaxes the density imbalance upon naked eye observation between the unit [h,v] and the unit [h+2,v].

If a condition that the unit [h,v] includes the objects A'[h,v], the unit [h,v+1] includes no object, and the unit [h,v+2] includes the objects A'[h,v+2] is satisfied in the process f8 shown in FIG. 46, the objects E and a are added to the unit [h,v+1] in the process f9. More specifically, as shown in FIG. 68(d), the objects E and a having an object area 1/2 or almost 1/2 that of the objects A or A' are added to the unit [h,v+1]. This relaxes the density imbalance upon naked eye observation between the unit [h,v] and the unit [h,v+2]. On the other hand, if a condition that the unit [h,v] includes the objects B'[h,v], the unit [h+1,v] includes no object, and the unit [h+2,v] includes the objects B'[h+2,v] is satisfied in the process f18 shown in FIG. 47, the objects E and b are added to the unit [h+1,v] in the process f19. More specifically, as shown in FIG. 68(h), the objects E and b having an object area 1/2 or almost 1/2 that of the objects B or B' are added to the unit [h+1,v]. This relaxes the density imbalance upon naked eye observation between the unit [h,v] and the unit [h+2,v]. Hence, when the processes f4 to f8 in FIG. 46 and the processes f14 to f18 in FIG. 47 are applied to the printed pattern 3 in FIG. 64(a), the density imbalance upon naked eye observation is relaxed throughout the printed pattern 3 shown in FIG. 69.

Note that the method of acquiring the unit width information and unit height information changes depending on the image format to be used. When the image format is, for example, EPS, a tag that describes the image width information and image height information is searched from the image file to acquire the information. Alternatively, when the image format is, for example, BMP, the unit width information and unit height information are obtained by acquiring image resolution information and pixel number information described at a predetermined position of the image file and performing calculations.

With the above-described processes, the composite image data (halftone dot data) is created. The created halftone dot data includes the first image data having the first invisible image made of the first and second objects, the second image data having the second invisible image made of the fifth and sixth objects, the third image data having the visible image made of the third objects, and the fourth and seventh objects to relax density imbalance.

(Image Output Step)

An anti-counterfeit printed matter can also be manufactured based on the created halftone dot data (STEP 4). To manufacture the anti-counterfeit printed matter, for example, the image data undergoes color separation to output a printing plate, and printing is performed by a commercial printing press. Alternatively, an inkjet printer outputs the printed matter directly based on the image data.

(Anti-Counterfeit Printed Matter C16)

Figure 102:
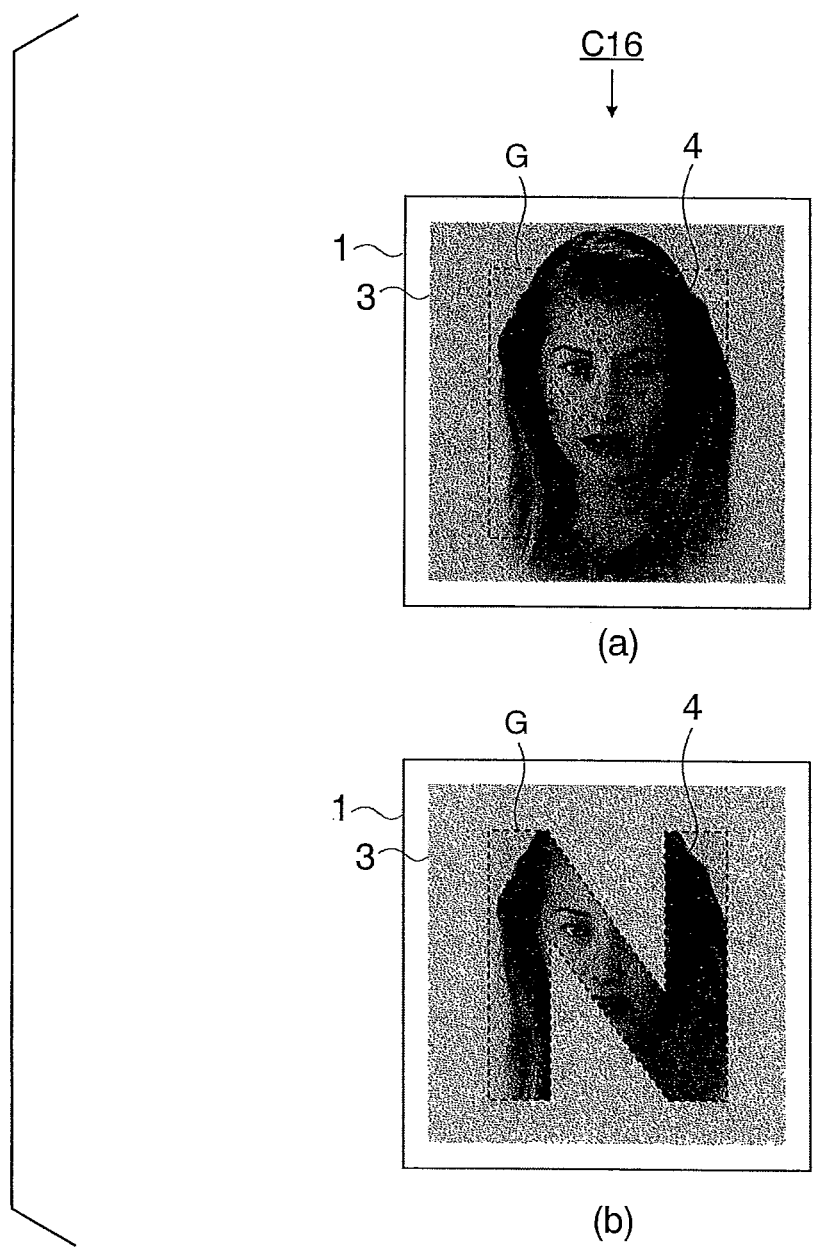
FIG. 102 shows explanatory views of a case in which the printed matter 1 is visually observed in the diffused light region and a case in which the printed matter 1 is visually observed in the specular reflected light region.

FIG. 102 shows anti-counterfeit printed matters of the anti-counterfeit printed matters C1 to C15 in which the printed pattern 3 is printed using photoluminescent ink, and a desired pattern G (N in the alphabet) is printed on the printed pattern 3 by solid filling using a colorless transparent material.

Figure 103:
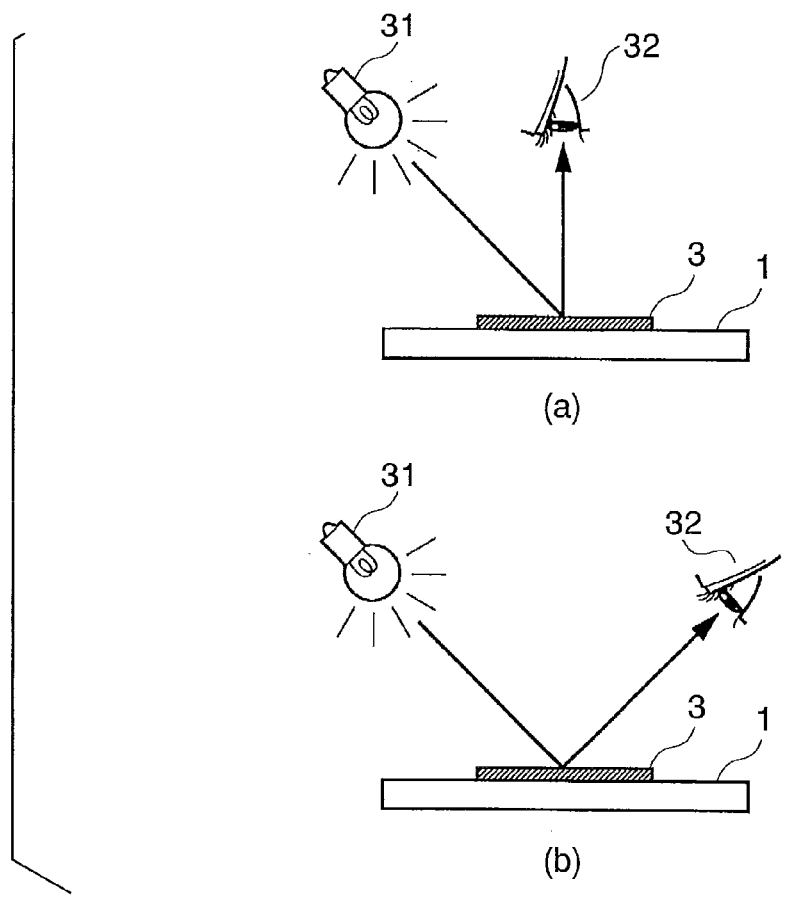
FIG. 103 shows explanatory views of the positional relationship between an illumination light source 31, an eyepoint 32, and the printed matter 1 upon observing the printed matter 1 in the diffused light region and the specular reflected light region.

FIG. 103 shows the positional relationship between an illumination light source 31, an eyepoint 32, and the printed matter 1 upon observing the printed matter 1 of the anti-counterfeit printed matter having a continuous tone shown in FIG. 102 in the diffused light region and the specular reflected light region. Observation in the diffused light region is done when the illumination light source 31, eyepoint 32, and printed matter 1 have the positional relationship shown in FIG. 103(a). Observation in the specular reflected light region is done when the illumination light source 31, eyepoint 32, and printed matter 1 have the positional relationship shown in FIG. 103(b).

When the printed matter 1 is visually observed in the diffused light region, as shown in FIG. 103(a), the pattern G formed on the printed pattern 3 using the colorless transparent material is completely transparent. For this reason, the printed pattern 3 made of the photoluminescent ink can visually be recognized, as shown in FIG. 102(a). On the other hand, when the printed matter 1 is visually observed in the specular reflected light region, as shown in FIG. 103(*b*), the brightness of the printed pattern 3 made of the photoluminescent ink rises due to the photoluminescent action caused by the specular reflected light, but the photoluminescent action of the printed pattern 3 is suppressed in the portion of the pattern G made of the colorless transparent material. Only the pattern G is thus enhanced and visually recognized due to the difference in the photoluminescence, as shown in FIG. 102 (*b*). Hence, the character "N" constructed by arranging the pattern G is observed.

In the present invention, a system for issuing a printed matter which adds invisible information including an image to a continuous tone image will be described.

Figure 104:
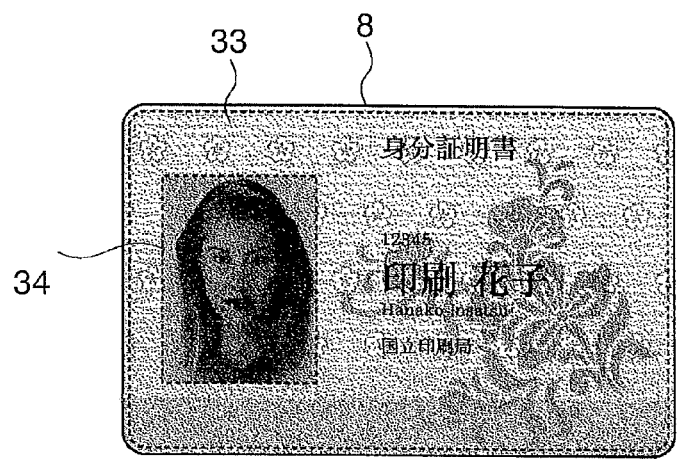
FIG. 104 is an explanatory view showing a printed matter of an identification card type including invisible information added to a continuous tone image.

FIG. 104 illustrates a printed matter which adds invisible information to a continuous tone image. A card mount pattern 33 and a face photo image 34 are printed together on part of the printing surface of a printed matter 8 of an identification card type. The face photo 34 is the printed pattern 3 obtained by any one of the above-described methods.

An example of an apparatus for issuing an anti-counterfeit printed matter having a continuous tone will be explained next.

Figure 105:
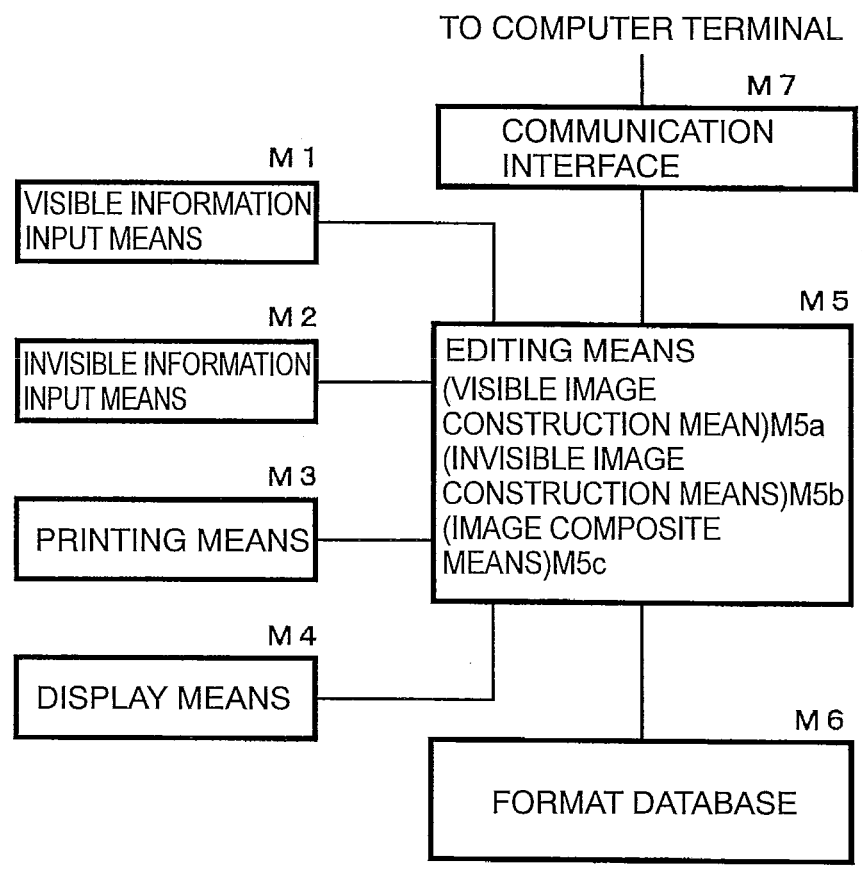
FIG. 105 is an organization chart of an apparatus for issuing a printed matter including invisible information added to a continuous tone image.

As shown in the organization chart of FIG. 105, the apparatus for issuing the anti-counterfeit printed matter according to the present invention includes a visible information input means M1 and an invisible information input means M2 each serving as an image input means, a printing means M3 serving as an image output means, a display means M4, an editing means M5 serving as a calculation means, a format database M6, and a communication interface M7.

The visible information input means M1 is not particularly limited to a camera, a digital camera, a scanner, and the like. The visible information input means can obtain visible information from a database in which personal information is input, like the format database to be described later, or via a communication interface from an external database server in which personal information is input in advance.

The invisible information input means M2 can obtain invisible information by input from a keyboard, or from a database in which invisible information is input, like the format database to be described later, or via a communication interface from an external database server in which invisible information is input in advance.

The printing means M3 is not particularly limited to an inkjet printer, a laser printer, and the like.

The display means M4 is not particularly limited to a normal monitor used in a computer, a dedicated monitor, and the like.

The editing means M5 includes a visible image construction means M5*a* and an invisible image construction means 5Mb each serving as an item setting means, and an image composite means 5Mc having an outline extraction means, an invisible image arranging means, a visible image arranging means, an object deletion unit, and a density imbalance relaxing object arranging means. The visible image construction means M5*a* sets the resolution, coloring, halftone dot shapes, and the like for an image obtained by the visible information input means M1. The invisible image construction means 5Mb sets the resolution, coloring, halftone dot shapes, and the like for an image obtained by the invisible information input means M2. The image composite means composites object data based on the items set by the visible image construction means M5*a* and those set by the invisible image construction means 5Mb.

The format database M6 stores data necessary for printing other than those for the visible information input means M1 and the invisible information input means M2.

The communication interface M7 is not particularly limited to RS-232C, IEEE1394, and the like.

Figure 106:
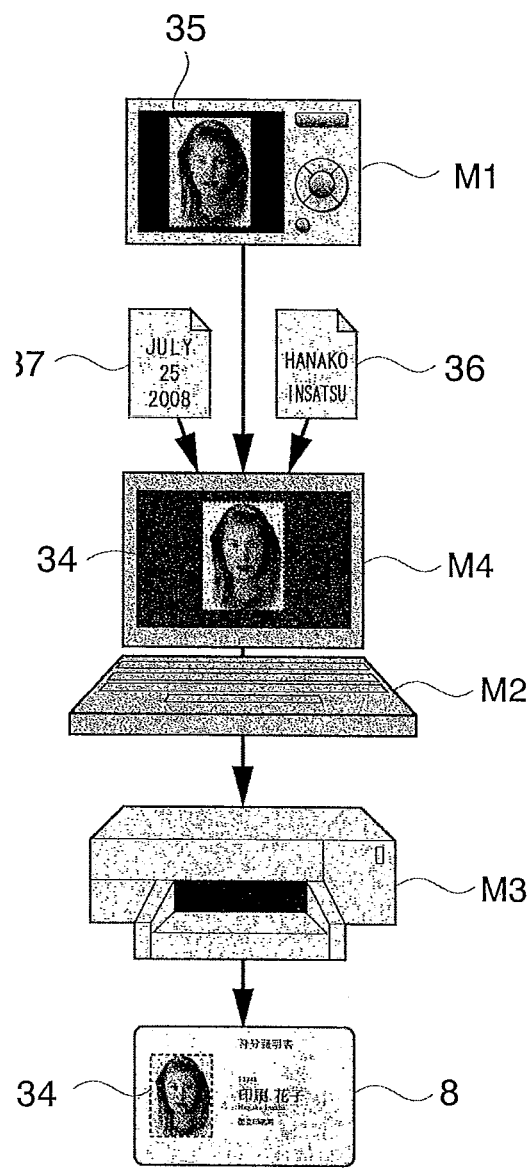
FIG. 106 is an explanatory view showing the procedure of issuing the printed matter of an identification card type.

FIG. 106 is an explanatory view showing the procedure of issuing the printed matter of an identification card. As shown in FIG. 106, for example, a person who wants to issue an identification card obtains the data of a face photo image 35 by the visible information input means M1, for example, a digital camera. Next, as two kinds of invisible information separately prepared, invisible information 36 that is, for example, the name and invisible information 37 that is, for example, time stamp information such as the date of issue are obtained by the invisible information input means M2, for example, input from a keyboard or as communication information from the communication interface. Then, the data of the face photo image 35 and the data of the two kinds of invisible information 36 are together sent to the editing means M4, for example, a notebook PC. The editing means M4 embeds the data of the invisible information 36 and the data of the invisible information 37 in the data of the face photo image 35. The printing means M3, for example, a printer prints the face photo image 34 in which the invisible information 36 and the invisible information 37 are embedded.

The display means M4 displays processes concerning the printed matter issuance as needed. The data of the face photo image 35, the data of the invisible information 36, and the data of the invisible information 37 may be obtained from another computer terminal by communication via the communication interface M7. Note that the tools shown in FIG. 106 are not particularly limited.

Figure 107:
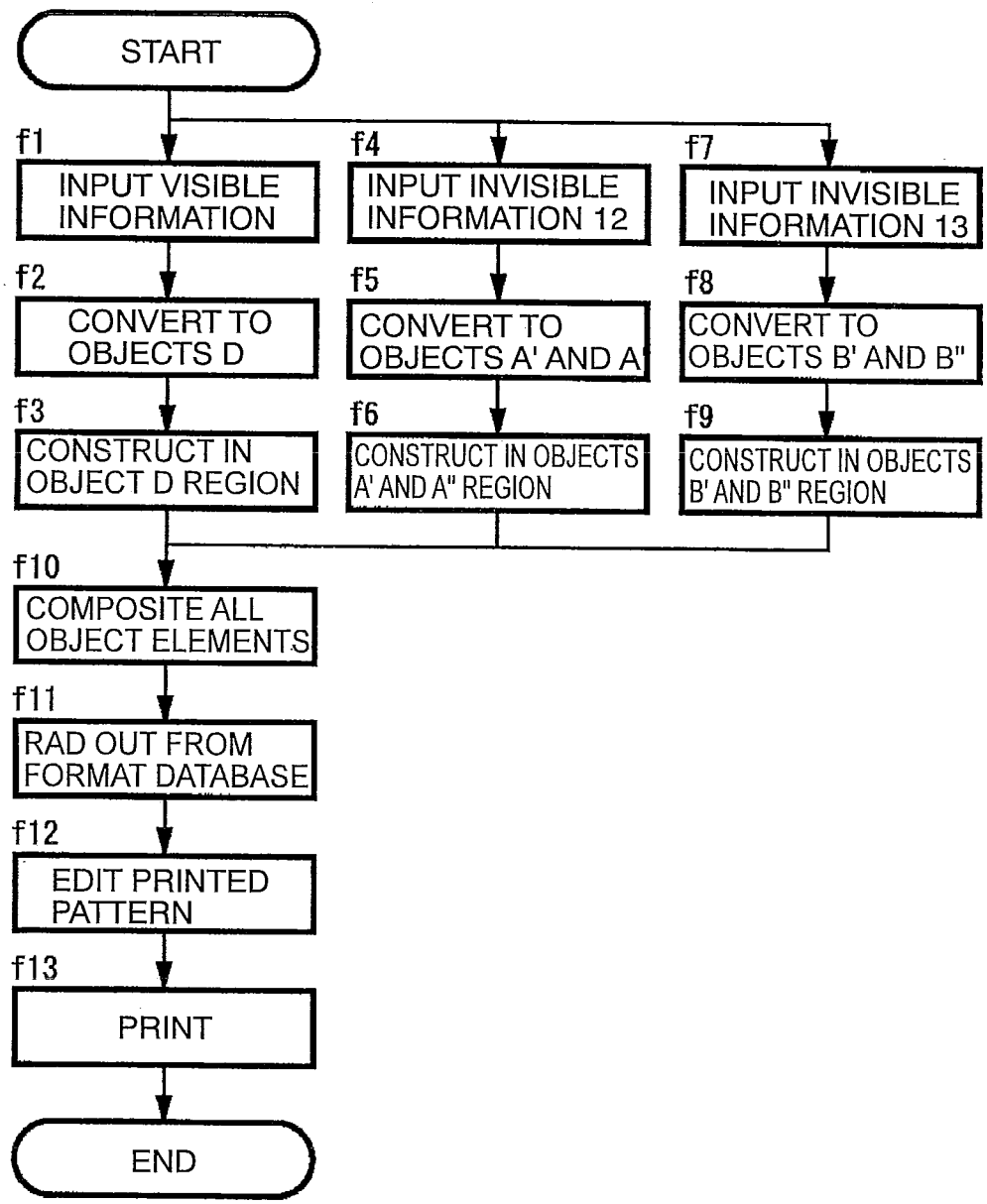
FIG. 107 is a flowchart illustrating the basic procedure of a printed matter issuing method.

An example of a method of manufacturing an anti-counterfeit printed matter having a continuous tone will be described next. FIG. 107 illustrates the basic procedure of a printed matter issuing method.

First, in step f1, the data of the face photo image 35 is obtained by the visible information input means M1. A multilevel bitmap image is input. The number of pixels and the like are not particularly limited. As an example, an RGB image of 1600×1200 pixels is input. In step f2, the image is converted into the data of the objects D to be arranged in the regions of the data of the objects D shown in FIG. 61. Conversion into the data of the objects D is done based on the settings of the visible image construction means M5*a* included in the editing means M5 shown in FIG. 105. The object shape of the data of the objects D is set by any one of the above-described continuous tone expression methods. In step f3, the data of the objects D converted from the data of the face photo image 35 are constructed in the regions of the data of the objects D shown in FIG. 61.

Additionally, in step f4, the data of the invisible information 36 is obtained by the invisible information input means M2. The inputtable information can be either an image or a text. When the data of the invisible information is obtained as a text, the editing means M5 converts it into a binary bitmap image. At this time, the image has the same number of pixels as that of the above-described multilevel bitmap image. In step f5, the image is converted into the data of the objects A and the data of the objects A' to be arranged in the regions of the data of the objects A and the data of the objects A' shown in FIG. 61. Conversion into the data of the objects A and the data of the objects A' is done based on the invisible image construction means M5*b* included in the editing means M5 shown in FIG. 105. In step f6, the data of the objects A and the data of the objects A' converted from the data of the invisible information 36 are constructed in the regions of the data of the objects A and the data of the objects A' shown in FIG. 61.

Furthermore, in step f7, the data of the invisible information 37 is obtained by the invisible information input means M2. The inputtable information can be either an image or a text. When the data of the invisible information is obtained as a text, the editing means M5 converts it into a binary bitmap image. At this time, the image has the same number of pixels as that of the above-described multilevel bitmap image. In step f8, the image is converted into the data of the objects B and the data of the objects B' to be arranged in the regions of the data of the objects B and the data of the objects B' shown in FIG. 61. Conversion into the data of the objects B and the data of the objects B' is done based on the invisible image construction means M5*b* included in the editing means M5 shown in FIG. 105. In step f9, the data of the objects B and the data of the objects B' converted from the data of the invisible information 37 are constructed in the regions of the data of the objects B and the data of the objects B' shown in FIG. 61.

Next, in the process of step f10, the image composite means M5*c* included in the editing means M5 composites the data of the objects D, the data of the objects A, the data of the objects A', the data of the objects B, and the data of the objects B' obtained in steps f1 to f9. At this time, the data of the objects a, the data of the objects b, and the data of the objects E to relax density imbalance are arranged by any one of the above-described methods.

In step f11, format data stored in the format database M6, for example, the card mount pattern 9 shown in FIG. 104 is sent to the editing means M5 and composited with the data of the face photo image 34 by the image composite means M5*c*.

Finally, the printing means M3 prints the data of the face photo image 34 in which the data of the invisible information 36 and the data of the invisible information 37 are embedded and the data of the card mount pattern 9 obtained from the format database M6 together, thereby obtaining the printed matter 8 shown in FIG. 104.

DESCRIPTION OF THE REFERENCE NUMERALS 1 printed matter
2 discrimination tool
3 printed pattern
4 pattern
5 invisible image, first invisible image
6 second invisible image
7 center line
8 pattern
11, 11' image input means
12, 12' item setting means
13, 13' calculation means
14, 14' image output means
15, 15' generation data resolution setting unit
16, 16' coloring setting unit
17, 17' halftone dot shape setting unit
18, 18' outline extraction unit
19, 19' invisible image arranging unit
20, 20' object deletion unit
21, 21' density imbalance relaxing object arranging unit
22 visible image arranging unit
23, 23*a*, 23*a*' first image data
23*b*, 23*b*' second image data
23*c* third image data
24 outline image data
24*a*, 24*a*' outline image data of first image data
24*b*, 24*b*' outline image data of second image data
24*a*1, 24*b*1, 24*a*1', 24*b*1' intra-outline unit
24*a*2, 24*b*2, 24*a*2', 24*b*2' extra-outline unit
25 second image data
26, 26' composite image data
31 illumination light source
32 eyepoint
33 card mount pattern
34, 34' face photo image
35 face photo image
36 invisible information
37 invisible information
A, A', B, B', C, C', D, E object
a, b object
A1, A2, A3, A4 halftone dot data creation apparatus
B1, B2, B3, B4 halftone dot data creation software
C1, C2, C3, C4, C5, C6, C7, C8, C9, C10, C11, C12, C13, C14 anti-counterfeit printed matter
h number of vertical steps
v number of horizontal steps
S size
T region
G pattern
L1 line
L2 line

The invention claimed is:

1. An anti-counterfeit printed matter having a continuous tone, comprising:
    units arranged at a predetermined pitch in a matrix on a base material in a first direction and a second direction perpendicular to the first direction,
    each of the units including:
    either a first object or a second object is arranged in a respective first or second region along the first direction in a manner so that the first region and the second region in each of the units oppose each other;
    a third object arranged between the first region and the second region along the first direction in an area of the unit where the first region and the second region are not arranged; and
    an imaginary horizontal line extending in the second direction,
    the imaginary horizontal line being arranged approximately 25% down from a top of the unit and passing between the first region and the second region in a position that passes through a center of the third object; and and
    wherein the first region and the second region of each of the units have equivalent areas, and a relationship in which one of the first and second regions has a respective object, and the other of the first and second regions does not have a respective object,
    the first object is adapted to form one of a positive image and a negative image of a first invisible image, while the second object is concurrently adapted to only form the other of the negative image and the positive image of the first invisible image, and
    the third object is adapted to form a visible image having a continuous tone.

2. The anti-counterfeit printed matter having a continuous tone according to claim 1,
    wherein the third object forms the visible image having the continuous tone by one method selected from increasing/decreasing an object size, changing an object density, and changing an object sparseness.

3. The anti-counterfeit printed matter having a continuous tone according to claim 1, wherein a maximum size of each of the units is not more than 1 mm.

4. The anti-counterfeit printed matter having a continuous tone according to claim 1,
each of the units further comprising:
a fourth object having an area ratio 1/2 or substantially 1/2 that of the first object or the second object, and also having a color identical to that of the first object and the second object,
the fourth object being arranged in an area of at least one of the units where each of the first object, the second object, and the third object are not arranged, and
in the at least one of the units,
the first object and the second object, which have the relationship in which one is in the off state when the other is the on state, are arranged to form the first invisible image, and
the second object in the off state is arranged in close vicinity to the first object in the off state in the adjacently arranged units.

5. The anti-counterfeit printed matter having a continuous tone according to claim 4,
wherein in each of the units,
the fourth object is formed in a shape surrounding the third object, and in an area of the unit where the first object, the second object, and the third object are not formed, or
the fourth object is formed in a shape surrounded by the third object, and in an area of the unit where the first object, the second object, and the third object are not formed in the unit.

6. The anti-counterfeit printed matter having a continuous tone according to claim 4,
wherein in each of the units,
the fourth object is formed in an area where the first object, the second object, and the third object are not foamed, and is arranged at a position adjacent to the first object and/or the second object.

7. The anti-counterfeit printed matter having a continuous tone according to claim 4,
wherein, in each of the units,
the first object, the second object, the third object, and the fourth object are printed by ink containing a photoluminescent material, and
a predetermined pattern is printed using a colorless transparent material on at least some of the first object, the second object, the third object, and the fourth object.

8. The anti-counterfeit printed matter having a continuous tone according to claim 1,
wherein the visible image having the continuous tone includes a face image.

9. An anti-counterfeit printed matter having a continuous tone, comprising:
units arranged at a predetermined pitch in a matrix on a base material,
each of the units including:
either a first object or a second object is arranged in a respective along a first direction in a manner so that the first region and the second region in each of the units oppose each other;
a fifth object and a sixth object a second direction perpendicular to the first direction in a manner so as to oppose each other;
a third object arranged between the first region and the second region along the first direction, and in an area of the unit where the first object, the second object, the fifth object, and the sixth object are not arranged; and
an imaginary horizontal line extending in the second direction,
the imaginary horizontal line being arranged approximately 25% down from a top of the unit and passing between the first region and the second region in a position that passes through a center of the third object;
wherein the first region and the second region of each of the units have equivalent areas, and a relationship in which one of the first and second regions has a respective object, and the other of the first and second regions does not have a respective object,
the first object being adapted to form one of a positive image and a negative image of a first invisible image, while the second object is concurrently adapted to only form the other of the negative image and the positive image of the first invisible image,
the fifth object and the sixth object of each of the units have a relationship in which one is an off state when the other is an on state, and have equivalent areas,
the fifth object being adapted to form one of a positive image and a negative image of a second invisible image, while the sixth object is concurrently adapted to only from the other of the negative image and the positive image of the second invisible image, and
the third object being adapted to form a visible image having a continuous tone.

10. The anti-counterfeit printed matter having a continuous tone according to claim 9,
wherein the unit has a square shape and sides each having a length of not more than 1 mm.

11. The anti-counterfeit printed matter having a continuous tone according to claim 9,
each of the units further comprising:
a fourth object having an area ratio 1/2 or substantially 1/2 that of the first object or the second object and also having a color identical to that of the first object and the second object,
the fourth object being arranged in an area of the unit where the first object, the second object, and the third object are not arranged, and
in the at least one of the units,
the first object and the second object, which have the relationship in which one is off when the other is on, are arranged to form the first invisible image, and
the second object in the off state is arranged in close vicinity to the first object in the off state in the adjacently arranged units, and
the at least one of the units further comprising:
a seventh object having an area ratio 1/2 or substantially 1/2 that of the fifth object or the sixth object, and also having a color identical to that of the fifth object and the sixth object,
the seventh object being arranged in an area of the unit where each of the fifth object and the sixth object are not arranged, and
in the at least one of the units,
the fifth object and the sixth object, which have the relationship in which one is the off state when the other is in the on state, are arranged to form the second invisible image,
the sixth object in the off state is arranged in close vicinity to the fifth object in the off state in the adjacently arranged units.

12. The anti-counterfeit printed matter having a continuous tone according to claim 11,
wherein the fourth object and the seventh object are formed in an area of the unit where the first object, the second object, the third object, the fifth object, and the sixth object are not formed in the unit.

13. The anti-counterfeit printed matter having a continuous tone according to claim 11, wherein the fourth object and the seventh object are formed in a shape surrounding the third object or in a shape surrounded by the third object in a object where the first object, the second object, the third object, the fifth object, and the sixth object are not formed in the unit.

14. The anti-counterfeit printed matter having a continuous tone according to claim 11, wherein the fourth object and the seventh object are formed in an area of the unit where the first object, the second object, the third object, the fifth object, and the sixth object are not formed in the unit, and are arranged at four corners in the unit having the square shape.

15. The anti-counterfeit printed matter having a continuous tone according to claim 11, wherein in each of the units, the first object, the second object, the third object, the fourth object, the fifth object, the sixth object, and the seventh object are printed by ink containing a photoluminescent material, and a predetermined pattern is printed using a colorless transparent material on at least some of the first object, the second object, the third object, the fourth object, the fifth object, the sixth object, and the seventh object.

16. The anti-counterfeit printed matter having a continuous tone according to claim 11, wherein in each of the units, the first object, the second object, and the fourth object have a hue different from that of the fifth object, the sixth object, and the seventh object.

* * * * *